(12) United States Patent
Harvey et al.

(10) Patent No.: US 9,051,461 B2
(45) Date of Patent: Jun. 9, 2015

(54) BLENDED FLUOROPOLYMER COMPOSITIONS HAVING MULTIPLE MELT PROCESSIBLE FLUOROPOLYMERS

(75) Inventors: Leonard W. Harvey, Downington, PA (US); Helen L. Brain, Merseyside (GB); Thomas J. Bate, Glenview, IL (US); Anita K. Peacock, Cheshire (GB); Susan J. Roberts-Bleming, Cheshire (GB)

(73) Assignee: Whitford Corporation, Elverson, PA (US)

( * ) Notice: Subject to any disclaimer, the term of this patent is extended or adjusted under 35 U.S.C. 154(b) by 359 days.

(21) Appl. No.: 12/962,790

(22) Filed: Dec. 8, 2010

(65) Prior Publication Data

US 2011/0306716 A1 Dec. 15, 2011

Related U.S. Application Data

(60) Provisional application No. 61/287,929, filed on Dec. 18, 2009, provisional application No. 61/296,553, filed on Jan. 20, 2010.

(51) Int. Cl.
| | |
|---|---|
| *C08L 27/00* | (2006.01) |
| *C08L 27/18* | (2006.01) |
| *C08L 27/20* | (2006.01) |
| *C09D 127/18* | (2006.01) |

(52) U.S. Cl.
CPC ............... *C08L 27/18* (2013.01); *C08L 27/20* (2013.01); *C08L 2205/03* (2013.01); *C09D 127/18* (2013.01)

(58) Field of Classification Search
USPC .......................................... 524/500, 501, 520
See application file for complete search history.

(56) References Cited

U.S. PATENT DOCUMENTS

| | | | |
|---|---|---|---|
| 3,067,262 A * | 12/1962 | Brady ............................ 570/126 |
| 4,610,918 A | 9/1986 | Effenberger et al. |
| 4,654,235 A | 3/1987 | Effenberger et al. |
| 4,749,752 A | 6/1988 | Youlu et al. |
| 4,767,646 A | 8/1988 | Cordova et al. |
| 4,904,735 A | 2/1990 | Chapman, Jr. et al. |
| 4,914,158 A | 4/1990 | Yoshimura et al. |
| 4,952,630 A | 8/1990 | Morgan et al. |
| 4,960,431 A | 10/1990 | Cordova et al. |
| 5,240,660 A | 8/1993 | Marshall |
| 5,317,061 A | 5/1994 | Chu et al. |
| 5,397,629 A | 3/1995 | Jahn |
| 5,444,116 A | 8/1995 | Amin et al. |
| 5,468,798 A | 11/1995 | Leech |
| 5,473,018 A | 12/1995 | Namura et al. |
| 5,501,879 A | 3/1996 | Murayama |
| 5,560,978 A | 10/1996 | Leech |
| 5,590,420 A | 1/1997 | Gunn |
| 5,603,999 A | 2/1997 | Namura et al. |
| 5,752,278 A | 5/1998 | Gunn |
| 5,829,057 A | 11/1998 | Gunn |
| 6,021,523 A | 2/2000 | Vero |
| 6,061,829 A | 5/2000 | Gunn |
| 6,080,474 A | 6/2000 | Oakley et al. |
| 6,133,359 A | 10/2000 | Bate et al. |
| 6,143,368 A | 11/2000 | Gunn |
| 6,255,384 B1 * | 7/2001 | McCarthy et al. ............ 524/805 |
| 6,436,533 B1 | 8/2002 | Heffner et al. |
| 6,461,679 B1 | 10/2002 | McMeekin et al. |
| 6,531,559 B1 | 3/2003 | Smith et al. |
| 6,548,612 B2 | 4/2003 | Smith et al. |
| 6,596,207 B1 | 7/2003 | Gunn |
| 6,649,699 B2 | 11/2003 | Namura |
| 6,673,125 B2 | 1/2004 | Miller |
| 6,673,416 B1 | 1/2004 | Nishio |
| 6,737,165 B1 | 5/2004 | Smith et al. |
| 6,750,162 B2 | 6/2004 | Underwood et al. |
| 6,800,176 B1 | 10/2004 | Birchenall |
| 6,800,602 B1 | 10/2004 | Kvita et al. |

(Continued)

FOREIGN PATENT DOCUMENTS

| | | | |
|---|---|---|---|
| EP | 0322877 A2 | 5/1989 |
| EP | 0395895 A1 | 11/1990 |

(Continued)

OTHER PUBLICATIONS

Dupont (Fluoropolymer Comparision—Typical Properties).*
DuPont (DuPont FEP 121-A aqueous dispersion).*
Dupont (Fluoropolymer Comparison—Typical Properties), 2012.*
Dupont (DuPont FEP 121-A aqueous dispersion), 2013.*
The International Search Report and Written Opinion mailed Mar. 29, 2011 in International Application No. PCT/US2010/059368.

(Continued)

*Primary Examiner* — Wenwen Cai
(74) *Attorney, Agent, or Firm* — Faegre Baker Daniels LLP

(57) ABSTRACT

Fluoropolymer compositions that include multiple fluoropolymer components and, in exemplary applications, may be applied as coatings to either rigid or flexible substrates. The compositions may themselves be applied as basecoats or overcoats, or may be combined with other components to formulate basecoats or overcoats. In one embodiment, the compositions include at least one low molecular weight polytetrafluoroethylene (LPTFE) and at least two chemically different melt processible fluoropolymers (MPF). In another embodiment, the compositions include at least one high molecular weight polytetrafluoroethylene (HPTFE), at least one low molecular weight polytetrafluoroethylene (LPTFE), and at least two chemically different melt processible fluoropolymers (MPF). After being applied to a substrate, optionally over a basecoat and/or a midcoat and then cured, the present compositions form coatings that demonstrate improved characteristics, such as improved release characteristics, abrasion resistance, translucency/transparency, and permeability, for example.

23 Claims, 32 Drawing Sheets

(56) References Cited

U.S. PATENT DOCUMENTS

| | | |
|---|---|---|
| 6,824,872 B2 | 11/2004 | Coates et al. |
| 6,846,570 B2 | 1/2005 | Leech et al. |
| 6,867,261 B2 | 3/2005 | Bladel et al. |
| 6,872,424 B2 | 3/2005 | Linford et al. |
| 7,026,036 B2 | 4/2006 | Leech et al. |
| 7,030,191 B2 | 4/2006 | Namura |
| 7,041,021 B2 | 5/2006 | Gibson et al. |
| 7,160,623 B2 | 1/2007 | Smith et al. |
| 7,220,483 B2 | 5/2007 | Coates et al. |
| 7,276,287 B2 | 10/2007 | Smith et al. |
| 7,291,678 B2 | 11/2007 | Namimatsu |
| 2001/0018493 A1 | 8/2001 | Lee et al. |
| 2001/0048179 A1 | 12/2001 | Stewart et al. |
| 2004/0242783 A1 | 12/2004 | Yabu et al. |
| 2004/0253387 A1 | 12/2004 | Cavero |
| 2005/0106325 A1 | 5/2005 | Nishio |
| 2006/0122333 A1 | 6/2006 | Nishio |
| 2006/0180936 A1 | 8/2006 | Japp et al. |
| 2006/0293459 A1 | 12/2006 | Yoshimoto et al. |
| 2007/0106026 A1 | 5/2007 | Namura |
| 2007/0117929 A1 | 5/2007 | Burch et al. |
| 2007/0117930 A1 | 5/2007 | Venkataraman et al. |
| 2007/0255012 A1 | 11/2007 | Smith et al. |
| 2013/0303650 A1* | 11/2013 | Brothers et al. ............ 522/83 |

FOREIGN PATENT DOCUMENTS

| | | |
|---|---|---|
| EP | 1839846 A1 | 10/2007 |
| EP | 1840165 A1 | 10/2007 |
| JP | 2005-320398 A | 11/2005 |
| WO | WO00/58389 A1 | 10/2000 |
| WO | WO2006/045753 A1 | 5/2006 |
| WO | WO2007/050247 A2 | 5/2007 |
| WO | WO2007/056350 A1 | 5/2007 |
| WO | WO2007/061915 A2 | 5/2007 |
| WO | WO2009/010739 A1 | 1/2009 |
| WO | WO2009/010740 A1 | 1/2009 |
| WO | WO2009/146277 A1 | 12/2009 |
| WO | WO2010/036911 A1 | 4/2010 |
| WO | WO2010/036935 A1 | 4/2010 |
| WO | WO2010/036935 A2 | 4/2010 |

OTHER PUBLICATIONS

The International Search Report and Written Opinion mailed Nov. 27, 2009 in International Application No. PCT/US2009/058444.
The International Search Report and Written Opinion mailed Aug. 3, 2009 in International Application No. PCT/US2009/044516.
The International Search Report and Written Opinion mailed Nov. 27, 2009 in International Application No. PCT/US2009/058407.
International Preliminary Report on Patentability mailed Sep. 9, 2010 in International Patent Application No. PCT/US2009/044516.
Related International Application No. PCT/US2010/059368 published on Jun. 23, 2011 as WO2011/075351A1.
International Preliminary Report on Patentability mailed Apr. 20, 2012 in International Patent Application No. PCT/US2010/059368.
Notice of Opposition and Opposition Statement and English Translation of same dated Apr. 11, 2013 relating to European Patent No. EP2342279B1.
Patent Proprietors Response to Notice of Opposition dated Sep. 12, 2013 filed in related European Patent No. EP2342279B1.
Evidential reference identified on p. 2 of the Opposition Statement noted as A1 A1: Delivery notes and formulation evidence items 1 to 8, 2013.
Evidential reference identified on p. 2 of the Opposition Statement noted as A2 A2: Technical data sheet for 3M Dyneon TF 5050, 2013.
Evidential reference identified on p. 2 of the Opposition Statement noted as A3 A3: Extract from WO 20111/30154, 2011.
Evidential reference identified on p. 2 of the Opposition Statement noted as A4 with an English translation A4: Herr Blädel-Bräunlein's statutory declaration, 2013.
Evidential reference identified on p. 2 of the Opposition Statement noted as A5 A5: Technical data sheet for 3M Dyneon TF 9205, 2013.
Evidential reference identified on p. 2 of the Opposition Statement noted as A6 with an English translation A6: E-mail from 3M in respect of E-15416, 2013.
Evidential reference identified on p. 2 of the Opposition Statement noted as A7 A7: Extract from product information for Dyneon polytetrafluoroethylenes, 2013.
Evidential reference identified on p. 2 of the Opposition Statement noted as A8 A8: Extract from 3M's Internet pages relating to Dyneon LPTFEs, 2013.
Evidential reference identified on p. 2 of the Opposition Statement noted as A9 with an English translation A9: Extract from Kunststoffe Hoechst—Hostaflon, 2013.
Evidential reference identified on p. 2 of the Opposition Statement noted as A11 with an English translation A11: Technical data sheet for 3M Dyneon TF 5070, 2013.
Evidential reference identified on p. 2 of the Opposition Statement noted as A12 A12: Technical data sheet for 3M Dyneon TF 6900, 2013.
Evidential reference identified on p. 2 of the Opposition Statement noted as A13 A13: Technical data sheet for 3M Dyneon TF 6910, 2013.
Evidential reference identified on p. 2 of the Opposition Statement noted as A14 A14: WO 2004/076570 (by post only), 2004.

* cited by examiner

Fig. 1: Run 31 DSC first melt peaks and Fusion peak

Fig. 2: Run 31 DSC Remelt Peak

Fig. 3: Run 23 DSC first melt peaks and Fusion peak

Fig. 4: Run 23 DSC first Remelt peak

Fig. 5: Run 30 DSC first melt peaks and Fusion peak

Fig. 6: Run 30 DSC Remelt Peak

Fig. 7: Run 22 DSC first melt peaks and Fusion peaks

Fig. 8: Run 22 DSC Remelt Peaks

Fig. 9: Run 03 DSC first melt peaks and Fusion peaks

Fig. 10: Run 03 DSC Remelt peaks

Fig. 11: Run 41 DSC first melt peaks and Fusion peaks

Fig. 12: Run 41 DSC Remelt peaks

Fig. 13: Run 29 DSC first melt peaks and Fusion peaks

Fig. 14: Run 29 DSC Remelt peaks

Fig. 15: Run 38 DSC first melt peaks and Fusion peaks

Fig. 16: Run 38 DSC Remelt peaks

Fig. 17: Run 39 DSC first melt peaks and Fusion peaks

Fig. 18: Run 39 DSC Remelt peaks

9,051,461 B2

BLENDED FLUOROPOLYMER COMPOSITIONS HAVING MULTIPLE MELT PROCESSIBLE FLUOROPOLYMERS

CROSS REFERENCE TO RELATED APPLICATIONS

This application claims priority under Title 35, U.S.C. §119(e) to U.S. Provisional Patent Application Ser. No. 61/287,929, tiled Dec. 18, 2009, entitled MULTIPLE-COMPONENT BLENDED FLUOROPOLYMER COMPOSITIONS, and to U.S. Provisional Patent Application Ser. No. 61/296,553, filed Jan. 20, 2010, entitled BLENDED FLUOROPOLYMER COMPOSITIONS WITH MULTIPLE MELT PROCESSIBLE FLUOROPOLYMERS, the entire disclosures of which are hereby expressly incorporated by reference herein.

BACKGROUND OF THE INVENTION

1. Field of the Invention

The present invention relates to fluoropolymers and, in particular, relates to fluoropolymer compositions having improved properties, such as coatings of the type that may be applied to either rigid or flexible substrates in which a non-stick and/or abrasion resistant surface is desired. In particular, the present invention relates to fluoropolymer compositions that include multiple fluoropolymer components and may be used to form coatings having improved non-stick or release characteristics and/or improved abrasion resistance, as well as films and/or blended powder compositions.

2. Description of the Related Art

Fluoropolymers are long-chain polymers comprising mainly ethylenic linear repeating units in which some or all of the hydrogen atoms are replaced with fluorine. Examples include poly tetrafluoroethylene (PTFE), methylfluoroalkoxy (MEA), fluoro ethylene propylene (FEP), perfluoroalkoxy (PEA), poly(chlorotrifluoroethylene) and poly(vinylfluoride).

Non-stick coating systems including fluoropolymers are applied in single or multiple coats to the surface of a substrate to provide a coated substrate having a non-stick coating to which extraneous materials will not adhere. In a multiple layer coating system, the non-stick coating generally includes a primer and a topcoat, and optionally, one or more midcoats.

The use of non-stick coating systems which are applied to a substrate in multiple layers has been known for many years. The primers for such systems typically contain a heat resistant organic binder resin and one or more fluoropolymer resins, along with various opaque pigments and fillers. The midcoats contain mainly fluoropolymers with some amounts of opaque pigments, fillers and coalescing aids, while the topcoats are almost entirely composed of fluoropolymers, such as entirely high molecular weight polytetrafluoroethylene (HPTFE), or HPTFE with a small amount of a melt-processible fluoropolymer.

Glasscloth is one example of a flexible substrate that may be coated with a fluoropolymer coating. The coating typically includes a high molecular weight polytetrafluoroethylene (HPTFE), either by itself or including small amounts of additional polymers and/or fillers. One coating technique involves feeding a glasscloth web through a dip tank containing a dispersion of the fluoropolymer, and then feeding the coated web upwardly through a drying and sintering oven tower to cure or fix the coating. This process is usually repeated a number of times whereby up to 10 or more coating layers may be applied.

What is needed are improved fluoropolymer compositions for applications such as coatings for rigid and/or flexible substrates that demonstrate improved characteristics, such as improved release and/or abrasion resistance.

SUMMARY OF THE INVENTION

The present disclosure provides fluoropolymer compositions that include multiple fluoropolymer components and, in exemplary applications, may be applied as coatings to either rigid or flexible substrates. The compositions may themselves be applied as basecoats or overcoats, or may be combined with other components to formulate basecoats or overcoats. In one embodiment, the compositions include at least one low molecular weight polytetrafluoroethylene (LPTFE) and at least two chemically different melt processible fluoropolymers (MPF). In another embodiment, the compositions include at least one high molecular weight polytetrafluoroethylene (HPTFE), at least one low molecular weight polytetrafluoroethylene (LPTFE), and at least two chemically different melt processible fluoropolymers (MPF). After being applied to a substrate, optionally over a basecoat and/or a midcoat and then cured, the present compositions form coatings that demonstrate improved characteristics, such as improved release characteristics, abrasion resistance, translucency/transparency, and permeability, for example.

In one form thereof, the present disclosure provides a fluoropolymer composition, including at least one low molecular weight polytetrafluoroethylene (LPTFE) having a first melt temperature ($T_m$) of 335° C. or less; and at least two melt processible fluoropolymers, including: a first melt-processible fluoropolymer (MPF); and a second melt-processible fluoropolymer (MPF), the second melt-processible fluoropolymer (MPF) chemically different from the first melt-processible fluoropolymer (MPF).

In one embodiment, the fluoropolymer composition lacks high molecular weight polytetrafluoroethylene (HPTFE) having a number average molecular weight ($M_n$) of at least 500,000. The at least one LPTFE may be present in an amount of between 10 wt. % and 70 wt. %, and the at least two MPEs may be together present in an amount of between 30 wt. % and 90 wt. %, based on the total solids weight of the at least one LPTFE and the at least two MPFs, or the at least one LPTFE may be present in an amount of between 40 wt. % and 60 wt. %, and the at least two MPFs may be together present in an amount of between 40 wt. % and 60 wt. %, based on the total solids weight of the at least one LPTFE and the at least two MPFs.

In another embodiment, the composition may further include at least one high molecular weight polytetrafluoroethylene (HPTFE) having a number average molecular weight ($M_n$) of at least 500,000. The at least one HPTFE may be present in an amount of between 1 wt. % and 89 wt. %, based on the total solids weight of the at least one HPTFE, the at least one LPTFE, and the at least two MPFs, or the at least one LPTFE may be present in an amount of between 16 wt. % and 60 wt. %, the FIPTEE may be present in an amount of between 1 wt. % and 60 wt. %, and the at least two MPFs may be together present in an amount of between 1 wt. % and 60 wt. %, based on the total solids weight of the at least one HPTFE. the at least one LPTFE, and the at least two MPFs, The at least two MPEs may each be present in an amount of between 1 wt. % and 30 wt. %, based on the total solids weight of the at least one HPTFE, the at least one LPTFE, and the at least two MPFs.

The at least one LPTFE may have a first melt temperature ($T_m$) selected from the group consisting of 332° C. or less, 330° C. or less, 329° C. or less, 328° C. or less, 327° C. or less, 326° C. or less, and 325° C or less and/or may be obtained via emulsion polymerization without being subjected to agglomeration, thermal degradation, or irradiation.

The composition may be in the form of an aqueous dispersion, and may be applied to a substrate as a coating.

In another form thereof, the present disclosure provides a method of coating a substrate, the method including the steps of providing a substrate; applying a coating composition to the substrate, the coating composition including: at least one low molecular weight polytetrafluoroethylene (LPTFE) having a first melt temperature ($T_m$) of 335° C. or less; and at least two melt processable fluoropolymers, including: a first melt-processable fluoropolymer (MPF); and a second melt-processable fluoropolymer (MPF), the second melt-processable fluoropolymer (MPF) chemically different from the first melt-processable fluoropolymer (MPF); and curing the composition to form a coating.

The method may include the additional steps, prior to the applying a coating composition step of: applying a primer to the substrate, the primer including at least one fluoropolymer; and optionally, at least partially curing the primer. The method may further include the additional steps, following the applying a primer step and prior to the applying a coating composition step, of: applying a midcoat to the substrate, the midcoat including at least one fluoropolymer; and optionally, at least partially curing the midcoat. The substrate may be selected front the group consisting of a rigid substrate and a flexible substrate.

BRIEF DESCRIPTION OF THE DRAWINGS

The above-mentioned and other features and advantages of this invention, and the manner of attaining them, will become more apparent and the invention itself will be better understood by reference to the following description of embodiments of the disclosure taken in conjunction with the accompanying drawings, wherein:

FIGS. 1-18 correspond to Example 2, wherein:

FIG. 1 is a DSC plot of the first melt peaks and fusion peak of Run 31 of Example 2;

FIG. 2 is a DSC plot of the remelt peak of Run 31 of Example 2;

FIG. 3 is a DSC plot of the first melt peaks and fusion peak of Run 23 of Example 2;

FIG. 4 is a DSC plot of the first remelt peak of Run 23 of Example 2;

FIG. 5 is a DSC plot of the first melt peaks and fusion peak of Run 30 of Example 2;

FIG. 6 is a DSC plot of the remelt peak of Run 30 of Example 2;

FIG. 7 is a DSC plot of the first melt peaks and fusion peaks of Run 22 of Example 2;

FIG. 8 is a DSC plot of the remelt peaks of Run 22 of Example 2;

FIG. 9 is a DSC plot of the first melt peaks and fusion peaks of Run 3 of Example 2;

FIG. 10 is a DSC plot of the remelt peaks of Run 3 of Example 2;

FIG. 11 is a DSC plot of the first melt peaks and fusion peaks of Run 41 of Example 2;

FIG. 12 is a DSC plot of the remelt peaks of Run 41 of Example 2;

FIG. 13 is a DSC plot of the first melt peaks and fusion peaks of Run 29 of Example 2;

FIG. 14 is a DSC plot of the remelt peaks of Run 29 of Example 2;

FIG. 15 is a DSC plot of the first melt peaks and fusion peaks of Run 38 of Example 2;

FIG. 16 is a DSC plot of the remelt peaks of Run 38 of Example 2;

FIG. 17 is a DSC plot of the first melt peaks and Fusion peaks of Run 39 of Example 2;

FIG. 18 is a DSC plot of the remelt peaks of Run 39 of Example 2;

FIGS. 19-30 correspond to Example 1, wherein:

FIG. 19 is an exemplary plot showing the positions of values for PFA (MPF), SFN-D (LPTFE), TE3887N (LPTFE) and FEP (MPF) for the coutour plots of FIGS. 20-30;

FIG. 20 is a contour plot showing coating gloss as a function of composition;

FIG. 21 is a contour plot showing contact angle as a function of composition;

FIG. 22 is a contour plot showing coating pencil hardness as a function of composition;

FIG. 23 is a normalized contour plot showing the mean of the contact angle, gloss, and pencil hardness testing;

FIG. 21 is a normalized contour plot showing the mean of the minimum remelt temperature, contact angle, gloss, and pencil hardness testing;

FIG. 26 is a contour plot showing the difference between the total enthalpy of fusion and the total first melt enthalpy;

FIG. 27 is a contour plot showing the difference between the total enthalpy of remelting and the total first melt enthalpy;

FIG. 28 is a contour plot showing the minimum first melt temperature;

FIG. 29 is a contour plot showing the minimum fusion temperature; and

FIG. 30 is a contour plot showing the minimum remelt temperature.

Corresponding reference characters indicate corresponding parts throughout the several views. The exemplifications set out herein illustrate embodiments of the disclosure, and such exemplifications are not to be construed as limiting the scope of the disclosure in any manner.

DETAILED DESCRIPTION

Figure 1:
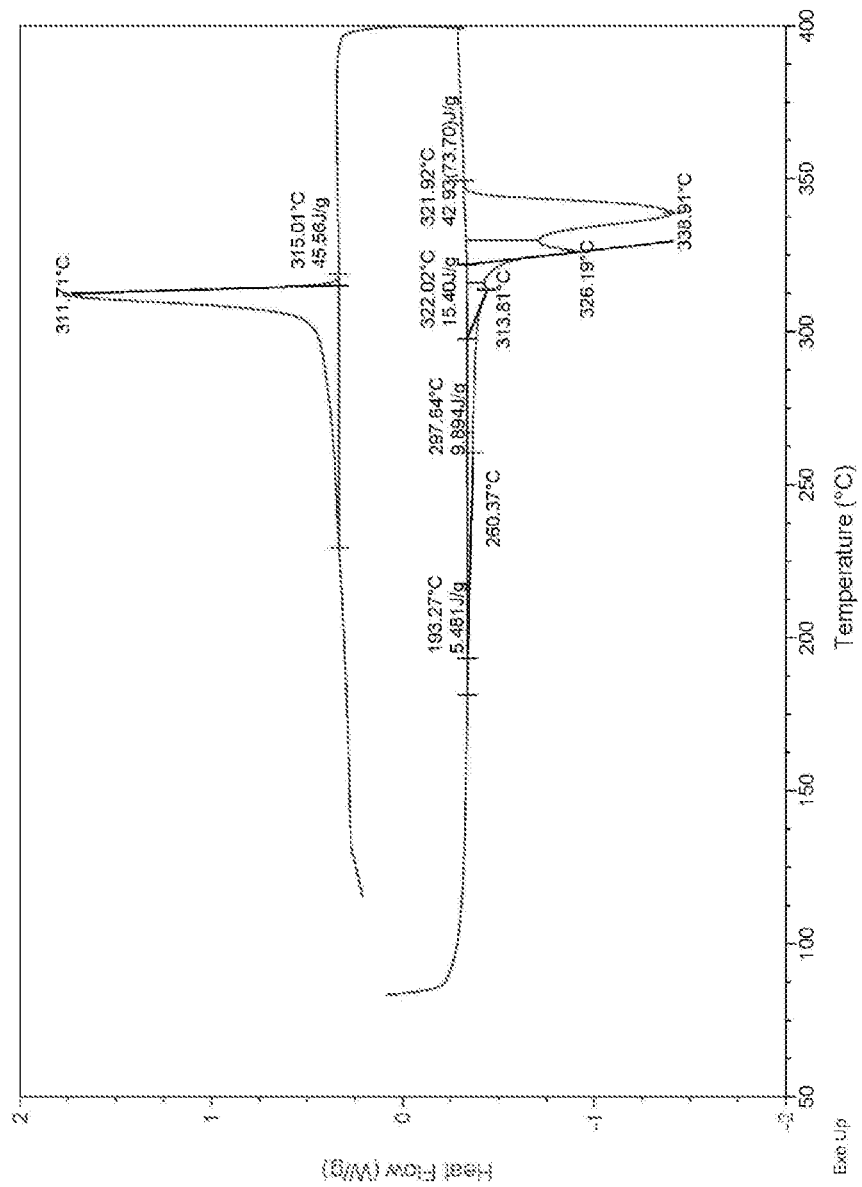
Figure 2:
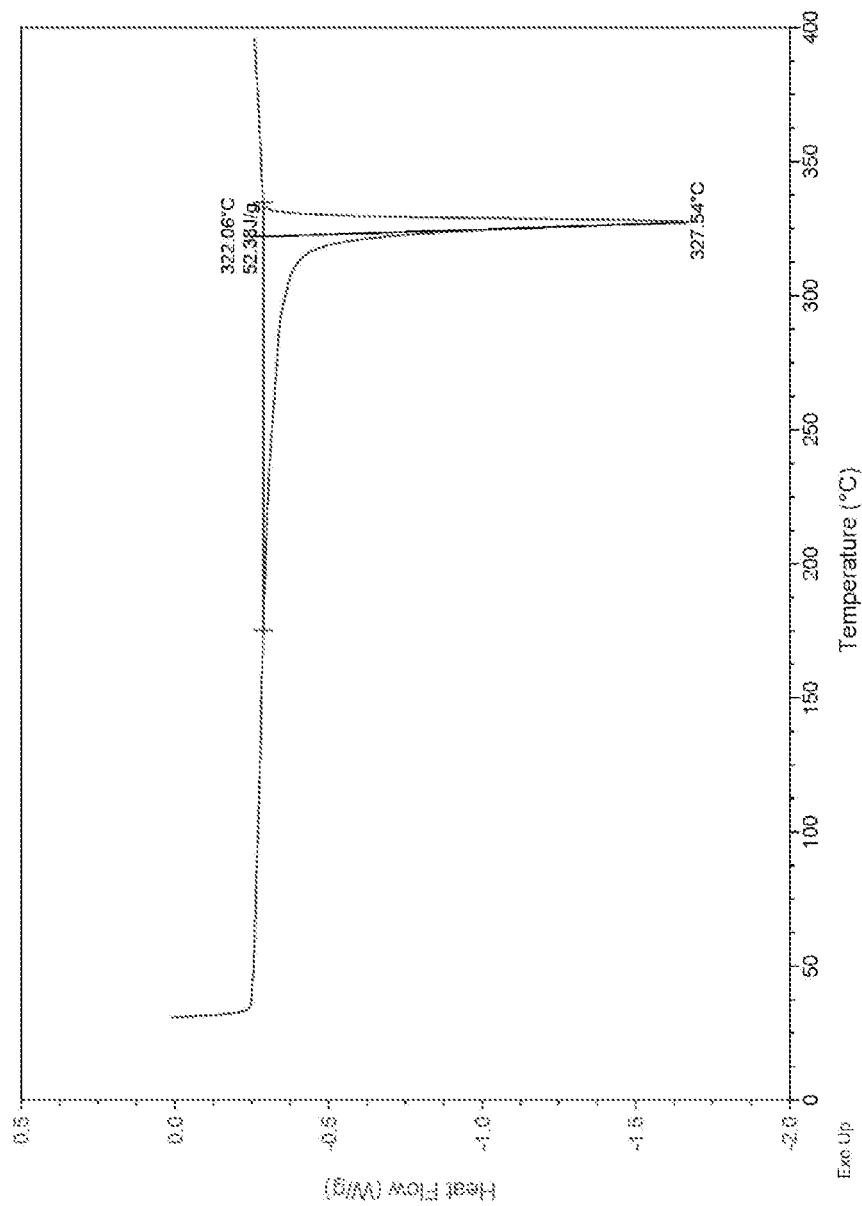
Figure 3:
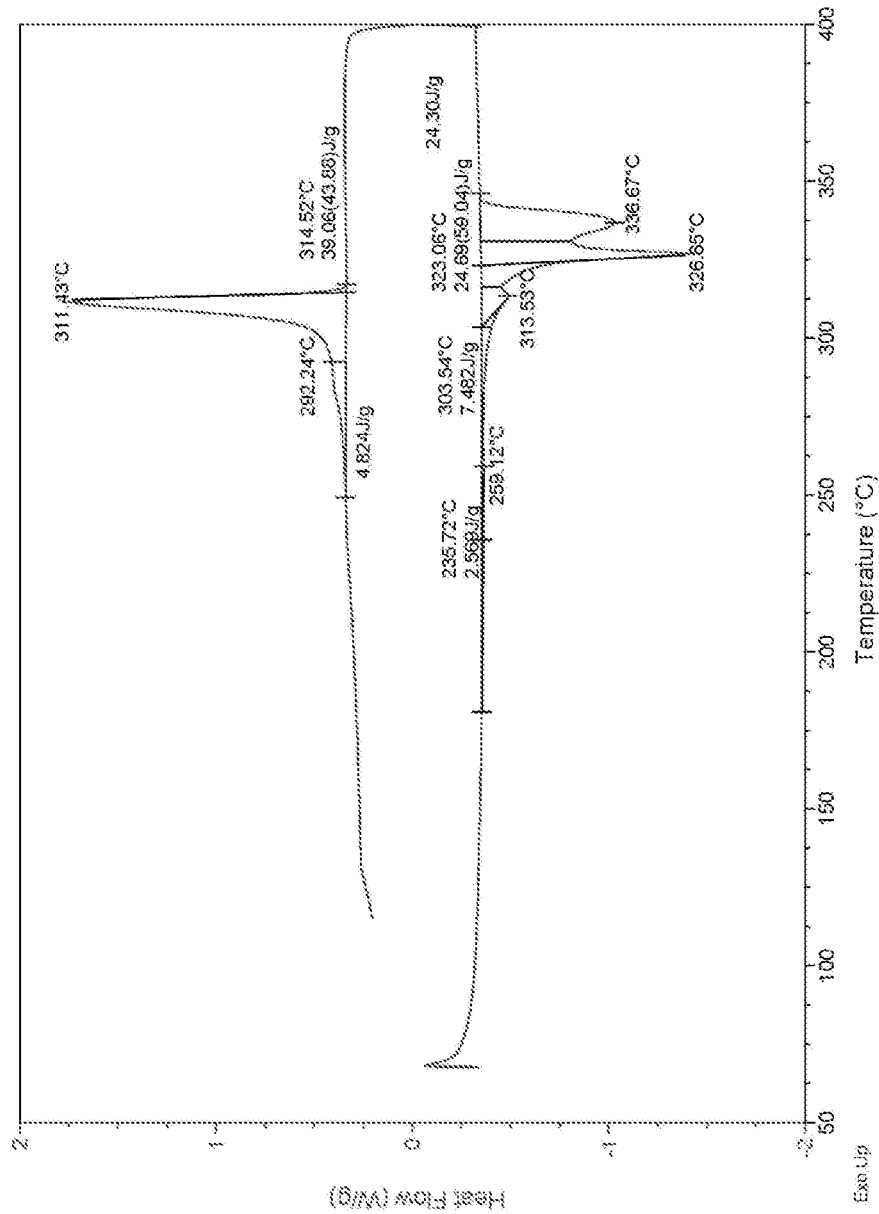
Figure 4:
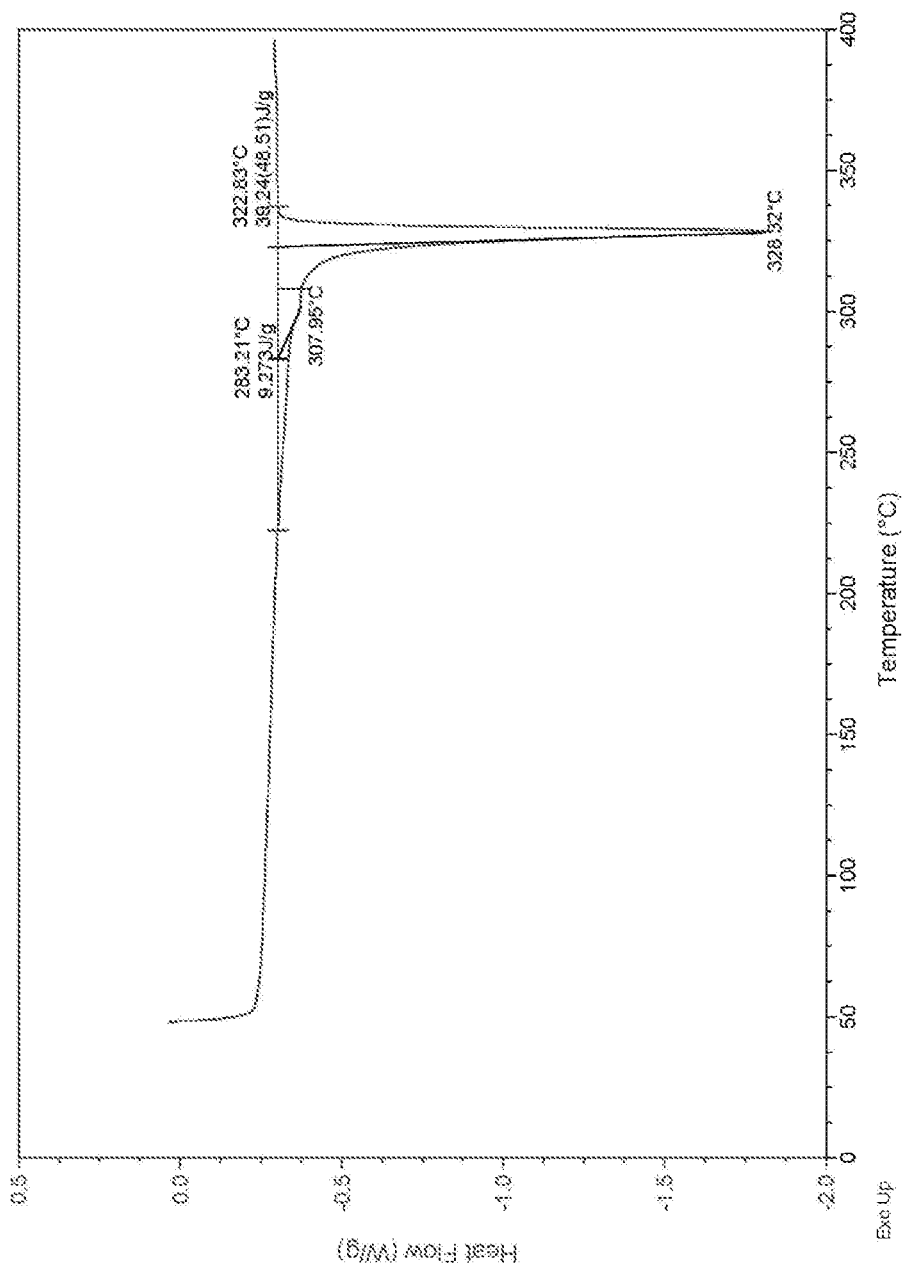
Figure 5:
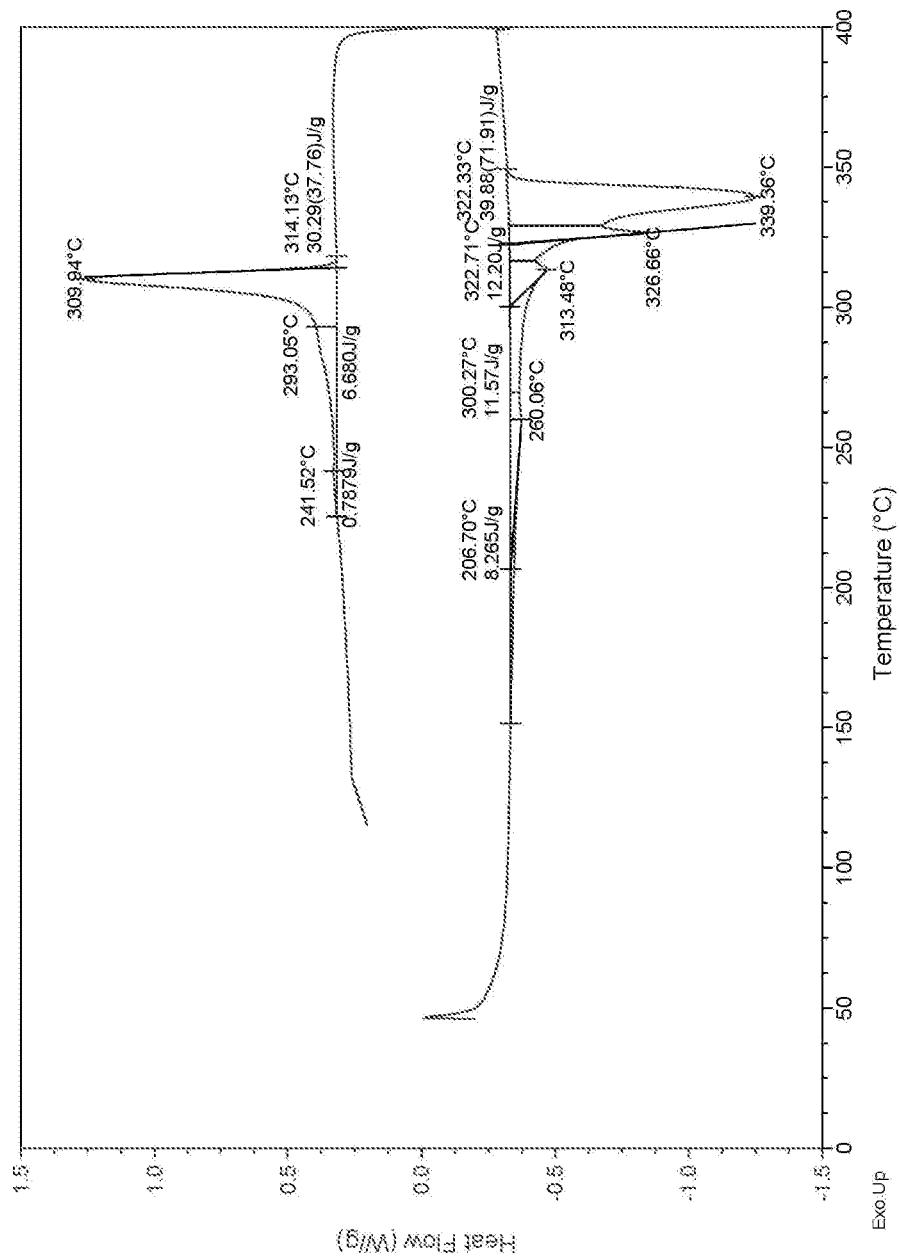

The present invention provides fluoropolymer compositions that include multiple fluoropolymer components and, in exemplary applications, may be applied as coatings to either rigid or flexible substrates. The compositions may themselves be applied as basecoats or overcoats, or may be combined with other components to formulate basecoats or overcoats. In one embodiment, the compositions include at least one low molecular weight polytetrafluoroethylene (LPTFE) and at least two chemically different melt processable fluoropolymers (MPF). In another embodiment, the compositions include at least one high molecular weight polytetrafluoroethylene (HPTFE), at least one low molecular weigh polytetrafluoroethylene (LPTFE), and at least two chemically different melt processable fluoropolymers (MPF). After being applied to a substrate, optionally over a basecoat and/or a midcoat and then cured, the present compositions form coatings that demonstrate improved characteristics, such as improved release characteristics, abrasion resistance, translucency/transparency, and permeability, for example.

Suitable substrates to which the present fluoropolymer compositions may be applied, as well as coating types, are discussed below in Section I; suitable high molecular weight polytetrafluoroethylene (HPTFE) components are discussed below in Section II; suitable low molecular weight polytetrafluoroethylene (LPTFE) components are discussed below in Section suitable melt processable fluoropolymer (MPF) components are discussed below in Section IV; suitable engineering polymers are discussed below in Section V; suitable application procedures and formulations are discussed below in Section VI; physical properties and characterization procedures are discussed below in Section VII; and the Examples follow.

Fluoropolymer blends inch/din LPTFE and a single type of MPF are disclosed in detail in U.S. patent application Ser. No. 12/468,580, filed on May 19, 2009, entitled BLENDED FLUOROPOLYMER COMPOSITIONS; fluoropolymer blends including high molecular weight polytetrafluoroethylene (HPTFE), LPTFE, and a single type of MPF are disclosed in detail in U.S. patent application Ser. No. 12/567,330, filed on Sep. 25, 2009, entitled BLENDED FLUOROPOLYMER COATINGS FOR RIGID SUBSTRATES and in U.S. patent application Ser. No. 12/567,446, filed on Sep. 25, 2009, entitled BLENDED FLUOROPOLYMER COMPOSITIONS AND COATINGS FOR FLEXIBLE SUBSTRATES; each are assigned to the assignee of the present invention, and the disclosures of each are expressly incorporated herein by reference.

In a first embodiment, the present blended fluoropolymer compositions include at least one LPTFE and at least two chemically different MPFs, but do not include high molecular weight polytetrafluoroethylene (HPTFE). In this respect, the blended fluoropolymer compositions of the first embodiment can he considered to be blended MPFs with an additive in the form of at least one LPTFE.

In a second embodiment, the present blended fluoropolymer compositions include at least one HPTFE, at least one LPTFE, and at least two chemically different MPFs. In this respect, the blended fluoropolymer compositions of the second embodiment can be considered to include the fluoropolymer compositions of the first embodiment used as an additive to a coating system that includes HPTFE.

In each of the first and second embodiments, the blended fluoropolymer compositions include at least two chemically different MPF's, as defined herein.

The compositions may be in the form of aqueous dispersion or powders, for example, and may be used in the particular types of applications discussed herein as well as in traditional applications in which MPFs are known to be used. Also, the present blended fluoropolymer compositions can be used alone, or may be formulated with other types of fluoropolymers or non-fluoropolymers, optionally together with suitable additives, such as fillers, pigments, surfactants, etc.

I. Substrates and Coating Types a. Rigid Substrates.

Suitable rigid substrates to which the present compositions may be applied include metals, metal alloys, ceramics, and/or rigid plastic materials. Examples include cookware, bakeware, industrial components such as rollers, or any other rigid substrate to which a coating formed of the present compositions is desired, The rigid substrate may optionally be coated with a primer (or basecoat) and/or a midcoat prior to application of the present coating compositions. The primer and midcoat may be any type of fluoropolymer-based coating, and commercially available coatings based on high molecular weight PTFE and/or other fluoropolymers are widely available. The particular compositions of the primer and/or midcoat may vary widely, and are not thought to be critical with respect to the improved properties demonstrated by the coatings disclosed herein.

b. Flexible Substrates.

Suitable flexible substrates to which the present compositions may be applied include glasscloth of the type commonly used in applications such as food conveyer belts for continuous ovens, architectural fabrics of the type used in stadium roofs and radar domes, as well as heat sealing belts, circuit boards, cooking sheets, and tenting fabrics, for example, "Glasscloth" or "glass cloth" is a textile material made of woven fibers such as, for example, linen, glass, or cotton.

Other flexible substrates that may be coated with the present compositions include any material including natural or synthetic fibers or filaments, including staple fiber, fiberfill, yarn, thread, textiles, nonwoven fabric, wire cloth, ropes, belting, cordage, and webbing, for example. Exemplary fibrous materials which may be coated with the present coating compositions include natural fibers, such as vegetable, animal, and mineral fibers, including cotton, cotton denim, wool, silk, ceramic fibers, and metal fibers, as well as synthetic fibers, such as knit carbon fabrics, ultra high molecular weight polyethylene (UHMWPE) fibers, poly(ethylene terephthalate) (PET) fibers, para-aramid fibers, including poly-paraphenylene terephthalamide or Kevlar®, and meta-aramid fibers, such as Nomex®, each available from E.I. du Pont de Nemours and Company, polyphenylene sulfide fibers, such as Ryton®, available from Chevron Phillips Chemical Co., polypropylene fibers, polyacrylic fibers, polyacrylonitrile (PAN) fibers, such as Zoltek®, available from Zoltek Corporation, polyamide fibers (nylon), and nylon-polyester fibers, such as Dacron®, available from Invista North America.

The flexible substrate may optionally be coated with a primer (or basecoat) and/or a midcoat prior to application of the present coating compositions. The primer and midcoat may be any type of fluoropolymer-based coating, and commercially available coatings based on high molecular weight PTFE and/or other fluoropolymers are widely available. The particular compositions of the primer and/or midcoat may vary widely, and are not thought to be critical with respect to the improved properties demonstrated by the coatings disclosed herein.

c. Coating Types.

In one embodiment, the present compositions are applied over an underlying coating, or undercoat, which undercoat may be cured, partially cured, or uncured prior to the application of the present compositions. The undercoat may be a basecoat, which is the coating applied directly to an underlying substrate (sometimes referred to as a primer), optionally together with one or more midcoats. In these embodiments, the present coating may he referred to herein as either an "overcoat" or a "topcoat" and these terms are generally interchangeable. In other embodiments, the present compositions may be applied directly to a substrate to form a coating in direct contact with the substrate whereby the coating is not applied over any undercoats. In farther embodiments, the present coating system may itself also be an undercoat.

II. High Molecular Weight Polytetrafluoroethylene (HPTFE)

In some embodiments, the present compositions include at least one type of traditional high molecular weight polytetrafluoroethylene PTFE (HPTFE).

The number average molecular weight ($M_n$) of the HPTFE is typically at least 500,000, and may be at least 1,000,000, and suitable HPTFE in the form of liquid dispersions and/or powders are available from many commercial sources. Liquid HPTFE dispersions typically include surfactants for stability, though "unstabilized" HPTFE dispersions, typically having less than 1.0 wt. % surfactant, are also available and may also be used. When a powder is used, the powder will typically be dispersed in a liquid to prepare the coating composition.

In some embodiments, the HPTFE may include a small amount of modifying co-monomer, in which case the HPTFE is a co-polymer known in the art as "modified PTFE" or "trace modified PTFE". Examples of the modifying co-monomer include perfluoropropylvinylether (PPVE), other modifiers, such as hexafluoropropylene (HFP), chlorotrifluoroethylene (CTFE), perfluorobutylethylene (PFBE), or other perfluoroalkylvinylethers, such as perfluoromethylvinylether (PMVE) or perfluoroethylvinylether (PEVE). The modifying co-monomer will typically be present in an amount less than 1% by weight, for example, based on the weight of the HPTFE.

The HPTFE is typically of the type produced by a polymerization process that is well known in the art as dispersion polymerization or emulsion polymerization. In some embodiments, however, the HPTFE may be of the type produced by the polymerization process well known in the art as granular or suspension polymerization, which yields PTFE known in the art as granular PTFE resin or granular PTFE molding powder.

III. Low Molecular Weight Polytetrafluoroethylene (LPTFE)

The present compositions include at least one type of low molecular weight polytetrafluoroethylene (LPTFE).

The LPTFE is typically provided in the form of a liquid dispersion and, in most embodiments will be an aqueous dispersion, though the LPTFE may be dispersed in other solvents and/or LPTFE originally in an aqueous phase may be phase transferred into another solvent, such as organic solvents including hexane, acetone, or an alcohol.

The LPTFE will typically have a mean particle size of 1.0 microns (μm) or less, 0.9 microns (μm) or less, 0.75 microns (μm) or less, 0.5 microns (μm) or less, 0.4 microns (μm) or less, 0.3 microns (μm) or less, or 0.2 microns (μm) or less, as measured by a suitable manner such as by laser light diffraction by ISO 13320. In some embodiments, the LPTFE may have a mean particle size as low as 30, 50, 100, or 150 nm, or as large as 200, 250, or 350 nm for example.

The number average molecular weight ($M_n$) of the LPTFE will typically be less than 500,000 and, in most embodiments, may be as low as 10,000 or greater, 20,000 or greater, or 25,000 or greater, or may be as high as 200,000 or less, 100,000 or less, or 70,000 or less, 60,000 or less, or 50,000 or less, for example.

An alternative manner of characterizing the molecular weight of the LPTFE is by its first melt temperature ($T_m$), as determined by a suitable method such as differential scanning calorimetry (DSC), which first melt temperature ($T_m$) for LPTFE may be either equal to or less than 335° C. In other embodiments, the first melt temperature of the LPTFE may be either equal to or less than 332° C., either equal to or less than 330° C., either equal to or less than 329° C., either equal to or less than 328° C., either equal to or less than 327° C., either equal to or less than 326° C., or either equal to or less than 325° C.

The LPTFE may be provided in the form of an aqueous dispersion which is stabilized, unstabilized, or minimally stabilized. As used herein, "unstabilized" or "minimally stabilized" refers to an aqueous dispersion that includes less than 1.0 wt. % of a traditional surfactant, such as non-ionic surfactant or an anionic surfactant, based on the weight of the LPTFE aqueous dispersion. In some embodiments, the LPTFE dispersion may be provided in the form of an aqueous dispersion having less than 1.0 wt. % surfactant, less than 0.8 wt. % surfactant, less than 0.6 wt. % surfactant, or even less than 0.5 wt. % surfactant, In other embodiments, the LPTFE dispersion may be provided in the form of an aqueous dispersion that is "stabilized", typically having 1-12 wt. % surfactant. However, the nature of the stabilization package employed is not a critical feature of this invention.

Also, as discussed below, the LPTFE may be provided in the form of a solid micropowder.

The LPTFE will typically be in the form of a low molecular weight PTFE homopolymer. However, in other embodiments, the LPTFE may include a small amount of modifying co-monomer, in which case the PTFE is a co-polymer known in the art as "modified PTFE" or "trace modified PTFE". Examples of the modifying co-monomer include perfluoropropylvinylether (PPVE), other modifiers, such as hexafluoropropylene (HFP), chlorotrifluoroethylene (CTFE), perfluorobutylethylene (PFBE), or other perfluoroalkylvinylethers, such as perfluoromethylvinylether (PMVE) or perfluoroethylvinylether (PEVE). The modifying co-monomer will typically be present in an amount less than 1% by weight, for example, with respect to the PTFE.

Suitable LPTFE dispersions include SFN-D, available from Chenguang R.I.C.I, Chengdu, 610036 P.R. China, as well as TE3887N, available from DuPont. Other exemplary LPTFE micropowders include Dyneon TF-9207, available from Dyneon LLC, LDW-410, available from Daikin Industries, Inc., and MP-25, MP-55, MP-8T and UF 8TA, each available from Laurel Products.

These fluoropolymers have characteristics set forth in the table below:

Characteristics of Exemplary Low Molecular Weight Polytetrafluoroethylenes (LPTFE)

| LPTFE | Solids content (wt. %) | Molecular weight (Mn) (estimated) | Mean particle size (μm) | Surfactant (wt. %, based on weight of LPTFE) (type) | First melt temperature (DSC) (° C.) |
|---|---|---|---|---|---|
| SFN-D | 50 | 10,000-20,000 | 0.19 | 5% | 324.5-326 |
| TE3887N | 60 | 65,000-70,000 | 0.2 | 6% (non-ionic) | 327.6 |
| LDW-410 | 40 | 80,000-90,000 | 0.2 | 5% | 329.4 |
| TF-9207 | 100 | 65,000-70,000 | 13.27 | N/A | 327.6 |
| MP-8T | 100 | ca. 25,000 | 1.32 | N/A | 323.1 |
| MP-10 | 100 | 100,000 | 0.84 | N/A | 330 |

-continued

| LPTFE | Solids content (wt. %) | Molecular weight (Mn) (estimated) | Mean particle size (μm) | Surfactant (wt. %, based on weight of LPTFE) (type) | First melt temperature (DSC) (° C.) |
|---|---|---|---|---|---|
| MP-55 | 100 | 40,000-50,000 | 11.06 | N/A | 324.3 |
| MP-25 | 100 | ca. 130,000 | 0.28 | N/A | 332 |
| UF-8TA | 100 | ca. 95,000 | 1.22 | N/A | 331.5 |

Exemplary types of LPTFE are discussed below.

a. LPTFE Produced by Dispersion Polymerization or Emulsion Polymerization and Which is Thereafter not Agglomerated, Irradiated or Thermally Degraded.

In some embodiments, the LPTFE is produced by a polymerization process that is well known in the art as dispersion polymerization or emulsion polymerization. These polymerization processes may be conducted with chain transfer agents, which reduce the average molecular weight of the fluoropolymers produced, and/or via other methods whereby the polymerization process is controlled to form a liquid dispersion of directly polymerized particles of PTFE having low molecular weight (LPTFE).

In these embodiments, the LPTFE, after being produced by dispersion polymerization or emulsion polymerization, is thereafter not agglomerated, irradiated, or thermally degraded. In particular, the LPTFE has not been subjected to any agglomeration steps during its manufacture, and therefore retains a small mean particle size. Further, the LPTFE has not been subjected to thermal degradation to reduce its molecular weight. Still further, the LPTFE has also not been subjected to irradiation, such as by high energy electron beam, to reduce its molecular weight. In these embodiments, the LPTFE dispersions will not demonstrate a spectrum and/or will be below a detection limit when subjected to electron paramagnetic resonance (EPR) or electron spin resonance (ESR) spectroscopy, as opposed to irradiated PTFE, which will demonstrate such a spectra and/or will otherwise have detectable free radicals.

These types of LPTFE dispersions are provided as aqueous dispersions that are obtained via a controlled dispersion or emulsion polymerization process to produce directly polymerized LPTFE that is not thereafter subjected to agglomeration, thermal degradation, or irradiation. These types of LPTFE dispersions will be appreciated by those of ordinary skill in the art to be distinct from other PTFE materials that are commercially available.

First, these types of LPTFE dispersions are distinct from PTFE that is produced by the polymerization process well known in the art as granular or suspension polymerization, which yields PTFE known in the art as granular PTFE resin or granular PTFE molding powder. Granular PTFE resins will typically have a high molecular weight, such as a number average molecular weight ($M_n$) of at least 1,000,000 or more and a first melt temperature ($T_m$) greater than the 335° C., typically much greater than 335° C. Granular PTFE resin is typically provided in solid, powder form including particles having a mean particle size of several microns, typically from 10 to 700 microns (μm). These resins may also be provided as fine cut resins having a mean particle size of 20 to 40 microns (μm), for example.

Additionally, these types of LPTFE dispersions may be distinct from lower molecular weight materials prepared from high molecular weight granular PTFE resins that have been degraded by irradiation or thermal degradation to form low molecular weight materials known as granular PTFE micropowders, which typically have a particle size ranging between 0.2 and 20 microns (μm). Examples of granular PTFE micropowders include Zonyl® MP1200, MP1300, and MP1400 resins, available from DuPont (Zonyl® is a registered trademark of E.I. du Pont de Nemours & Co).

Second, these types of LPTFE dispersions are also distinct from high molecular weight PTFE dispersions made from dispersion or emulsion polymerization conducted without chain transfer agents to thereby polymerize a high molecular weight PTFE having a number average molecular weight ($M_n$) of at least 1,000,000 or more, and a first melt temperature ($T_m$) greater than the 335° C., typically much greater than 335° C. These high molecular weight PTFE dispersions are typically stabilized with a traditional surfactant present in an amount greater than 1.0 wt. %, typically much greater than 1.0 wt. %.

Additionally, these types of LPTFE dispersions are also distinct from high molecular weight PTFE dispersions that are produced via dispersion or emulsion polymerization and thereafter coagulated or agglomerated.

Still further, these types of LPTFE dispersions are distinct from high molecular weight PTFE dispersions that are produced via dispersion or emulsion polymerization and thereafter coagulated or agglomerated, and then are subjected to thermal degradation or irradiation to form low molecular weight PTFE powders, known in the art as PTFE micropowders, which are provided as solid powders having a particle size between 0.2 and 20 microns (μm), such as for use in extrusion and other applications. Examples of PTFE micropowders include Zonyl® MP1000, MP1100, MP1500 and MP1600 resins, available from DuPont (Zonyl® is a registered trademark of E.I. du Pont de Nemours & Co.). However, as discussed below, these types of LPTFE micropowders may also be used in the present invention.

Third, these types of LPTFE dispersions are distinct from LPTFE micropowders that are polymerized via dispersion or emulsion polymerization in the presence of chain transfer agents, and then are agglomerated to form PTFE micropowders having an average particle size of between 0.2 and 20 microns (μm), for example, b. LPTFE Micropowders.

In a second embodiment, the LPTFE may be in the form of an LPTFE micropowder.

A first type of LPTFE micropowders are derived from high molecular weight PTFE dispersions that are produced via dispersion or emulsion polymerization and thereafter coagulated or agglomerated, and then subjected to thermal degradation or irradiation to form low molecular weight PTFE powders, known in the art as PUT micropowders and referred to herein as LPTFE micropowders, which are typically provided as solid powders having a particle size typically between 0.2 and 20 microns (μm).

Examples of these types of LPTFE micropowders include Zonyl® MP1000, MP1100, MP1500 and MP1600 resins, available from DuPont (Zonyl® is a registered trademark of Ed. du Pont de Nemours & Co.); and MP-25, MP-55, and UF 8TA, each available from Laurel Products.

A second type of LPTFE micropowders are derived from high molecular weight granular PTFE resins that have been degraded by irradiation or thermal degradation to form low molecular weight materials known as granular PTFE micropowders, which typically have a particle size ranging typically between 2 and 20 microns (μm).

Examples of these types of LPTFE micropowders include Zonyl® MP1200, MP1300, and MP1400 resins, available from DuPont (Zonyl® is a registered trademark of E.I. du Pont de Nemours & Co.) and MP-8T and MP-10, available from Laurel Products.

A third type of these types LPTFE micropowders are polymerized via dispersion or emulsion or suspension polymerization in the presence of chain transfer agents, and then may be agglomerated to form LPTFE micropowders having an average particle size of typically between 0.2 and 20 microns (μm), for example.

IV. Melt Processible Fluoropolymers (MPFs)

In some embodiments, the present compositions also include a component in the form of at least two chemically different melt processible fluoropolymers (MPF), such as perfluoroalkoxy (PFA) (copolymers of tetrafluoroethylene (TFE) and perfluoroalkylvinyl ethers), generally including methylfluoroalkoxy (MFA) (a copolymer of tetrafluoroethylene (TEE) and perfluoromethylvinyl ether (PMVE)), ethylfluoroalkoxy (EFA) (a copolymer of tetrafluoroethylene (TFE) and perfluoroethylvinyl ether (PEVE)), and perfluoroalkoxy (PEA) (copolymers of tetrafluoroethylene (TFE) and perfluoropropylvinyl ether (PPVE)); and copolymers of tetrafluoroethylene (TFE) and hexafluoropropylene (HFP), known as fluorinated ethylene propylene (FEP), for example.

Each of the foregoing MPF's, as well as the HPTFE and LPTFE disclosed herein, are known in the art as "perfluorinated" fluoropolymers, meaning that the hydrogen atoms of their alkane and/or alkoxy analogs have been completely substituted by fluorine atoms, it being understood that perfluorinated fluoropolymers are considered inert or non-reactive.

As used herein, "chemically different", when used in connection with the MPFs disclosed herein, refers to MPFs of differing type, as opposed to grade. For example, a type of PEA and a type of FEP would be chemically different, while two PFAs of different grades would not. However, two MPFs having different modifying co-monomers would also be "chemically different" even if they were nominally referred to as the same polymer type. Also, for purposes of this disclosure, MFA, EFA, PEA, and FEP are each chemically different from one another.

The MPF may be produced by a polymerization process that is well known in the art as dispersion polymerization or emulsion polymerization. These polymerization processes may be conducted with chain transfer agents, which reduce the average molecular weight of the fluoropolymers produced, and/or via other methods whereby the polymerization process is controlled to form a liquid dispersion of directly polymerized particles of MPF, In most embodiments, the MPF, after being produced by dispersion polymerization or emulsion polymerization, is thereafter not agglomerated, irradiated, or thermally degraded. In particular, the MPF will not have been subjected to any agglomeration steps during its manufacture, and therefore retains a small mean particle size as described below.

The liquid, dispersion of MPF in most embodiments will be an aqueous dispersion, though the MPF may be dispersed in other solvents and/or MPF originally in an aqueous phase may be phase transferred into another solvent, such as organic solvents including hexane, acetone, or an alcohol, The MPF, when produced as described above, will typically have a mean particle size of 1.0 microns (μm) or less, 0.9 microns (μm) or less, 0.75 microns (μm) or less, 0.5 microns (μm) or less, 0.4 microns (μm) or less, 0.3 microns (μm) or less, or 0.2 microns (μm) or less. In particular, the MPF may have a mean particle size as low as 30, 50, 100, or 150 nm, or as large as 200, 250, or 350 nm, for example.

In other embodiments, MPF powders could also be used.

The MPF may be provided in the form of an aqueous dispersion which is stabilized, unstabilized, or minimally stabilized. As used herein, "unstabilized" or "minimally stabilized" refers to an aqueous dispersion that includes less than 1.0 wt. % of a traditional surfactant, such as non-ionic surfactant or an anionic surfactant, based on the weight of the MPF aqueous dispersion. In some embodiments, the MPF dispersion may be provided in the form of an aqueous dispersion having less than 1.0 wt. % surfactant, less than 0.8 wt. % surfactant, less than 0.6 wt. % surfactant, or even less than 0.5 wt. % surfactant. In other embodiments, the MPF dispersion may be provided in the form of an aqueous dispersion that is "stabilized", typically having 1-12 wt. % surfactant.

Typically, the melt flow rate (MFR) of the MPF will be greater than 0.5 g/10 min and, in one embodiment, may be about 2 g/10 min or higher, as determined by ASTM D1238.

Also, the MPF will typically have a co-monomer content, i.e., a content of one or more monomers other than tetrafluoroethylene (TFE), of about 10 wt. % or greater, such as 4.0 wt. % or greater, 4.5 wt. % or greater, 5.0 wt. % or greater, 5.5 wt. % or greater, or 6.0 wt. % or greater.

Suitable MPF dispersions include TE7224 (PFA), available itom DuPont, 6900Z (PFA), available from Dyneon EEC, TE9568 (FEP), available from DuPont, Neoflon ND-110 (FEP), available from Daikin, and Hyflon XPH 6202-1 (WA), available from Solvay. These MPF dispersions have characteristics set forth in the below:

Characteristics of Exemplary Melt Processible Fluoropolymers (MPFs)

| MPF (type) | Solids content (wt. %) | Mean particle size (μm) | Melt flow rate (MFR) (g/10 min) | First melt temperature (DSC) (° C.) |
|---|---|---|---|---|
| DuPont TE7224 (PFA) | 58.6 | 0.26 | 2.4 | 313.0 (shoulder 321.2) |
| Dyneon 6900Z (PFA) | 49.4 | 0.31 | 19.4 | 310.25 |
| DuPont TE9568 (FEP) | 55.6 | 0.17 | 11.9 | 257.84 |
| Daikin Neoflon ND-110 (FEP) | 56.5 | 0.16 | — | 232.83 |
| Solvay Hyflon XPH 6202-1 (MFA) | 27.2 | 0.28 | 4.5 | 306.31 (shoulder 287.29) |

V. Engineering Polymers

In some embodiments, fluoropolymer compositional blends of the first and second embodiments discloses herein may be added to at least one engineering polymer that is not a fluoropolymer, in order to form a modified engineering polymer coating composition. An "engineering polymer" as used herein is a polymer that is not a fluoropolymer, and exhibits superior mechanical and thermal properties over a wide range of conditions.

Suitable engineering polymers include PolyEther Ether Ketone (PEEK), PolyEther Sulphone (PES), PolyPhenylene Sulfide (PPS), PolyAmide Imide (PAI), Epoxy polymers (inc. BPA, BPF, Phenollic, Novolac, BIS A Free), Polyester, Polyurethane (PU), Acrylic, PolyCarbonate (PC).

Descriptions of the typical properties of these engineering polymers are set forth below.

PolyEther Ether Ketone (PEEK). PEEK can be manufactured by step growth polymerization. It is a semi-crystalline thermoplastic that exhibits excellent mechanical properties and chemical resistance, which are maintained at higher temperatures due to it being highly resistant to thermal degradation. PEEK has a glass transition temperature of about ~143° C. and a melt point about ~343° C.

Polyether Sulphone (PES). PES can be manufactured by nucleophilic aromatic substitution. It is a high temperature resistant non-crystalline material that has good continuous operation temperature (about ~200° C.). It shows good resistance to organic and aqueous environments. Depending on grade, PES has a glass transition temperature of about ~193° C. and a melt point of about 255° C.

Polyphenylene Sulphide (PPS). PPS has a resistance to heat, acid and alkaline conditions and has good abrasion resistance. It has a glass transition temperature of about 85° C. and melting point of about ~285° C. PPS is semi-crystalline and has excellent solvent and thermal performance.

Polyamide Imide (PAT). PAI is a thermoplastic amorphous polymer that has exceptional thermal and chemical resistance properties. Examples of which are those produced by Solvay under the "Torlon" brand trade name. PAI is capable of operating at continuous temperatures of about ~260° C. and has a glass transition temperature of about 280° C.

Epoxy Polymers. Epoxy polymers are manufactured in a number of ways, the most commonly known being through the reaction of epichlorohydrin and bisphenol A to result in a bisphenol A Epoxy resin. The most common epoxy resins are bisphenol A- and F-based or Novolac-based being manufactured from a Phenolic-based feedstock. Epoxy polymers have exceptional chemical resistance and depending on type, good continuous heat resistance. The glass transition temperature and melt point vary dependent upon the polymer backbone.

Polyester Polymers. Polyesters are most commonly found in the thermoplastic form, however, thermosetting polymers are also available. They have glass transitions in the region of (but not limited to) 70° C. and melt points ~265° C.

Polyurethanes (PU). PU's are manufactured typically through the addition reaction of polyisocyanates with polyalcohols. The glass transitions and melt points depending on polymer matrix and application.

Fluoropolymer blends that may be added to at least one engineering polymer according to the present disclosure include: (1) a blend of at least one LPTFE and at least one MPF, (2) a blend of at least one HPTFE, at least one LPTFE, and at least one MPF, and (3) any of the multiple component fluoropolymer blends disclosed herein.

VI. Application Procedures and Coating Formulations

To form the present blended fluoropolymer compositions, liquid dispersions of the various components are blended together. When one or more of the components are initially provided in solid, i.e., powder form, the powder will typically be dispersed in a liquid medium to form a liquid dispersion prior to blending with other components. The order of blending is not considered to be important, and one of ordinary skill in the art will recognize that the wet weights of liquid dispersions of the components discussed herein may be selected based on the solids contents of the dispersions and the desired relative weight percent ratios of the components that are desired.

The relative ratios, fractions, or weight percents of the components described below are based on the total solids weight of the components, excluding non-fluoropolymer components that may be present, such as water or other solvents, surfactants, pigments, fillers, and other compositions.

The compositions described herein may also include suitable additives, such as surfactants, fillers, reinforcement additives, and pigments, if desired, or, as embodied in the Examples herein in connection with some of these components, may be formulated to specifically lack some or all of these components. Also, in some embodiments, the compositions may include only fluoropolymers, or may include only perfluorinated fluoropolymers, and may lack other types of polymers.

The compositions can be prepared by any standard formulation technique such as simple addition and low shear mixing. The compositions may be applied over a primer and/or midcoat by any known technique. Although the primer and midcoat, if present, will typically each include at least one fluoropolymer, the particular compositions of the primer and/or midcoat may vary widely, and are not thought to be critical with respect to the improved properties demonstrated by the coatings disclosed herein.

The coatings may be applied to a dry film thickness (DFT) of between 4 and 100 microns, depending on the application, and may be cured at a temperature above about 140° C. for between 1 and 30 minutes, depending on the applied thickness. Depending on the application and degree of thickness desired, the coatings may be applied in several layers.

It has been found that blending of the dispersions facilitates interaction of the LPTFE and MPF(s), and of the HPTFE, LPTFE and MPF(s), on a submicron level to facilitate intimate blending such that, when the blended fluoropolymer composition is dried, a crystal structure representing a true alloy of the fluoropolymers is formed, having melt characteristics that differ from those of the individual fluoropolymers. The blended fluoropolymer composition may be used to provide a coating having improved abrasion resistance, gloss, adhesion, and higher contact angles.

In addition, when used with the engineering polymers discussed in Section V herein, the blended fluoropolymer dispersions disclosed herein provide coatings that are capable of providing icophobicity.

a. Compositions that do not Include Engineering Polymers.

For the first embodiment, in which the blended compositions include at least one LPTFE and at least two chemically different MPFs (but do not include HPTFE), the propotions of the components may be as follows, based on total solids weight of the at least one LPTFE and the at least two MFPs in the blended fluoropolymer compositions:

(i). The LPTFE(s) may comprise as little as 2%, 5 wt. %, 10 wt. %, or 15 wt. %, or as much as 85 wt. %, 90 wt. %, 95 wt. %, or 98 wt. % of the blended fluoropolymer composition, and may be present within any range delimited by these values and/or by the values in the Examples herein. In one embodiment, the LPTTE may comprise between 10 wt. % and 70 wt. % of the blended fluoropolymer composition, such as between 30 wt. % and 90 wt. % of the blended fluompolymer composition. In another embodiment, the LPTFE may comprise between 20 wt. % and 60 wt. % of the blended fluoropolymer composition. In another embodiment, the LPTFE may comprise between 40 wt. % and 60 wt. % of the blended fluoropolymer composition.

(ii). The combined MPFs may comprise as little as 2 wt. %, 10 wt. %, or 15 wt. %, or as much as 85 wt. %, 90 wt. %, 95 wt. %, or 98 wt. % of the blended fluoropolymer composition, and may be present within any range delimited by these values andlor by the values in the Examples herein. In one embodiment, the combined MPFs may comprise between 40 wt. % and 80 wt. % of the blended fluoropolymer composition. In another embodiment, the combined MPFs may comprise between 40 wt. % and 60 wt. % of the blended fluoropolymer composition. In another embodiment, the combined MPFs may comprise between 36 wt. % and 64 wt. % of the blended fluoropolymer composition.

From Example 1 below, particular embodiments include: (1) 10-64 wt. % FEP, 16-64 wt. % PFA, and 20-60 wt. % LPTFE; (2) 12-24 wt. % FEP, 24-64 wt. % PFA, and 20-60 wt. % LPTFE, and (3) 12-16 wt. % FEP, 24-48 wt. % PFA and 40-60 wt. % LPTFE.

For the second embodiment, in which the blended compositions include at least one HPTFE, at least one LPTFE, and at least two chemically different MPFs, the proportions of the components may be as follows, based on total solids weight of the at least one HPTFE, the at least one LPTFE, and the at least two MFPs in the blended fluoropolymer compositions:

(i). The LPTFE(s) may comprise as little as 2 wt. %, 5 wt. %, 10 wt. %, or 15 wt. %, or as much as 85 wt. %, 90 wt. %, 95 wt. %, or 98 wt. % of the blended fluoropolymer composition, and may be present within any range delimited by these values and/or by the values in the Examples herein. In one embodiment, the LPTEE may comprise between 10 wt. % and 90 wt. % of the blended fluoropolyme.r composition, such as 24 wt. % of the blended composition. In another embodiment, the LPTFE may comprise between 16 wt. % and 60 wt. % of ihe blended fluoropolymer composition.

(ii). The combined MPFs may comprise as little as 2 wt. %, 10 wt. %, or 15 wt. %, or as much as 85 wt. %, 90 wt. %, 95 wt. %, or 98 wt. % of the blended fluoropolymer composition, and may be present within any range delimited by these values and/or by the values in the Examples herein. In one embodiment, the combined MPFs may comprise between 10 wt. % and 90 wt. % of the blended fluoropolymer composition, such as 24 wt. % of the blended composition. In another embodiment, the combined MPFs may comprise between 1 wt. % and 60 wt. % of the blended fluoropolymer composition.

(iii). The HPTFE(s) may comprise between 1 wt. % and 89 wt. % or 90 wt. % of the blended fluoropolymer composition, such as 60 wt. % of the blended fluoropolymer composition. In another embodiment, the HPTFE may comprise between 1 wt. % and 60 wt. % of the blendedfluoropolymer composition.

From Example 2 below, particular embodiments include: (1) 16-60 wt. % LPTFE, 1-30 wt. % FEP, 1-30 wt. % PFA and 1-60 wt. % HPITE or, more particularly, 16-60% LPTFE, 8-18% FEP, 8-18% PFA, and 40-60% HPTFE.

From Example 3 below, particular embodiments include: (1) 60-84 wt. % HPTFE, 4-12 wt. % PFA, 2-18 wt. % FEP and 4-30 wt. % LPTFE.

b. Compositions that Include Engineering Polymers.

The total engineering polymer weight content, based on solids weight of all polymers in the composition, may be as little as 15 wt. % to as great as 85 wt. % for both spray applications and coil applications. In compositions that include engineering polymers, the LPTFE may comprise as little as 5 wt. %, 10 wt. %, 11 wt. %, or 16 wt. %, or as much as 24 wt. %, 36 wt. %, or 95 wt. % by weight of the composition, and may be present within any range delimited by these values or by the values in the Examples herein. The combined MPFs may comprise as little as 5 wt. %, 10 wt. %, 12 wt. % or 16 wt. %, or as much as 24 wt. %, 36 wt. %, or 95 wt. % of the composition, and may be present within any range delimited by these values or by the values in the Examples herein.

In one embodiment, the combined MPFs may comprise between 5 wt. % and 36 wt. % of the composition, such as 23 wt. % of the composition, and the LPTFE may comprise between 10 wt. % and 36 wt. % of the blended fiuoropolymer composition such as 16 wt. % of the blended fluoropolymer composition.

The HPTFE may comprise between 40 wt. % and 90 wt. % of the composition such as 60 wt. % of the composition or any range delimited by the values in the Examples herein.

VII. Physical Properties and Characterization Procedures a. First Melt, Fusion, and Second Melt (Remelt) Temperatures.

The present compositions, when applied to a substrate, either directly to the substrate or over an underlying coating, or formed into a film, exhibit first melt, fusion, and second melt (remelt) temperatures described in the Examples below, as measured by differential scanning caloimetry (DSC).

For DSC analysis, blended fluoropolymer compositions were prepared as follows. The given amounts of aqueous fluoropolymer dispersions were mixed under air in a mixer for 30 minutes to ensure homogenous mixture of the dispersions. The mixture was mixed under low to medium shear to avoid coagulation of blended dispersion. A plastic eye-dropper was used to place a known weight of the mixed, blended dispersion into a pre-weighed drying dish, The dispersion was flashed at 100° C. in an oven for 30 minutes, and the residual powder was then dried at 200° C. for an additional 30 minutes. After the dried powder cooled to room temperature, the powder was weighed and the percent solids in the mixed dispersion were calculated, The blended fluoropolymer powder was then ready for DSC analysis.

For DSC analysis, 10 mg (+/−1 mg) of the dried powder was placed in a aluminum DSC sample pan, and the pan was sealed with a standard lid, The heating and cooling cycles of the DSC were as follows: (1) ramp 15.0° C./min to 400° C.; (2) isothermal for 1.00 min; (3) ramp 15.0° C./min to 135° C.: (4) isothermal for 1.00 min: (5) ramp 15.0° C./min to 400° C.; and (6) air cool.

The melting peaks were obtained during the (1) ramping up heating process, The crystallization peaks were obtained in the (3) cooling process. The 2nd melting peaks were obtained at the (5) heating process.

b. Contact Angle.

The present compositions, when applied to a substrate, either directly to the substrate or over an underlying coating, or formed into a film, exhibit a contact angle of at least 100° in water, and may have a contact angle of at least 110°, 120°, 125°, 130°, or 135°, and may have a contact angle within any range delimited by these values and/or by the values in the Examples herein, as measured for a water droplet according to the Young Relation. Contact angle may be measured according to ASTM D7334-08 with any suitable co/nmcrciallyovuiluble instrument, such as the "Drop Shape Analysis" system (DSA10), available from Kruss GmbH of Hamburg, Germany.

c. Gloss.

The present compositions, when applied to a substrate, either directly to the substrate or over an underlying coating, or formed into a film, exhibits a measured gloss, in % reflectance, of at least 10, and may have a measured gloss of at least 15, 25, 30, 35, 40, or 45, and may have a measured gloss within any range delimited by these values and/or by the values in the Examples herein, as measured at 60° with any suitable commercially available instrument, such as a Microgloss 60° glossmeter, available from Byk-Gardner, in accordance with the following standards: BS3900/D5, INN EN ISO 2813, DIN 67530, EN ISO 7668, ASTM D523, ASTM D1455, ASTM C346, ASTM C584, ASTM D2457, JIS Z 8741, MFT 30064, TAPPI T 480. Units of measurement are expressed as % reflectance.

d. Pencil Test.

The pencil test protocol is below.

1. Equipment and Materials.

1.1 A set of hardness pencils varying in hardness from 4B (softest) to 8H (hardest). Leads in mechanical holders may be used also.

1.2 Extra fine sandpaper (400 grit).

1.3 Pencil sharpener, preferably of the drafting type that removes only wood, and produces a blunt, unsharpened lead.

2. Procedure.

2.1 Arrange pencils in order from softest to hardest. The order of pencils is set forth in the table below, each correlated to a number which may be used for statistical analysis of the results as in Example 1, where 4B is the softest and 8H is the hardest:

| 4B | 3B | 2B | B  | HB | F | H | 1H | 2H | 3H | 4H | 5H | 6H | 7H | 8H |
|----|----|----|----|----|---|---|----|----|----|----|----|----|----|----|
| −5 | −4 | −3 | −2 | −1 | 0 | 1 | 2  | 3  | 4  | 5  | 6  | 7  | 8  | 9  |

2.2 Sharpen pencils. If possible, remove only the wood and do not sharpen the lead. This is unnecessary if leads in mechanical holders are used.

2.3 Place the sandpaper on a smooth flat surface. Holding the pencil as vertical as possible on the sandpaper, abrade the end of the lead to produce a perfectly round and flat tip. The edges of the tip should be sharp and form a 90° angle with the sides of the lead. Touch the tip lightly with fingertip or soft tissue to remove excess lead dust, 2.4 Hold the coated test object firmly on a flat surface. Select a pencil that is harder than you expect the coating to be. Hold the pencil in a normal writing manner and place the tip against the coated object to form a 45° angle with the plane of the coating.

2.5 Push the pencil firmly and with one smooth 5 cm stroke into the coating at a 45' angle. The objective is to penetrate the coating, and push it off the substrate. If the lead crumbles, stop testing.

2.6 Examine the coating. If the pencil has nicked or gouged the coating, select the next softer pencil and repeat 2.4 and 2.5 until a pencil is reached that does not penetrate the coating.

3. Evaluation.

3.1 The hardness rating of the coating is equal to the first pencil that does not penetrate and gouge the coating, 4. Precautions.

4.1 Dress the tip of the lead for each test. With practice, it will be possible to use the lead twice for each dressing by rotating it 180" and using the opposite edge. For reproducibility, it is a good idea to run two tests for each pencil when evaluating the hardness of a coating.

4.2 Specify the substrate on which the test is performed. Coatings will have slightly lower pencil hardness on soft substrates such as aluminum than on hard steel substrates.

4.3 Make sure that the coating has been applied at the proper film thickness. Coatings will have a slightly higher apparent hardness if they are applied at low film thickness especially if the substrate is steel.

4.4 Specify the temperature at which the test is performed. Coatings become softer at elevated temperature.

5. References.

5.1 ASTM D-3363

5.7 BS Au 148 Part 6

EXAMPLES

The following non-limiting Examples illustrate various features and characteristics of the present invention, which is not to be construed as limited thereto. Throughout the Examples and elsewhere herein, percentages are by weight unless otherwise indicated.

Example 1

First Embodiment

Fluoropolymer Blends with Multiple MPFs (LPTFE/MPF1/MP2)

Basic and Thermal Properties

In this Example, blends were prepared including the following components as described above: at least one LPTFE, and at least two chemically different MPFs, but not including HPTFE. In this Example, the two MPFs employed were FEP and PEA. The blends in this Example were made by mixing aqueous dispersions of the components, and the resulting blends were then drawn down as films for gloss contact angle, and pencil test characterization and, for the thermal analysis, were coagulated and dried for DSC measurement, as discussed in Section VII above.

Panels were prepared for gloss, contact angle and pencil hardness testing as follows. In Mix A and Mix B, the value for deionized water (D1W) appears more than once as such may originate from more than one of the components in the mixtures.

1. Make liquid blend of MPF and LPTFE in the desired ratios.
2. Add the formulation to the blend created in step 1. Use the following formulation and percentages shown in the table below to make the blends for drawdown using the following procedure.
   a. Make a blend of dispersions. Calculate the % solids of the blend.
   b. Divide the % solids by 35
   c. Subtract 1.15. The result is the % water to add. by volume to the dispersion blend.
   d. Add 15% by volume of the Dispersion Solution shown in the table below
   e. Add the amount of water calculated in step 3.
   f. Add 0.4% Triethanolamine by overall volume
3. Blend the mix gently to avoid air bubbles.
4. Using a pipet apply a small amount to an aluminum degreased panel.

5. Draw the coating down the panel in a smooth motion using a 3 mil wet path bird applicator,
6. Flash the panel for approximately 5-10 minutes at 200° F.
7. Move the panel to 400° F. and flash an additional 3-5 minutes.
8. Cure the panel for 10 minutes at 750° F.

Dispersion Solution

| | |
|---|---|
| 50% Carbowax PE Glycol 1450 in DIW | 55.00 |
| Glycerine | 30.00 |
| Carbopol EP-1 | 5.00 |
| DIW | 10.00 |

Table 1 below is a summary of the blends examined in this Example. In Table 1, "Total MPF" designates the total amount of MPF, which was FEP, PEA, or a combination of the foregoing, wherein the FEP used was TE 9568 FEP (55.6% solids), available from DuPont and the PEA used was TE 7224 PEA (58.6% solids), each described above in Section IV. "LPTFE" designates the total amount of LPTFE, wherein the LPTFE's used were SEN-D, available from Chenguang R.I.C.I, Chengdu, 610036 P.R. China and TE3887N, available from DuPont, each described above in Section II. "Coord LPTFE" and "Coord MPF" represent the coordinates of the compositions on the composition plots XX-YY of FIGS. 19-30.

TABLE 1

Fluoropolymer Blends

| Run # | SFN-D | TE3887N | FEP | PFA | Total LPTFE | Total MPF | Coord MPF | Coord LPTFE |
|---|---|---|---|---|---|---|---|---|
| 1 | 0 | 0 | 0 | 1 | 0 | 1 | 0 | 0 |
| 2 | 0 | 0 | 0.05 | 0.95 | 0 | 1 | 0.05 | 0 |
| 3 | 0 | 0 | 0.2 | 0.8 | 0 | 1 | 0.2 | 0 |
| 4 | 0 | 0 | 0.4 | 0.6 | 0 | 1 | 0.4 | 0 |
| 5 | 0 | 0 | 0.5 | 0.5 | 0 | 1 | 0.5 | 0 |
| 6 | 0 | 0 | 0.6 | 0.4 | 0 | 1 | 0.6 | 0 |
| 7 | 0 | 0 | 0.8 | 0.2 | 0 | 1 | 0.8 | 0 |
| 8 | 0 | 0 | 1 | 0 | 0 | 1 | 1 | 0 |
| 9 | 0 | 0.1 | 0 | 0.9 | 0.1 | 0.9 | 0 | −0.1 |
| 10 | 0 | 0.1 | 0.9 | 0 | 0.1 | 0.9 | 0.9 | −0.1 |
| 11 | 0 | 0.2 | 0 | 0.8 | 0.2 | 0.8 | 0 | −0.2 |
| 12 | 0 | 0.2 | 0.8 | 0 | 0.2 | 0.8 | 0.8 | −0.2 |
| 13 | 0 | 0.2 | 0.16 | 0.64 | 0.2 | 0.8 | 0.16 | −0.2 |
| 14 | 0 | 0.2 | 0.32 | 0.48 | 0.2 | 0.8 | 0.32 | −0.2 |
| 15 | 0 | 0.2 | 0.4 | 0.4 | 0.2 | 0.8 | 0.4 | −0.2 |
| 16 | 0 | 0.2 | 0.48 | 0.32 | 0.2 | 0.8 | 0.48 | −0.2 |
| 17 | 0 | 0.2 | 0.64 | 0.16 | 0.2 | 0.8 | 0.64 | −0.2 |
| 18 | 0 | 0.25 | 0.75 | 0 | 0.25 | 0.75 | 0.75 | −0.25 |
| 19 | 0 | 0.3 | 0 | 0.7 | 0.3 | 0.7 | 0 | −0.3 |
| 20 | 0 | 0.4 | 0 | 0.6 | 0.4 | 0.6 | 0 | −0.4 |
| 21 | 0 | 0.4 | 0.12 | 0.48 | 0.4 | 0.6 | 0.12 | −0.4 |
| 22 | 0 | 0.4 | 0.24 | 0.36 | 0.4 | 0.6 | 0.24 | −0.4 |
| 23 | 0 | 0.4 | 0.3 | 0.3 | 0.4 | 0.6 | 0.3 | −0.4 |
| 24 | 0 | 0.4 | 0.36 | 0.24 | 0.4 | 0.6 | 0.36 | −0.4 |
| 25 | 0 | 0.4 | 0.48 | 0.12 | 0.4 | 0.6 | 0.48 | −0.4 |
| 26 | 0 | 0.4 | 0.6 | 0 | 0.4 | 0.6 | 0.6 | −0.4 |
| 27 | 0 | 0.45 | 0 | 0.55 | 0.45 | 0.55 | 0 | −0.45 |
| 28 | 0 | 0.45 | 0.55 | 0 | 0.45 | 0.55 | 0.55 | −0.45 |
| 29 | 0 | 0.5 | 0 | 0.5 | 0.5 | 0.5 | 0 | −0.5 |
| 30 | 0 | 0.5 | 0.1 | 0.4 | 0.5 | 0.5 | 0.1 | −0.5 |
| 31 | 0 | 0.5 | 0.2 | 0.3 | 0.5 | 0.5 | 0.2 | −0.5 |
| 32 | 0 | 0.5 | 0.25 | 0.25 | 0.5 | 0.5 | 0.25 | −0.5 |
| 33 | 0 | 0.5 | 0.3 | 0.2 | 0.5 | 0.5 | 0.3 | −0.5 |
| 34 | 0 | 0.5 | 0.4 | 0.1 | 0.5 | 0.5 | 0.4 | −0.5 |
| 35 | 0 | 0.5 | 0.5 | 0 | 0.5 | 0.5 | 0.5 | −0.5 |
| 36 | 0 | 0.55 | 0 | 0.45 | 0.55 | 0.45 | 0 | −0.55 |
| 37 | 0 | 0.55 | 0.45 | 0 | 0.55 | 0.45 | 0.45 | −0.55 |
| 38 | 0 | 0.6 | 0 | 0.4 | 0.6 | 0.4 | 0 | −0.6 |
| 39 | 0 | 0.6 | 0.08 | 0.32 | 0.6 | 0.4 | 0.08 | −0.6 |
| 40 | 0 | 0.6 | 0.16 | 0.24 | 0.6 | 0.4 | 0.16 | −0.6 |
| 41 | 0 | 0.6 | 0.2 | 0.2 | 0.6 | 0.4 | 0.2 | −0.6 |
| 42 | 0 | 0.6 | 0.24 | 0.16 | 0.6 | 0.4 | 0.24 | −0.6 |
| 43 | 0 | 0.6 | 0.32 | 0.08 | 0.6 | 0.4 | 0.32 | −0.6 |
| 44 | 0 | 0.6 | 0.4 | 0 | 0.6 | 0.4 | 0.4 | −0.6 |
| 45 | 0 | 0.7 | 0 | 0.3 | 0.7 | 0.3 | 0 | −0.7 |
| 46 | 0 | 0.75 | 0.25 | 0 | 0.75 | 0.25 | 0.25 | −0.75 |
| 47 | 0 | 0.8 | 0 | 0.2 | 0.8 | 0.2 | 0 | −0.8 |
| 48 | 0 | 0.8 | 0.04 | 0.16 | 0.8 | 0.2 | 0.04 | −0.8 |
| 49 | 0 | 0.8 | 0.08 | 0.12 | 0.8 | 0.2 | 0.08 | −0.8 |
| 50 | 0 | 0.8 | 0.1 | 0.1 | 0.8 | 0.2 | 0.1 | −0.8 |
| 51 | 0 | 0.8 | 0.12 | 0.08 | 0.8 | 0.2 | 0.12 | −0.8 |
| 52 | 0 | 0.8 | 0.16 | 0.04 | 0.8 | 0.2 | 0.16 | −0.8 |
| 53 | 0 | 0.8 | 0.2 | 0 | 0.8 | 0.2 | 0.2 | −0.8 |
| 54 | 0 | 0.9 | 0 | 0.1 | 0.9 | 0.1 | 0 | −0.9 |

TABLE 1-continued

Fluoropolymer Blends

| Run # | SFN-D | TE3887N | FEP | PFA | Total LPTFE | Total MPF | Coord MPF | Coord LPTFE |
|---|---|---|---|---|---|---|---|---|
| 55 | 0 | 0.9 | 0.1 | 0 | 0.9 | 0.1 | 0.1 | −0.9 |
| 56 | 0 | 1 | 0 | 0 | 1 | 0 | 0 | −1 |
| 57 | 0.05 | 0 | 0.05 | 0.9 | 0.05 | 0.95 | 0.05 | 0.05 |
| 58 | 0.05 | 0 | 0.35 | 0.6 | 0.05 | 0.95 | 0.35 | 0.05 |
| 59 | 0.06 | 0 | 0.0244 | 0.9146 | 0.061 | 0.939 | 0.0244 | 0.061 |
| 60 | 0.08 | 0 | 0.05 | 0.875 | 0.075 | 0.925 | 0.05 | 0.075 |
| 61 | 0.08 | 0 | 0.2 | 0.725 | 0.075 | 0.925 | 0.2 | 0.075 |
| 62 | 0.08 | 0 | 0.35 | 0.572 | 0.078 | 0.922 | 0.35 | 0.078 |
| 63 | 0.09 | 0 | 0.3182 | 0.5909 | 0.0909 | 0.9091 | 0.3182 | 0.0909 |
| 64 | 0.1 | 0 | 0 | 0.9 | 0.1 | 0.9 | 0 | 0.1 |
| 65 | 0.1 | 0 | 0.9 | 0 | 0.1 | 0.9 | 0.9 | 0.1 |
| 66 | 0.1 | 0 | 0.05 | 0.85 | 0.1 | 0.9 | 0.05 | 0.1 |
| 67 | 0.1 | 0 | 0.215 | 0.685 | 0.1 | 0.9 | 0.215 | 0.1 |
| 68 | 0.2 | 0 | 0 | 0.8 | 0.2 | 0.8 | 0 | 0.2 |
| 69 | 0.2 | 0 | 0.8 | 0 | 0.2 | 0.8 | 0.8 | 0.2 |
| 70 | 0.2 | 0 | 0.16 | 0.64 | 0.2 | 0.8 | 0.16 | 0.2 |
| 71 | 0.2 | 0 | 0.32 | 0.48 | 0.2 | 0.8 | 0.32 | 0.2 |
| 72 | 0.2 | 0 | 0.4 | 0.4 | 0.2 | 0.8 | 0.4 | 0.2 |
| 73 | 0.2 | 0 | 0.48 | 0.32 | 0.2 | 0.8 | 0.48 | 0.2 |
| 74 | 0.2 | 0 | 0.64 | 0.16 | 0.2 | 0.8 | 0.64 | 0.2 |
| 75 | 0.25 | 0 | 0 | 0.75 | 0.25 | 0.75 | 0 | 0.25 |
| 76 | 0.25 | 0 | 0.75 | 0 | 0.25 | 0.75 | 0.75 | 0.25 |
| 77 | 0.3 | 0 | 0 | 0.7 | 0.3 | 0.7 | 0 | 0.3 |
| 78 | 0.3 | 0 | 0.7 | 0 | 0.3 | 0.7 | 0.7 | 0.3 |
| 79 | 0.4 | 0 | 0 | 0.6 | 0.4 | 0.6 | 0 | 0.4 |
| 80 | 0.4 | 0 | 0.12 | 0.48 | 0.4 | 0.6 | 0.12 | 0.4 |
| 81 | 0.4 | 0 | 0.24 | 0.36 | 0.4 | 0.6 | 0.24 | 0.4 |
| 82 | 0.4 | 0 | 0.3 | 0.3 | 0.4 | 0.6 | 0.3 | 0.4 |
| 83 | 0.4 | 0 | 0.36 | 0.24 | 0.4 | 0.6 | 0.36 | 0.4 |
| 84 | 0.4 | 0 | 0.48 | 0.12 | 0.4 | 0.6 | 0.48 | 0.4 |
| 85 | 0.4 | 0 | 0.6 | 0 | 0.4 | 0.6 | 0.6 | 0.4 |
| 86 | 0.45 | 0 | 0 | 0.55 | 0.45 | 0.55 | 0 | 0.45 |
| 87 | 0.45 | 0 | 0.55 | 0 | 0.45 | 0.55 | 0.55 | 0.45 |
| 88 | 0.47 | 0 | 0 | 0.53 | 0.47 | 0.53 | 0 | 0.47 |
| 89 | 0.5 | 0 | 0 | 0.5 | 0.5 | 0.5 | 0 | 0.5 |
| 90 | 0.5 | 0 | 0.1 | 0.4 | 0.5 | 0.5 | 0.1 | 0.5 |
| 91 | 0.5 | 0 | 0.2 | 0.3 | 0.5 | 0.5 | 0.2 | 0.5 |
| 92 | 0.5 | 0 | 0.25 | 0.25 | 0.5 | 0.5 | 0.25 | 0.5 |
| 93 | 0.5 | 0 | 0.3 | 0.2 | 0.5 | 0.5 | 0.3 | 0.5 |
| 94 | 0.5 | 0 | 0.4 | 0.1 | 0.5 | 0.5 | 0.4 | 0.5 |
| 95 | 0.5 | 0 | 0.5 | 0 | 0.5 | 0.5 | 0.5 | 0.5 |
| 96 | 0.55 | 0 | 0 | 0.45 | 0.55 | 0.45 | 0 | 0.55 |
| 97 | 0.55 | 0 | 0.45 | 0 | 0.55 | 0.45 | 0.45 | 0.55 |
| 98 | 0.6 | 0 | 0 | 0.4 | 0.6 | 0.4 | 0 | 0.6 |
| 99 | 0.6 | 0 | 0.08 | 0.32 | 0.6 | 0.4 | 0.08 | 0.6 |
| 100 | 0.6 | 0 | 0.16 | 0.24 | 0.6 | 0.4 | 0.16 | 0.6 |
| 101 | 0.6 | 0 | 0.2 | 0.2 | 0.6 | 0.4 | 0.2 | 0.6 |
| 102 | 0.6 | 0 | 0.24 | 0.16 | 0.6 | 0.4 | 0.24 | 0.6 |
| 103 | 0.6 | 0 | 0.32 | 0.08 | 0.6 | 0.4 | 0.32 | 0.6 |
| 104 | 0.6 | 0 | 0.4 | 0 | 0.6 | 0.4 | 0.4 | 0.6 |
| 105 | 0.65 | 0 | 0.35 | 0 | 0.65 | 0.35 | 0.35 | 0.65 |
| 106 | 0.7 | 0 | 0 | 0.3 | 0.7 | 0.3 | 0 | 0.7 |
| 107 | 0.7 | 0 | 0.3 | 0 | 0.7 | 0.3 | 0.3 | 0.7 |
| 108 | 0.75 | 0 | 0.25 | 0 | 0.75 | 0.25 | 0.25 | 0.75 |
| 109 | 0.8 | 0 | 0 | 0.2 | 0.8 | 0.2 | 0 | 0.8 |
| 110 | 0.8 | 0 | 0.04 | 0.16 | 0.8 | 0.2 | 0.04 | 0.8 |
| 111 | 0.8 | 0 | 0.08 | 0.12 | 0.8 | 0.2 | 0.08 | 0.8 |
| 112 | 0.8 | 0 | 0.1 | 0.1 | 0.8 | 0.2 | 0.1 | 0.8 |
| 113 | 0.8 | 0 | 0.12 | 0.08 | 0.8 | 0.2 | 0.12 | 0.8 |
| 114 | 0.8 | 0 | 0.16 | 0.04 | 0.8 | 0.2 | 0.16 | 0.8 |
| 115 | 0.8 | 0 | 0.2 | 0 | 0.8 | 0.2 | 0.2 | 0.8 |
| 116 | 0.85 | 0 | 0 | 0.15 | 0.85 | 0.15 | 0 | 0.85 |
| 117 | 0.85 | 0 | 0.15 | 0 | 0.85 | 0.15 | 0.15 | 0.85 |
| 118 | 0.9 | 0 | 0.1 | 0 | 0.9 | 0.1 | 0.1 | 0.9 |
| 119 | 1 | 0 | 0 | 0 | 1 | 0 | 0 | 1 |

Observed data is set forth in Table 2 below, wherein:
GLOSS=measured gloss, per Section VII above;
NORM GLOSS=normalized gloss, calculated as: [Gloss−Minimum (Gloss)]/[Maximum (Gloss)−Minimum (Gloss)];
CONTACT ANGLE (CA)=contact angle, per Section V above;
NORM CA=normalized contact angle, calculated as: [Contact Angle−Minimum (Contact Angle)]/[Maximum (Contact Angle)−Minimum (Contact Angle)];
PENCIL=pencil test measurement, per Section VII above, where the value in Table 2 below is the mean of the number of measured results, as indicated by "# Data" in Table 1 above;

NORM PENCIL=normalized pencil test measurement, calculated as: [PENCIL−Minimum (PENCIL)]/[Maximum (PENCIL)−Minimum (PENCIL)];

NORM min remelt=normalized "min remelt", calculated as: [min remelt−Minimum (min remelt)]/[Maximum (min remelt)−Minimum (min remelt)], wherein "min remelt" is the temperature of the lowest remelt peak for a given sample;

Norm (CA, Gloss, Hard)=the mean of (NORM CA, NORM PENCIL, and NORM GLOSS); and

Norm (Remelt, CA, Gloss, Hard)=the mean of (NORM CA, NORM PENCIL, NORM GLOSS, and NORM min remelt).

TABLE 2

Observed data

| Run # | GLOSS | NORM GLOSS | Contact Angle | NORM CA | Pencil | NORM PENCIL | norm min remelt | CA, GLOSS, HARD | remelt, CA, Gloss, hard |
|---|---|---|---|---|---|---|---|---|---|
| 1 | 50.2 | 0.64 | 122.81 | 0.33 | 0 | 0.38 | 0.70 | 0.45 | 0.51 |
| 2 | 71 | 0.99 | 122.66 | 0.32 | −2 | 0.13 | 0.76 | 0.48 | 0.55 |
| 3 | 67.1 | 0.92 | 118.61 | 0.13 | −2 | 0.13 | 0.33 | 0.39 | 0.38 |
| 4 | 67.7 | 0.93 | 116.43 | 0.03 | 4 | 0.88 | 0.10 | 0.61 | 0.48 |
| 5 | 51.8 | 0.66 | 116.23 | 0.02 | 3 | 0.75 | 0.10 | 0.48 | 0.38 |
| 6 | 67.7 | 0.93 | 116.90 | 0.05 | 4 | 0.88 | 0.12 | 0.62 | 0.49 |
| 7 | 41.5 | 0.49 | 115.97 | 0.01 | 4 | 0.88 | 0.12 | 0.46 | 0.37 |
| 8 | 68.7 | 0.95 | 118.63 | 0.13 | 5 | 1.00 | 0.15 | 0.69 | 0.56 |
| 9 | 51.1 | 0.65 | 119.26 | 0.16 | 0 | 0.38 | 0.62 | 0.40 | 0.45 |
| 10 | 50.5 | 0.64 | 117.35 | 0.07 | 4 | 0.88 | 0.13 | 0.53 | 0.43 |
| 11 | 51.1 | 0.65 | 125.83 | 0.47 | −2 | 0.13 | 0.61 | 0.41 | 0.46 |
| 12 | 69 | 0.96 | 119.17 | 0.16 | 4 | 0.88 | 0.14 | 0.66 | 0.53 |
| 13 | 41.1 | 0.48 | 124.89 | 0.42 | 5 | 1.00 | 0.63 | 0.63 | 0.63 |
| 14 | 40.2 | 0.47 | 124.63 | 0.41 | 4 | 0.88 | 0.12 | 0.58 | 0.47 |
| 15 | 37.8 | 0.42 | 123.89 | 0.38 | 5 | 1.00 | 0.12 | 0.60 | 0.48 |
| 16 | 38.7 | 0.44 | 124.72 | 0.41 | 5 | 1.00 | 0.09 | 0.62 | 0.49 |
| 17 | 69 | 0.96 | 122.42 | 0.31 | 5 | 1.00 | 0.12 | 0.75 | 0.60 |
| 18 | 57.4 | 0.76 | 120.55 | 0.22 | 4 | 0.88 | 0.12 | 0.62 | 0.49 |
| 19 | 48.1 | 0.60 | 118.87 | 0.14 | −3 | 0.00 | 0.62 | 0.25 | 0.34 |
| 20 | 70 | 0.97 | 128.48 | 0.59 | −3 | 0.00 | 0.61 | 0.52 | 0.54 |
| 21 | 64.8 | 0.88 | 133.79 | 0.84 | 3 | 0.75 | 0.63 | 0.82 | 0.77 |
| 22 | 60.6 | 0.81 | 131.62 | 0.74 | 3 | 0.75 | 0.18 | 0.77 | 0.62 |
| 23 | 66.7 | 0.92 | 129.12 | 0.62 | 3 | 0.75 | 0.13 | 0.76 | 0.60 |
| 24 | 46 | 0.56 | 131.02 | 0.71 | 0 | 0.38 | 0.14 | 0.55 | 0.45 |
| 25 | 40.7 | 0.47 | 128.65 | 0.60 | 4 | 0.88 | 0.12 | 0.65 | 0.52 |
| 26 | 67.6 | 0.93 | 123.68 | 0.37 | 4 | 0.88 | 0.13 | 0.72 | 0.58 |
| 27 | 47.4 | 0.59 | 129.22 | 0.62 | −3 | 0.00 | 0.61 | 0.40 | 0.46 |
| 28 | 32.5 | 0.33 | 127.54 | 0.55 | 5 | 1.00 | 0.11 | 0.63 | 0.50 |
| 29 | 64.3 | 0.88 | 135.05 | 0.89 | 4 | 0.88 | 0.61 | 0.88 | 0.81 |
| 30 | 56.8 | 0.75 | 134.97 | 0.89 | −3 | 0.00 | 0.63 | 0.55 | 0.57 |
| 31 | 50.7 | 0.64 | 133.21 | 0.81 | 5 | 1.00 | 0.18 | 0.82 | 0.66 |
| 32 | 41.8 | 0.49 | 132.58 | 0.78 | 1 | 0.50 | 0.15 | 0.59 | 0.48 |
| 33 | 30.6 | 0.30 | 132.70 | 0.79 | −3 | 0.00 | 0.14 | 0.36 | 0.31 |
| 34 | 29.3 | 0.28 | 132.02 | 0.75 | 4 | 0.88 | 0.14 | 0.64 | 0.51 |
| 35 | 25.8 | 0.22 | 128.94 | 0.61 | 3 | 0.75 | 0.11 | 0.53 | 0.42 |
| 36 | 66.6 | 0.91 | 123.33 | 0.35 | −3 | 0.00 | 0.61 | 0.42 | 0.47 |
| 37 | 61.5 | 0.83 | 129.46 | 0.63 | 5 | 1.00 | 0.11 | 0.82 | 0.64 |
| 38 | 42.4 | 0.50 | 125.16 | 0.43 | −3 | 0.00 | 0.60 | 0.31 | 0.38 |
| 39 | 39 | 0.45 | 136.06 | 0.94 | −3 | 0.00 | 0.62 | 0.46 | 0.50 |
| 40 | 42 | 0.50 | 135.12 | 0.90 | 5 | 1.00 | 0.65 | 0.80 | 0.76 |
| 41 | 30.5 | 0.30 | 134.65 | 0.88 | −3 | 0.00 | 0.25 | 0.39 | 0.36 |
| 42 | 27.1 | 0.24 | 134.73 | 0.88 | −2 | 0.13 | 0.16 | 0.42 | 0.35 |
| 43 | 27 | 0.24 | 130.08 | 0.66 | 4 | 0.88 | 0.13 | 0.59 | 0.48 |
| 44 | 24.4 | 0.20 | 130.10 | 0.66 | 4 | 0.88 | 0.12 | 0.58 | 0.46 |
| 45 | 65.3 | 0.89 | 131.69 | 0.74 | −3 | 0.00 | 0.60 | 0.54 | 0.56 |
| 46 | 17.7 | 0.08 | 133.48 | 0.82 | −2 | 0.13 | 0.11 | 0.34 | 0.28 |
| 47 | 64.3 | 0.88 | 132.18 | 0.76 | −3 | 0.00 | 0.37 | 0.55 | 0.50 |
| 48 | 25.3 | 0.21 | 137.02 | 0.99 | −3 | 0.00 | 0.64 | 0.40 | 0.46 |
| 49 | 21.4 | 0.15 | 136.59 | 0.97 | −2 | 0.13 | 0.98 | 0.41 | 0.55 |
| 50 | 12.8 | 0.00 | 137.33 | 1.00 | −3 | 0.00 | 1.00 | 0.33 | 0.50 |
| 51 | 15.2 | 0.04 | 136.21 | 0.95 | 1 | 0.50 | 0.29 | 0.50 | 0.44 |
| 52 | 27.1 | 0.24 | 133.65 | 0.83 | 1 | 0.50 | 0.12 | 0.52 | 0.42 |
| 53 | 13.9 | 0.02 | 132.66 | 0.78 | −2 | 0.13 | 0.08 | 0.31 | 0.25 |
| 54 | 54.6 | 0.71 | 131.72 | 0.74 | −3 | 0.00 | 0.98 | 0.48 | 0.61 |
| 55 | 19.7 | 0.12 | 133.58 | 0.83 | −3 | 0.00 | 0.11 | 0.31 | 0.26 |
| 56 | 22.9 | 0.17 | 133.29 | 0.81 | −3 | 0.00 | 0.98 | 0.33 | 0.49 |
| 57 | 71.7 | 1.00 | 122.21 | 0.30 | −2 | 0.13 | 0.76 | 0.47 | 0.54 |
| 58 | 67.8 | 0.94 | 115.82 | 0.00 | −1 | 0.25 | 0.33 | 0.39 | 0.38 |
| 59 | 69.5 | 0.96 | 123.72 | 0.37 | −3 | 0.00 | 0.76 | 0.44 | 0.52 |
| 60 | 69.2 | 0.96 | 123.56 | 0.36 | −2 | 0.13 | 0.76 | 0.48 | 0.55 |
| 61 | 63 | 0.85 | 119.64 | 0.18 | −3 | 0.00 | 0.31 | 0.34 | 0.33 |
| 62 | 56.2 | 0.74 | 117.94 | 0.10 | −1 | 0.25 | 0.32 | 0.36 | 0.35 |
| 63 | 68.3 | 0.94 | 117.61 | 0.08 | −1 | 0.25 | 0.35 | 0.43 | 0.41 |

TABLE 2-continued

Observed data

| Run # | GLOSS | NORM GLOSS | Contact Angle | NORM CA | Pencil | NORM PENCIL | norm min remelt | CA, GLOSS, HARD | remelt, CA, Gloss, hard |
|---|---|---|---|---|---|---|---|---|---|
| 64 | 68.2 | 0.94 | 126.32 | 0.49 | −1 | 0.25 | 0.57 | 0.56 | 0.56 |
| 65 | 57.8 | 0.76 | 118.58 | 0.13 | 5 | 1.00 | 0.04 | 0.63 | 0.48 |
| 66 | 62 | 0.84 | 124.46 | 0.40 | −2 | 0.13 | 0.80 | 0.45 | 0.54 |
| 67 | 63.2 | 0.86 | 119.55 | 0.17 | −2 | 0.13 | 0.31 | 0.38 | 0.36 |
| 68 | 65.1 | 0.89 | 127.30 | 0.53 | −1 | 0.25 | 0.82 | 0.56 | 0.62 |
| 69 | 52.6 | 0.68 | 119.61 | 0.18 | 5 | 1.00 | 0.08 | 0.62 | 0.48 |
| 70 | 60.4 | 0.81 | 125.06 | 0.43 | 3 | 0.75 | 0.20 | 0.66 | 0.55 |
| 71 | 63.4 | 0.86 | 123.22 | 0.34 | 4 | 0.88 | 0.12 | 0.69 | 0.55 |
| 72 | 63.3 | 0.86 | 124.44 | 0.40 | 4 | 0.88 | 0.11 | 0.71 | 0.56 |
| 73 | 56.1 | 0.74 | 123.70 | 0.37 | 0 | 0.38 | 0.11 | 0.49 | 0.40 |
| 74 | 45.4 | 0.55 | 121.05 | 0.24 | −2 | 0.13 | 0.12 | 0.31 | 0.26 |
| 75 | 70.6 | 0.98 | 128.29 | 0.58 | −2 | 0.13 | 0.85 | 0.56 | 0.63 |
| 76 | 48 | 0.60 | 121.28 | 0.25 | 5 | 1.00 | 0.03 | 0.62 | 0.47 |
| 77 | 64.9 | 0.89 | 131.07 | 0.71 | −2 | 0.13 | 0.86 | 0.57 | 0.65 |
| 78 | 37.7 | 0.42 | 117.28 | 0.07 | 0 | 0.38 | 0.04 | 0.29 | 0.23 |
| 79 | 60.2 | 0.81 | 131.03 | 0.71 | −3 | 0.00 | 0.88 | 0.50 | 0.60 |
| 80 | 50.7 | 0.64 | 131.99 | 0.75 | −1 | 0.25 | 0.67 | 0.55 | 0.58 |
| 81 | 49.1 | 0.62 | 129.87 | 0.65 | 3 | 0.75 | 0.12 | 0.67 | 0.53 |
| 82 | 35.9 | 0.39 | 130.87 | 0.70 | 1 | 0.50 | 0.12 | 0.53 | 0.43 |
| 83 | 33.1 | 0.34 | 128.76 | 0.60 | −2 | 0.13 | 0.13 | 0.36 | 0.30 |
| 84 | 22.4 | 0.16 | 125.97 | 0.47 | −3 | 0.00 | 0.11 | 0.21 | 0.19 |
| 85 | 51.4 | 0.66 | 123.61 | 0.36 | 0 | 0.38 | 0.06 | 0.46 | 0.36 |
| 86 | 49.6 | 0.63 | 134.30 | 0.86 | −3 | 0.00 | 0.83 | 0.49 | 0.58 |
| 87 | 52.3 | 0.67 | 123.02 | 0.34 | −1 | 0.25 | 0.05 | 0.42 | 0.33 |
| 88 | 58.9 | 0.78 | 130.43 | 0.68 | −3 | 0.00 | 0.95 | 0.49 | 0.60 |
| 89 | 63.2 | 0.86 | 135.34 | 0.91 | −3 | 0.00 | 0.91 | 0.59 | 0.67 |
| 90 | 42.7 | 0.51 | 134.79 | 0.88 | −3 | 0.00 | 0.68 | 0.46 | 0.52 |
| 91 | 36.3 | 0.40 | 133.06 | 0.80 | −2 | 0.13 | 0.22 | 0.44 | 0.39 |
| 92 | 27.5 | 0.25 | 132.48 | 0.78 | −1 | 0.25 | 0.15 | 0.42 | 0.36 |
| 93 | 27.5 | 0.25 | 131.29 | 0.72 | −3 | 0.00 | 0.13 | 0.32 | 0.27 |
| 94 | 17.3 | 0.08 | 127.64 | 0.55 | 0 | 0.38 | 0.12 | 0.33 | 0.28 |
| 95 | 41.2 | 0.48 | 124.28 | 0.39 | −1 | 0.25 | 0.07 | 0.38 | 0.30 |
| 96 | 55.7 | 0.73 | 135.35 | 0.91 | −3 | 0.00 | 0.92 | 0.55 | 0.64 |
| 97 | 43.1 | 0.51 | 124.36 | 0.40 | −2 | 0.13 | 0.01 | 0.35 | 0.26 |
| 98 | 46.7 | 0.58 | 133.88 | 0.84 | −3 | 0.00 | 0.66 | 0.47 | 0.52 |
| 99 | 31.3 | 0.31 | 135.83 | 0.93 | −3 | 0.00 | 0.68 | 0.41 | 0.48 |
| 100 | 32.8 | 0.34 | 131.26 | 0.72 | −3 | 0.00 | 0.24 | 0.35 | 0.33 |
| 101 | 21 | 0.14 | 132.82 | 0.79 | −2 | 0.13 | 0.13 | 0.35 | 0.30 |
| 102 | 22 | 0.16 | 131.42 | 0.73 | −2 | 0.13 | 0.15 | 0.34 | 0.29 |
| 103 | 16.2 | 0.06 | 128.09 | 0.57 | 0 | 0.38 | 0.15 | 0.33 | 0.29 |
| 104 | 61.2 | 0.82 | 124.46 | 0.40 | −2 | 0.13 | 0.05 | 0.45 | 0.35 |
| 105 | 53.9 | 0.70 | 125.29 | 0.44 | 0 | 0.38 | 0.04 | 0.50 | 0.39 |
| 106 | 30.4 | 0.30 | 131.10 | 0.71 | −3 | 0.00 | 0.94 | 0.34 | 0.49 |
| 107 | 37.7 | 0.42 | 123.44 | 0.35 | 0 | 0.38 | 0.00 | 0.38 | 0.29 |
| 108 | 37.2 | 0.41 | 127.12 | 0.53 | −3 | 0.00 | 0.10 | 0.31 | 0.26 |
| 109 | 30.4 | 0.30 | 131.85 | 0.75 | −3 | 0.00 | 0.93 | 0.35 | 0.49 |
| 110 | 19.9 | 0.12 | 133.65 | 0.83 | −3 | 0.00 | 0.95 | 0.32 | 0.48 |
| 111 | 16.3 | 0.06 | 133.21 | 0.81 | −3 | 0.00 | 0.22 | 0.29 | 0.27 |
| 112 | 18.9 | 0.10 | 132.98 | 0.80 | −3 | 0.00 | 0.85 | 0.30 | 0.44 |
| 113 | 15 | 0.04 | 132.16 | 0.76 | −2 | 0.13 | 0.19 | 0.31 | 0.28 |
| 114 | 15.6 | 0.05 | 130.64 | 0.69 | 0 | 0.38 | 0.07 | 0.37 | 0.30 |
| 115 | 44.3 | 0.54 | 127.52 | 0.54 | −3 | 0.00 | 0.10 | 0.36 | 0.29 |
| 116 | 51.3 | 0.65 | 129.55 | 0.64 | −2 | 0.13 | 0.95 | 0.47 | 0.59 |
| 117 | 32.3 | 0.33 | 122.46 | 0.31 | 4 | 0.88 | 0.95 | 0.51 | 0.62 |
| 118 | 43.1 | 0.51 | 125.99 | 0.47 | −2 | 0.13 | 0.93 | 0.37 | 0.51 |
| 119 | 30 | 0.29 | 134.25 | 0.86 | 4 | 0.88 | 0.96 | 0.67 | 0.74 |

From the data presented in Table 2 it can be seen that some of the three component blends have generally better properties than the other blends, such as higher gloss, contact angle, and greater pencil hardness.

Thermal data is summarized in Tables 3, 4, and 5 below for 1st Melt, Fusion and 2nd Melt (remelt) respectively.

TABLE 3

1st melt DSC data

| Run # | 1st melt_1 | 1st Melt_3 | 1st melt_4 | 1st melt_5 | 1st_melt_6 | # 1st melt | min first melt | DH first melt 1 | DH 1st Melt 3 | DH first Melt 4 | DH first Melt 5 | DH first Melt 6 | total 1st DH |
|---|---|---|---|---|---|---|---|---|---|---|---|---|---|
| 1 | | 313.4 | | | | 1.0 | 313.4 | | 6.9 | 1.3 | | | 8.2 |
| 2 | 260.5 | 315.1 | 322.1 | | | 3.0 | 260.5 | 2.3 | 34.0 | 1.5 | | | 37.8 |
| 3 | 259.5 | 313.2 | 320.7 | | | 3.0 | 259.5 | 3.5 | 31.6 | 1.4 | | | 36.5 |
| 4 | 260.3 | 312.6 | 321.0 | | | 3.0 | 260.3 | 12.4 | 25.2 | 4.2 | | | 41.8 |
| 5 | 259.2 | 312.6 | 321.5 | | | 3.0 | 259.2 | 8.8 | 22.4 | 1.0 | | | 32.2 |
| 6 | 260.1 | 311.6 | 320.8 | | | 3.0 | 260.1 | 13.9 | 11.0 | 0.8 | | | 25.6 |
| 7 | 259.8 | 311.2 | 321.2 | | | 3.0 | 259.8 | 18.7 | 7.0 | 0.6 | | | 26.3 |
| 8 | 257.4 | | | | | 1.0 | 257.4 | 18.2 | | | | | 18.2 |
| 9 | | 312.9 | 321.0 | | 326.4 | 3.0 | 312.9 | | 38.9 | 2.2 | | 6.4 | 47.6 |
| 10 | 258.9 | | | | 326.8 | 2.0 | 258.9 | 26.7 | | | | 8.1 | 34.9 |
| 11 | | 313.0 | 321.0 | | 326.6 | 3.0 | 313.0 | | 37.5 | 2.5 | | 13.2 | 53.2 |
| 12 | 259.2 | | | | 326.9 | 2.0 | 259.2 | 17.1 | | | | 12.5 | 29.6 |
| 13 | 257.9 | 313.1 | 320.5 | | 326.7 | 4.0 | 257.9 | 1.6 | 23.2 | 1.8 | | 12.6 | 39.2 |
| 14 | 260.8 | 313.6 | 321.7 | | 328.0 | 4.0 | 260.8 | 4.9 | 17.6 | 1.6 | | 11.7 | 35.8 |
| 15 | 260.8 | 313.3 | 322.0 | | 327.9 | 4.0 | 260.8 | 11.2 | 15.0 | 1.6 | | 11.6 | 39.3 |
| 16 | 259.2 | 311.6 | 320.9 | | 326.7 | 4.0 | 259.2 | 10.8 | 11.7 | 1.4 | | 11.4 | 35.2 |
| 17 | 259.5 | 311.4 | | | 326.7 | 3.0 | 259.5 | 20.4 | 6.4 | | | 12.6 | 39.5 |
| 18 | 259.0 | | | | 327.0 | 2.0 | 259.0 | 15.4 | | | | 16.6 | 32.0 |
| 19 | | 313.0 | 322.1 | | 326.7 | 3.0 | 313.0 | | 26.8 | 2.6 | | 19.3 | 48.7 |
| 20 | | 313.1 | 322.0 | | 327.0 | 3.0 | 313.1 | | 21.2 | 2.7 | | 25.2 | 49.1 |
| 21 | 260.2 | 313.1 | | | 327.0 | 3.0 | 260.2 | 2.2 | 19.1 | | | 27.2 | 48.4 |
| 22 | 259.4 | 313.9 | 321.6 | | 328.3 | 4.0 | 259.4 | 3.9 | 12.7 | 1.7 | | 23.9 | 42.2 |
| 23 | 261.2 | 313.7 | | | 328.4 | 3.0 | 261.2 | 6.7 | 11.3 | | | 24.9 | 42.9 |
| 24 | 261.1 | 313.7 | | | 328.5 | 3.0 | 261.1 | 4.4 | 7.2 | | | 24.6 | 36.1 |
| 25 | 258.9 | 312.0 | | | 327.5 | 3.0 | 258.9 | 8.4 | 3.6 | | | 25.5 | 37.6 |
| 26 | 259.2 | | | | 328.0 | 2.0 | 259.2 | 9.5 | | | | 25.2 | 34.7 |
| 27 | | 313.2 | 320.7 | | 327.1 | 3.0 | 313.2 | | 22.4 | 1.8 | | 28.7 | 52.9 |
| 28 | 260.0 | | | | 328.3 | 2.0 | 260.0 | 9.1 | | | | 29.9 | 39.0 |
| 29 | | 313.0 | | | 327.1 | 2.0 | 313.0 | | 19.6 | | | 35.0 | 54.5 |
| 30 | 260.4 | 313.3 | | | 327.4 | 3.0 | 260.4 | 2.4 | 17.9 | | | 32.7 | 53.1 |
| 31 | 258.5 | 314.2 | | | 328.7 | 3.0 | 258.5 | 3.0 | 10.4 | | | 31.5 | 44.9 |
| 32 | 261.0 | 313.9 | | | 328.4 | 3.0 | 261.0 | 2.7 | 9.4 | | | 31.3 | 43.5 |
| 33 | 261.1 | 313.7 | | | 328.4 | 3.0 | 261.1 | 4.4 | 7.5 | | | 30.9 | 42.9 |
| 34 | 260.2 | 312.7 | | | 327.8 | 3.0 | 260.2 | 7.5 | 4.5 | | | 30.2 | 42.3 |
| 35 | 258.9 | | | | 327.8 | 2.0 | 258.9 | 7.6 | | | | 31.5 | 39.1 |
| 36 | | 313.2 | | | 327.2 | 2.0 | 313.2 | | 17.0 | | | 36.8 | 53.8 |
| 37 | 255.4 | | | | 328.0 | 2.0 | 255.4 | 4.0 | | | | 40.6 | 44.6 |
| 38 | | 313.1 | | | 327.3 | 2.0 | 313.1 | | 16.6 | | | 39.8 | 56.4 |
| 39 | 260.3 | 313.1 | | | 327.2 | 3.0 | 260.3 | 2.1 | 15.4 | | | 39.9 | 57.4 |
| 40 | 259.4 | 314.4 | | | 328.8 | 3.0 | 259.4 | 1.6 | 8.5 | | | 35.9 | 46.0 |
| 41 | 259.1 | 314.2 | | | 328.7 | 3.0 | 259.1 | 1.6 | 8.0 | | | 36.9 | 46.6 |
| 42 | 261.2 | 314.1 | | | 328.9 | 3.0 | 261.2 | 1.8 | 5.7 | | | 37.1 | 44.6 |
| 43 | 259.7 | 321.7 | | | 327.6 | 3.0 | 259.7 | 5.3 | 4.8 | | | 36.7 | 46.8 |
| 44 | 258.4 | | | | 327.7 | 2.0 | 258.4 | 5.5 | | | | 40.0 | 45.5 |
| 45 | | 313.0 | | | 327.4 | 2.0 | 313.0 | | 10.2 | | | 45.5 | 55.7 |
| 46 | 259.1 | | | | 327.9 | 2.0 | 259.1 | 3.0 | | | | 55.7 | 58.7 |
| 47 | | 313.1 | | | 327.5 | 2.0 | 313.1 | | 8.5 | | | 48.8 | 57.3 |
| 48 | | 313.4 | | | 327.9 | 3.0 | 262.2 | 1.1 | 9.0 | | | 50.0 | 60.1 |
| 49 | 257.3 | 313.2 | | | 327.7 | 3.0 | 257.3 | 0.2 | 6.7 | | | 50.7 | 57.7 |
| 50 | | | | | 329.2 | 1.0 | 329.2 | | | | | 64.5 | 64.5 |
| 51 | 261.4 | 314.6 | | | 329.0 | 3.0 | 261.4 | 1.6 | 6.0 | | | 48.7 | 56.3 |
| 52 | 259.6 | 314.5 | | | 327.7 | 3.0 | 259.6 | 1.7 | | | | 64.1 | 65.8 |
| 53 | 258.6 | | | | 327.7 | 2.0 | 258.6 | 2.0 | | | | 53.5 | 55.4 |
| 54 | | 313.1 | | | 327.5 | 2.0 | 313.1 | | 5.8 | | | 58.8 | 64.6 |
| 55 | 258.7 | | | | 325.7 | 2.0 | 258.7 | 20.4 | | | | 9.7 | 30.1 |
| 56 | | | | | 327.6 | 1.0 | 327.6 | | | | | 64.2 | 64.2 |
| 57 | | 314.4 | 321.5 | | 326.5 | 3.0 | 314.4 | | 40.9 | 1.8 | | 0.1 | 42.7 |
| 58 | 258.4 | 313.9 | 321.6 | | 326.5 | 4.0 | 258.4 | 2.8 | 29.3 | 1.5 | | 0.1 | 33.7 |
| 59 | | 315.0 | 321.7 | | 326.7 | 3.0 | 315.0 | | 41.0 | 1.7 | | 0.1 | 42.8 |
| 60 | | 314.6 | 321.6 | | 326.6 | 3.0 | 314.6 | | 38.8 | 1.6 | | 0.1 | 40.5 |
| 61 | 258.6 | 314.4 | 321.8 | | 326.5 | 4.0 | 258.6 | 1.4 | 30.5 | 1.7 | | 1.1 | 34.7 |
| 62 | 260.0 | 315.2 | 327.3 | | 322.8 | 4.0 | 260.0 | 3.6 | 21.6 | 1.0 | | 1.1 | 27.3 |
| 63 | 260.3 | 314.8 | 322.5 | | 327.0 | 4.0 | 260.3 | 4.4 | 25.6 | 1.3 | | 1.1 | 32.5 |
| 64 | | 313.4 | | | 325.5 | 2.0 | 313.4 | | 36.5 | | | | 36.5 |
| 65 | 256.6 | | | | 324.7 | 2.0 | 256.6 | 19.6 | | | | 7.0 | 26.6 |
| 66 | | 314.7 | 321.9 | | 326.6 | 3.0 | 314.7 | | 33.3 | 1.9 | | 3.2 | 38.5 |
| 67 | 258.8 | 314.0 | 321.9 | | 326.5 | 4.0 | 258.8 | 1.5 | 29.4 | 1.6 | | 1.2 | 33.7 |
| 68 | | 313.7 | | | 325.6 | 2.0 | 313.7 | | 23.7 | | | | 23.7 |
| 69 | 256.6 | | | | 324.9 | 2.0 | 256.6 | 16.6 | | | | | 16.6 |
| 70 | 259.5 | 313.0 | 320.6 | | 325.7 | 4.0 | 259.5 | 9.6 | 29.4 | 2.6 | | 9.0 | 50.6 |
| 71 | 259.6 | 312.5 | 321.5 | | 325.9 | 4.0 | 259.6 | 4.3 | 19.3 | 2.5 | | 8.3 | 34.3 |
| 72 | 260.0 | 312.4 | 321.3 | | 326.0 | 4.0 | 260.0 | 9.0 | 16.8 | 2.3 | | 8.2 | 36.3 |
| 73 | 260.0 | 312.1 | | | 326.2 | 3.0 | 260.0 | 12.3 | 13.4 | | | 9.8 | 35.5 |
| 74 | 259.3 | 311.3 | | | 325.5 | 3.0 | 259.3 | 17.1 | 7.3 | | | 9.3 | 33.6 |

TABLE 3-continued

1st melt DSC data

| Run # | 1st melt_1 | 1st Melt_3 | 1st melt_4 | 1st melt_5 | 1st_melt_6 | # 1st melt | min first melt | DH first melt 1 | DH 1st Melt 3 | DH first Melt 4 | DH first Melt 5 | DH first Melt 6 | total 1st DH |
|---|---|---|---|---|---|---|---|---|---|---|---|---|---|
| 75 | | 313.5 | | | 325.3 | 2.0 | 313.5 | | 21.2 | | | | 21.2 |
| 76 | 256.4 | | | | 325.0 | 2.0 | 256.4 | 18.5 | | | | 14.2 | 32.7 |
| 77 | | 313.6 | | | 325.4 | 2.0 | 313.6 | | 16.0 | | | | 16.0 |
| 78 | 256.5 | | | | 325.2 | 2.0 | 256.5 | 15.3 | | | | 16.6 | 31.8 |
| 79 | | 313.4 | | | 325.2 | 2.0 | 313.4 | | 11.8 | | | | 11.8 |
| 80 | 259.7 | 313.0 | | | 325.7 | 3.0 | 259.7 | | | | | | 0.0 |
| 81 | 260.1 | 312.8 | | | 325.9 | 3.0 | 260.1 | 4.7 | 16.9 | | | 20.6 | 42.2 |
| 82 | 259.5 | 312.5 | | 324.3 | 325.7 | 4.0 | 259.5 | 5.0 | 14.1 | | 10.5 | 9.9 | 39.4 |
| 83 | 259.6 | 312.2 | | | 325.6 | 3.0 | 259.6 | 6.7 | 12.0 | | | 20.8 | 39.5 |
| 84 | 259.7 | 312.3 | | | 325.8 | 3.0 | 259.7 | 18.4 | 7.8 | | | 19.4 | 45.6 |
| 85 | 256.4 | | | | 325.3 | 2.0 | 256.4 | 11.7 | | | | 20.8 | 32.6 |
| 86 | | 313.3 | | | 325.4 | 2.0 | 313.3 | | 14.6 | | | | 14.6 |
| 87 | 256.5 | | | | 325.0 | 2.0 | 256.5 | 11.0 | | | | 29.7 | 40.7 |
| 88 | | | | | | 0.0 | | | | | | | 0.0 |
| 89 | | 313.6 | | | 325.5 | 2.0 | 313.6 | | 8.3 | | | | 8.3 |
| 90 | 260.5 | 313.0 | | | 325.7 | 3.0 | 260.5 | 5.7 | 20.3 | | | 33.4 | 59.3 |
| 91 | 259.8 | 312.9 | | | 325.8 | 3.0 | 259.8 | 2.4 | 15.0 | | | 26.7 | 44.0 |
| 92 | 260.1 | 312.8 | | | 325.9 | 3.0 | 260.1 | 3.7 | 12.5 | | | 26.3 | 42.5 |
| 93 | 259.7 | 312.5 | | | 325.6 | 3.0 | 259.7 | 4.9 | 11.3 | | | 26.2 | 42.5 |
| 94 | 259.8 | 312.4 | | | 325.7 | 3.0 | 259.8 | 9.7 | 7.1 | | | 25.8 | 42.6 |
| 95 | 257.1 | | | | 325.3 | 2.0 | 257.1 | 8.2 | | | | 28.8 | 36.9 |
| 96 | | 313.3 | | | 325.5 | 2.0 | 313.3 | | | | | | 0.0 |
| 97 | 256.7 | | | | 325.2 | 2.0 | 256.7 | 8.2 | | | | 36.5 | 44.8 |
| 98 | | 313.2 | | | 325.2 | 2.0 | 313.2 | | 7.7 | | | | 7.7 |
| 99 | 260.6 | 313.2 | | | 325.9 | 3.0 | 260.6 | 1.5 | 17.3 | | | 32.5 | 51.2 |
| 100 | 259.9 | 312.8 | | | 325.8 | 3.0 | 259.9 | 4.8 | 15.1 | | | 32.1 | 52.0 |
| 101 | 260.2 | 312.8 | | | 325.7 | 3.0 | 260.2 | 8.8 | 14.0 | | | 32.1 | 54.9 |
| 102 | 260.0 | 312.8 | | | 326.0 | 3.0 | 260.0 | 3.4 | 10.0 | | | 31.7 | 45.1 |
| 103 | 260.0 | 312.9 | | | 325.6 | 3.0 | 260.0 | 7.1 | 7.2 | | | 31.3 | 45.7 |
| 104 | 256.8 | | | | 325.3 | 2.0 | 256.8 | 7.4 | | | | 38.1 | 45.5 |
| 105 | 256.5 | | | | | 1.0 | 256.5 | 5.4 | | | | 42.4 | 47.9 |
| 106 | | 313.0 | | | 325.2 | 2.0 | 313.0 | | | | | | 0.0 |
| 107 | 256.2 | | | | 325.2 | 2.0 | 256.2 | 4.8 | | | | 46.7 | 51.5 |
| 108 | 258.5 | | | | 325.6 | 2.0 | 258.5 | 5.0 | | | | | 5.0 |
| 109 | | 313.0 | | | 326.9 | 2.0 | 313.0 | | | | | 58.6 | 58.6 |
| 110 | 260.3 | 312.7 | | | 325.6 | 3.0 | 260.3 | 2.3 | 13.9 | | | 45.9 | 62.1 |
| 111 | 260.3 | 312.7 | | | 325.7 | 3.0 | 260.3 | 2.2 | 11.6 | | | 45.7 | 59.5 |
| 112 | 260.6 | 313.0 | | | 326.0 | 3.0 | 260.6 | 1.5 | 10.5 | | | 44.5 | 56.5 |
| 113 | 260.4 | 313.3 | | | 326.0 | 3.0 | 260.4 | 4.2 | 9.7 | | | 44.4 | 58.3 |
| 114 | 260.1 | 313.5 | | | 325.6 | 3.0 | 260.1 | 2.1 | 7.5 | | | 43.5 | 53.2 |
| 115 | 258.4 | | | | | 1.0 | 258.4 | 4.1 | | | | | 4.1 |
| 116 | | | | | 325.4 | 1.0 | 325.4 | | | | | | 0.0 |
| 117 | 255.9 | | | | 325.4 | 2.0 | 255.9 | 0.6 | | | | 39.1 | 39.6 |
| 118 | 259.5 | | | | 326.0 | 2.0 | 259.5 | 0.8 | | | | | 0.8 |
| 119 | | | | | 325.5 | 1.0 | 325.5 | | | | | | 0.0 |

Table 3 shows the first melt temperature (° C.) and heat of melting (ΔH J/g) for the various blends of Table 1, It will be noticed that the various components exhibit their melt points in the blends at temperatures typical for their chemistry, i.e., FEP at ca. 255-260° C., PEA at ca. 312-314° C., and LPTFE at ca 324-328° C. Within Table 3, the numerical identifiers (i.e., the "1" in "Fusion_1" and "DH fusion 1") indicate the peak numbers in the DSC traces from the lowest to the highest melt temperatures

TABLE 4

Fusion peak DSC data

| Run # | Fusion_1 | Fusion_4 | Fusion_5 | Fusion_6 | Fusion_7 | #fusion | min fusion | DH fusion 1 | DH FUSION 4 | DH fusion 5 | DH fusion 6 | DH Fusion 7 | Total fusion DH |
|---|---|---|---|---|---|---|---|---|---|---|---|---|---|
| 1 | | 281.7 | | | | 1 | 281.7 | | 16.12 | | | | 16.12 |
| 2 | 231 | 283.4 | | | | 2 | 231 | 1.537 | 18.94 | | | | 20.48 |
| 3 | 233.4 | 284.1 | | | | 2 | 233.4 | 3.026 | 22.13 | | | | 25.16 |
| 4 | 231.4 | 285 | | | | 2 | 231.4 | 10.51 | 16.83 | | | | 27.34 |
| 5 | 232.3 | 286.7 | | | | 2 | 232.3 | 6.605 | 16.1 | | | | 22.71 |
| 6 | 233 | 283.6 | | | | 2 | 233 | 19.1 | 12.1 | | | | 31.2 |
| 7 | 235.5 | 279 | | | | 2 | 235.5 | 20.19 | 6.867 | | | | 27.06 |
| 8 | 234.3 | | | | | 1 | 234.3 | 13.92 | | | | | 13.92 |
| 9 | | 286.7 | | 293.7 | | 2 | 286.7 | | 8.938 | | 22.36 | | 31.3 |
| 10 | 237.7 | | | 300.6 | | 2 | 237.7 | 20.01 | | | 9.755 | | 29.77 |
| 11 | | 284.4 | | 297.7 | | 2 | 284.4 | | 8.676 | | 25.64 | | 34.32 |

TABLE 4-continued

Fusion peak DSC data

| Run # | Fusion_1 | Fusion_4 | Fusion_5 | Fusion_6 | Fusion_7 | #fusion | min fusion | DH fusion 1 | DH FUSION 4 | DH fusion 5 | DH fusion 6 | DH Fusion 7 | Total fusion DH |
|---|---|---|---|---|---|---|---|---|---|---|---|---|---|
| 12 | 238.2 | | | 306.2 | | 2 | 238.2 | 12.86 | | | 14.77 | | 27.63 |
| 13 | 239.7 | 284.2 | | 298.2 | | 3 | 239.7 | 3.942 | 9.426 | | 21.82 | | 35.19 |
| 14 | 233.9 | 286.2 | | 300.9 | | 3 | 233.9 | 10.92 | 7.631 | | 19.64 | | 38.19 |
| 15 | 233.9 | 285.5 | | 301.8 | | 3 | 233.9 | 7.382 | 5.185 | | 17.6 | | 30.17 |
| 16 | 233.7 | 283.6 | | 301 | | 3 | 233.7 | 7.695 | 3.693 | | 16.25 | | 27.64 |
| 17 | 235.3 | 285.6 | | 303.6 | | 3 | 235.3 | 7.859 | 1.289 | | 14.92 | | 24.07 |
| 18 | 237.9 | | | 307.4 | | 2 | 237.9 | 12.58 | | | 18.81 | | 31.39 |
| 19 | | 283.6 | | 301.2 | | 2 | 283.6 | | 8.186 | | 30.39 | | 38.58 |
| 20 | | 283.1 | | 304.1 | | 2 | 283.1 | | 9.222 | | 36.23 | | 45.45 |
| 21 | 246.7 | 283.7 | | 304.7 | | 3 | 246.7 | 1.934 | 9.391 | | 33.4 | | 44.73 |
| 22 | 235.7 | 285.6 | | 307.1 | | 3 | 235.7 | 7.637 | 6.515 | | 30.51 | | 44.66 |
| 23 | 234.9 | 285 | | 307.6 | | 3 | 234.9 | 2.764 | 4.128 | | 28.26 | | 35.15 |
| 24 | 234.5 | 284.4 | | 308.4 | | 3 | 234.5 | 5.112 | 3.981 | | 28.32 | | 37.41 |
| 25 | 236 | 283.5 | | 307.9 | | 3 | 236 | 12.4 | 3.276 | | 29.49 | | 45.17 |
| 26 | 238 | | | 309.9 | | 2 | 238 | 8.677 | | | 29.43 | | 38.11 |
| 27 | | 282.6 | | 305.1 | | 2 | 282.6 | | 7.125 | | 36.55 | | 43.68 |
| 28 | 237.5 | | | 310.3 | | 2 | 237.5 | 7.118 | | | 35.27 | | 42.39 |
| 29 | | 282.4 | | 306.4 | | 2 | 282.4 | | 14.07 | | 41.67 | | 55.74 |
| 30 | | 283.2 | | 306.9 | | 2 | 283.2 | | 8.007 | | 39.59 | | 47.6 |
| 31 | 238.7 | 284.3 | | 308.8 | | 3 | 238.7 | 6.876 | 7.623 | | 37.01 | | 51.51 |
| 32 | 236.1 | 284.7 | | 309.6 | | 3 | 236.1 | 1.474 | 3.467 | | 35.67 | | 40.61 |
| 33 | 234.7 | 283.9 | | 310 | 325.7 | 4 | 234.7 | 2.442 | 2.973 | | 35.19 | 30.93 | 71.54 |
| 34 | 235.2 | 285.1 | | 309.5 | | 3 | 235.2 | 5.714 | 2.41 | | 34.6 | | 42.72 |
| 35 | 235.9 | | | 310.6 | | 2 | 235.9 | 6.039 | | | 36.12 | | 42.16 |
| 36 | | 282 | | 307.4 | | 2 | 282 | | 10.9 | | 43.74 | | 54.64 |
| 37 | 236.2 | | | 311.6 | | 2 | 236.2 | 5.573 | | | 43.19 | | 48.76 |
| 38 | | 281.6 | | 308.3 | | 2 | 281.6 | | 8.623 | | 45.82 | | 54.44 |
| 39 | | 282.8 | | 308.9 | | 2 | 282.8 | | 3.904 | | 45.57 | | 49.47 |
| 40 | 240.6 | 283.6 | | 310.6 | | 3 | 240.6 | 1.943 | 4.715 | | 41.61 | | 48.27 |
| 41 | 235.8 | 283.6 | | 311.1 | | 3 | 235.8 | 2.745 | 4.224 | | 42.51 | | 49.48 |
| 42 | 235.2 | 284.5 | | 311.4 | | 3 | 235.2 | 1.539 | 2.847 | | 42.76 | | 47.15 |
| 43 | 235.4 | | | 310.5 | | 2 | 235.4 | 2.96 | | | 44.26 | | 47.22 |
| 44 | 236.6 | | | 311.7 | | 2 | 236.6 | 4.391 | | | 47.38 | | 51.77 |
| 45 | | 281.2 | | 310.3 | | 2 | 281.2 | | 3.323 | | 52.98 | | 56.3 |
| 46 | 235.9 | | | 312.5 | | 2 | 235.9 | 3.112 | | | 55.71 | | 58.82 |
| 47 | | 287.7 | | 311.9 | | 2 | 287.7 | | 4.553 | | 56.73 | | 61.28 |
| 48 | | 285.2 | | 312 | | 2 | 285.2 | | 1.055 | | 57.61 | | 58.67 |
| 49 | 241.9 | 283.3 | | 312.4 | | 3 | 241.9 | 0.503 | 3.249 | | 60.12 | | 63.87 |
| 50 | | | | 315.8 | | 1 | 315.8 | | | | 70.48 | | 70.48 |
| 51 | 229.9 | | | 313.9 | | 2 | 229.9 | 0.395 | | | 60.32 | | 60.71 |
| 52 | 234 | | | 312.5 | | 2 | 234 | | | | | | 0 |
| 53 | 233.8 | | | 313 | | 2 | 233.8 | 2.907 | | | 59.65 | | 62.56 |
| 54 | | | | 313.8 | | 1 | 313.8 | | | | 70.19 | | 70.19 |
| 55 | 237.6 | | | 296.9 | | 2 | 237.6 | 14.5 | | | 11.91 | | 26.41 |
| 56 | | | | 315.1 | | 1 | 315.1 | | | | 73.27 | | 73.27 |
| 57 | 248.3 | 285.3 | | | | 2 | 248.3 | 0.966 | 23.66 | | | | 24.63 |
| 58 | 231.7 | 19.64 | | | | 2 | 19.64 | 4.946 | 19.64 | | | | 24.59 |
| 59 | 249.4 | 285.2 | | | | 2 | 249.4 | 1.558 | 24.35 | | | | 25.91 |
| 60 | 249 | 286.2 | | | | 2 | 249 | 1.409 | 24.35 | | | | 25.76 |
| 61 | 233.1 | 285.1 | | | | 2 | 233.1 | 3.022 | 20.73 | | | | 23.75 |
| 62 | 231.3 | 283.5 | | | | 2 | 231.3 | 4.113 | 15.34 | | | | 19.45 |
| 63 | 232 | 284.1 | | | | 2 | 232 | 5.533 | 17.93 | | | | 23.46 |
| 64 | 251.1 | | | 292.5 | | 2 | 251.1 | | | | 32.84 | | 32.84 |
| 65 | 236.1 | | | 287 | | 2 | 236.1 | 9.077 | | | 6.75 | | 15.83 |
| 66 | 240.9 | 288.3 | | | | 2 | 240.9 | 0.729 | 24.55 | | | | 25.28 |
| 67 | 232.8 | 285 | | | | 2 | 232.8 | 4.236 | 21.44 | | | | 25.68 |
| 68 | 249.1 | | | 291.9 | | 2 | 249.1 | 0.491 | | | 28.58 | | 29.07 |
| 69 | 236.7 | | | 292.5 | | 2 | 236.7 | 9.148 | | | 8.945 | | 18.09 |
| 70 | 241.1 | 286.5 | | 294.1 | | 3 | 241.1 | 2.332 | 7.634 | | 14.09 | | 24.06 |
| 71 | 232.7 | 288.1 | | 296.6 | | 3 | 232.7 | 11.16 | 7.56 | | 18.94 | | 37.66 |
| 72 | 233.2 | 288.1 | | 297.1 | | 3 | 233.2 | 5.993 | 16.82 | | 5.347 | | 28.16 |
| 73 | 233.7 | | | 297.9 | | 2 | 233.7 | 6.124 | | | 18.78 | | 24.9 |
| 74 | 248.8 | | 288.7 | 301.5 | | 3 | 248.8 | 9.42 | | 2.715 | 11.95 | | 24.09 |
| 75 | 254.5 | | | 296.5 | | 2 | 254.5 | 8.373 | | | 32.49 | | 40.86 |
| 76 | 234.7 | | | 299.7 | | 2 | 234.7 | 12.19 | | | 16.59 | | 28.78 |
| 77 | 252.1 | | | 297.3 | | 2 | 252.1 | | | | 35 | | 35 |
| 78 | 233.7 | | | 303.4 | | 2 | 233.7 | 10.84 | | | 18.58 | | 29.42 |
| 79 | | 281.8 | | 300.2 | | 2 | 281.8 | | 0.761 | | 33.34 | | 34.1 |
| 80 | 245.2 | 284.9 | | 300.2 | | 3 | 245.2 | | | | 18.48 | | 18.48 |
| 81 | 233 | 286 | | 302.6 | | 3 | 233 | 4.751 | 8.479 | | 26.51 | | 39.74 |
| 82 | 232.8 | 285.9 | | 303.6 | | 3 | 232.8 | 5.552 | 25.58 | | 7.563 | | 38.7 |
| 83 | 233.5 | 285.3 | | 304.2 | 325.7 | 4 | 233.5 | 7.298 | 6.557 | | 25.14 | 30.93 | 69.93 |
| 84 | 233.9 | | 291 | 306 | 325.7 | 4 | 233.9 | 9.094 | | 3.04 | 22.41 | 30.93 | 65.47 |
| 85 | 233.5 | | | 306.2 | | 2 | 233.5 | 7.718 | | | 26.88 | | 34.6 |

TABLE 4-continued

Fusion peak DSC data

| Run # | Fusion_1 | Fusion_4 | Fusion_5 | Fusion_6 | Fusion_7 | #fusion | min fusion | DH fusion 1 | DH FUSION 4 | DH fusion 5 | DH fusion 6 | DH Fusion 7 | Total fusion DH |
|---|---|---|---|---|---|---|---|---|---|---|---|---|---|
| 86 |  | 281.2 |  | 301.9 |  | 2 | 281.2 |  | 1.202 |  | 36.03 |  | 37.23 |
| 87 | 236.7 |  |  | 307.6 |  | 2 | 236.7 | 4.827 |  |  | 30.5 |  | 35.33 |
| 88 |  | 281.6 |  | 302.7 |  | 2 | 281.6 |  |  |  |  |  | 0 |
| 89 |  | 281.6 |  | 302.7 |  | 2 | 281.6 |  | 1.01 |  | 36.84 |  | 37.85 |
| 90 |  | 285 |  | 304.7 |  | 2 | 285 |  | 10.78 |  | 40.27 |  | 51.05 |
| 91 | 234.6 | 286 |  | 304.5 |  | 3 | 234.6 | 4.71 | 9.45 |  | 32.82 |  | 46.98 |
| 92 | 233 | 285.8 |  | 305.2 |  | 3 | 233 | 5.721 | 31.87 |  | 8.326 |  | 45.92 |
| 93 | 233.6 | 285.6 |  | 305.9 |  | 3 | 233.6 | 4.633 | 6.257 |  | 31.61 |  | 42.5 |
| 94 | 259.8 |  |  | 312.4 | 325.7 | 3 | 259.8 | 6.177 |  |  | 4.744 | 30.93 | 41.85 |
| 95 | 232.9 |  |  | 307.6 | 325.7 | 3 | 232.9 | 6.001 |  |  | 33.15 | 30.93 | 70.08 |
| 96 |  |  |  | 304 |  | 1 | 304 |  |  |  | 47.41 |  | 47.41 |
| 97 | 233.8 |  |  | 308.2 |  | 2 | 233.8 | 3.902 |  |  | 38.78 |  | 42.68 |
| 98 |  | 284.3 |  | 304.4 |  | 2 | 284.3 |  |  |  | 50.38 |  | 50.38 |
| 99 |  | 284.9 |  | 304.7 |  | 2 | 284.9 |  | 7.247 |  | 39.78 |  | 47.03 |
| 100 | 239.6 | 286.3 |  | 306.3 |  | 3 | 239.6 | 3.047 | 9.435 |  | 39.72 |  | 52.2 |
| 101 | 235.5 |  | 292.3 | 306.7 |  | 3 | 235.5 | 1.561 |  | 38.19 | 7.819 |  | 47.57 |
| 102 | 233.6 |  | 291.1 | 307.4 |  | 3 | 233.6 | 5.371 |  | 6.899 | 38 |  | 50.27 |
| 103 | 235.5 |  |  | 308.2 |  | 2 | 235.5 | 4.801 |  |  | 40.45 |  | 45.25 |
| 104 | 229.5 |  |  | 307.7 |  | 2 | 229.5 | 5.141 |  |  | 37.2 |  | 42.34 |
| 105 | 232.3 |  |  | 307.9 |  | 2 | 232.3 | 2.522 |  |  | 41.81 |  | 44.33 |
| 106 |  |  |  | 306.3 |  | 1 | 306.3 |  |  |  | 56.82 |  | 56.82 |
| 107 | 229.4 |  |  | 308.4 | 325.7 | 3 | 229.4 | 2.492 |  |  | 44.91 | 30.93 | 78.33 |
| 108 | 233.4 |  |  | 308.8 |  | 2 | 233.4 | 3.599 |  |  | 52 |  | 55.6 |
| 109 |  |  |  | 308 |  | 1 | 308 |  |  |  | 57.31 |  | 57.31 |
| 110 |  | 285.8 |  | 307.9 |  | 2 | 285.8 |  | 7.217 |  | 55.6 |  | 62.82 |
| 111 | 246.5 | 288.2 |  | 309.4 |  | 3 | 246.5 | 2.446 | 8.696 |  | 57.5 |  | 68.64 |
| 112 | 238.3 |  |  | 309.6 |  | 2 | 238.3 | 0.557 |  |  | 58.42 |  | 58.98 |
| 113 | 236.2 |  |  | 309.6 |  | 2 | 236.2 | 1.549 |  |  | 59.04 |  | 60.59 |
| 114 | 222.8 |  |  | 311.9 |  | 2 | 222.8 | 2.217 |  |  | 55.21 |  | 57.43 |
| 115 | 233.1 |  |  | 309.4 | 325.7 | 3 | 233.1 | 2.106 |  |  | 54.17 | 30.93 | 87.21 |
| 116 |  |  |  | 308.8 |  | 1 | 308.8 |  |  |  | 58.19 |  | 58.19 |
| 117 | 225.8 |  |  | 309.9 |  | 2 | 225.8 | 0.53 |  |  | 50.65 |  | 51.18 |
| 118 |  |  |  | 310.7 |  | 1 | 310.7 |  |  |  | 64.22 |  | 64.22 |
| 119 |  |  |  | 311.2 |  | 1 | 311.2 |  |  |  | 64.61 |  | 64.61 |

TABLE 5

$2^{nd}$ melt DSC data

| Run # | 2nd melt_1 | 2nd melt_2 | 2nd melt_3 | 2nd melt_4 | 2nd Melt_6 | 2nd Melt_7 | #2nd melt | min 2nd melt | DH 2nd melt 1 | DH 2ND MELT 2 | DH 2ND MELT 3 | DH 2ND MELT 4 | DH 2nd Melt 6 | DH 2nd Melt 7 | Total 2nd DH |
|---|---|---|---|---|---|---|---|---|---|---|---|---|---|---|---|
| 1 |  |  |  |  | 305.1 |  | 1 | 305.1 |  |  |  | 13.82 |  |  | 13.82 |
| 2 |  |  |  |  | 310.4 |  | 1 | 310.4 |  |  |  | 25.90 |  |  | 25.90 |
| 3 | 273.2 |  |  |  | 309.1 |  | 2 | 273.2 | 6.40 |  |  | 21.17 |  |  | 27.57 |
| 4 | 253.7 |  |  |  | 309.2 |  | 2 | 253.7 | 10.75 |  |  | 15.85 |  |  | 26.60 |
| 5 | 252.9 |  |  |  | 309.4 |  | 2 | 252.9 | 7.02 |  |  | 15.23 |  |  | 22.25 |
| 6 | 254.7 |  |  |  | 309.0 |  | 2 | 254.7 | 3.99 |  |  | 9.59 |  |  | 13.58 |
| 7 | 254.8 |  |  |  | 307.9 |  | 2 | 254.8 | 8.40 |  |  | 4.34 |  |  | 12.74 |
| 8 | 257.5 |  |  |  |  |  | 1 | 257.5 | 14.18 |  |  |  |  |  | 14.18 |
| 9 |  | 298.7 |  |  |  | 314.6 | 2 | 298.7 |  |  | 17.89 |  |  | 20.46 | 38.35 |
| 10 | 256.2 |  |  |  | 322.1 | 327.4 | 3 | 256.2 | 17.09 |  |  |  | 5.21 | 3.66 | 25.96 |
| 11 |  | 297.7 |  |  |  | 318.0 | 2 | 297.7 |  |  | 14.97 |  |  | 24.26 | 39.23 |
| 12 | 256.4 |  |  |  | 324.2 | 327.6 | 3 | 256.4 | 12.12 |  |  |  | 7.50 | 5.61 | 25.23 |
| 13 |  |  | 299.7 |  |  | 319.2 | 2 | 299.7 |  |  |  | 11.67 |  | 21.12 | 32.79 |
| 14 | 255.3 |  | 300.7 |  |  | 321.3 | 3 | 255.3 | 2.53 |  |  | 6.72 |  | 17.87 | 27.12 |
| 15 | 255.4 |  | 301.1 |  |  | 322.0 | 3 | 255.4 | 5.37 |  |  | 6.12 |  | 16.97 | 28.46 |
| 16 | 252.9 |  | 300.7 |  |  | 321.0 | 3 | 252.9 | 4.91 |  |  | 2.22 |  | 15.26 | 22.38 |
| 17 | 255.3 |  | 298.2 |  |  | 323.4 | 3 | 255.3 | 24.86 |  |  | 2.35 |  | 14.72 | 41.93 |
| 18 | 255.1 |  |  |  |  | 328.0 | 2 | 255.1 | 10.49 |  |  |  |  | 17.28 | 27.77 |
| 19 |  | 298.4 |  |  |  | 320.8 | 2 | 298.4 |  |  | 9.31 |  |  | 29.42 | 38.73 |
| 20 |  | 297.6 |  |  |  | 323.0 | 2 | 297.6 |  |  | 13.95 |  |  | 35.74 | 49.69 |
| 21 |  |  | 299.3 |  |  | 323.9 | 2 | 299.3 |  |  |  | 12.37 |  | 32.63 | 45.00 |
| 22 | 260.0 |  | 300.8 |  |  | 326.0 | 3 | 260.0 | 2.19 |  |  | 9.64 |  | 30.79 | 42.63 |
| 23 | 255.6 |  | 301.1 |  |  | 326.6 | 3 | 255.6 | 4.61 |  |  | 5.90 |  | 28.35 | 38.86 |
| 24 | 256.7 |  | 301.1 |  |  | 326.6 | 3 | 256.7 | 3.45 |  |  | 3.61 |  | 27.53 | 34.59 |
| 25 | 254.8 |  |  |  |  | 325.8 | 2 | 254.8 | 5.78 |  |  |  |  | 29.57 | 35.35 |
| 26 | 256.1 |  |  |  |  | 328.8 | 2 | 256.1 | 6.51 |  |  |  |  | 28.08 | 34.59 |
| 27 |  | 297.6 |  |  |  | 323.9 | 2 | 297.6 |  |  | 8.64 |  |  | 37.24 | 45.88 |
| 28 | 254.1 |  |  |  |  | 328.7 | 2 | 254.1 | 8.67 |  |  |  |  | 32.10 | 40.77 |

TABLE 5-continued

2nd melt DSC data

| Run # | 2nd melt_1 | 2nd melt_2 | 2nd melt_3 | 2nd melt_4 | 2nd Melt_6 | 2nd Melt_7 | #2nd melt | min 2nd melt | DH 2nd melt 1 | DH 2ND MELT 2 | DH 2ND MELT 3 | DH 2ND MELT 4 | DH 2nd Melt 6 | DH 2nd Melt 7 | Total 2nd DH |
|---|---|---|---|---|---|---|---|---|---|---|---|---|---|---|---|
| 29 | | | 297.4 | | | 324.3 | 2 | 297.4 | | | 6.95 | | | 38.49 | 45.44 |
| 30 | | | | 299.2 | | 325.8 | 2 | 299.2 | | | | 8.96 | | 38.41 | 47.37 |
| 31 | 260.5 | | | 300.9 | | 327.4 | 3 | 260.5 | 1.83 | | | 8.49 | | 36.98 | 47.31 |
| 32 | 258.0 | | | 300.7 | | 327.2 | 3 | 258.0 | 1.85 | | | 4.50 | | 35.10 | 41.45 |
| 33 | 256.9 | | | 300.7 | | 327.9 | 3 | 256.9 | 2.52 | | | 3.11 | | 34.15 | 39.78 |
| 34 | 256.5 | | | | | 328.1 | 2 | 256.5 | 3.63 | | | | | 34.31 | 37.94 |
| 35 | 254.6 | | | | | 328.8 | 2 | 254.6 | 4.53 | | | | | 33.79 | 38.32 |
| 36 | | | 297.3 | | | 325.5 | 2 | 297.3 | | | 8.79 | | | 43.01 | 51.80 |
| 37 | 254.3 | | | | | 328.8 | 2 | 254.3 | 3.99 | | | | | 40.62 | 44.61 |
| 38 | | | 296.8 | | | 321.4 | 2 | 296.8 | | | 8.01 | | | 45.37 | 53.38 |
| 39 | | | | 298.7 | | 326.5 | 2 | 298.7 | | | | 5.25 | | 44.77 | 50.02 |
| 40 | | | | 300.8 | | 328.5 | 2 | 300.8 | | | | 7.34 | | 41.01 | 48.35 |
| 41 | 266.4 | | | 301.0 | | 328.8 | 3 | 266.4 | 2.16 | | | 5.48 | | 42.27 | 49.92 |
| 42 | 258.4 | | | 305.4 | | 329.7 | 3 | 258.4 | 1.43 | | | 2.91 | | 41.33 | 45.68 |
| 43 | 256.1 | | | | | 328.8 | 2 | 256.1 | 6.15 | | | | | 42.87 | 49.02 |
| 44 | 254.7 | | | | | 329.1 | 2 | 254.7 | 4.12 | | | | | 44.43 | 48.55 |
| 45 | | | 296.5 | | | 327.2 | 2 | 296.5 | | | 3.07 | | | 51.85 | 54.92 |
| 46 | 254.2 | | | | | 329.7 | 2 | 254.2 | 2.82 | | | | | 51.93 | 54.75 |
| 47 | | 277.1 | | | | 324.3 | 2 | 277.1 | | 2.81 | | | | 38.49 | 41.30 |
| 48 | | | | 300.7 | | 329.3 | 2 | 300.7 | | | | 4.49 | | 57.35 | 61.84 |
| 49 | | | | | | 329.4 | 1 | 329.4 | | | | | | 64.73 | 64.73 |
| 50 | | | | | | 331.5 | 1 | 331.5 | | | | | | 69.35 | 69.35 |
| 51 | 269.4 | | | | | 330.8 | 2 | 269.4 | 1.50 | | | | | 58.87 | 60.37 |
| 52 | 255.4 | | | | | 329.3 | 2 | 255.4 | 6.87 | | | | | 56.75 | 63.62 |
| 53 | 251.9 | | | | | 329.7 | 2 | 251.9 | 3.47 | | | | | 58.34 | 61.81 |
| 54 | | | | | | 329.4 | 1 | 329.4 | | | | | | 68.34 | 68.34 |
| 55 | 254.3 | | | | 320.9 | 325.5 | 3 | 254.3 | 13.97 | | | | 4.10 | 6.29 | 24.35 |
| 56 | | | | | | 329.9 | 1 | 329.9 | | | | | | 70.83 | 70.83 |
| 57 | | | | 310.3 | | | 1 | 310.3 | | | | 27.05 | | | 27.05 |
| 58 | | 273.5 | | 309.7 | | | 2 | 273.5 | | 3.43 | | 20.75 | | | 24.18 |
| 59 | | | | 310.7 | | | 1 | 310.7 | | | | 29.65 | | | 29.65 |
| 60 | | | | 310.6 | | | 1 | 310.6 | | | | 27.71 | | | 27.71 |
| 61 | | 271.2 | | 311.5 | | | 2 | 271.2 | | 2.56 | | 23.23 | | | 25.79 |
| 62 | | 272.3 | | 312.2 | | | 2 | 272.3 | | 4.77 | | 19.60 | | | 24.37 |
| 63 | | 274.8 | | 311.8 | | | 2 | 274.8 | | 4.02 | | 19.52 | | | 23.54 |
| 64 | | | 294.3 | | | 314.2 | 2 | 294.3 | | | | | | 32.58 | 32.58 |
| 65 | 248.4 | | | | | 324.1 | 2 | 248.4 | 14.65 | | | | | 6.54 | 21.19 |
| 66 | | | | 313.9 | | | 1 | 313.9 | | | | 32.37 | | | 32.37 |
| 67 | | 271.2 | | 311.3 | | | 2 | 271.2 | | 2.07 | | 22.46 | | | 24.53 |
| 68 | | | | | | 315.8 | 1 | 315.8 | | | | | | 20.92 | 20.92 |
| 69 | 251.4 | | | | | 325.1 | 2 | 251.4 | 9.67 | | | | | 2.12 | 11.79 |
| 70 | 262.2 | | | 302.5 | 317.1 | | 3 | 262.2 | 6.96 | | | 12.32 | 30.24 | | 49.52 |
| 71 | 254.9 | | | 304.9 | | 318.7 | 3 | 254.9 | 3.03 | | | 7.44 | | 17.85 | 28.32 |
| 72 | 254.0 | | | 304.9 | | 319.2 | 3 | 254.0 | 7.73 | | | 6.12 | | 16.75 | 30.60 |
| 73 | 254.6 | | | 305.5 | | 320.1 | 3 | 254.6 | 10.71 | | | 4.47 | | 14.58 | 29.76 |
| 74 | 254.8 | | | | | 327.8 | 2 | 254.8 | 11.57 | | | | | 64.65 | 76.22 |
| 75 | | | | | | 318.3 | 1 | 318.3 | | | | | | 28.74 | 28.74 |
| 76 | 247.6 | | | | | 322.3 | 2 | 247.6 | 10.68 | | | | | 14.84 | 25.52 |
| 77 | | | | | | 319.7 | 1 | 319.7 | | | | | | 25.07 | 25.07 |
| 78 | 248.0 | | | | | 324.3 | 2 | 248.0 | 9.42 | | | | | 17.34 | 26.76 |
| 79 | | | | | | 321.2 | 1 | 321.2 | | | | | | 30.43 | 30.43 |
| 80 | | | | 303.2 | 321.9 | | 2 | 303.2 | | | | 14.80 | 43.45 | | 58.25 |
| 81 | 254.9 | | | 303.4 | | 323.1 | 3 | 254.9 | 4.68 | | | 10.15 | | 26.31 | 41.14 |
| 82 | 254.7 | | | 303.7 | | 323.2 | 3 | 254.7 | 3.66 | | | 7.48 | | 25.22 | 36.36 |
| 83 | 255.8 | | | 309.3 | | 323.9 | 3 | 255.8 | 3.25 | | | 5.32 | | 24.61 | 33.18 |
| 84 | 254.6 | | | 309.8 | | 325.3 | 3 | 254.6 | 15.81 | | | 4.13 | | 33.58 | 53.52 |
| 85 | 250.0 | | | | | 325.1 | 2 | 250.0 | 6.26 | | | | | 22.19 | 28.45 |
| 86 | | | | | | 316.5 | 1 | 316.5 | | | | | | 34.27 | 34.27 |
| 87 | 249.2 | | | | | 325.5 | 2 | 249.2 | 6.33 | | | | | 30.14 | 36.47 |
| 88 | | | | | | 326.9 | 1 | 326.9 | | | | | | 42.13 | 42.13 |
| 89 | | | | | | 323.3 | 1 | 323.3 | | | | | | 34.98 | 34.98 |
| 90 | | | | 303.5 | | 325.1 | 2 | 303.5 | | | | 9.60 | | 39.89 | 49.49 |
| 91 | 263.4 | | | 304.0 | | 324.3 | 3 | 263.4 | 1.46 | | | 9.18 | | 32.87 | 43.51 |
| 92 | 257.8 | | | 305.8 | | 324.6 | 3 | 257.8 | 1.43 | | | 6.26 | | 31.63 | 39.32 |
| 93 | 256.0 | | | 307.2 | | 324.8 | 3 | 256.0 | 2.40 | | | 4.65 | | 31.35 | 38.40 |
| 94 | 255.2 | | | | | 320.1 | 2 | 255.2 | 7.35 | | | | | 14.58 | 21.93 |
| 95 | 251.0 | | | | | 325.7 | 2 | 251.0 | 5.47 | | | | | 27.54 | 33.01 |
| 96 | | | | | | 324.5 | 1 | 324.5 | | | | | | 40.07 | 40.07 |
| 97 | 245.3 | | | | | 325.7 | 2 | 245.3 | 6.71 | | | | | 37.66 | 44.37 |
| 98 | | | | 302.1 | | 325.1 | 2 | 302.1 | | | | | | 52.52 | 52.52 |
| 99 | | | | 303.5 | | 325.1 | 2 | 303.5 | | | | 14.80 | | 39.87 | 54.67 |
| 100 | 265.7 | | | 307.6 | | 325.4 | 3 | 265.7 | 5.13 | | | 9.10 | | 38.73 | 52.97 |
| 101 | 255.9 | | | 305.1 | | 325.5 | 3 | 255.9 | 5.49 | | | 6.11 | | 39.05 | 50.65 |
| 102 | 258.0 | | | 306.3 | | 325.8 | 3 | 258.0 | 1.06 | | | 3.83 | | 37.65 | 42.54 |

TABLE 5-continued

2nd melt DSC data

| Run # | 2nd melt_1 | 2nd melt_2 | 2nd melt_3 | 2nd melt_4 | 2nd Melt_6 | 2nd Melt_7 | #2nd melt | min 2nd melt | DH 2nd melt 1 | DH 2ND MELT 2 | DH 2ND MELT 3 | DH 2ND MELT 4 | DH 2ND Melt 6 | DH 2nd Melt 7 | Total 2nd DH |
|---|---|---|---|---|---|---|---|---|---|---|---|---|---|---|---|
| 103 | 257.7 | | | | | 320.1 | 2 | 257.7 | 2.78 | | | | | 14.58 | 17.36 |
| 104 | 248.8 | | | | | 325.8 | 2 | 248.8 | 4.74 | | | | | 40.73 | 45.47 |
| 105 | 248.3 | | | | | 326.4 | 2 | 248.3 | 3.66 | | | | | 42.24 | 45.90 |
| 106 | | | | | | 326.4 | 1 | 326.4 | | | | | | 58.08 | 58.08 |
| 107 | 244.7 | | | | | 325.8 | 2 | 244.7 | 2.61 | | | | | 44.98 | 47.59 |
| 108 | 253.1 | | | | | 326.1 | 2 | 253.1 | 2.88 | | | | | 49.50 | 52.38 |
| 109 | | | | | | 325.1 | 1 | 325.1 | | | | | | 63.49 | 63.49 |
| 110 | | | | | | 327.3 | 1 | 327.3 | | | | | | 58.55 | 58.55 |
| 111 | 263.8 | | | | 317.6 | 326.7 | 3 | 263.8 | 1.86 | | | | 15.37 | 46.36 | 63.59 |
| 112 | | | | | 318.8 | 327.2 | 2 | 318.8 | | | | | 11.29 | 43.07 | 54.36 |
| 113 | 261.3 | | | | 319.2 | 327.4 | 3 | 261.3 | 1.61 | | | | 13.51 | 42.64 | 57.76 |
| 114 | 250.7 | | | | 318.1 | 320.1 | 3 | 250.7 | 2.01 | | | | 10.54 | 14.58 | 27.13 |
| 115 | 253.0 | | | | | 326.5 | 2 | 253.0 | 2.06 | | | | | 52.51 | 54.57 |
| 116 | | | | | | 327.1 | 1 | 327.1 | | | | | | 53.41 | 53.41 |
| 117 | | | | | | 326.9 | 1 | 326.9 | | | | | | 40.61 | 40.61 |
| 118 | | | | | | 325.7 | 1 | 325.7 | | | | | | 37.66 | 37.66 |
| 119 | | | | | | 327.8 | 1 | 327.8 | | | | | | 64.65 | 64.65 |

Within Tables 4 and 5, the numerical identifiers (i.e., the "1" in "2nd melt_1"and "DH 2nd melt1") indicate the peak numbers in the DSC traces from the lowest to the highest melt temperatures. The data in Tables 4 and. 5 reveal that in the case of many of the 3-component blends, after first melting many of the components virtually lose their thermal signature and, in particular, the low melt points associated with FEP are virtually lost for many of the blends shown. This behavior is mirrored for the remelt peaks shown in Table 5 where several blends lose their FEP signature, for example, Runs 49-50.

It is thought that the thermal data exhibited by the blends is indicative of extensive and intimate mixing of the various components leading to the formation of a type of fluoropolymer alloy. These formulations are also associated with an unparalleled combination of gloss, water contact angle, and hardness, which is illustrated by the normalized data of Table 2.

In this connection, the data of Table 2 above show that many of the blends are generally associated with the higher values of the composite variables including Norm (CA, Gloss, Hard) and Norm (Remelt, CA, Gloss, Hard). In particular Run 21 has an excellent combination of properties with increased hardness yet no perceptible FEP signature and hence a high remelt temperature. These formulations will imbue coating systems employing them with desirable properties based on these characteristics, as demonstrated by other Examples herein.

Figure 19:
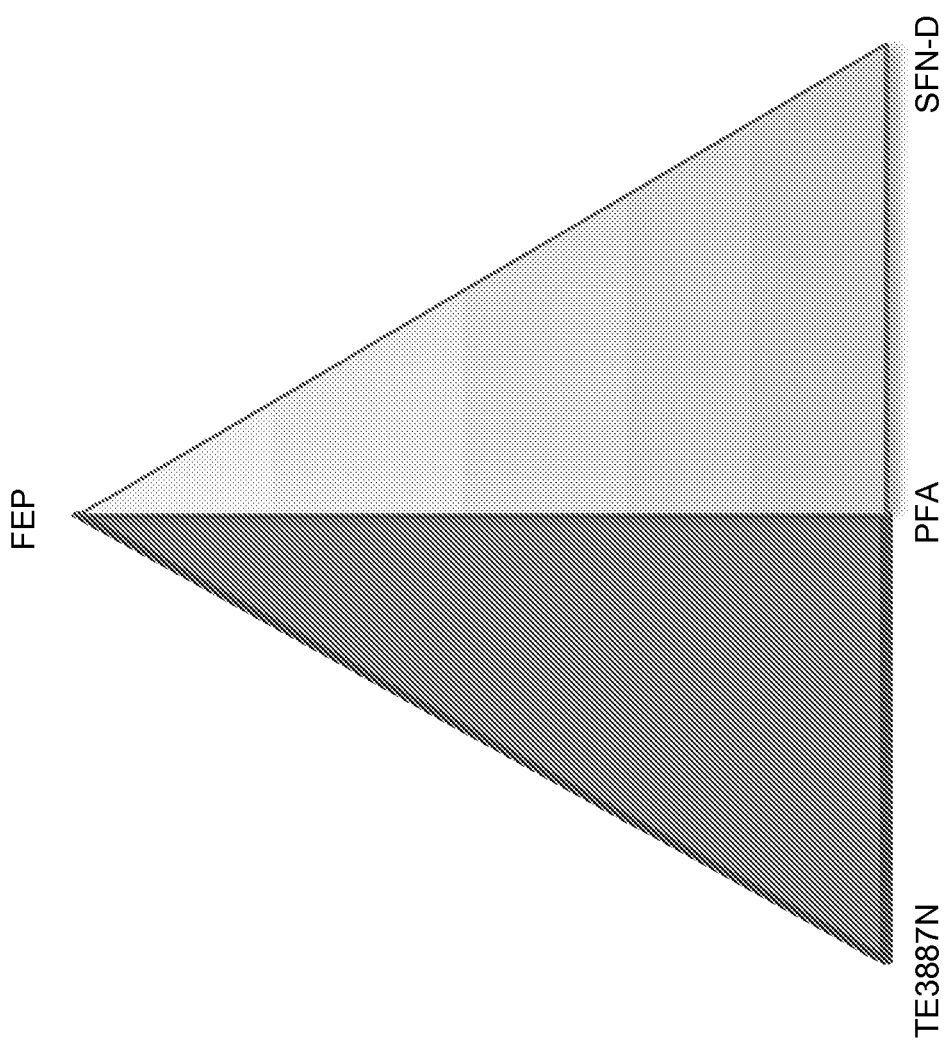

The data are also summarized in FIGS. 19-30. FIG. 19 illustrates the construction of FIGS. 20-30, they are essentially two ternary mixture plots conjoined along the PFA:FEP axis (Y-axis). The origin represents 100% PFA (TE7224) negative values on the X-axis represent increasing weight fractions of TE3887N (LPTFE) whereas positive values on the X-axis represent increasing weight fractions of SFN-D (LPTFE). 100% FEP represented by the coordinate (0, 1) is 100% TE9568. As might be anticipated FIGS. 20-30 often show symmetry about the Y-axis but this is not absolute, reflecting the effect of different ITTFEs on the precise compositions for desirable properties. The findings of FIGS. 20-30 are now discussed in more detail.

Figure 20:
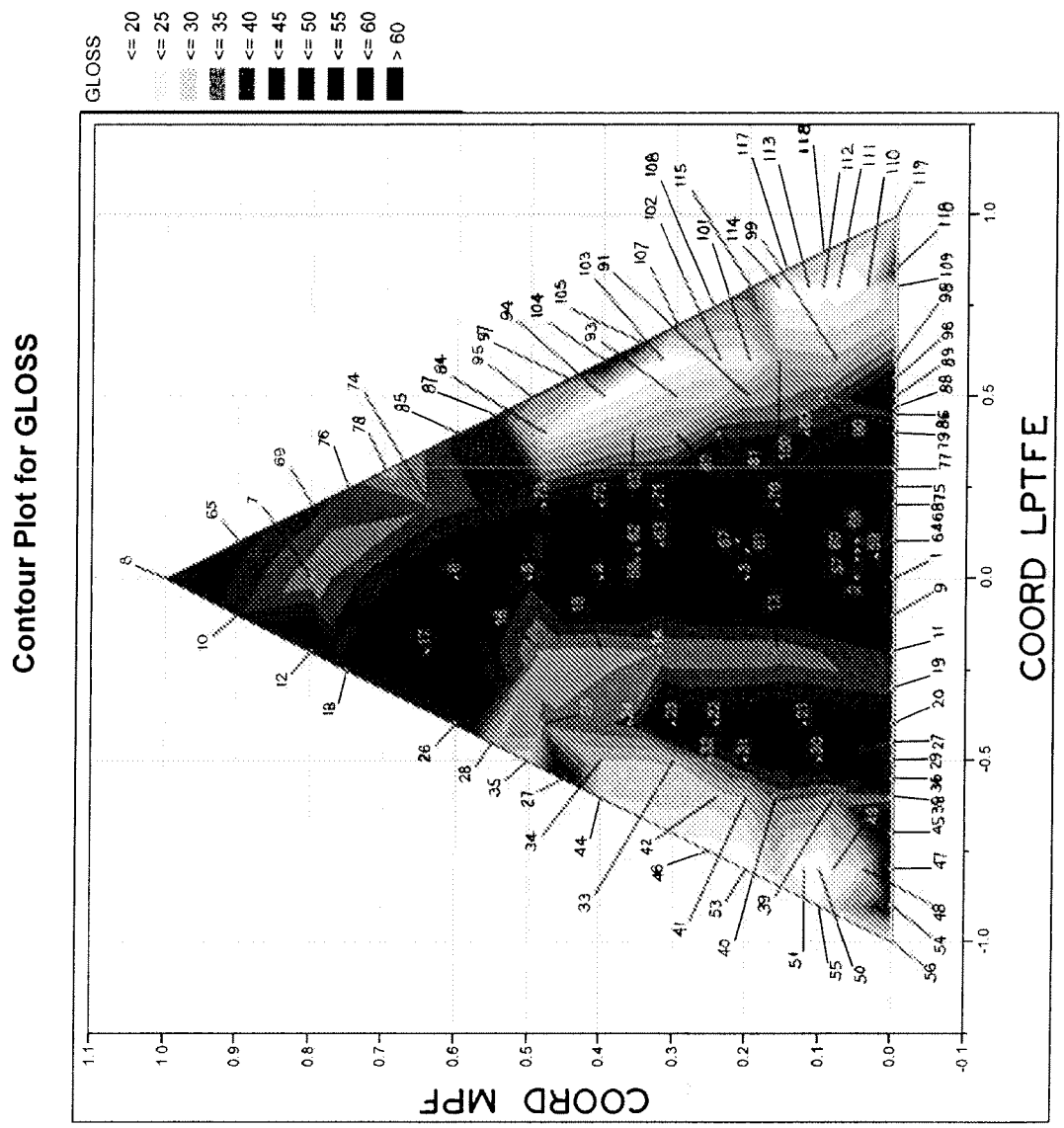

FIG. 20 shows coating gloss as a function of composition, there are 3 main regions of composition for enhanced gloss: A) 50-85% FEP, 1-40% LPTFE and 15-50% PEA; B) 5-40% FEP, 30-55% LPTFE and 40-95% PFA; and C) 5-40% FEP, 1-40% LPTFE and 1-40% PFA.

Figure 21:
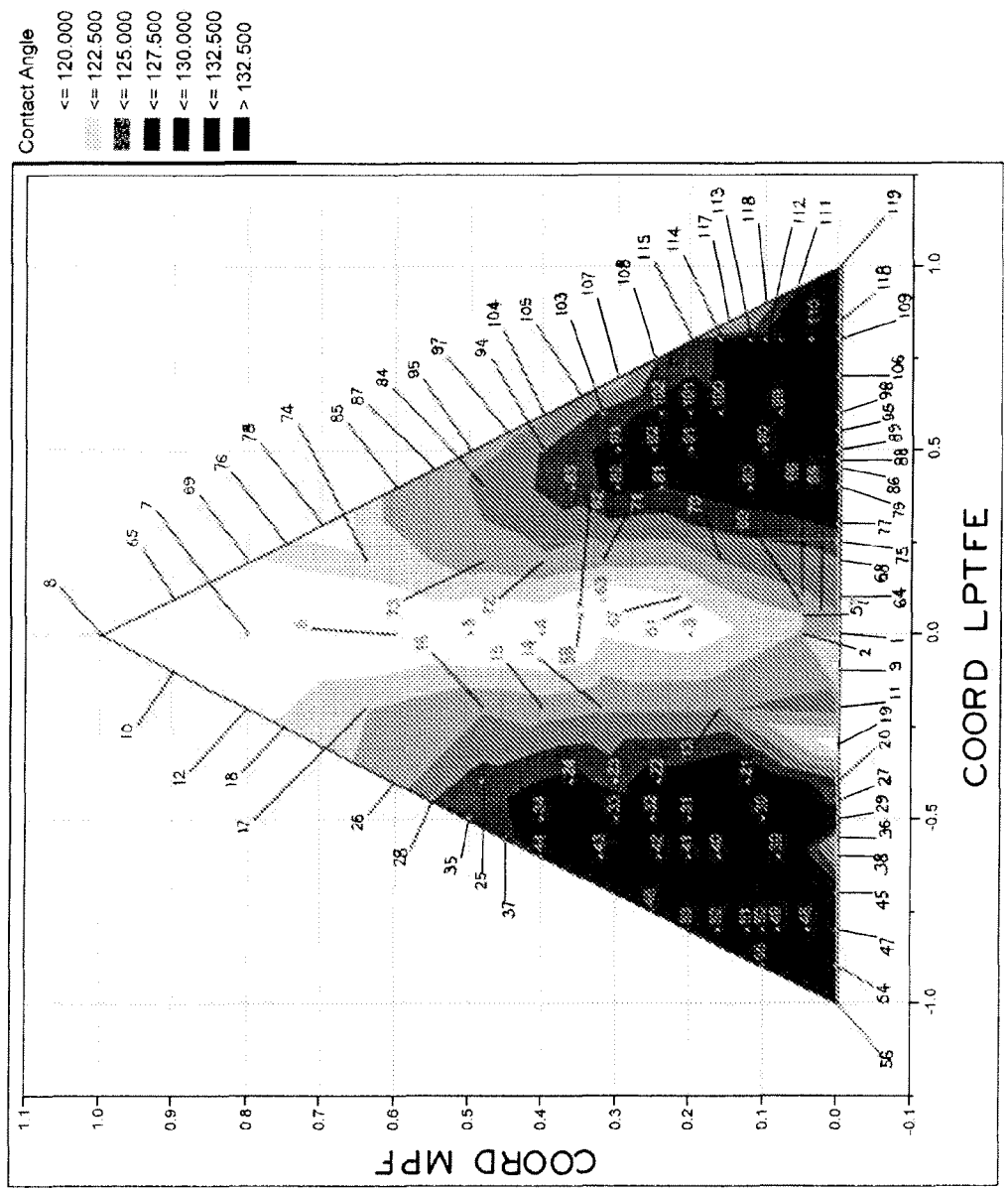

FIG. 21 shows coating contact angle with water as a function of composition. The main region of composition for enhanced contact angle is 1-40% FEP, 30-100% LPTFE and 0-60% PEA.

Figure 22:
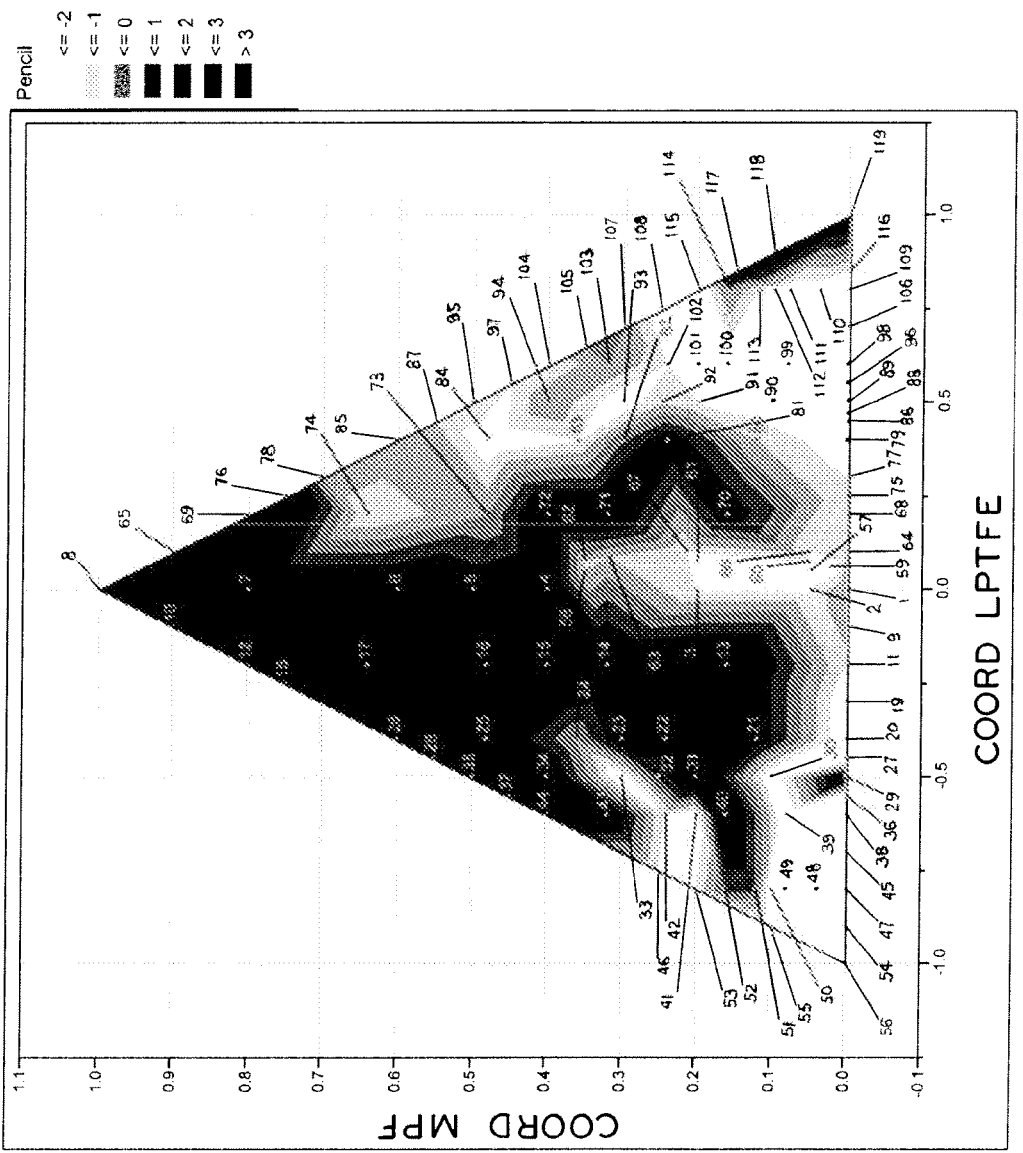

FIG. 22 shows coating pencil hardness as a function of composition. The main region of composition for enhanced pencil hardness is 10-90% FEP, 1-80% LPTFE and 1-50% PEA.

Figure 23:
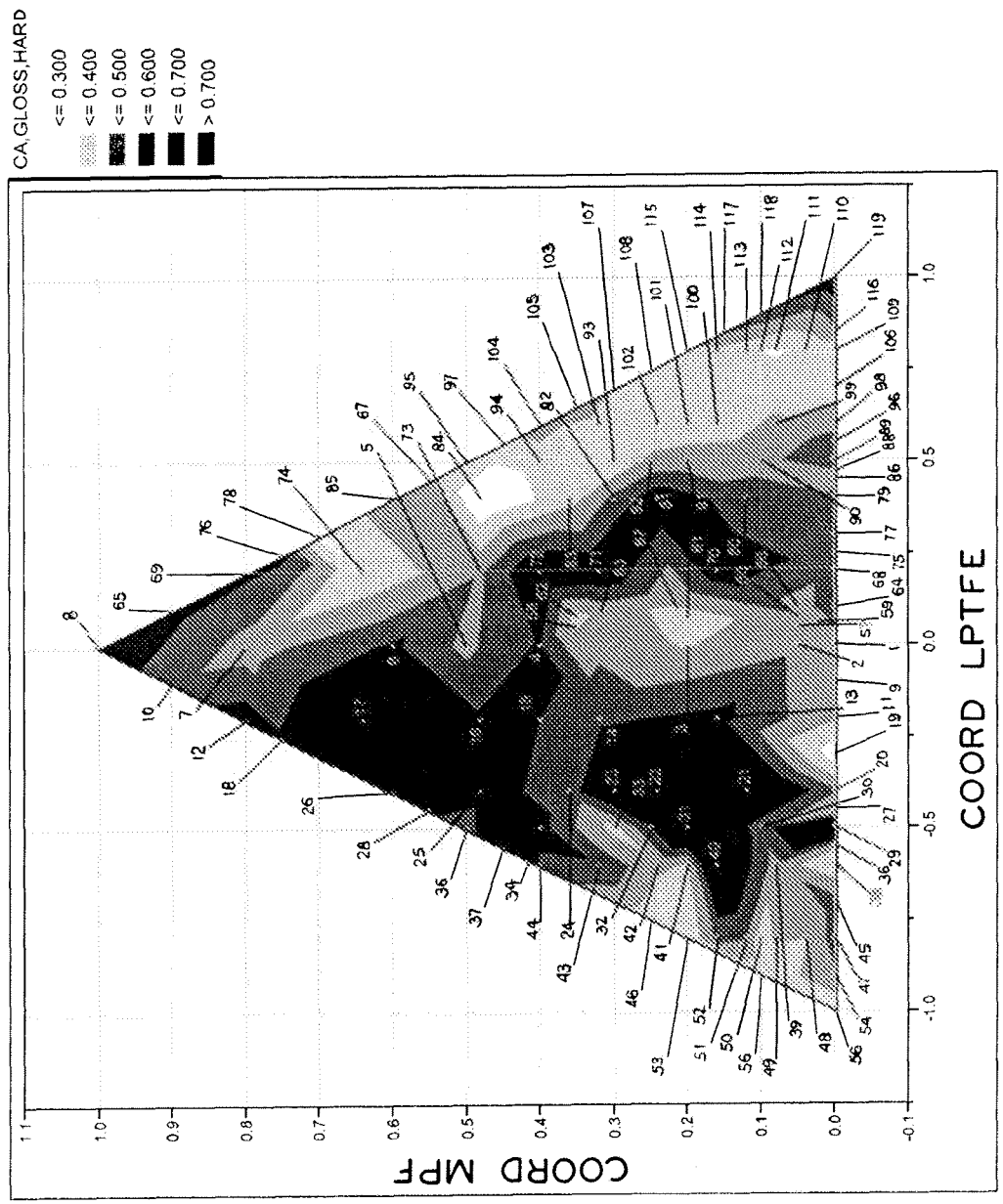
Figure 24:
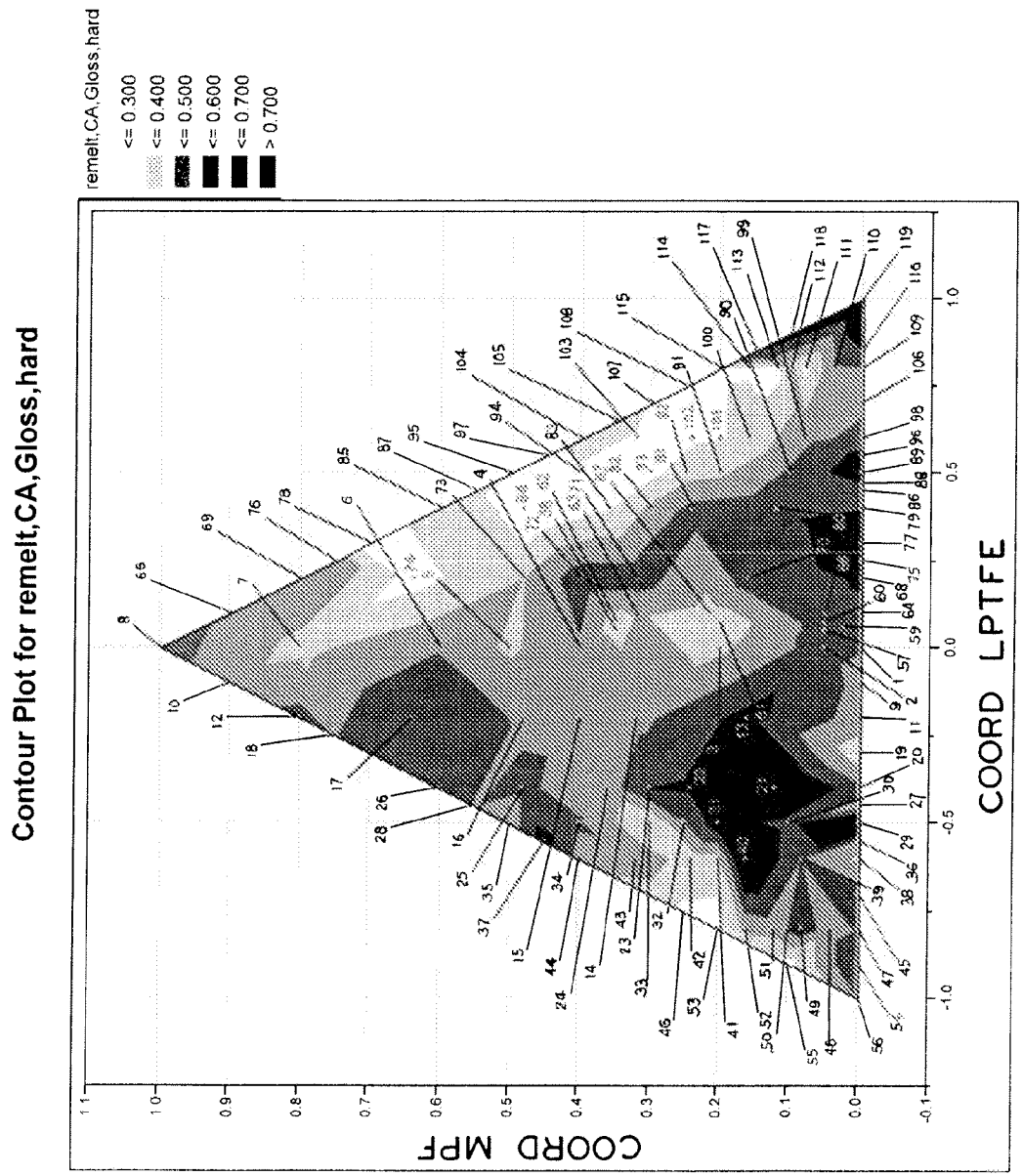

FIG. 23 and FIG. 24 are the normalized plot for the mean of contact angle, gloss pencil hardness and minimum remelt temperature they are calculated as follows:

GLOSS=measured gloss,
NORM GLOSS=normalized gloss, calculated as: [Gloss–Minimum (Gloss)]/[Maximum (Gloss)–Minimum (Gloss)];
CONTACT ANGLE (CA)=contact angle in water
NORM CA=normalized contact angle, calculated as: [Contact Angle–Minimum (Contact Angle)]/[Maximum (Contact Angle)–Minimum (Contact Angle)];
PENCIL=pencil test measurement, per Section VII
NORM PENCIL=normalized pencil test measurement, calculated as: [PENCIL–Minimum (PENCIL)]/[Maximum (PENCIL)–Minimum (PENCIL)];
NORM min remelt=normalized "min remelt", calculated as: [min remelt–Minimum (min remelt)]/[Maximum (min remelt)–Minimum (min remelt)], wherein "min remelt" is the temperature of the lowest remelt peak for a given sample;
Norm (CA, Gloss, Hard)=the mean of (NORM CA, NORM PENCIL, and NORM GLOSS); and
Norm (Remelt, CA, Gloss, Hard)=the mean of (NORM CA, NORM PENCIL, NORM GLOSS, and NORM min remelt).

FIG. 23 shows desirable regions of higher normalized (CA, Gloss, Hardness) in 3 regions of composition: A) 10-40% LPTFE, 50-70% FEP and 30-50% PFA; B) 5-40% LPTFE, 20-40% FEP and 60-85% PFA; C) 20-80% LPTFE, 5-35% FEP and 60-95% HA. FIG. 24 shows desirable regions of higher normalized (CA, Gloss, Hardness, Minimum Remelt temperature) at 0-80% LPTFE, 5-30% FEP and 70-95% PFA.

Figure 25A:
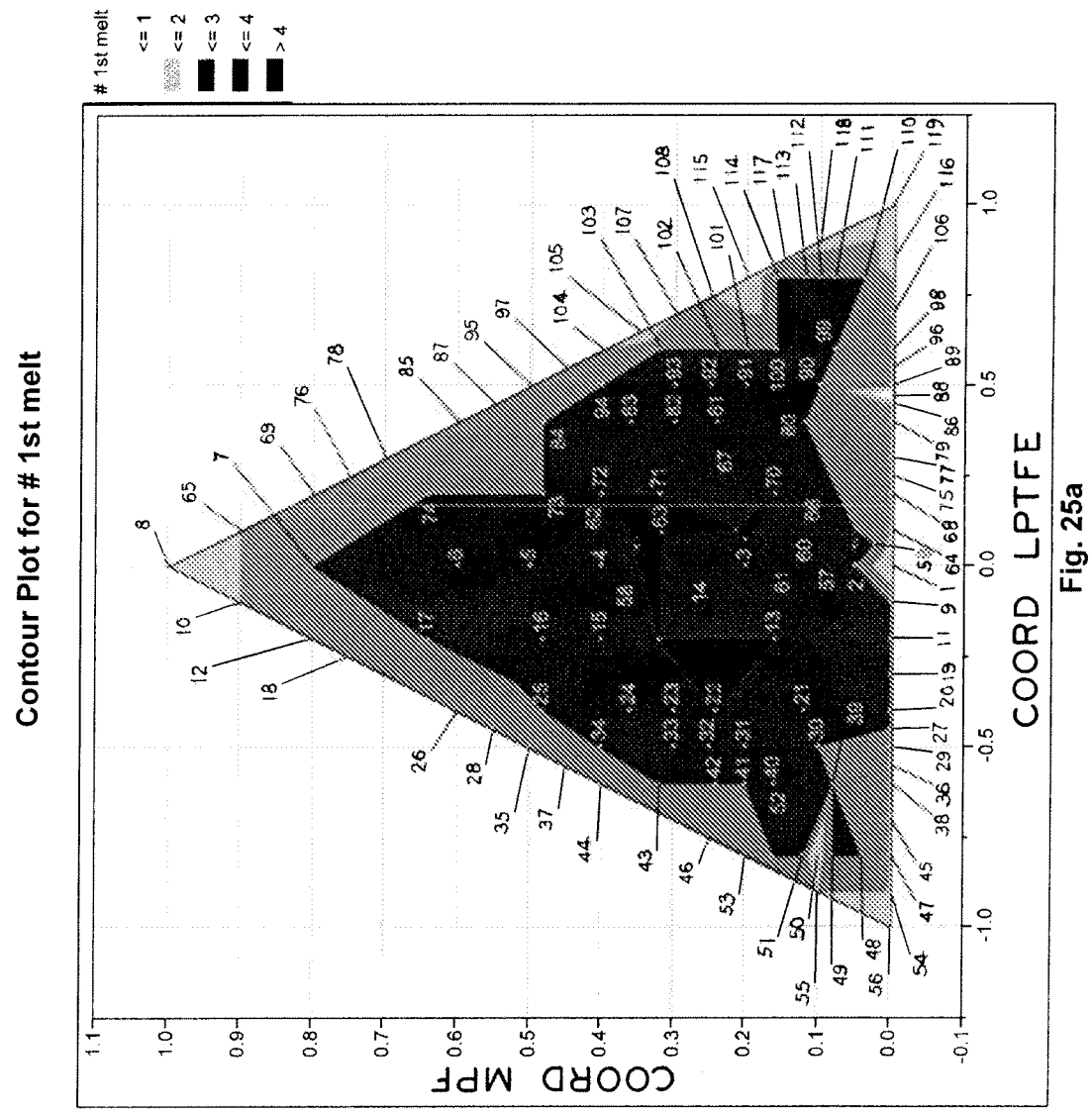
FIG. 25a is a contour plots showing the number of DSC peaks observed during first melt.
Figure 25B:
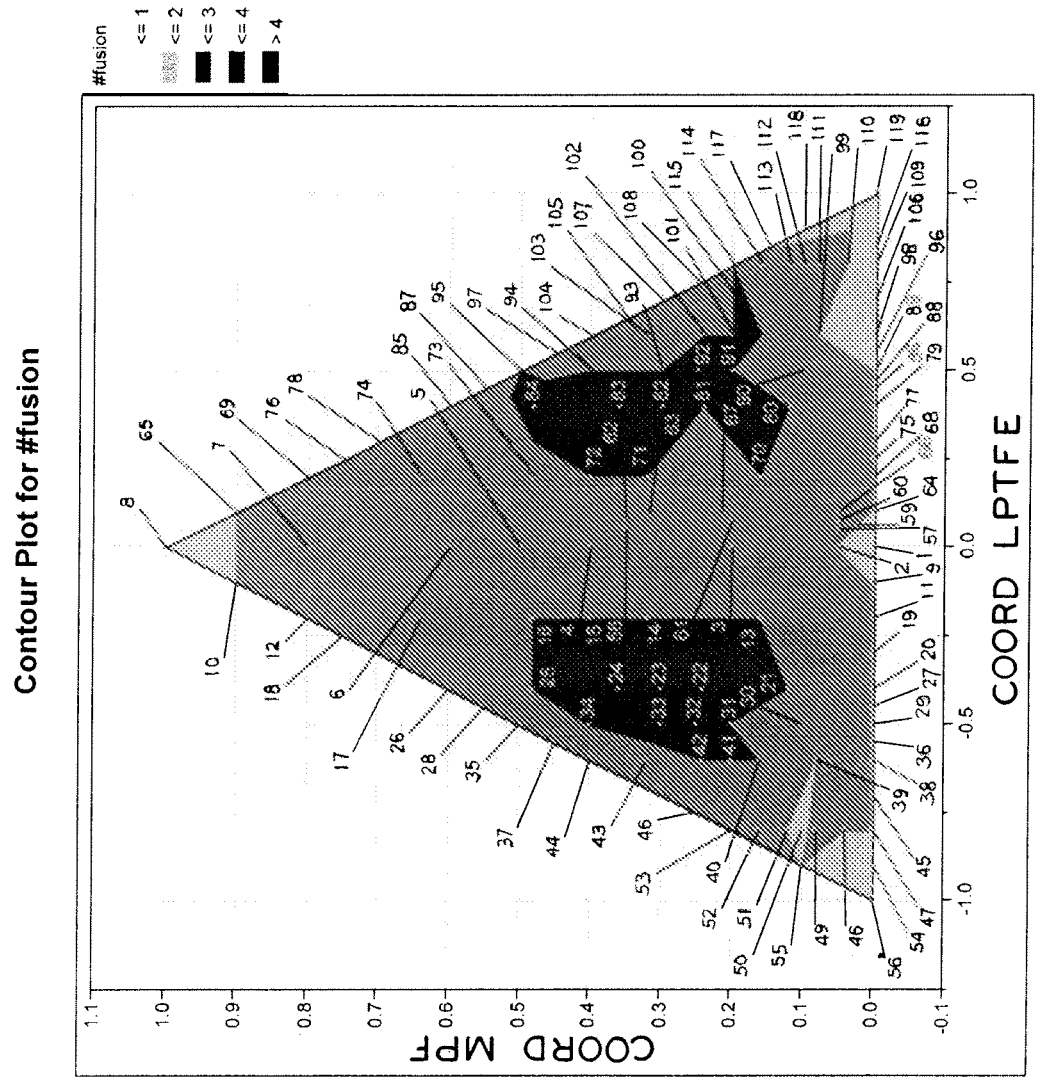
FIG. 25b is a contour plots showing the number of DSC peaks observed during fusion.
Figure 25C:
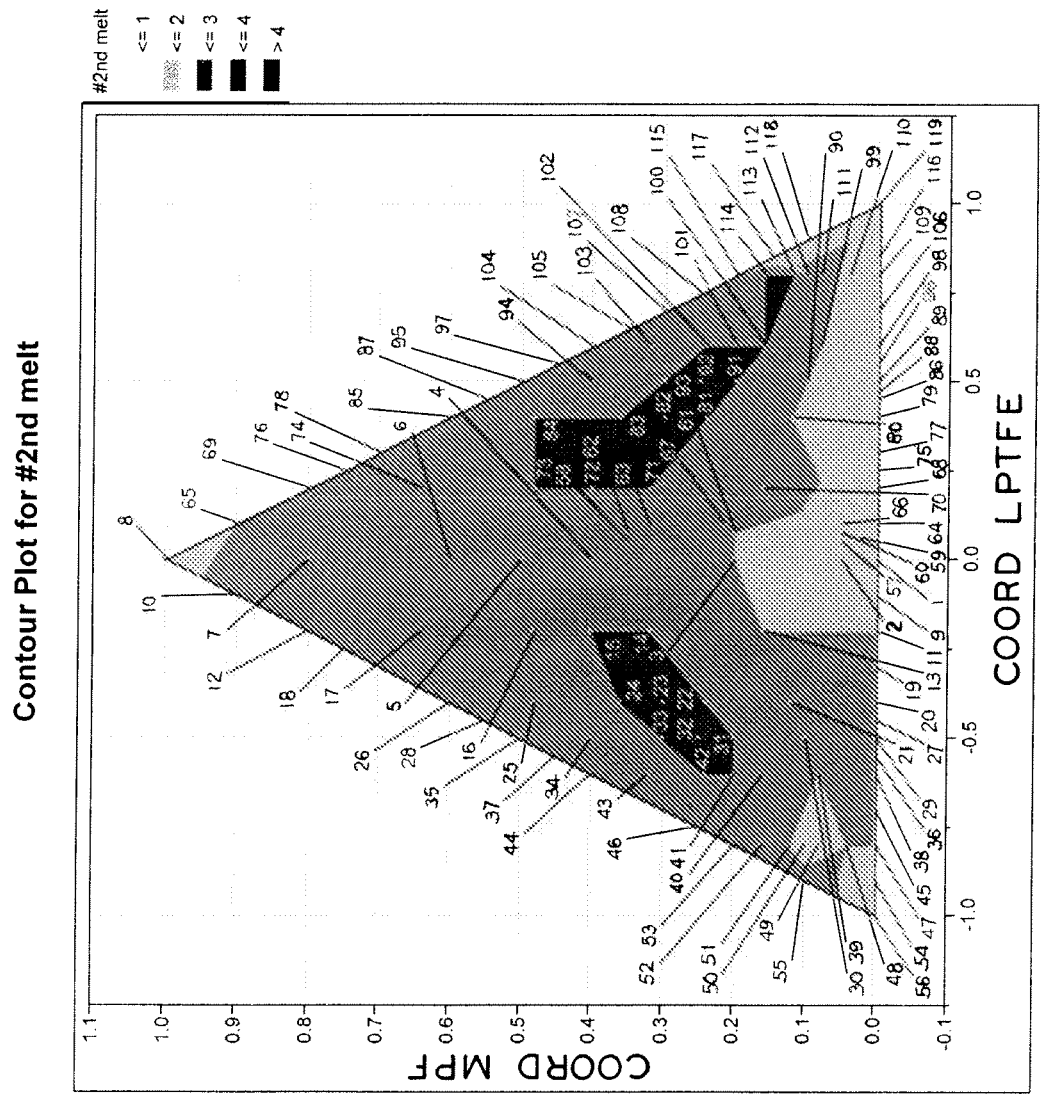
FIG. 25c is a contour plots showing the number of DSC peaks observed during second melt.

FIGS. 25a, 25b, and 25c show the number of DSC peaks observed during First Melt, Fusion and Second Melt, respectively. It can be seen the numbers of DSC peaks observed decreases with each melting of the polymer blend this is indicative of reduction in the numbers of phases present and the presence of mixed phases, i.e., alloying.

Figure 26:
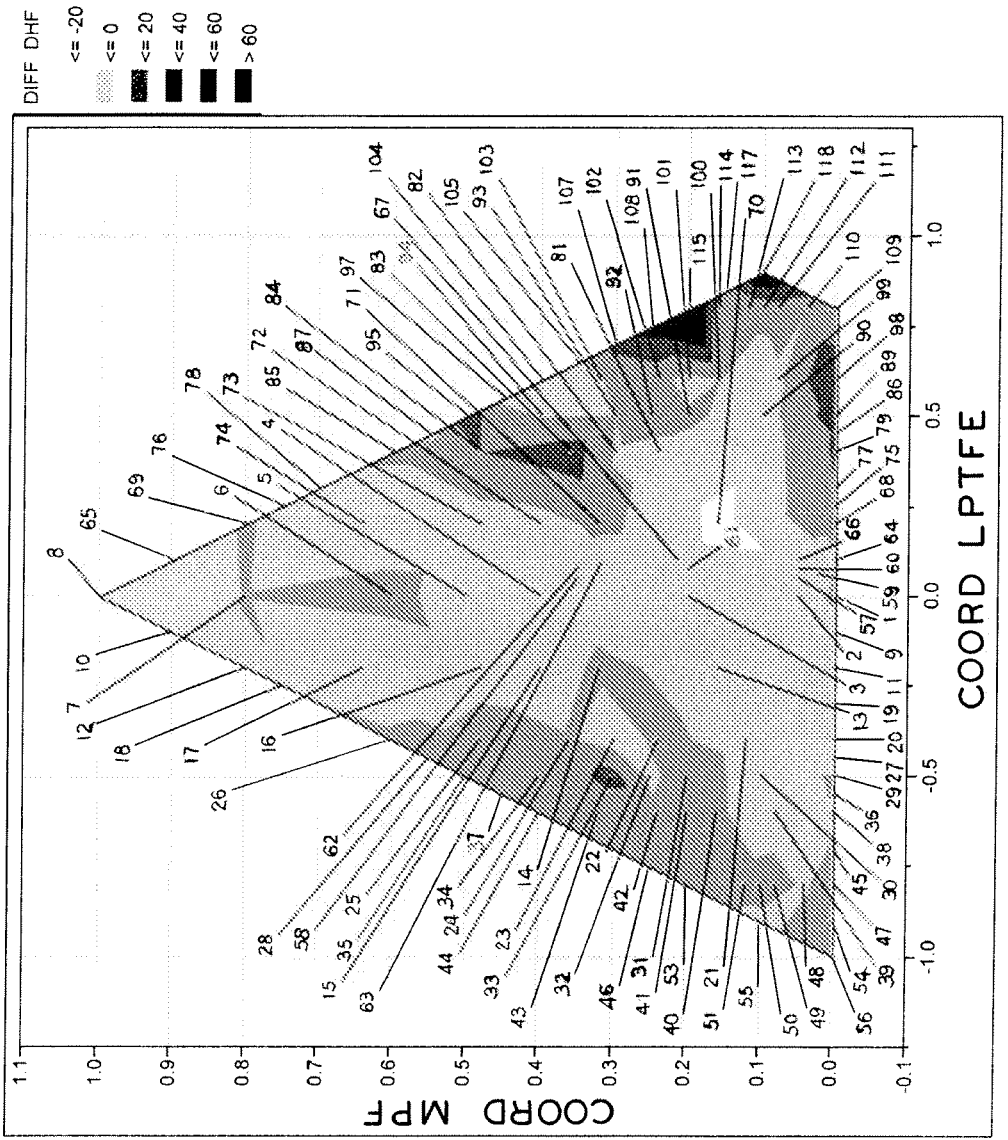
Figure 27:
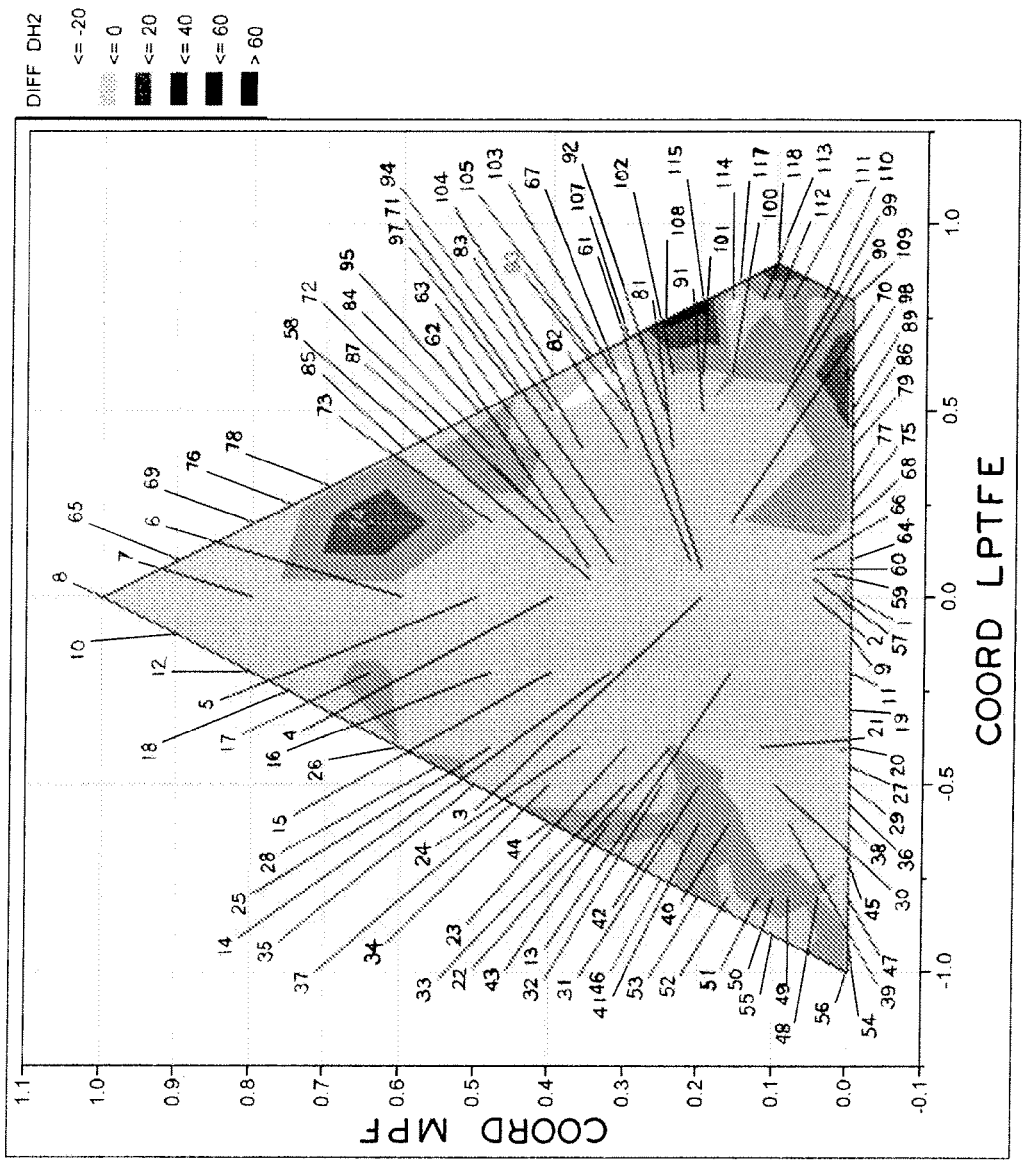
Figure 28:
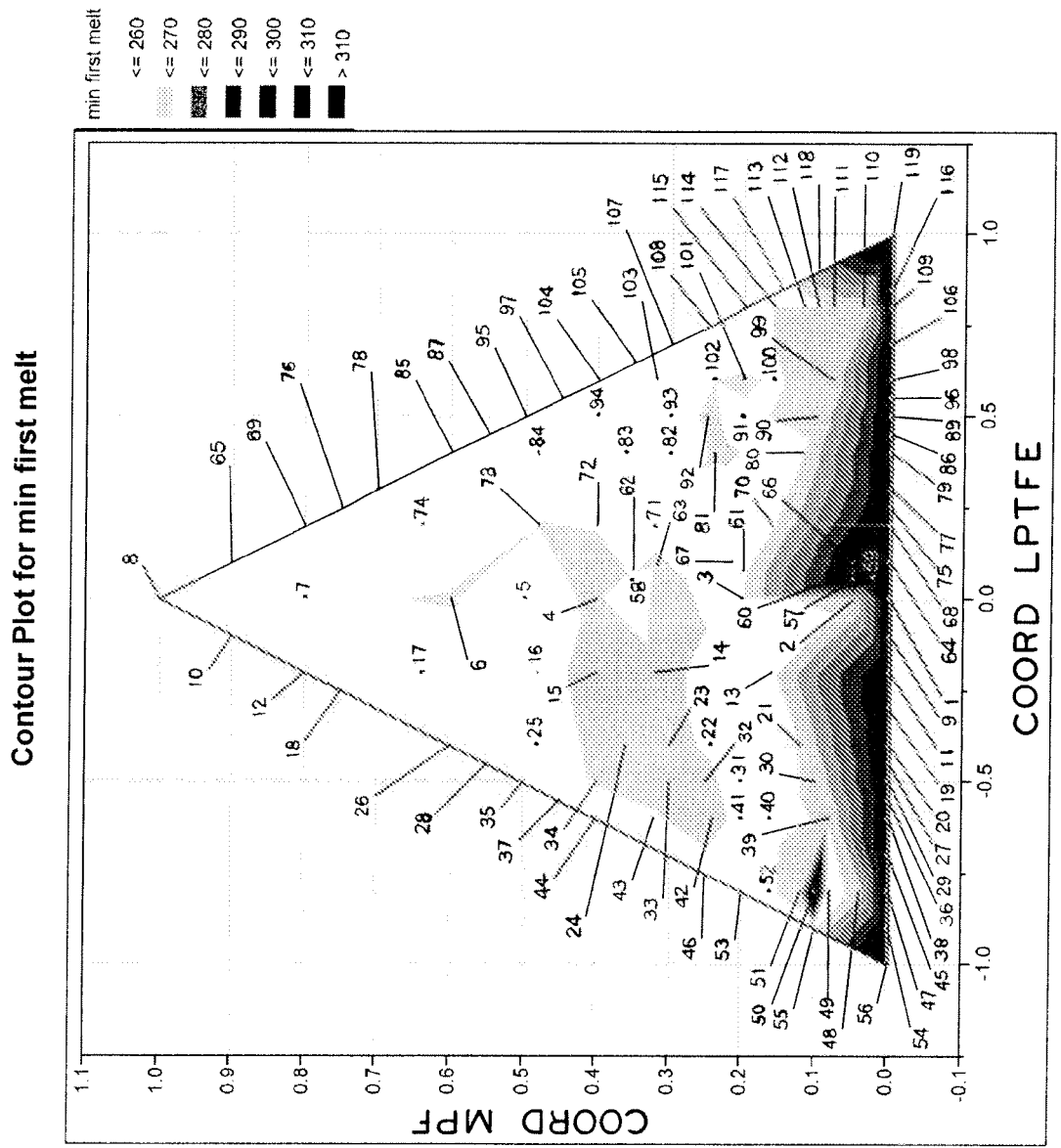
Figure 29:
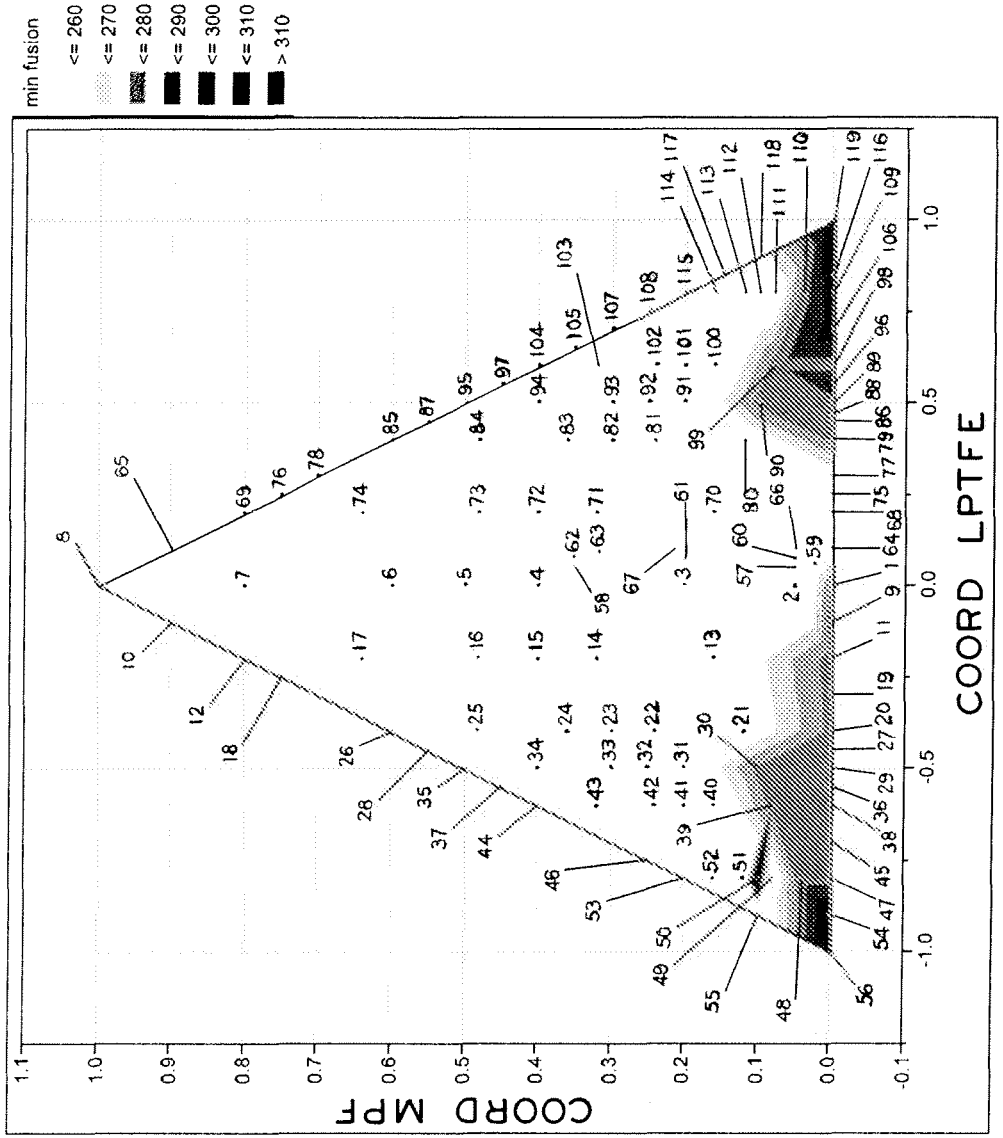
Figure 30:
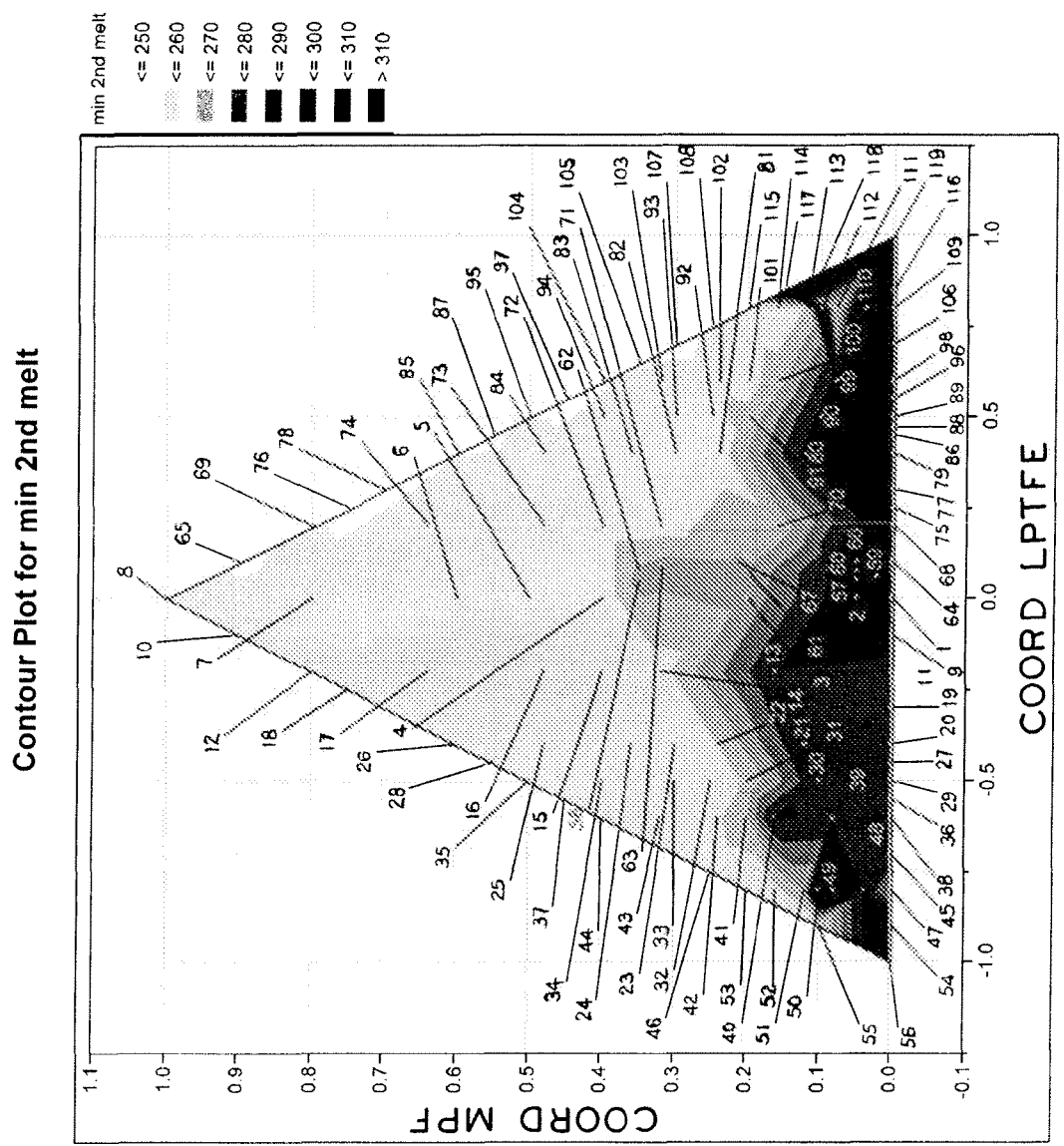

FIGS. 26 is the difference between the total fusion enthalpy and the total first melt enthalpy and FIG. 27 shows the difference between the total remelt enthalpy and the first melt enthalpy J/g. These plots both show regions where total crystallinity of the sample increased after melting (where values are positive). Regions of greatest increase often being associated with a reduction in the number of melt peaks; a further indication of the development of new more crystalline phases associated with the intimate mixing of the component fluoropolymers. These higher crystalline phases are in regions broadly corresponding to those associated with the enhanced normalized properties as exhibited in FIGS. 23-24, i.e., 10-85% LPTFE, 5-30% FEP and 70-95% PFA. FIG. 28 is the minimum first melt temperature, FIG. 29 is the minimum fusion temperature and FIG. 30 is the minimum remelt temperature. Simple comparison of FIGS. 28-30 reveals that the mimimum melt temperature generally increases on further melting. In particular the generally lower FEP melt peak becomes less evident and in fact absent in many cases. The regions associated with these runs are also generally in accord with the regions of enhanced properties discussed above.

least one HPTFE, at least one LPTFE, and at least two chemically different MPFs. In this Example, the two MPFs employed are FEP and PEA. The blends in this Example were made by mixing aqueous dispersions of the components, and the resulting blends were then drawn down as films for gloss, contact angle, and pencil test characterization and, for the thermal analysis, were coagulated and dried for DSC measurement, as discussed in Section VII above.

Panels were prepared for gloss, contact angle and pencil hardness testing as follows. In Mix A and Mix B, the value for deionized water (DIW) appears more than once as such may originate from more than one of the component in the mixtures.

1. Make liquid blend of MPF, LPTFE, and HPTFE in the desired ratios.
2. Add the appropriate formulation to the blend created in step 1. Use the following formulations and percentages to make the blends for drawdown.
3. For PFA use Mix B (below) without PFA. Multiply the amount created in step 1 by ⅔.
4. For FEP use Mix A (below) without FEP. Multiply the amount created in step 1 by 0.70.
5. Blend the mix gently to avoid air bubbles.
6. Using a pipet apply a small amount to an aluminum degreased panel.

TABLE 6

Summary of Selected 3-Component (2 MPF and LPTFE) Formulations with Desirable Properties

| Run # | FEP | PFA | LPTFE | GLOSS | Contact Angle | Pencil | CA, GLOSS, HARD | remelt, CA, Gloss, hard | 1st melt_1 | min 2nd melt |
|---|---|---|---|---|---|---|---|---|---|---|
| 21 | 0.12 | 0.48 | 0.4 | 64.8 | 133.79 | 3 | 0.8231 | 0.7746 | 260.16 | 299.3 |
| 40 | 0.16 | 0.24 | 0.6 | 42 | 135.117 | 5 | 0.7978 | 0.7599 | 259.4 | 300.79 |
| 31 | 0.2 | 0.3 | 0.5 | 50.7 | 133.207 | 5 | 0.8175 | 0.6586 | 258.46 | 260.46 |
| 13 | 0.16 | 0.64 | 0.2 | 41.1 | 124.887 | 5 | 0.634 | 0.634 | 257.94 | 299.73 |
| 22 | 0.24 | 0.36 | 0.4 | 60.6 | 131.617 | 3 | 0.7656 | 0.6182 | 259.43 | 259.96 |
| 23 | 0.3 | 0.3 | 0.4 | 66.7 | 129.12 | 3 | 0.7613 | 0.6024 | 261.16 | 255.57 |
| 17 | 0.64 | 0.16 | 0.2 | 69 | 122.42 | 5 | 0.7538 | 0.5958 | 259.48 | 255.25 |
| 80 | 0.12 | 0.48 | 0.4 | 50.7 | 131.993 | −1 | 0.5485 | 0.5799 | 259.72 | 303.19 |
| 30 | 0.1 | 0.4 | 0.5 | 56.8 | 134.967 | −3 | 0.546 | 0.5665 | 260.37 | 299.21 |
| 72 | 0.4 | 0.4 | 0.2 | 63.3 | 124.437 | 4 | 0.7111 | 0.5602 | 259.98 | 253.99 |

From Table 6 we can conclude that selected 3-Component (2MPF, 1LPTFE) systems have between 10-64% FEP, 1.6-64% PFA and 20-60% LPTFE. In particular between 12-24% FEP, 24-64% PFA and. 20-60% LPTFE. And most particularly between 12-16% FEP, 24-48% PFA and 40-60% LPTFE.

Formulation 21 is particularly remarkable as, it has a minimum remelt temperature of 299.3° C. though it contains 12% FEP, the FEP melt peak has disappeared indicating that it is now contained in a mixed phase or alloy, note its first melt temperature was 260.16° C. Formulation 21 is also hard with a very high contact angle in water as well as being very glossy.

Example 2

Second Embodiment

Fluoropolymer Blends with Multiple MPFs (HPTFE/LPTFE/MPF1/MPF2)

Basic and Thermal Properties

As defined in this Example, a "4-component" blend contains all of the following components as described above: at 7. Draw the coating down the panel in a smooth motion using a 3 mil wet path bird applicator.
8. Flash the panel for approximately 5-10 minutes at 200° F.
9. Move the panel to 400° F. and flash an additional 3-5 minutes.
10. Cure the panel for 10 minutes at 750° F.

Mix A

| Component | Weight % |
|---|---|
| DIW | 63.15 |
| PE 1450 DIW Solution | 15.15 |
| Triethanolamine | 4.00 |
| Silwet L-77 | 2.85 |
| Aromatic 100 | 3.75 |
| DIW | 8.10 |
| Carbopol EP-1 | 3.00 |

Mix B

| Component | Weight % |
|---|---|
| PE 1450 DIW Solution | 29.25 |
| DIW | 52.00 |
| Surfynol 440 | 4.50 |
| 10% FC-4430 in DIW | 6.95 |
| Morpholine | 0.40 |
| ASE60 | 6.90 |

Table 7 below is a summary of the blends examined in this Example, wherein the column "# data" is the number of repeats for the runs, hence all the data are averages of these repeated runs. Four runs were made of 4 component blends, i.e. Runs 22, 23, 30 and 31 respectively. In Table 7, "Total MPF" designates the total amount of MPF, which was FEP, PEA, or a combination of the foregoing, wherein the FEP used was TE 9568 FEP (55.6% solids), available from DuPont and the PEA used was TE 7724 PEA (58.6 solids), each described above in Section IV. "Total LPTFE" designates the total amount of LPTFE, wherein the LPTFE's used were SFN-D, availdble from Chenguang Chengdu, 610036 P.R. China and TE3887N, available from DuPont, each described above in Section II. "HPTFE" designates the HPTFE used, which was D310, available from Daikin.

TABLE 7

| | | | Fluoropolymer Blends | | | | |
|---|---|---|---|---|---|---|---|
| Run # | # Data | Total MPF | Total LPTFE | LPTFE (SFN-D) | LPTFE (TE3887N) | FEP (TE9568) | PFA (TE7724) | HPTFE (D310) |
| 1 | 6 | 0.8 | 0.2 | 0 | 0.2 | 0.4 | 0.4 | 0 |
| 2 | 6 | 0.8 | 0.2 | 0.2 | 0 | 0.4 | 0.4 | 0 |
| 3 | 12 | 0.6 | 0.4 | 0.2 | 0.2 | 0.3 | 0.3 | 0 |
| 4 | 6 | 0.6 | 0.4 | 0 | 0.4 | 0.3 | 0.3 | 0 |
| 5 | 6 | 0.6 | 0.4 | 0.4 | 0 | 0.3 | 0.3 | 0 |
| 6 | 6 | 0.5 | 0.5 | 0 | 0.5 | 0.25 | 0.25 | 0 |
| 7 | 6 | 0.5 | 0.5 | 0.5 | 0 | 0.25 | 0.25 | 0 |
| 8 | 10 | 0.4 | 0.6 | 0.3 | 0.3 | 0.2 | 0.2 | 0 |
| 9 | 6 | 0.4 | 0.6 | 0 | 0.6 | 0.2 | 0.2 | 0 |
| 10 | 6 | 0.4 | 0.6 | 0.6 | 0 | 0.2 | 0.2 | 0 |
| 11 | 6 | 0.2 | 0.8 | 0 | 0.8 | 0.1 | 0.1 | 0 |
| 12 | 6 | 0.2 | 0.8 | 0.8 | 0 | 0.1 | 0.1 | 0 |
| 13 | 28 | 0 | 1 | 0 | 1 | 0 | 0 | 0 |
| 14 | 9 | 0 | 1 | 0.5 | 0.5 | 0 | 0 | 0 |
| 15 | 12 | 0 | 1 | 1 | 0 | 0 | 0 | 0 |
| 16 | 8 | 0 | 0.8 | 0 | 0.8 | 0 | 0 | 0.2 |
| 17 | 6 | 0 | 0.8 | 0.8 | 0 | 0 | 0 | 0.2 |
| 18 | 9 | 0.6 | 0 | 0 | 0 | 0.3 | 0.3 | 0.4 |
| 19 | 9 | 0 | 0.6 | 0 | 0.6 | 0 | 0 | 0.4 |
| 20 | 9 | 0 | 0.6 | 0.3 | 0.3 | 0 | 0 | 0.4 |
| 21 | 6 | 0 | 0.6 | 0.6 | 0 | 0 | 0 | 0.4 |
| 22 | 9 | 0.36 | 0.24 | 0.12 | 0.12 | 0.18 | 0.18 | 0.4 |
| 23 | 11 | 0.24 | 0.36 | 0.18 | 0.18 | 0.12 | 0.12 | 0.4 |
| 24 | 6 | 0 | 0.5 | 0 | 0.5 | 0 | 0 | 0.5 |
| 25 | 6 | 0 | 0.5 | 0.5 | 0 | 0 | 0 | 0.5 |
| 26 | 17 | 0 | 0.4 | 0.2 | 0.2 | 0 | 0 | 0.6 |
| 27 | 6 | 0 | 0.4 | 0.4 | 0 | 0 | 0 | 0.6 |
| 28 | 3 | 0 | 0.4 | 0 | 0.4 | 0 | 0 | 0.6 |
| 29 | 6 | 0.4 | 0 | 0 | 0 | 0.2 | 0.2 | 0.6 |
| 30 | 9 | 0.24 | 0.16 | 0.08 | 0.08 | 0.12 | 0.12 | 0.6 |
| 31 | 9 | 0.16 | 0.24 | 0.12 | 0.12 | 0.08 | 0.08 | 0.6 |
| 32 | 6 | 0 | 0.2 | 0.2 | 0 | 0 | 0 | 0.8 |
| 33 | 4 | 0 | 0.2 | 0 | 0.2 | 0 | 0 | 0.8 |
| 34 | 10 | 0 | 0 | 0 | 0 | 0 | 0 | 1 |
| 35 | 24 | 1 | 0 | 0 | 0 | 1 | 0 | 0 |
| 36 | 61 | 1 | 0 | 0 | 0 | 0.5 | 0.5 | 0 |
| 37 | 18 | 1 | 0 | 0 | 0 | 0 | 1 | 0 |
| 38 | 3 | 0.33 | 0.27 | 0 | 0.27 | 0 | 0.33 | 0.4 |
| 39 | 3 | 0.3 | 0.3 | 0 | 0.3 | 0.3 | 0 | 0.4 |
| 40 | 3 | 0.3 | 0.3 | 0.3 | 0 | 0.3 | 0 | 0.4 |
| 41 | 9 | 0.6 | 0 | 0 | 0 | 0.3 | 0.3 | 0.4 |

Observed data is set forth in Table 8 below, wherein:
GLOSS=measured gloss, per Section VII above;
NORM GLOSS=normalized gloss, calculated as: [Gloss−Minimum (Gloss)]/[Maximum (Gloss)−Minimum (Gloss)];
CONTACT ANGLE (CA)=contact angle, per Section VII above;
NORM CA=normalized contact angle, calculated as: [Contact Angle−Minimum (Contact Angle)]/[Maximum (Contact Angle)−Minimum (Contact Angle];
PENCIL=pencil test measurement, per Section VII above, where the value in Table 7 below is the mean of the number of measured results, as indicated by "# Data" in Table 6 above;
NORM PENCIL=normalized pencil test measurement, calculated as: [PENCIL−Minimum (PENCIL)]/[Maximum (PENCIL) Minimum (PENCIL)];
NORM min remelt=normalized "min remelt", calculated as: [min remelt−Minimum (min remelt)]/[Maximum (min remelt)−Minimum (min remelt)], wherein "min remelt" is the temperature of the lowest remelt peak for a given sample;
Norm (CA, Gloss, Hard)=the mean of (NORM CA, NORM PENCIL, and NORM GLOSS); and
Norm (Remelt, CA, Gloss, Hard)=the mean of (NORM CA, NORM PENCIL, NORM GLOSS, and NORM min remelt).

TABLE 8

Observed data

| Run # | GLOSS | NORM GLOSS | Contact Angle (CA) | NORM CA | PENCIL | NORM PENCIL | norm min remelt | Norm (CA, Gloss, Hard) | Norm (Remelt, CA, Gloss, Hard) |
|---|---|---|---|---|---|---|---|---|---|
| 1 | 37.8 | 0.46 | 123.89 | 0.38 | 5.0 | 1.00 | 0.12 | 0.61 | 0.49 |
| 2 | 63.3 | 0.88 | 124.44 | 0.40 | 4.0 | 0.88 | 0.11 | 0.72 | 0.57 |
| 3 | 54.2 | 0.73 | 131.65 | 0.67 | 3.3 | 0.78 | 0.22 | 0.73 | 0.60 |
| 4 | 66.7 | 0.94 | 129.12 | 0.58 | 3.0 | 0.75 | 0.13 | 0.75 | 0.60 |
| 5 | 35.9 | 0.42 | 130.87 | 0.64 | 1.0 | 0.50 | 0.12 | 0.52 | 0.42 |
| 6 | 41.8 | 0.52 | 132.58 | 0.71 | 1.0 | 0.50 | 0.15 | 0.58 | 0.47 |
| 7 | 27.5 | 0.28 | 132.48 | 0.70 | −1.0 | 0.25 | 0.15 | 0.41 | 0.35 |
| 8 | 38.7 | 0.47 | 135.20 | 0.80 | −1.6 | 0.18 | 0.11 | 0.48 | 0.39 |
| 9 | 30.5 | 0.33 | 134.65 | 0.78 | −3.0 | 0.00 | 0.25 | 0.37 | 0.34 |
| 10 | 21.0 | 0.18 | 132.82 | 0.71 | −2.0 | 0.13 | 0.13 | 0.34 | 0.29 |
| 11 | 12.8 | 0.04 | 137.33 | 0.88 | −3.0 | 0.00 | 1.00 | 0.31 | 0.48 |
| 12 | 18.9 | 0.14 | 132.98 | 0.72 | −3.0 | 0.00 | 0.85 | 0.29 | 0.43 |
| 13 | 22.9 | 0.21 | 133.29 | 0.73 | −3.0 | 0.00 | 0.98 | 0.31 | 0.42 |
| 14 | 11.2 | 0.01 | 137.48 | 0.89 | −3.0 | 0.00 | 0.97 | 0.30 | 0.36 |
| 15 | 30.0 | 0.33 | 134.25 | 0.77 | −2.0 | 0.13 | 0.96 | 0.41 | 0.54 |
| 16 | 45.8 | 0.59 | 132.35 | 0.70 | −3.0 | 0.00 | 0.99 | 0.43 | 0.57 |
| 17 | 29.7 | 0.32 | 136.03 | 0.83 | −3.0 | 0.00 | 0.97 | 0.38 | 0.53 |
| 18 | 53.2 | 0.71 | 120.83 | 0.27 | 5.0 | 1.00 | 0.16 | 0.66 | 0.53 |
| 19 | 52.0 | 0.69 | 132.03 | 0.68 | −3.0 | 0.00 | 0.99 | 0.46 | 0.59 |
| 20 | 48.4 | 0.63 | 135.48 | 0.81 | −3.0 | 0.00 | 0.99 | 0.48 | 0.61 |
| 21 | 54.3 | 0.73 | 134.71 | 0.78 | −3.0 | 0.00 | 0.97 | 0.50 | 0.62 |
| 22 | 48.4 | 0.63 | 138.65 | 0.93 | 2.7 | 0.71 | 0.95 | 0.76 | 0.81 |
| 23 | 44.9 | 0.57 | 139.02 | 0.95 | 4.4 | 0.92 | 0.73 | 0.81 | 0.79 |
| 24 | 48.2 | 0.63 | 132.12 | 0.69 | −3.0 | 0.00 | 0.98 | 0.44 | 0.57 |
| 25 | 44.0 | 0.56 | 131.95 | 0.68 | −3.0 | 0.00 | 0.98 | 0.41 | 0.55 |
| 26 | 54.5 | 0.73 | 133.43 | 0.74 | 0.1 | 0.38 | 0.98 | 0.62 | 0.71 |
| 27 | 50.1 | 0.66 | 132.62 | 0.71 | −3.0 | 0.00 | 0.97 | 0.46 | 0.58 |
| 28 | 47.8 | 0.62 | 131.60 | 0.67 | −3.0 | 0.00 | 0.98 | 0.43 | 0.57 |
| 29 | 56.8 | 0.77 | 120.40 | 0.25 | 4.5 | 0.94 | 0.37 | 0.65 | 0.58 |
| 30 | 51.7 | 0.69 | 134.05 | 0.76 | 3.0 | 0.75 | 0.40 | 0.73 | 0.65 |
| 31 | 55.1 | 0.74 | 136.39 | 0.85 | 4.0 | 0.88 | 0.95 | 0.82 | 0.85 |
| 32 | 52.7 | 0.70 | 131.11 | 0.65 | −3.0 | 0.00 | 0.96 | 0.45 | 0.58 |
| 33 | 51.3 | 0.68 | 128.86 | 0.57 | −3.0 | 0.00 | 0.97 | 0.42 | 0.55 |
| 34 | 56.5 | 0.77 | 125.64 | 0.45 | −2.0 | 0.13 | 0.93 | 0.45 | 0.50 |
| 35 | 68.7 | 0.97 | 118.63 | 0.19 | 5.0 | 1.00 | 0.15 | 0.72 | 0.58 |
| 36 | 51.8 | 0.69 | 116.23 | 0.10 | 3.7 | 0.83 | 0.10 | 0.54 | 0.46 |
| 37 | 50.2 | 0.66 | 122.81 | 0.34 | 0.0 | 0.38 | 0.70 | 0.46 | 0.52 |
| 38 | 59.4 | 0.81 | 130.94 | 0.64 | −3.0 | 0.00 | 0.66 | 0.49 | 0.53 |
| 39 | 57.2 | 0.78 | 134.32 | 0.77 | 0.0 | 0.38 | 0.14 | 0.64 | 0.52 |
| 40 | 58.8 | 0.80 | 135.93 | 0.83 | 0.0 | 0.38 | 0.26 | 0.67 | 0.57 |
| 41 | 53.2 | 0.71 | 120.83 | 0.27 | 5.0 | 1.00 | 0.16 | 0.66 | 0.53 |

From the data presented in Table 8 it can be seen that the 4-component blends have generally better properties than the other blends, such as higher gloss, contact angle, and greater pencil hardness.

Thermal data is summarized in Tables 9, 10, and 11 below for 1st Melt, Fusion and 2nd Melt (remelt) respectively.

TABLE 9

1st melt DSC data

| Run # | 1st melt1 | 1st Melt3 | 1st melt4 | 1st melt5 | 1st melt6 | 1st melt7 | min 1st melt |
|---|---|---|---|---|---|---|---|
| 1 | 260.8 | 313.3 | 322.0 | — | 327.9 | — | 260.8 |
| 2 | 260.0 | 312.4 | 321.3 | — | 326.0 | — | 260.0 |
| 3 | 259.5 | 313.2 | — | — | 327.0 | — | 259.5 |
| 4 | 261.2 | 313.7 | — | — | 328.4 | — | 261.2 |
| 5 | 259.5 | 312.5 | — | 324.3 | 325.7 | — | 259.5 |
| 6 | 261.0 | 313.9 | — | — | 328.4 | — | 261.0 |
| 7 | 260.1 | 312.8 | — | — | 325.9 | — | 260.1 |
| 8 | 259.5 | 313.3 | — | — | 327.0 | — | 259.5 |
| 9 | 259.1 | 314.2 | — | — | 328.7 | — | 259.1 |
| 10 | 260.2 | 312.8 | — | — | 325.7 | — | 260.2 |
| 11 | — | — | — | — | 329.2 | — | 329.2 |
| 12 | 260.6 | 313.0 | — | — | 326.0 | — | 260.6 |
| 13 | — | — | — | — | 327.6 | — | 327.6 |
| 14 | — | — | — | — | 327.2 | — | 327.2 |
| 15 | — | — | — | — | 325.5 | — | 325.5 |
| 16 | — | — | — | — | 327.4 | 333.3 | 327.4 |
| 17 | — | — | — | — | 325.3 | 330.2 | 325.3 |
| 18 | 259.6 | 312.9 | 321.1 | — | — | 337.8 | 259.6 |
| 19 | — | — | — | — | 327.3 | 335.3 | 327.3 |
| 20 | — | — | — | — | 326.8 | 336.1 | 326.8 |
| 21 | — | — | — | — | 325.0 | 334.5 | 325.0 |
| 22 | 60.4 | 13.8 | | | 26.2 | 38.9 | 60.4 |
| 23 | 259.1 | 313.5 | — | — | 326.9 | 336.7 | 259.1 |
| 24 | — | — | — | — | 327.2 | 335.9 | 327.2 |
| 25 | — | — | — | — | 325.4 | 336.9 | 325.4 |
| 26 | — | — | — | — | 326.5 | 338.0 | 326.5 |
| 27 | — | — | — | — | 325.2 | 337.9 | 325.2 |
| 28 | — | — | — | — | 326.8 | 336.8 | 326.8 |
| 29 | 259.5 | 313.1 | 321.0 | — | — | 339.4 | 259.5 |
| 30 | 260.1 | 313.5 | — | — | 326.7 | 339.4 | 260.1 |
| 31 | 260.4 | 313.8 | — | — | 326.2 | 338.9 | 260.4 |
| 32 | — | — | — | — | 325.9 | 339.4 | 325.9 |
| 33 | — | — | — | — | 326.2 | 338.3 | 326.2 |
| 34 | — | — | — | — | 327.6 | 338.8 | 332.1 |
| 35 | 257.4 | — | — | — | — | — | 257.4 |
| 36 | 259.2 | 312.6 | 321.5 | — | — | — | 259.2 |
| 37 | — | 313.4 | — | — | — | — | 313.4 |
| 38 | — | 314.0 | — | — | 327.7 | 337.8 | 314.0 |
| 39 | 259.3 | — | — | — | 327.4 | 337.2 | 259.3 |
| 40 | 259.4 | — | — | 325.2 | 326.0 | 337.1 | 259.4 |
| 41 | 259.6 | 312.9 | 321.1 | — | — | 337.8 | 259.6 |

| Run # | DH 1st melt 1 | DH 1st Melt 3 | DH 1st Melt 4 | DH 1st Melt 5 | DH 1st Melt 6 | DH 1st Melt 7 | Total 1st DH |
|---|---|---|---|---|---|---|---|
| 1 | 11.23 | 14.96 | 1.57 | — | 11.55 | — | 39.31 |
| 2 | 8.97 | 16.84 | 2.29 | — | 8.18 | — | 36.27 |
| 3 | 7.18 | 15.54 | — | — | — | — | 22.72 |
| 4 | 6.71 | 11.33 | — | — | 24.89 | — | 42.93 |
| 5 | 4.96 | 14.05 | — | 10.52 | 9.89 | — | 39.42 |
| 6 | 2.74 | 9.44 | — | — | 31.34 | — | 43.51 |
| 7 | 3.72 | 12.53 | — | — | 26.26 | — | 42.51 |
| 8 | 4.84 | 12.63 | — | — | — | — | 17.47 |
| 9 | 1.63 | 8.04 | — | — | 36.92 | — | 46.58 |
| 10 | 8.79 | 13.97 | — | — | 32.12 | — | 54.88 |
| 11 | — | — | — | — | 64.48 | — | 64.48 |
| 12 | 1.49 | 10.50 | — | — | 44.50 | — | 56.49 |
| 13 | — | — | — | — | 64.19 | — | 41.27 |
| 14 | — | — | — | — | — | — | |
| 15 | — | — | — | — | — | — | |
| 16 | — | — | — | — | 45.23 | 19.52 | 64.75 |
| 17 | — | — | — | — | — | 10.33 | 10.33 |
| 18 | 3.86 | 13.47 | 1.46 | — | — | 27.42 | 46.21 |
| 19 | — | — | — | — | 47.10 | 25.79 | 72.89 |
| 20 | — | — | — | — | 38.07 | 22.18 | 52.86 |
| 21 | — | — | — | — | — | 25.77 | 25.77 |
| 22 | 5.48 | 9.89 | — | — | 42.93 | — | 58.31 |

TABLE 9-continued

| | | | 1st melt DSC data | | | | |
|---|---|---|---|---|---|---|---|
| 23 | 2.57 | 7.48 | — | — | 24.30 | — | 34.35 |
| 24 | — | — | — | — | 43.39 | 28.09 | 71.48 |
| 25 | — | — | — | — | 31.84 | 30.85 | 62.69 |
| 26 | — | — | — | — | 32.66 | 37.11 | 63.22 |
| 27 | — | — | — | — | 25.46 | 39.69 | 65.15 |
| 28 | — | — | — | — | 38.56 | 35.20 | 73.76 |
| 29 | 5.08 | 10.77 | 1.89 | — | — | 41.18 | 58.93 |
| 30 | 8.27 | 11.57 | — | — | 39.88 | — | 59.72 |
| 31 | 5.48 | 9.89 | — | — | 42.93 | — | 58.31 |
| 32 | — | — | — | — | 12.65 | 41.25 | 53.90 |
| 33 | — | — | — | — | 16.61 | 50.10 | 66.71 |
| 34 | — | — | — | — | — | 66.64 | 26.66 |
| 35 | 18.18 | — | — | — | — | — | 18.18 |
| 36 | 8.82 | 22.41 | 0.98 | — | — | — | 21.12 |
| 37 | — | 6.91 | 1.28 | — | — | — | 8.19 |
| 38 | — | 14.11 | — | — | 18.90 | 22.51 | 55.52 |
| 39 | 6.31 | — | — | — | 30.07 | 25.59 | 61.97 |
| 40 | 2.82 | — | — | 16.23 | 6.54 | 28.95 | 54.54 |
| 41 | 3.86 | 13.47 | 1.46 | — | — | 27.42 | 46.21 |

Table 9 shows the first melt temperature (° C.) and heat of melting (ΔH J/g) for the various blends of Table 7. Within Table 9, the numerical identifiers (i.e., the "1" in "DH 1st melt 1") indicate the peak numbers in the DSC traces from the lowest to the highest melt temperatures. It will be noticed that the various components exhibit their melt points in the blends at temperatures typical for their chemistry, 1,e., FEP at ca. 255-260° C., PEA at ca. 312-314° C., LPTFE at ca. 324-328° C., and HPTFE at ca. 330-340° C.

TABLE 10

| | | | | Fusion peak DSC data | | | | | |
|---|---|---|---|---|---|---|---|---|---|
| Run # | Fusion 1 | Fusion 4 | Fusion 5 | Fusion 6 | min Fusion | DH Fusion 1 | DH Fusion 4 | DH Fusion 5 | DH Fusion 6 | Total Fusion DH |
| 1 | 233.9 | 285.5 | — | 301.8 | 233.9 | 7.38 | 5.19 | — | 17.60 | 30.17 |
| 2 | 233.2 | 288.1 | — | 297.1 | 233.2 | 5.99 | 16.82 | — | 5.35 | 28.16 |
| 3 | 232.9 | 285.2 | — | 305.5 | 232.9 | 3.47 | 6.69 | — | 28.42 | 38.59 |
| 4 | 234.9 | 285.0 | — | 307.6 | 234.9 | 2.76 | 4.13 | — | 28.26 | 35.15 |
| 5 | 232.8 | 285.9 | — | 303.6 | 232.8 | 5.55 | 25.58 | — | 7.56 | 38.70 |
| 6 | 236.1 | 284.7 | — | 309.6 | 236.1 | 1.47 | 3.47 | — | 35.67 | 40.61 |
| 7 | 233.0 | 285.8 | — | 305.2 | 233.0 | 5.72 | 31.87 | — | 8.33 | 45.92 |
| 8 | 236.1 | 284.6 | — | 309.3 | 236.1 | 0.62 | 4.69 | — | 42.75 | 48.06 |
| 9 | 235.8 | 283.6 | — | 311.1 | 235.8 | 2.75 | 4.22 | — | 42.51 | 49.48 |
| 10 | 235.5 | — | 292.3 | 306.7 | 235.5 | 1.56 | — | 38.19 | 7.82 | 47.57 |
| 11 | — | — | — | 315.8 | 315.8 | — | — | — | 70.48 | 70.48 |
| 12 | 238.3 | — | — | 309.6 | 238.3 | 0.56 | — | — | 58.42 | 58.98 |
| 13 | — | — | — | 315.1 | 315.1 | — | — | — | 73.27 | 47.10 |
| 14 | — | — | — | 314.6 | 314.6 | — | — | — | 69.54 | 23.18 |
| 15 | — | — | — | 311.2 | 311.2 | — | — | — | 64.61 | 64.61 |
| 16 | — | — | — | 314.5 | 314.5 | — | — | — | 61.30 | 61.30 |
| 17 | — | — | — | 315.4 | 315.4 | — | — | — | 69.39 | 69.39 |
| 18 | 234.3 | — | 291.3 | 303.1 | 234.3 | 4.09 | — | 8.75 | 16.18 | 29.02 |
| 19 | — | — | — | 314.9 | 314.9 | — | — | — | 64.29 | 64.29 |
| 20 | — | — | — | 315.1 | 315.1 | — | — | — | 60.87 | 60.87 |
| 21 | — | — | — | 315.2 | 315.2 | — | — | — | 62.29 | 62.29 |
| 22 | — | — | — | 311.7 | 311.7 | — | — | — | 45.56 | 45.56 |
| 23 | — | — | 292.2 | 311.4 | 292.2 | — | — | 4.82 | 39.06 | 43.88 |
| 24 | — | — | — | 314.9 | 314.9 | — | — | — | 69.22 | 69.22 |
| 25 | — | — | — | 314.6 | 314.6 | — | — | — | 54.55 | 54.55 |
| 26 | — | — | — | 314.5 | 314.5 | — | — | — | 52.11 | 52.11 |
| 27 | — | — | — | 314.3 | 314.3 | — | — | — | 57.20 | 57.20 |
| 28 | — | — | — | 314.6 | 314.6 | — | — | — | 60.72 | 60.72 |
| 29 | 238.7 | — | 291.5 | 306.8 | 238.7 | 1.78 | — | 8.55 | 20.05 | 30.38 |
| 30 | 241.5 | — | 293.1 | 309.9 | 241.5 | 0.79 | — | 6.68 | 30.29 | 37.76 |
| 31 | — | — | — | 311.7 | 311.7 | — | — | — | 45.56 | 45.56 |
| 32 | — | — | — | 313.0 | 313.0 | — | — | — | 44.43 | 44.43 |
| 33 | — | — | — | 313.6 | 313.6 | — | — | — | 47.63 | 47.63 |
| 34 | — | — | — | 311.1 | 311.1 | — | — | — | 38.02 | 15.21 |
| 35 | 234.3 | — | — | — | 234.3 | 13.92 | — | — | — | 13.92 |
| 36 | 232.3 | 286.7 | — | — | 232.3 | 6.61 | 16.10 | — | — | 14.89 |

TABLE 10-continued

Fusion peak DSC data

| Run # | Fusion 1 | Fusion 4 | Fusion 5 | Fusion 6 | min Fusion | DH Fusion 1 | DH Fusion 4 | DH Fusion 5 | DH Fusion 6 | Total Fusion DH |
|---|---|---|---|---|---|---|---|---|---|---|
| 37 | — | 281.7 | — | — | 281.7 | — | 16.12 | — | — | 16.12 |
| 38 | — | 284.8 | — | 309.9 | 284.8 | — | 8.60 | — | 32.45 | 41.05 |
| 39 | 232.4 | — | — | 313.5 | 232.4 | 7.47 | — | — | 46.94 | 54.41 |
| 40 | 239.0 | — | — | 313.5 | 239.0 | 5.74 | — | — | 43.94 | 49.68 |
| 41 | 234.3 | — | 291.3 | 303.1 | 234.3 | 4.09 | — | 8.75 | 16.18 | 29.02 |

TABLE 11

$2^{nd}$ melt DSC data

| Run # | 2nd Melt 1 | 2nd Melt 2 | 2nd Melt 3 | 2nd Melt 4 | 2nd Melt 6 | 2nd Melt 7 | min 2nd Melt |
|---|---|---|---|---|---|---|---|
| 1 | 255.4 | — | — | 301.1 | — | 322.0 | 255.4 |
| 2 | 254.0 | — | — | 304.9 | — | 319.2 | 254.0 |
| 3 | 263.8 | — | — | 302.3 | — | 326.9 | 263.8 |
| 4 | 255.6 | — | — | 301.1 | — | 326.6 | 255.6 |
| 5 | 254.7 | — | — | 303.7 | — | 323.2 | 254.7 |
| 6 | 258.0 | — | — | 300.7 | — | 327.2 | 258.0 |
| 7 | 257.8 | — | — | 305.8 | — | 324.6 | 257.8 |
| 8 | 254.3 | — | — | 302.1 | — | 324.7 | 254.3 |
| 9 | 266.4 | — | — | 301.0 | — | 328.8 | 266.4 |
| 10 | 255.9 | — | — | 305.1 | — | 325.5 | 255.9 |
| 11 | — | — | — | — | — | 331.5 | 331.5 |
| 12 | — | — | — | — | 318.8 | 327.2 | 318.8 |
| 13 | — | — | — | — | — | 329.9 | 329.9 |
| 14 | — | — | — | — | — | 329.3 | 329.3 |
| 15 | — | — | — | — | — | 327.8 | 327.8 |
| 16 | — | — | — | — | — | 330.2 | 330.2 |
| 17 | — | — | — | — | — | 328.7 | 328.7 |
| 18 | 258.7 | — | — | 306.9 | — | 320.8 | 258.7 |
| 19 | — | — | — | — | — | 330.4 | 330.4 |
| 20 | — | — | — | — | — | 330.3 | 330.3 |
| 21 | — | — | — | — | — | 329.2 | 329.2 |
| 22 | — | — | — | — | — | 327.5 | 327.5 |
| 23 | — | — | — | 308.0 | — | 328.3 | 308.0 |
| 24 | — | — | — | — | — | 329.9 | 329.9 |
| 25 | — | — | — | — | — | 29.6 | 29.6 |
| 26 | — | — | — | — | — | 329.8 | 329.8 |
| 27 | — | — | — | — | — | 329.0 | 329.0 |
| 28 | — | — | — | — | — | 330.0 | 330.0 |
| 29 | — | 276.7 | — | 305.3 | — | 323.2 | 276.7 |
| 30 | — | 279.7 | — | 304.0 | — | 327.3 | 279.7 |
| 31 | — | — | — | — | — | 327.5 | 327.5 |
| 32 | — | — | — | — | — | 327.9 | 327.9 |
| 33 | — | — | — | — | — | 328.5 | 328.5 |
| 34 | — | — | — | — | — | 325.5 | 325.5 |
| 35 | 257.5 | — | — | — | — | — | 257.5 |
| 36 | 252.9 | — | — | 309.4 | — | — | 252.9 |
| 38 | — | — | — | 302.3 | — | 326.3 | 302.3 |
| 39 | 256.7 | — | — | — | — | 329.9 | 256.7 |
| 40 | 267.3 | — | — | — | — | 328.8 | 267.3 |
| 41 | 258.7 | — | — | 306.9 | — | 320.8 | 258.7 |

| Run # | DH 2nd Melt 1 | DH 2ND Melt 2 | DH 2ND Melt 3 | DH 2ND Melt 4 | DH 2nd Melt 6 | DH 2nd Melt 7 | Total 2nd DH |
|---|---|---|---|---|---|---|---|
| 1 | 5.37 | — | — | 6.12 | — | 16.97 | 28.46 |
| 2 | 7.73 | — | — | 6.12 | — | 16.75 | 30.60 |
| 3 | 1.32 | — | — | 6.02 | — | 42.13 | 49.47 |
| 4 | 4.61 | — | — | 5.90 | — | 28.35 | 38.86 |
| 5 | 3.66 | — | — | 7.48 | — | 25.22 | 36.36 |
| 6 | 1.85 | — | — | 4.50 | — | 35.10 | 41.45 |
| 7 | 1.43 | — | — | 6.26 | — | 31.63 | 39.32 |
| 8 | 4.12 | — | — | 7.25 | — | 28.06 | 39.43 |
| 9 | 2.16 | — | — | 5.48 | — | 42.27 | 49.92 |
| 10 | 5.49 | — | — | 6.11 | — | 39.05 | 50.65 |
| 11 | — | — | — | — | — | 69.35 | 69.35 |
| 12 | — | — | — | — | 11.29 | 43.07 | 54.36 |
| 13 | — | — | — | — | — | 70.83 | 45.53 |
| 14 | — | — | — | — | — | 67.39 | 22.46 |

TABLE 11-continued

2nd melt DSC data

| | | | | | | | |
|---|---|---|---|---|---|---|---|
| 15 | — | — | — | — | — | 64.65 | 64.65 |
| 16 | — | — | — | — | — | 56.41 | 56.41 |
| 17 | — | — | — | — | — | 66.42 | 66.42 |
| 18 | 5.69 | — | — | 8.29 | — | 18.69 | 32.67 |
| 19 | — | — | — | — | — | 70.43 | 70.43 |
| 20 | — | — | — | — | — | 62.05 | 62.05 |
| 21 | — | — | — | — | — | 61.14 | 61.14 |
| 22 | — | — | — | — | — | 52.38 | 52.38 |
| 23 | — | — | — | 9.27 | — | 39.24 | 48.51 |
| 24 | — | — | — | — | — | 59.75 | 59.75 |
| 25 | — | — | — | — | — | 51.03 | 51.03 |
| 26 | — | — | — | — | — | 53.57 | 53.57 |
| 27 | — | — | — | — | — | 53.96 | 53.96 |
| 28 | — | — | — | — | — | 63.19 | 63.19 |
| 29 | — | 5.62 | — | 8.69 | — | 17.94 | 32.25 |
| 30 | — | 6.78 | — | 4.85 | — | 32.27 | 43.90 |
| 31 | — | — | — | — | — | 52.38 | 52.38 |
| 32 | — | — | — | — | — | 41.25 | 41.25 |
| 33 | — | — | — | — | — | 43.76 | 43.76 |
| 34 | — | — | — | — | — | 31.20 | 12.48 |
| 35 | 14.18 | — | — | — | — | — | 14.18 |
| 36 | 7.02 | — | — | 15.23 | — | — | 14.59 |
| 38 | — | — | — | 12.82 | — | 31.29 | 44.11 |
| 39 | 6.52 | — | — | — | — | 43.86 | 50.38 |
| 40 | 2.67 | — | — | — | — | 41.39 | 44.06 |
| 41 | 29.02 | 5.69 | — | 8.29 | — | 18.69 | 32.67 |

Within Tables 10 and 11, the numerical identifiers (i.e., the "1" in "Fusion 1" and "2nd melt 1" and "DH 2nd melt1") indicate the peak numbers in the DSC traces from the lowest to the highest melt temperatures.

However, the data in Tables 10 and 11 reveal that in the case of the 4-component blends, after first melting many of the components virtually lose their thermal signature and, in particular, the low melt points associated with FEP are virtually lost for 3 of the four 4-component blends shown, i.e., runs 22, 23 and 31. For two of these blends, the PFA fusion peak is also virtually absent, i.e., Runs 22 and 31 and the fusion data only reveal 1 fusion peak for these materials. This behavior is mirrored for the remelt peaks shown in Table 11. Essentially, after the first melting virtually all that remains on fusion and remelting is one peak at a temperature normally associated with PTFE. This is quite remarkable as, in the case of Run 22, for example, 36 wt. % of the formulation is either FEP or PFA which are associated with much lower melt points.

It is thought that the thermal data exhibited by the 4-component blends is indicative of extensive and intimate mixing of the various components leading to the formation of a type of fluoropolymer alloy. These formulations are also associated with an unparalleled combination of gloss, water contact angle, and hardness, which is illustrated by the Normalized data of Table 8, In this connection, the data of Table 8 above show that the 4 component blends, i.e., Runs 22, 23, 30 and 31, are associated with the highest values of the composite variables including Norm (CA, Gloss, Hard) and Norm (Remelt, CA, Gloss, Hard). These formulations will imbue coating systems employing them with desirable properties based on these characteristics, as demonstrated by other Examples herein.

Exemplary actual DSC plots of from certain Runs of Tables 8-10 are given in FIGS. 1-18 and summarized in Table 12 below.

TABLE 12

Various Fluoropolymer Blends with DSC Plots shown FIGS. (1-18)

| Run # | Blend Type | # 1st Melt Peaks | Min 1st Melt ° C. | # Fusion Peaks | Min Fusion ° C. | # Re-melt Peaks | Min Re-melt ° C. | Fig. # (1st Melt & Fusion) | Fig. # (2nd Melt) |
|---|---|---|---|---|---|---|---|---|---|
| 3 | FLP | 3 | 261.2 | 3 | 232.9 | 3 | 263.8 | 9 | 10 |
| 22 | FLPH | 4 | 260.4 | 3 | 311.7 | 3 | 327.5 | 7 | 8 |
| 23 | FLPH | 4 | 259.1 | 2 | 292.2 | 2 | 308.0 | 3 | 4 |
| 29 | FPH | 3 | 259.5 | 3 | 238.7 | 3 | 276.7 | 13 | 14 |
| 30 | FLPH | 4 | 260.1 | 3 | 241.5 | 3 | 279.7 | 5 | 6 |
| 31 | FLPH | 4 | 260.4 | 1 | 311.7 | 1 | 327.5 | 1 | 2 |
| 38 | LPH | 3 | 314.0 | 2 | 284.8 | 2 | 302.3 | 15 | 16 |
| 39 | LFH | 3 | 259.3 | 2 | 232.4 | 2 | 256.7 | 17 | 18 |
| 41 | FPH | 3 | 259.6 | 3 | 234.3 | 3 | 258.7 | 11 | 12 |

Figure 6:
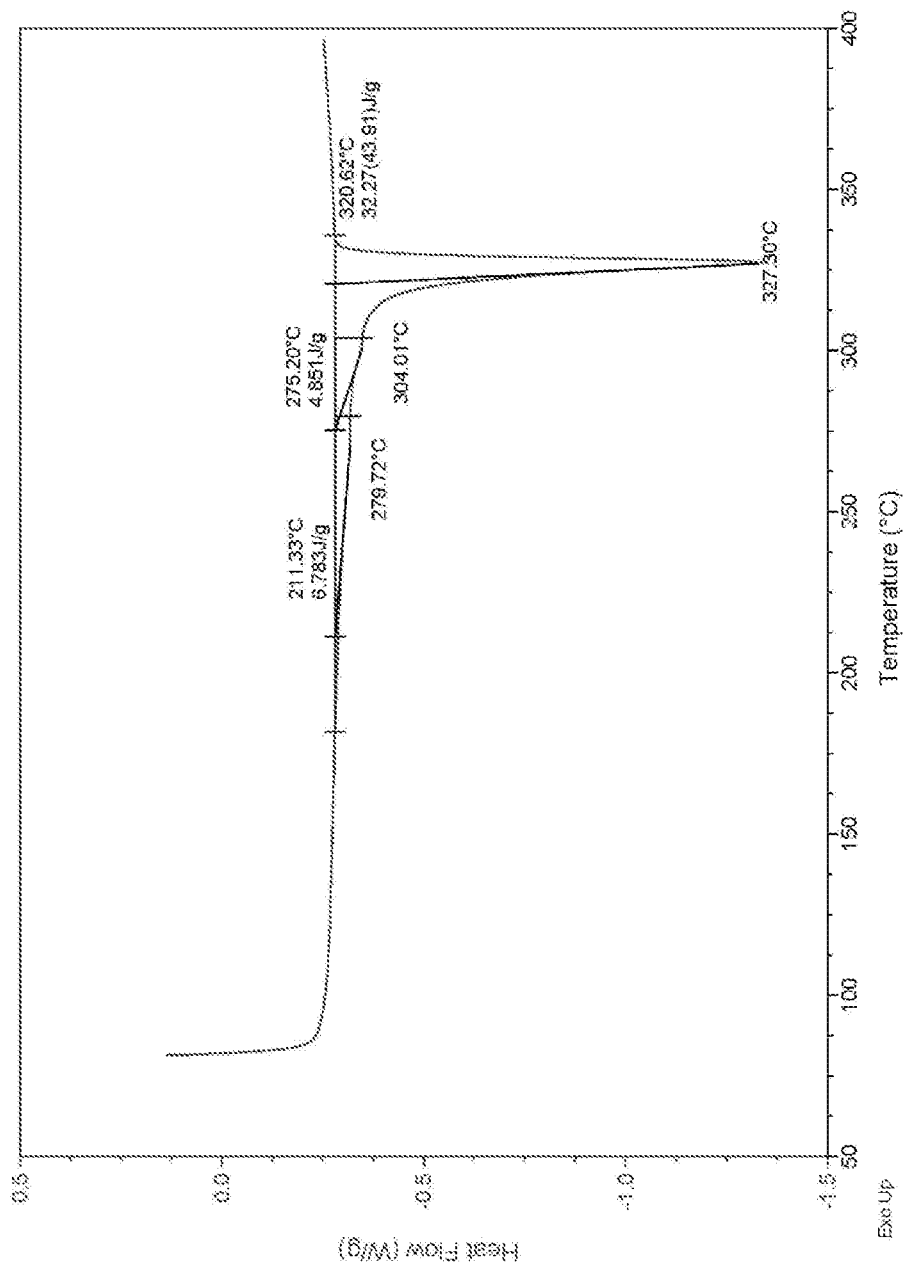
Figure 7:
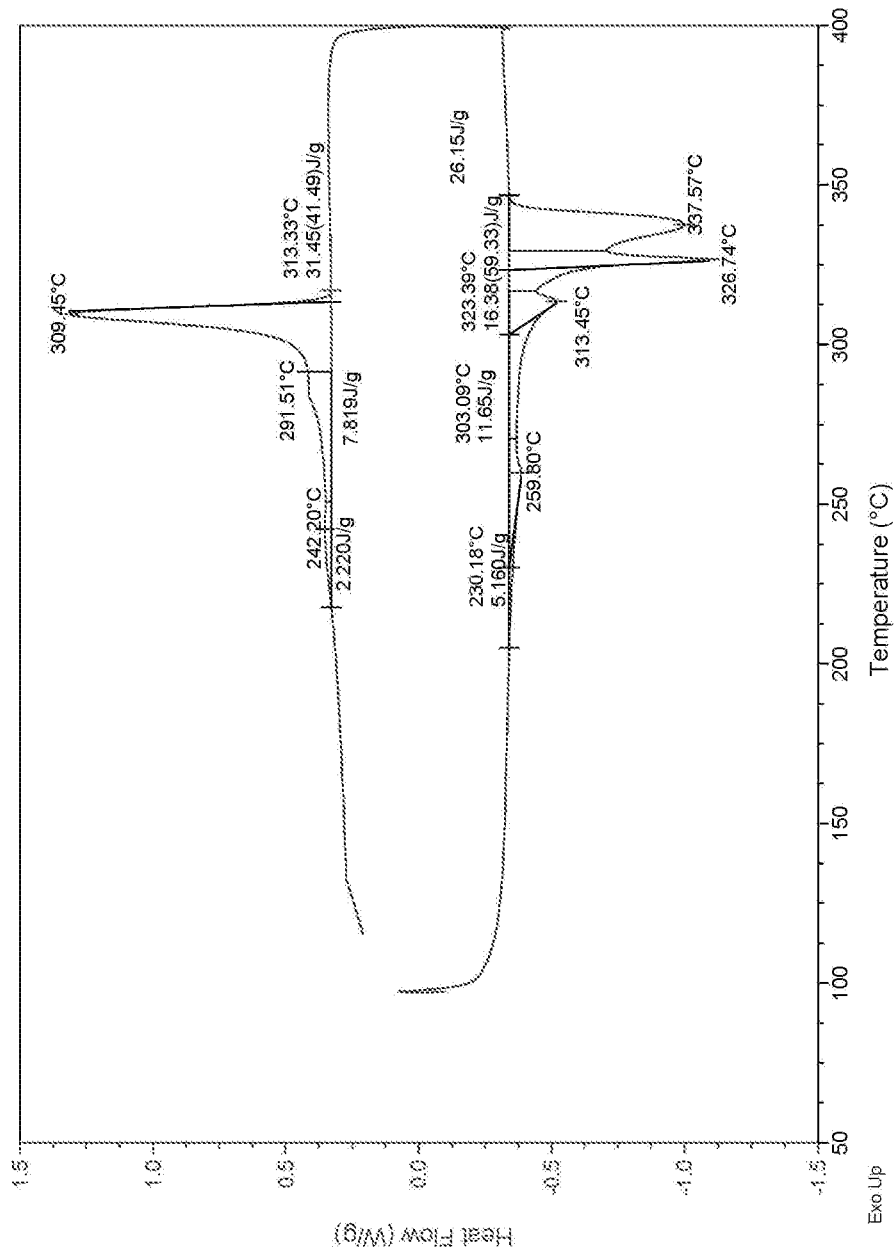
Figure 8:
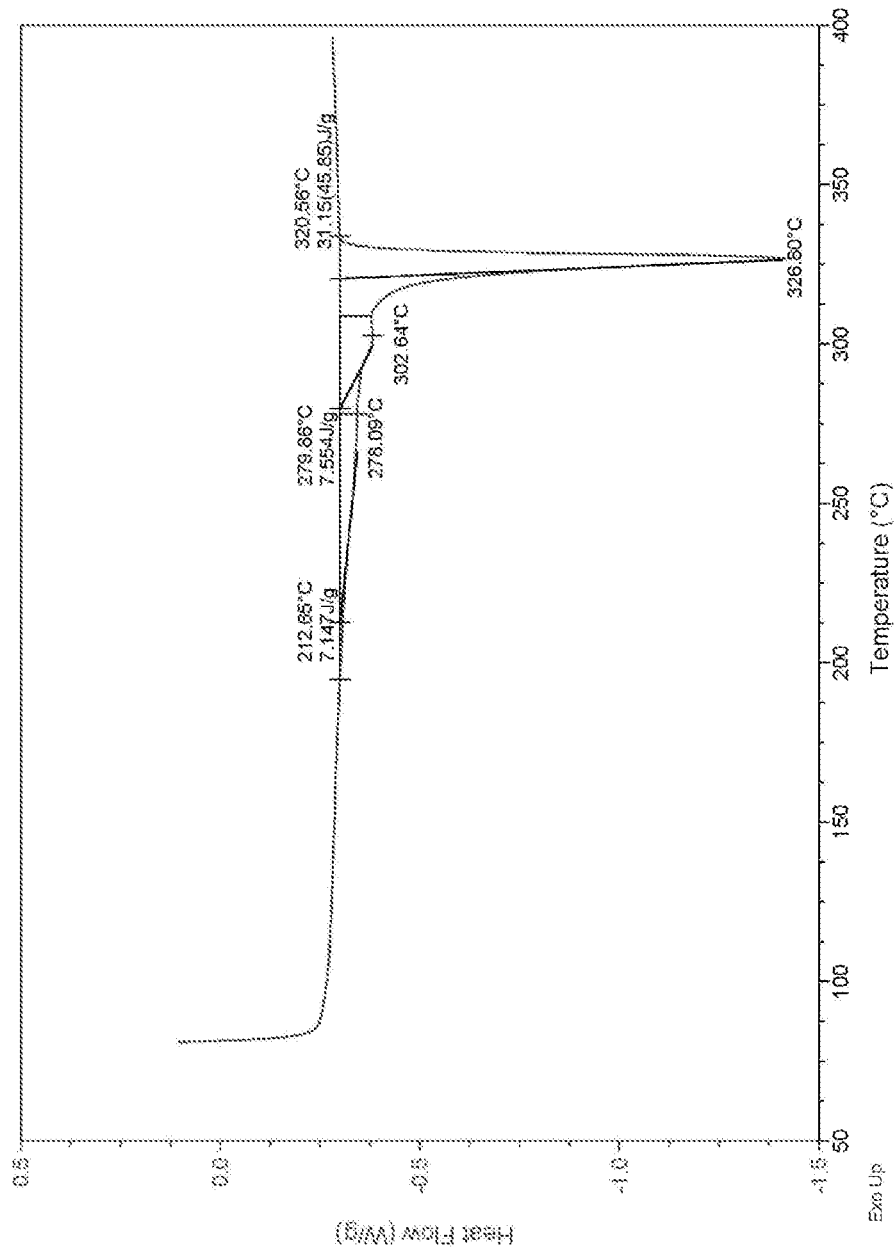
Figure 9:
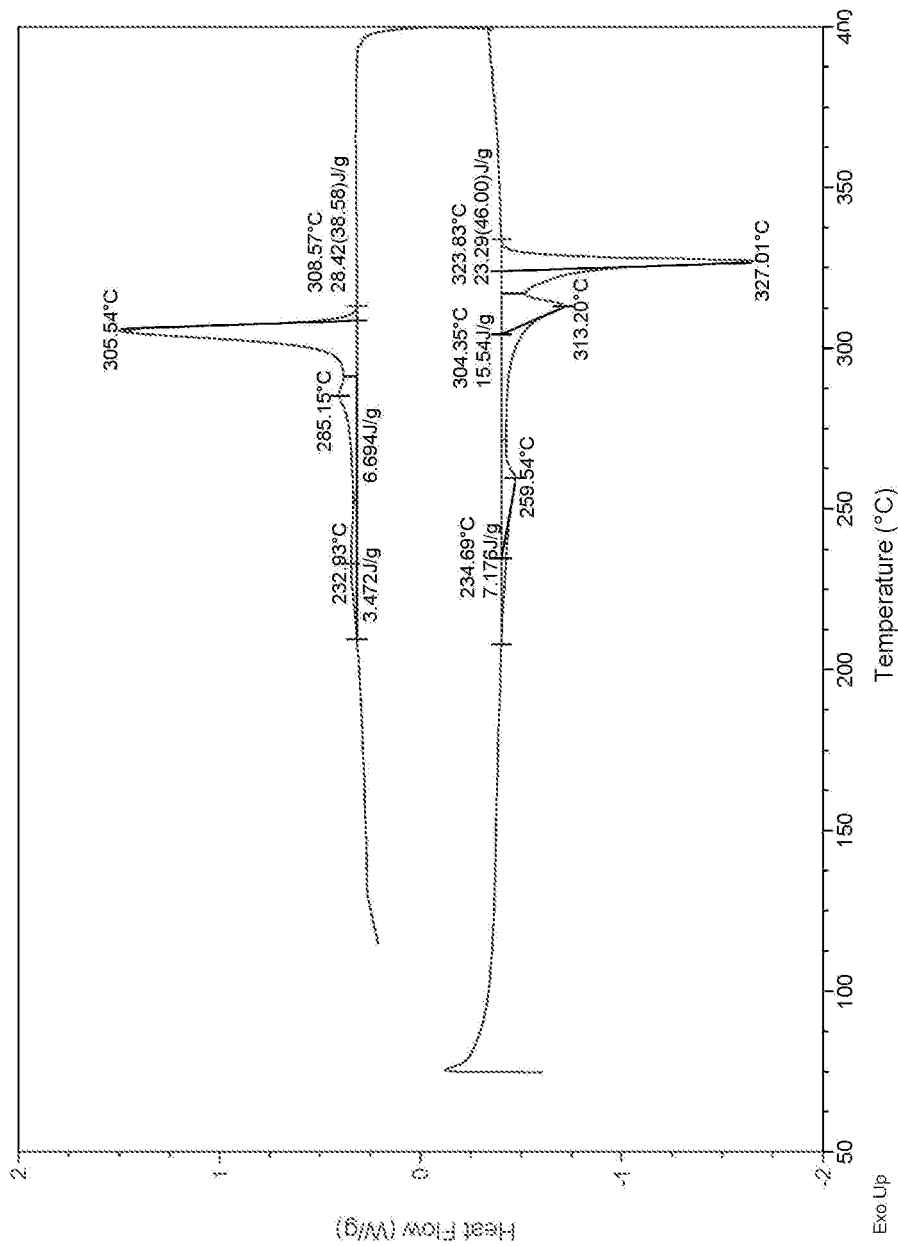
Figure 10:
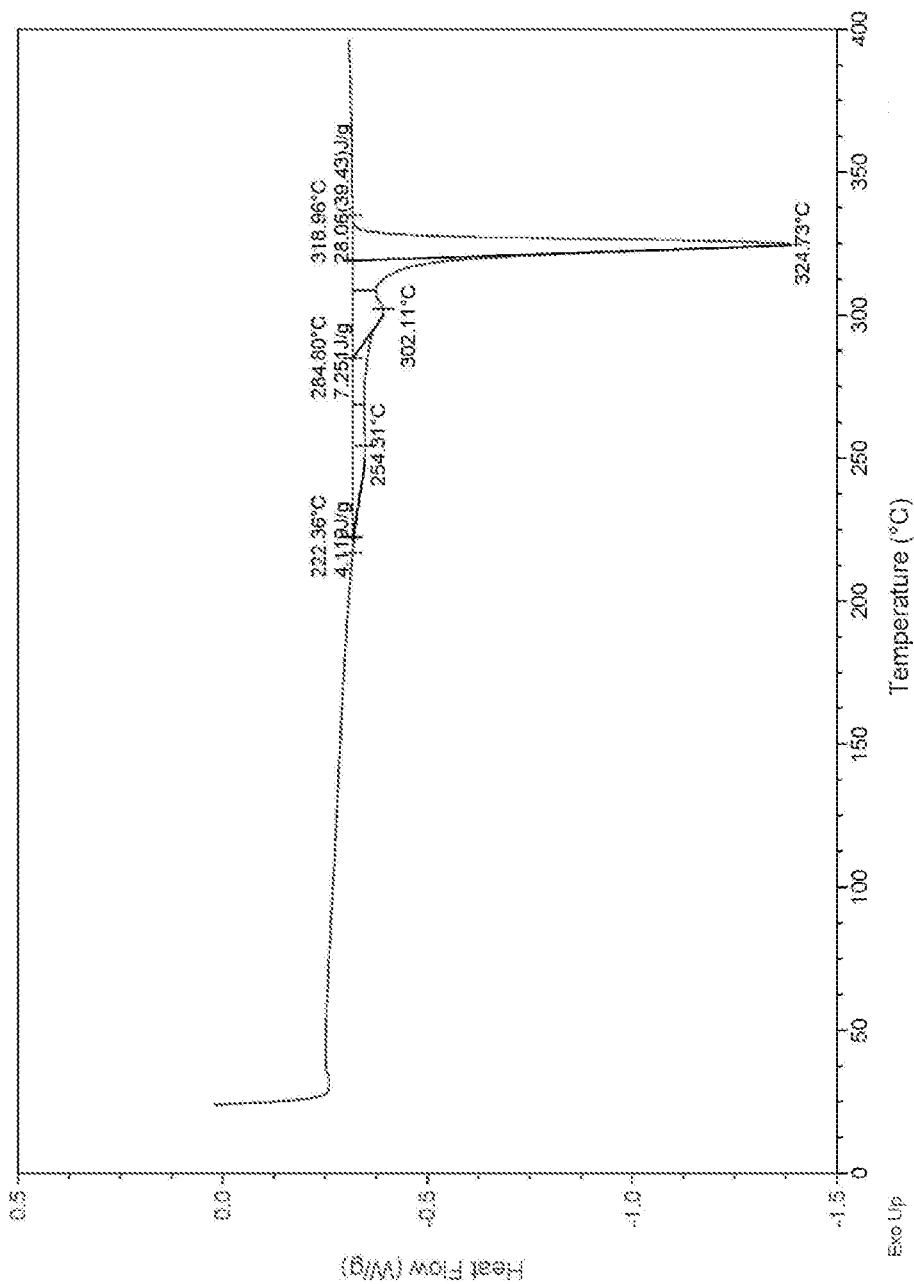
Figure 11:
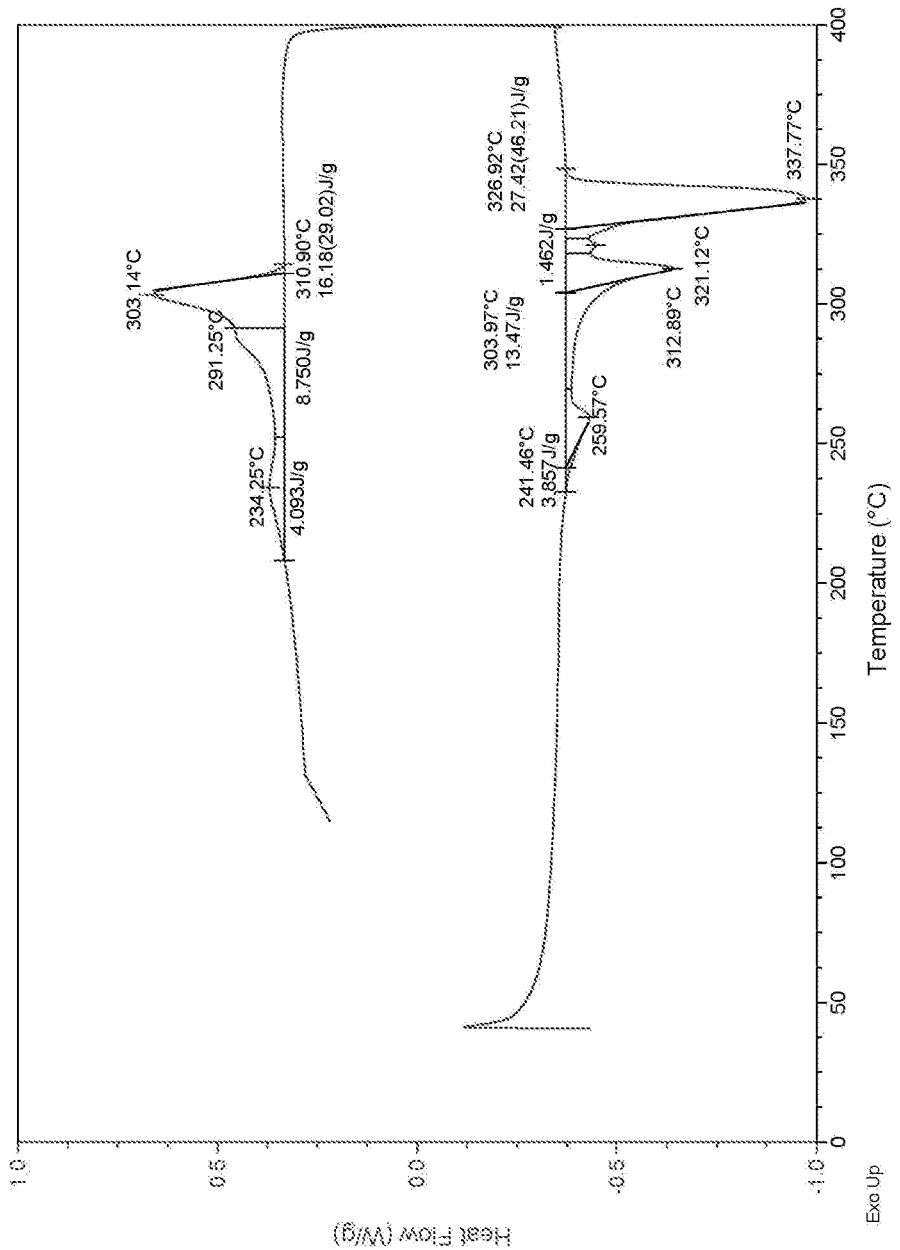
Figure 12:
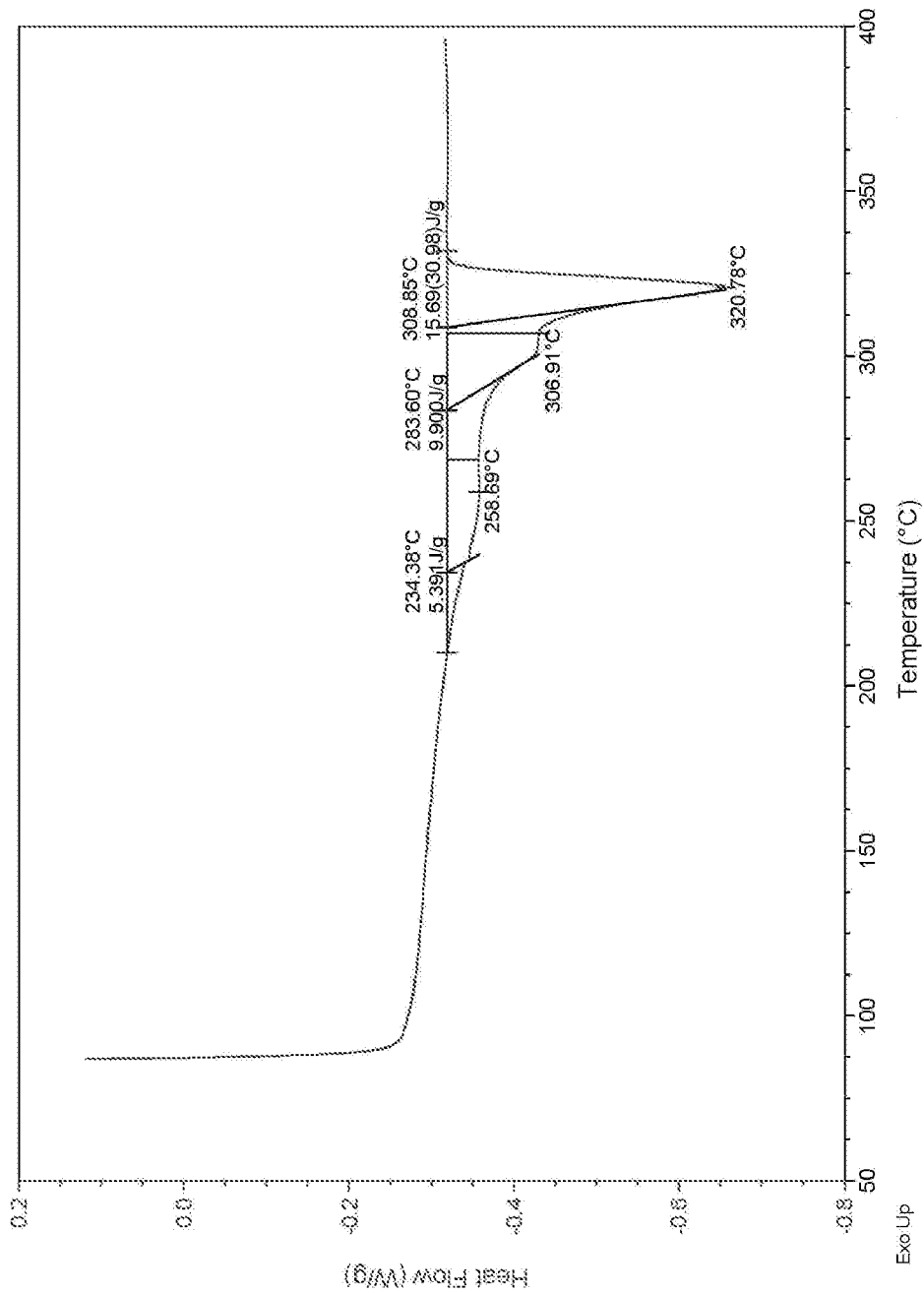
Figure 13:
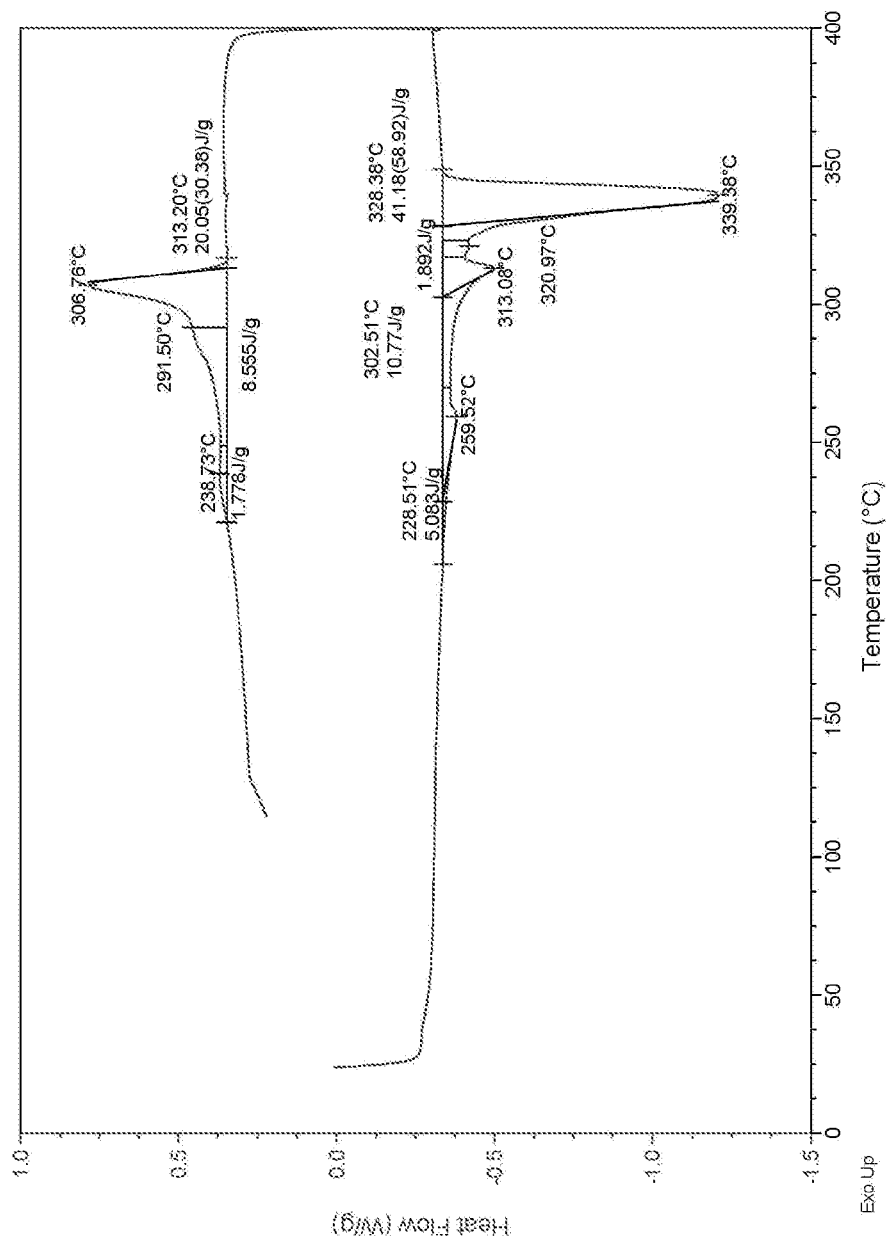
Figure 14:
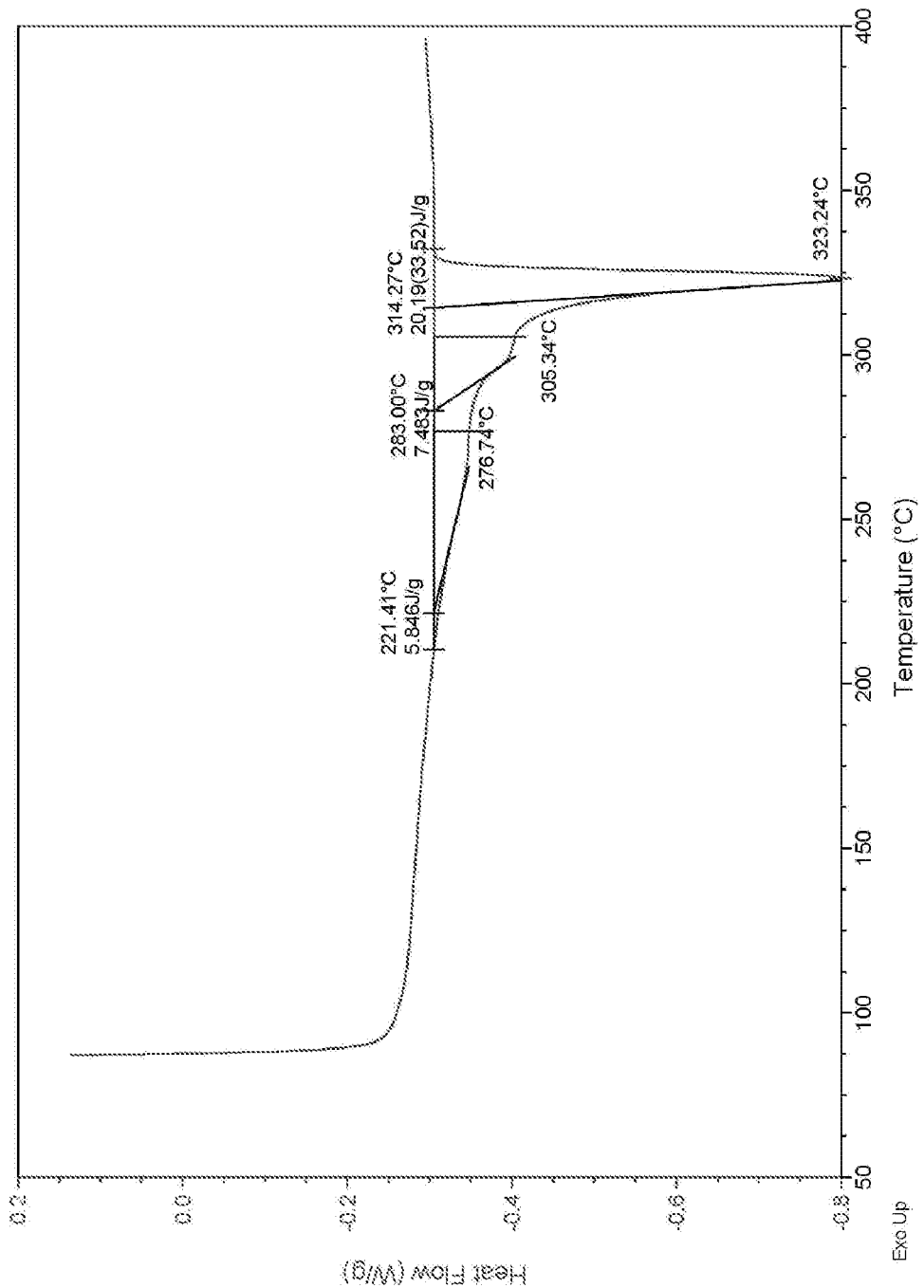
Figure 15:
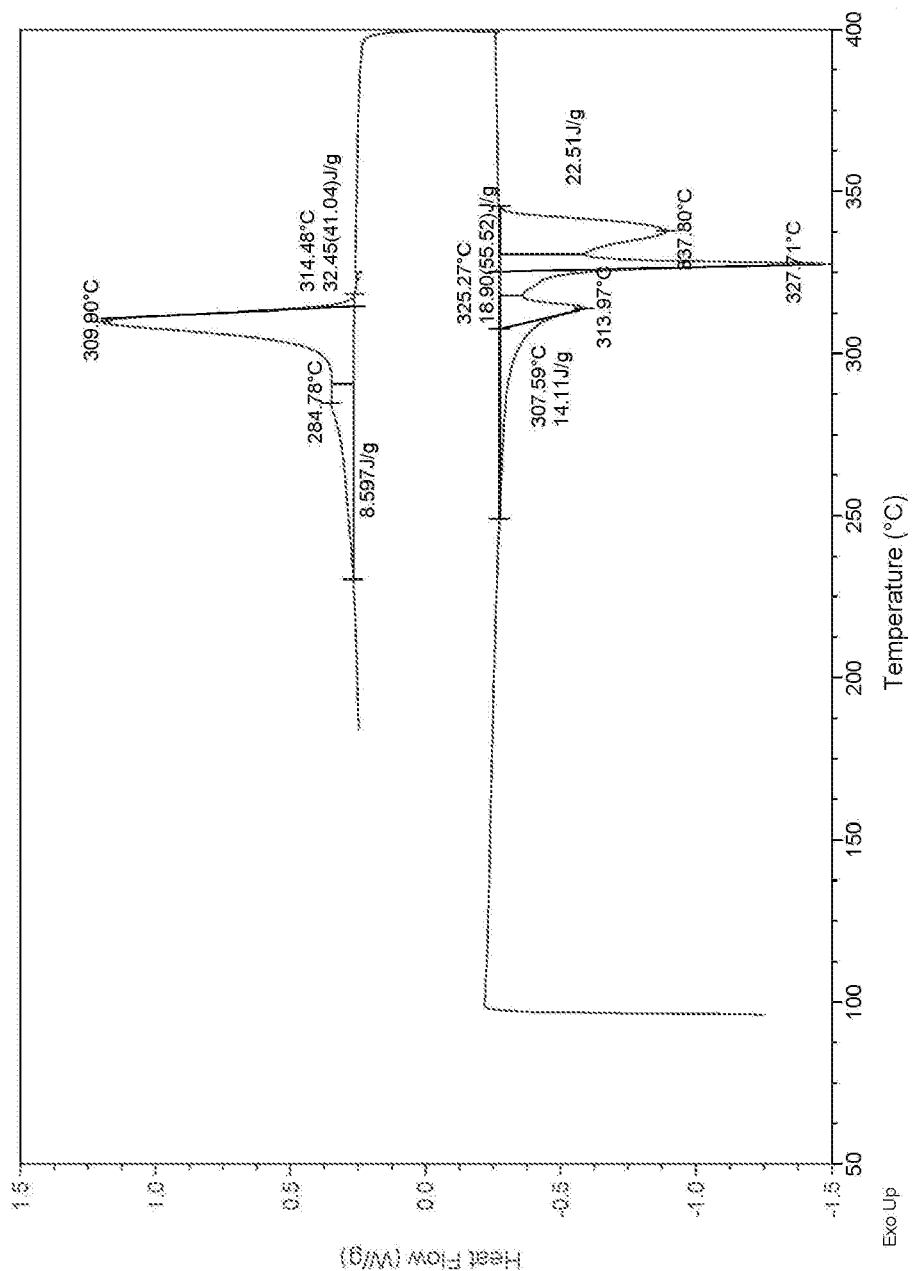
Figure 16:
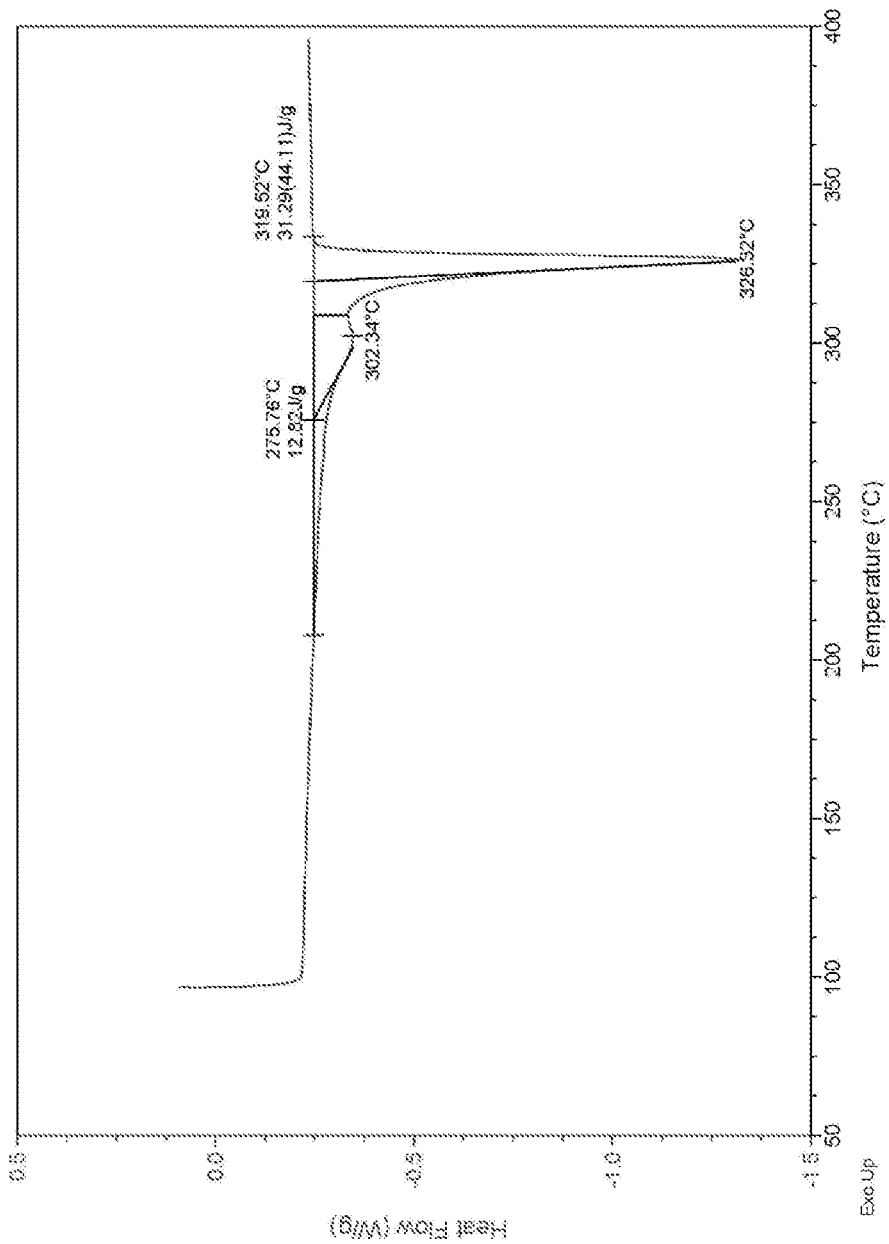
Figure 17:
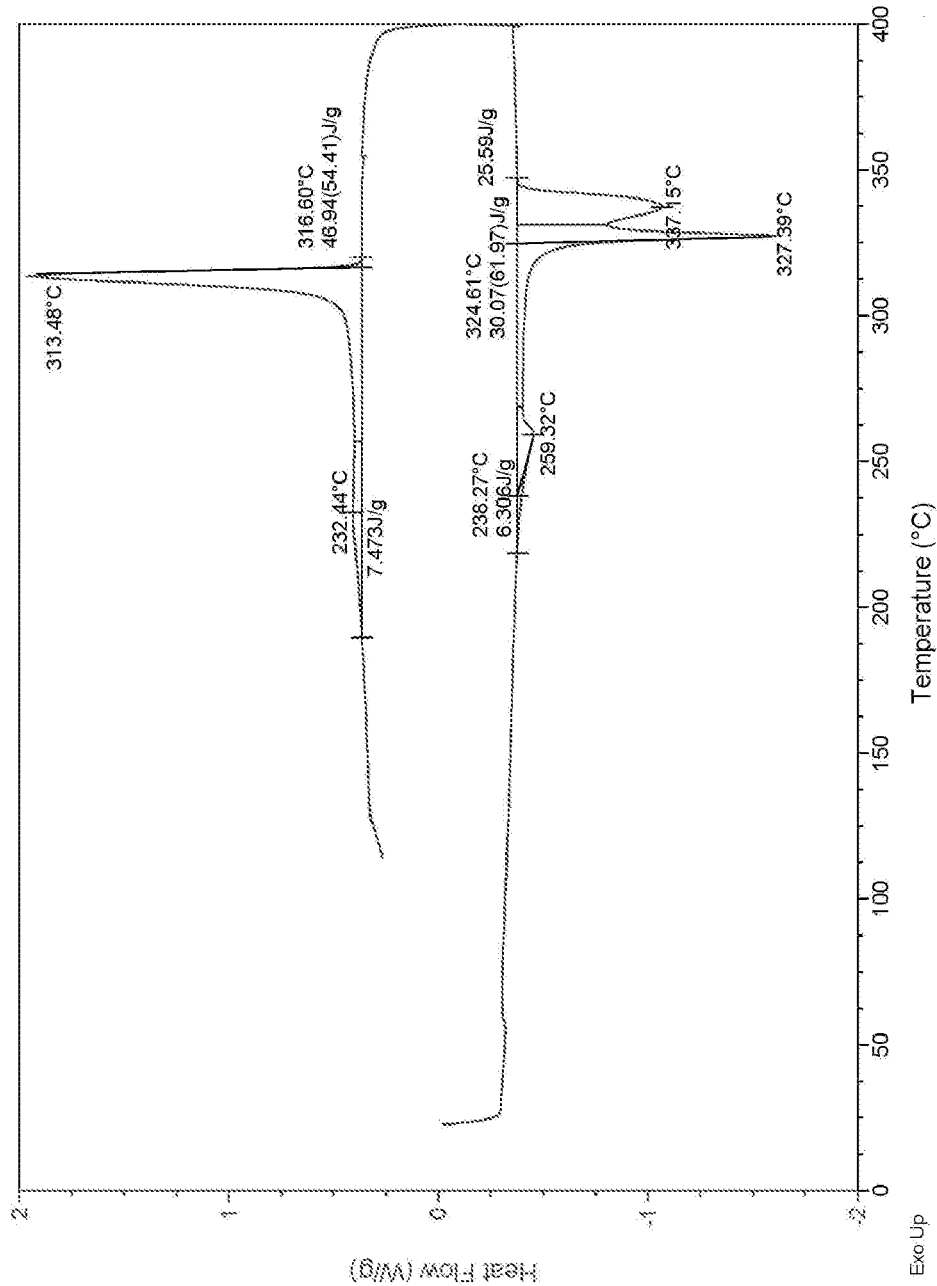
Figure 18:
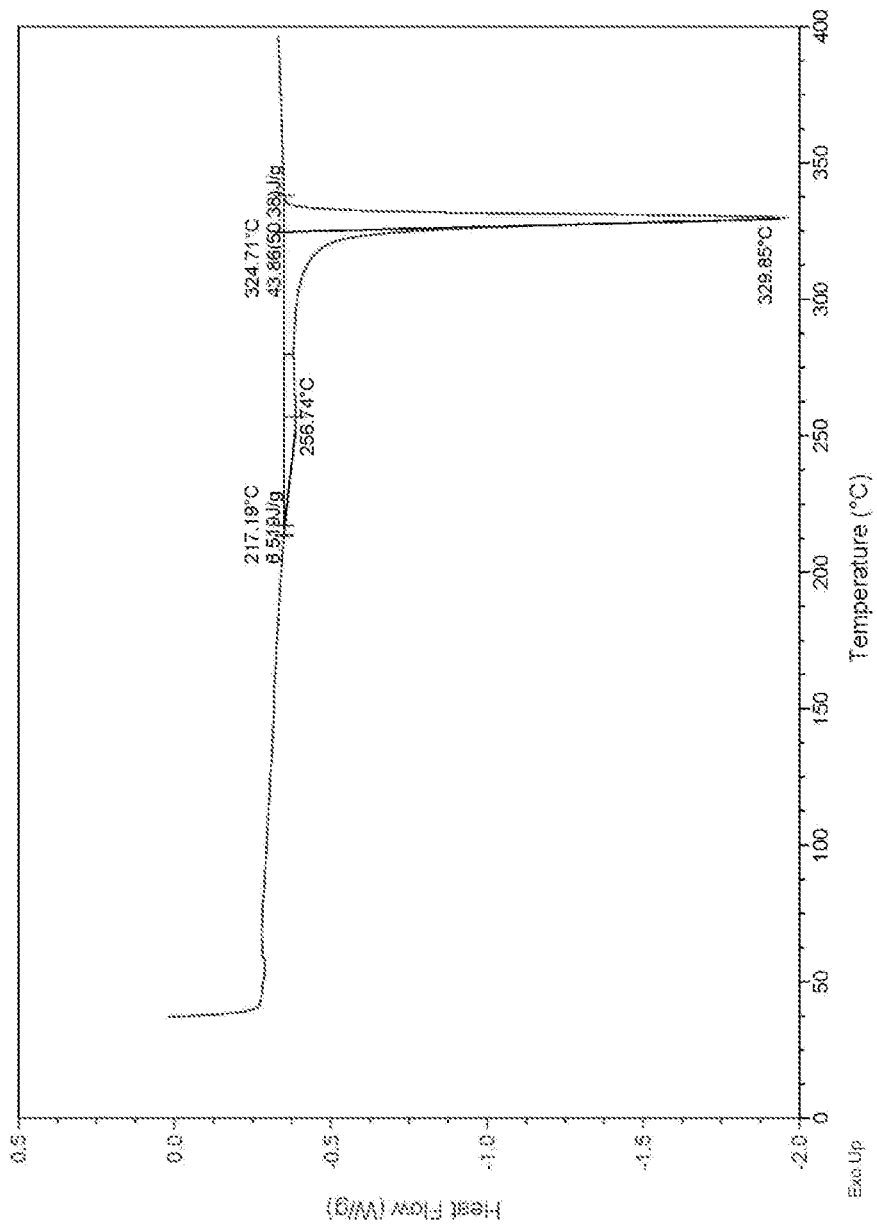

Closer examination of these plots reveals that, in most cases, traces of minor peaks associated with PFA and FEP can be found even for the 4-component blends during fusion and remelting, except for Run 31 (FIGS. 6-7). However, for 4-component blends in general, these minor peaks are very small (and absent in Run 31), indicating that these components have somehow become largely associated with the PTFE present in the blend. As mentioned above, such blends have been found to exhibit exceptional properties as shown in Table 12 above.

Table 12B summarizes the 4-component blends which yielded desirable properties as derived from the maximum observed values of Norm (Remelt, CA, Gloss, Hard)

TABLE 12B

Selected 4-Component Fluoropolymer Blends

| Run # | LPTFE | FEP | PFA | HPTFE | GLOSS | Contact Angle (CA) | PENCIL | Norm (CA, Gloss, Hard) | Norm (Remelt, CA, Gloss, Hard) |
|---|---|---|---|---|---|---|---|---|---|
| 31 | 0.24 | 0.08 | 0.08 | 0.6 | 55.1 | 136.39 | 4 | 0.82 | 0.85 |
| 22 | 0.24 | 0.18 | 0.18 | 0.4 | 48.4 | 138.65 | 2.7 | 0.76 | 0.81 |
| 23 | 0.36 | 0.12 | 0.12 | 0.4 | 44.9 | 139.02 | 4.4 | 0.81 | 0.79 |
| 26 | 0.4 | 0 | 0 | 0.6 | 54.5 | 133.43 | 0.1 | 0.62 | 0.71 |
| 30 | 0.16 | 0.12 | 0.12 | 0.6 | 51.7 | 134.05 | 3 | 0.73 | 0.65 |
| 21 | 0.6 | 0 | 0 | 0.4 | 54.3 | 134.71 | −3 | 0.5 | 0.62 |
| 20 | 0.6 | 0 | 0 | 0.4 | 48.4 | 135.48 | −3 | 0.48 | 0.61 |
| 3 | 0.4 | 0.3 | 0.3 | 0 | 54.2 | 131.65 | 3.3 | 0.73 | 0.6 |
| 4 | 0.4 | 0.3 | 0.3 | 0 | 66.7 | 129.12 | 3 | 0.75 | 0.6 |
| 19 | 0.6 | 0 | 0 | 0.4 | 52 | 132.03 | −3 | 0.46 | 0.59 |

From Table 12B it can be seen that the selected 4-component blends contain 16-60% LPTFE, 1-30% FEP, 1-30% PFA and 1-60% HPTFE or, more particularly, 16-60% LPTFE, 8-18% FEP, 8-18% PFA, and 40-60% HPTFE.

Run 31 is a remarkable combination of high gloss, contact angle and hardness.

Example 3

Coating Compositions and Application to a Flexible Substrate, e.g., Glasscloth

In this Example, coating compositions were made of blended fluoropolymers, including HPTFE, LPTFE, and two chemically different MPFs. These coating compositions were coated onto glasscloth over basecoats and/or midcoats, and the resulting coating systems were tested for abrasion resistance, release properties, and other properties in the remaining Examples.

The formulations of the basecoat and midcoats are set forth in Tables 13A and 13B, respectively, and are expressed as wet weight fractions whereas the topcoat components, set forth in Table 13C, are expressed as dry weight fractions, with one topcoat applied in each coating.

TABLE 13A

Basecoat Formulations

| Coating # | Substrate | Grade of Substrate | HPTFE | Water | Solids | # of passes |
|---|---|---|---|---|---|---|
| F(Controls A-D) | Glasscloth | 2116 | 0.5 | 0.5 | 30 | 2 |
| F(1)-F(44) | Glasscloth | 2116 | 0.5 | 0.5 | 30 | 2 |

TABLE 13B

Midcoat Formulations

| Coating # | HPTFE | Water | Solids | # of passes |
|---|---|---|---|---|
| F(Controls A-D) | 0.92 | 0.08 | 50 | 2 |
| F(1)-F(44) | 0.92 | 0.08 | 50 | 2 |

TABLE 13C

Topcoat Formulations

| Coating # | Base Coat | Mid Coat | HPTFE | PFA | FEP | LPTFE | Gloss | Coating Weight |
|---|---|---|---|---|---|---|---|---|
| F(Control A) | PTFE | PTFE | 1 | 0 | 0 | 0 | 20.6 | 248 |
| F(Control B) | PTFE | PTFE | 1 | 0 | 0 | 0 | 15.8 | 280 |
| F(Control C) | PTFE | PTFE | 0 | 1 | 0 | 0 | 7.8 | 307 |
| F(Control D) | PTFE | PTFE | 0 | 0 | 0 | 1 | 18.9 | 293 |
| F(1) | PTFE | PTFE | 0.6 | 0.08 | 0.08 | 0.24 | 41.98 | 295 |
| F(2) | PTFE | PTFE | 0.4 | 0.18 | 0.18 | 0.24 | 31.29 | 291 |
| F(3) | PTFE | PTFE | 0.4 | 0.12 | 0.12 | 0.36 | 25.63 | 291 |
| F(4) | PTFE | PTFE | 0.6 | 0.12 | 0.12 | 0.16 | 44.08 | 290 |
| F(5) | PTFE | PTFE | 0.74 | 0.04 | 0.18 | 0.04 | 44.23 | 290 |
| F(6) | PTFE | PTFE | 0.662 | 0.118 | 0.18 | 0.04 | 39 | 290 |
| F(7) | PTFE | PTFE | 0.6 | 0.217 | 0.063 | 0.12 | 38.18 | 289 |
| F(8) | PTFE | PTFE | 0.84 | 0.1 | 0.02 | 0.04 | 41.38 | 292 |
| F(9) | PTFE | PTFE | 0.84 | 0.04 | 0.02 | 0.1 | 42.82 | 291 |
| F(10) | PTFE | PTFE | 0.701 | 0.122 | 0.137 | 0.04 | 41.83 | 289 |
| F(11) | PTFE | PTFE | 0.6 | 0.04 | 0.13 | 0.23 | 40.35 | 289 |
| F(12) | PTFE | PTFE | 0.749 | 0.191 | 0.02 | 0.04 | 42.9 | 290 |
| F(13) | PTFE | PTFE | 0.64 | 0.04 | 0.02 | 0.3 | 42.38 | 289 |
| F(14) | PTFE | PTFE | 0.666 | 0.04 | 0.07 | 0.224 | 43.05 | 290 |
| F(15) | PTFE | PTFE | 0.699 | 0.04 | 0.136 | 0.124 | 45.95 | 290 |
| F(16) | PTFE | PTFE | 0.675 | 0.115 | 0.02 | 0.19 | 44.22 | 294 |
| F(17) | PTFE | PTFE | 0.674 | 0.214 | 0.072 | 0.04 | 44.83 | 294 |
| F(18) | PTFE | PTFE | 0.77 | 0.04 | 0.075 | 0.115 | 46.43 | 298 |
| F(19) | PTFE | PTFE | 0.6 | 0.162 | 0.02 | 0.218 | 42.8 | 294 |
| F(20) | PTFE | PTFE | 0.6 | 0.04 | 0.18 | 0.18 | 45.25 | 297 |
| F(21) | PTFE | PTFE | 0.6 | 0.106 | 0.067 | 0.227 | 44.22 | 294 |
| F(22) | PTFE | PTFE | 0.84 | 0.04 | 0.02 | 0.1 | 49.42 | 292 |
| F(23) | PTFE | PTFE | 0.668 | 0.196 | 0.02 | 0.116 | 46.42 | 297 |
| F(24) | PTFE | PTFE | 0.6 | 0.08 | 0.02 | 0.3 | 42.02 | 297 |
| F(25) | PTFE | PTFE | 0.748 | 0.115 | 0.02 | 0.117 | 48.28 | 299 |
| F(26) | PTFE | PTFE | 0.6 | 0.28 | 0.02 | 0.1 | 43.7 | 298 |
| F(27) | PTFE | PTFE | 0.66 | 0.04 | 0.18 | 0.12 | 46.57 | 300 |
| F(28) | PTFE | PTFE | 0.84 | 0.04 | 0.08 | 0.04 | 52.08 | 299 |
| F(29) | PTFE | PTFE | 0.707 | 0.04 | 0.02 | 0.233 | 42.33 | 296 |
| F(30) | PTFE | PTFE | 0.774 | 0.113 | 0.073 | 0.04 | 49.92 | 293 |
| F(31) | PTFE | PTFE | 0.84 | 0.04 | 0.08 | 0.04 | 51.55 | 295 |
| F(32) | PTFE | PTFE | 0.765 | 0.04 | 0.02 | 0.175 | 47.65 | 295 |
| F(33) | PTFE | PTFE | 0.6 | 0.18 | 0.18 | 0.04 | 46.37 | 296 |
| F(34) | PTFE | PTFE | 0.6 | 0.28 | 0.08 | 0.04 | 46.38 | 296 |
| F(35) | PTFE | PTFE | 0.66 | 0.28 | 0.02 | 0.04 | 47.98 | 292 |
| F(36) | PTFE | PTFE | 0.74 | 0.04 | 0.18 | 0.04 | 50.82 | 296 |
| F(37) | PTFE | PTFE | 0.6 | 0.134 | 0.134 | 0.132 | 43.42 | 295 |
| F(38) | PTFE | PTFE | 0.64 | 0.04 | 0.02 | 0.3 | 41.92 | 293 |
| F(39) | PTFE | PTFE | 0.6 | 0.216 | 0.144 | 0.04 | 47.12 | 295 |
| F(40) | PTFE | PTFE | 0.6 | 0.107 | 0.18 | 0.113 | 45.02 | 298 |
| F(41) | PTFE | PTFE | 0.6 | 0.28 | 0.08 | 0.04 | 44.5 | 298 |
| F(42) | PTFE | PTFE | 0.84 | 0.1 | 0.02 | 0.04 | 51.17 | 298 |
| F(43) | PTFE | PTFE | 0.66 | 0.28 | 0.02 | 0.04 | 46.58 | 300 |
| F(44) | PTFE | PTFE | 0.6 | 0.04 | 0.06 | 0.3 | 39.9 | 301 |

The fluoropolymer components of the Topcoats were as follows:
PTFE (HPTFE)—Daikin D310, solids=60%.
PFA—du Pont PFA TE7224, Lot #-0804330005, Solids=58.6%).
FEP—du Pont FEP TE9568, solids=54.0%).
LPTFE—SFN-D, Chenguang, except that topcoat F(45) was made with Dyneon 9207 TF PTFE micropowder.

All of the coating compositions were mixed using a standard mixer under medium shear for 5-7 minutes. All mixed coatings were applied to glasscloth in the laboratory using draw down bars. The glasscloth substrate grades are set forth in Table 12A above, produced by PD Interglas Porcher Industries. The coated substrate is subjected to a flash off in laboratory box oven set at 260° C. (500° F.) for 2 minutes followed by curing in a laboratory box oven set at 400° C. (752° F.) for 2 minutes.

F(Control)A was a standard product produced using conventional PTFE dispersions by AFC (Advanced Flexible Composites) and no modifications or further coatings were applied to this sample. The basecoat, midcoat and PTFE of the topcoat of the control samples were all standard PTFE dispersions. F(Control B, C and D) were standard products produced using conventional PTFE dispersions by AFC (Advanced Flexible Composites) with one additional topcoat as detailed in Table 13C.

Example 3A

Determination of Roughness, Gloss, and Contact Angle

In this Example, roughness, gloss, and contact angle of the coatings were determined The test protocols are as follows.

Roughness. A stylus type surface roughness detector equipped with an analyzer that provides a tracing of the surface was used according to EN ISO 13565, such as the following: Mitutoyo Surliest 402 surface roughness detector and analyzer, available from Mitutoyo Canada, 2121 Meadowvale Blvd, Mississauga, Toronto, Ontario, ON L5N 5N1, and Perthometer M2P/M3P/M4P surface roughness detector and analyzer (Mahr GmbH—Carl-Mahr-Str.1, D-37073 Göttingen, Germany). These instruments measure Ra (arithmetic mean deviation of the roughness profile, measured in microns) and Pc (peak count). The procedure is as follows. First, prepare the sample to be measured. Due to the configuration of most detectors this may require cutting the sample to obtain a flat surface accessible to the detector. Set the detector roughness range to the level just higher than the expected roughness to be measured. Set the length of trace, scale magnification and measurement units (English or metric). Calibrate the detector according to the manufacturer's instructions using a known reference standard. In the same manner, measure the roughness of the sample surface. Make at least 6 measurements, Gloss. Gloss measurements were attained using a Mini-glossmeter 11.0V 20°-60°, available from Sheen Instruments, at an angle of 60°. The gloss meter conformed to the following standards: BS3900/D5, DIN EN ISO 2813, DIN 67530, EN ISO 7668, ASTM D523, ASTM D1455, ASTM C346, ASTM C584, ASTM D2457, JIS Z 8741, MFT 30064, TAPPI T 480. Units of measurement are expressed as % reflectance.

Contact Angle. Contact angle was measured for a water droplet and is expressed in degrees, as determined according to ASTM D7334-08 using the "Drop Shape Analysis" system (DSA10), available from Kruss GmbH of Hamburg, Germany, according to the Young Relation.

The results are set forth in Table 14 below:

TABLE 14

Roughness, Gloss and Contact Angle

| Formula | RA | Gloss | CA- Water |
|---|---|---|---|
| F(Control A) | 2.42 | 20.6 | — |
| F(Control B) | 1.37 | 15.8 | — |
| F(Control C) | 2.79 | 7.8 | |
| F(Control D) | 0.77 | 18.9 | |
| F(1) | 0.7 | 41.98 | |
| F(2) | 0.58 | 31.29 | |
| F(3) | 0.6 | 25.63 | |
| F(4) | 0.48 | 44.08 | |
| F(5) | 0.47 | 44.23 | |
| F(6) | 0.49 | 39 | 104.88 |
| F(7) | 0.41 | 38.18 | 100.86 |
| F(8) | 0.45 | 41.38 | 104.93 |
| F(9) | 0.54 | 42.82 | 105.4 |
| F(10) | 0.48 | 41.83 | 101.97 |
| F(11) | 0.52 | 40.35 | 107.71 |
| F(12) | 0.5 | 42.9 | 106.71 |

TABLE 14-continued

Roughness, Gloss and Contact Angle

| Formula | RA | Gloss | CA- Water |
|---|---|---|---|
| F(13) | 0.5 | 42.38 | 104.11 |
| F(14) | 0.53 | 43.05 | 104.69 |
| F(15) | 0.51 | 45.95 | 104.3 |
| F(16) | 0.49 | 44.22 | 104.26 |
| F(17) | 0.63 | 44.83 | 103.27 |
| F(18) | 0.52 | 46.43 | 107.57 |
| F(19) | 0.48 | 42.8 | 107.5 |
| F(20) | 0.51 | 45.25 | 103.38 |
| F(21) | 0.54 | 44.22 | 104.75 |
| F(22) | 0.66 | 49.42 | 105.36 |
| F(23) | 0.64 | 46.42 | 104.82 |
| F(24) | 0.63 | 42.02 | 107.07 |
| F(25) | 0.56 | 48.28 | 104.85 |
| F(26) | 0.49 | 43.7 | 102.88 |
| F(27) | 0.65 | 46.57 | 105.8 |
| F(28) | 0.4 | 52.08 | 113.81 |
| F(29) | 0.54 | 42.33 | 106.04 |
| F(30) | 0.48 | 49.92 | 112.42 |
| F(31) | 0.52 | 51.55 | 103.38 |
| F(32) | 0.44 | 47.65 | 106.37 |
| F(33) | 0.45 | 46.37 | 109.3 |
| F(34) | 0.55 | 46.38 | 109.54 |
| F(35) | 0.51 | 47.98 | 109.49 |
| F(36) | 0.45 | 50.82 | 108.84 |
| F(37) | 0.49 | 43.42 | 106.58 |
| F(38) | 0.47 | 41.92 | 110.26 |
| F(39) | 0.54 | 47.12 | 107.65 |
| F(40) | 0.6 | 45.02 | 108.77 |
| F(41) | 0.61 | 44.5 | 107.11 |
| F(42) | 0.44 | 51.17 | 113.48 |
| F(43) | 0.5 | 46.58 | 111.26 |
| F(44) | 0.49 | 39.9 | 108.15 |

The results in Table 14 above show a significant improvement in smoothness, an increase in gloss, and an increase in the contact angle of water over the control topcoats for coating compositions made in accordance with the first and second embodiments of the present invention when applied to flexible glass substrates.

Example 3B

Reciprocating Abrasion Test

A reciprocating abrasion test (RAT) was conducted on each coating under the test protocol set forth at the end of this Example. The results are set forth in Table 15 below:

TABLE 15

Reciprocating abrasion test (RAT)

| Formula | RAT Ambient initial | RAT ambient 10% |
|---|---|---|
| F(Control A) | 2000 | 4000 |
| F(Control B) | 2000 | 5000 |
| F(Control C) | 9000 | 14000 |
| F(Control D) | 5000 | 11000 |
| F(1) | 9000 | 13000 |
| F(2) | 10000 | 15000 |
| F(3) | 6000 | 11000 |
| F(4) | 6000 | 9000 |
| F(5) | 5000 | 10000 |
| F(6) | 6000 | 9000 |
| F(7) | 8000 | 12000 |
| F(8) | 16000 | 20000 |
| F(9) | 7000 | 11000 |
| F(10) | 12000 | 17000 |
| F(11) | 12000 | 17000 |
| F(12) | 5000 | 8000 |

TABLE 15-continued

Reciprocating abrasion test (RAT)

| Formula | RAT Ambient initial | RAT ambient 10% |
|---|---|---|
| F(13) | 10000 | 14000 |
| F(14) | 4000 | 9000 |
| F(15) | 17000 | 22000 |
| F(16) | 6000 | 10000 |
| F(17) | 8000 | 15000 |
| F(18) | 6000 | 8000 |
| F(19) | 5000 | 9000 |
| F(20) | 8000 | 10000 |
| F(21) | 5000 | 8000 |
| F(22) | 4000 | 8000 |
| F(23) | 8000 | 17000 |
| F(24) | 6000 | 11000 |
| F(25) | 6000 | 11000 |
| F(26) | 6000 | 9000 |
| F(27) | 13000 | 16000 |
| F(28) | 9000 | 19000 |
| F(29) | 6000 | 11000 |
| F(30) | 7000 | 12000 |
| F(31) | 3000 | 8000 |
| F(32) | 6000 | 11000 |
| F(33) | 5000 | 10000 |
| F(34) | 8000 | 13000 |
| F(35) | 15000 | 22000 |
| F(36) | 10000 | 14000 |
| F(37) | 10000 | 17000 |
| F(38) | 3000 | 5000 |
| F(39) | 3000 | 6000 |
| F(40) | 3000 | 6000 |
| F(41) | 6000 | 9000 |
| F(42) | 9000 | 11000 |
| F(43) | 14000 | 20000 |
| F(44) | 4000 | 10000 |

The results in the table above show that there is up to 300% improvement in linear abrasion resistance over the control topcoat A with the topcoats made in accordance with the first and second embodiments of the present invention when applied to flexible glass substrates.

Reciprocating Abrasion Rest (RAT).

The reciprocating abrasion test was conducted based on the complete protocol set forth below with the following modifications: (1) the coated sample were tested until 10% exposure of substrate; (2) the test was performed using a 3kg weight at ambient temperature; and (3) the Scotchbrite 3M (7447) pads were changed every 1000 cycles.

The complete test protocol is as follows:

Scope. This test measures the resistance of coatings to abrasion by a reciprocating Scotch-Brite pad. The test subjects coating abrasion in a back and forth motion. The test is a measure of the useful life of coatings that have been subjected to scouring and other similar forms of damage caused by cleaning. TM 135C is specific to a test apparatus built by Whitford Corporation of West Chester, Pa. However, it is applicable to similar test methods such as the one described in British Standard 7069-1988.

Equipment and Materials.

(1) A test machine capable of holding a Scotch-Brite abrasive pad of a specific size to the surface to be tested with a fixed force and capable of moving the pad in a back and forth (reciprocating) motion over a distance to 10-15 cm (4 to 6 inches). The force and motion are applied by a free falling, weighted stylus. The machine must be equipped with a counter, preferably one that may be set to shut off after a given number of cycles.

(2) Scotch-Brite pads of required abrasiveness cut to required size. Scotch-Brite pads are made by 3M Company, Abrasive Systems Division, St Paul, Minn. 55144-1000. Pads come in grades with varying levels of abrasiveness as follows:
Lowest—7445, 7448, 6448, 7447, 6444, 7446, 7440, 5440—Highest Scotch-Brite pads may be used at temperatures up to 150° C. (300° F.). Equivalent pads may be used.

(3) Hot plate to heat test specimens. (Optional)

(4) Detergent solution or oil for performing test in with a liquid. (Optional)

Procedure.

Before beginning the test, the end point must be defined. Usually, the end point is defined when some amount of substrate has been exposed. However, the end point may be defined as a given number of strokes even if substrate is not exposed. The present inventors use a 1.0% exposure of substrate over the abraded area as the standard definition of end point. Other end points may be used.

Secure the part to be tested under the reciprocating pad. The part must be firmly fastened with bolts, clamps or tape. The part should be as flat as possible and long enough so that the pad does not run off an edge. Bumps in the surface will wear first, and overrunning an edge can tear the pad and cause premature scratching and a false result.

Cut a piece of Scotch Brite of required abrasiveness to the exact size of the "foot" of the stylus. The present inventors use Grade 7447 as standard, and the "foot" of the stylus on the test machine is 5 cm (2 inches) in diameter. Attach the pad to the bottom of the "foot." The Scotch-Brite pad is fixed to the "foot" by means of a piece of "Velcro" glued to the bottom of the foot.

If the machine has an adjustable stroke length, set the required length. The present inventors use a 10 cm (4 inch) stroke length as standard. Lower the pad onto the surface of the piece to be tested. Make sure that the weight is completely free. The present inventors used a 3.0 Kg weight as standard, but this can be varied.

If the machine is equipped with a counter, set the counter to the required number of strokes. One stroke is a motion in one direction. If the machine does not have an automatic counter, the counter must be watched so that the machine can be turned off at the proper time. The machine is stopped at various intervals to change the abrasive pad. The abrasiveness of the pad changes (usually becomes less effective) as the pad fills with debris. The present inventors changed pads at intervals of 1,000 strokes. One thousand strokes is the preferred interval between pad changes.

Start the test machine. Allow to run until an end point is reached or until a required number of strokes are attained before changing the pad.

Inspect the test piece carefully at the beginning and end of each start up. As the end point is approached, the substrate will begin to show through the coating. When close to the end point, observe the test piece constantly. Stop the machine when the end point has been reached.

Evaluation.

Record the following for the test machine:
1. Grade and size of Scotch-Brite pad.
2. Load on stylus
3. Number of strokes between pad changes.
4. Length of stroke.
5. Definition of end point.
6. Number of strokes to end point.

Duplicate tests provide greater reliability. Indicate if end point is a single result or the average of several results.

Record the description of the coating, the film thickness, and the substrate and surface preparation.

If the test is conducted to a specific number of strokes, record the number of strokes. Record a description of the amount of wear, such as percent of substrate exposed, or number of strokes to first substrate exposure. Optionally, record the film thickness and/or weight before and after testing.

If the test is performed at elevated temperature, record the temperature of the test. If performed with a liquid, record the specifics of the liquid.

Comments/Precautions.

Both sides of a Scotch-Brite pad may be used. Pads must be cut precisely to fit the "foot." Ragged edges or rough spots on the pad will give false results. Test pieces must be flat and free from dirt or other particles. This test method is similar to the abrasion test described in BS 7069:1988, Appendix A1. When tested according to BS 7069, test pieces are immersed in 50 cm$^3$ of a 5 g/liter solution of household dish washing detergent in water. The test runs for 250 cycles with pads changed every 50 cycles.

Example 3C

Taber Reciprocating Abrasion Test

A Taber reciprocating abrasion test was conducted according to ASTM D3389 under the following conditions: (1) the test was completed on a Taber 5135 Abraser using the weight loss method; (2) resilient Calibrase wheels H-18 were used with a 250 g load on each abraser arm, and the wheels were resurfaced every 1000 cycles; and (3) the Taber Wear Index was calculated as:

$$TWI = Wt(loss)mg/\# \text{ of cycles}$$

Taber tests generally involve mounting a specimen (typically less than 12.5 mm thickness) to a turntable platform that rotates at a fixed speed. Two abrasive wheels, which are applied at a specific pressure, are lowered onto the specimen surface. As the turntable rotates, the wheels are driven by the sample in opposite directions about a horizontal axis displaced tangentially from the axis of the sample. One abrading wheel rubs the specimen outward toward the periphery and the other, inward toward the centre while a vacuum system removes loose debris during testing.

The results are set forth in Table 16 below:

TABLE 16

Taber reciprocating abrasion test

| Formula | TWI 1000 | TWI 2000 | TWI 3000 |
|---|---|---|---|
| F(Control A) | 21 | 20 | 23 |
| F(Control B) | 11 | 10.5 | 10 |
| F(Control C) | 16 | 13.5 | 12.3 |
| F(Control D) | 27 | 20 | 18.3 |
| F(1) | 11 | 16.5 | 15.3 |
| F(2) | 8 | 15.5 | 16.3 |
| F(3) | 10 | 15.5 | 17.3 |
| F(4) | 20 | 23.5 | 19.3 |
| F(5) | 48 | 41.3 | 39 |
| F(6) | 33 | 48 | 47.1 |
| F(7) | 41 | 42.5 | 53.1 |
| F(8) | 23 | 29.5 | 28.7 |
| F(9) | 15 | 12.5 | 15.3 |
| F(10) | 26 | 28 | 31.3 |
| F(11) | 24 | 25 | 27 |
| F(12) | 50 | 27 | 24.3 |

TABLE 16-continued

Taber reciprocating abrasion test

| Formula | TWI 1000 | TWI 2000 | TWI 3000 |
|---|---|---|---|
| F(13) | 19 | 28 | 36 |
| F(14) | 20 | 23 | 30 |
| F(15) | 29 | 46.5 | 38.3 |
| F(16) | 24 | 26 | 35.3 |
| F(17) | 24 | 28 | 40.7 |
| F(18) | 25 | 23 | 32.7 |
| F(19) | 20 | 23 | 29.7 |
| F(20) | 23 | 22.5 | 29.7 |
| F(21) | 25 | 24 | 34 |
| F(22) | 30 | 20 | 26.3 |
| F(23) | 18 | 17 | 26.7 |
| F(24) | 20 | 16.5 | 28.7 |
| F(25) | 23 | 16.5 | 28 |
| F(26) | 16 | 16 | 27 |
| F(27) | 17 | 19.5 | 29.7 |
| F(28) | 37 | 2.2 | 27 |
| F(29) | 36 | 20 | 26.7 |
| F(30) | 46 | 24.5 | 30 |
| F(31) | 31 | 19.5 | 28 |
| F(32) | 138 | 107 | — |
| F(33) | 24 | 26 | 27.7 |
| F(34) | 13 | 21 | 24.7 |
| F(35) | 11 | 20.5 | 18 |
| F(36) | 39 | 24 | 24.3 |
| F(37) | 49 | 28 | 22 |
| F(38) | 15 | 25 | 24 |
| F(39) | 15 | 23 | 22 |
| F(40) | 15 | 22.5 | 20.3 |
| F(41) | 23 | 24.5 | 20 |
| F(42) | 25 | 27 | 24.7 |
| F(43) | 32 | 27 | 25 |
| F(44) | 31 | 34 | 30.7 |

The results in Table 16 above show that there is a reduction in the Taber Wear Index with the topcoats made in accordance with the first and second embodiments of the present invention when applied to flexible glass substrates, indicating an improvement in cross directional abrasion resistance over the control topcoats.

Example 3D

Cooking Release Tests

Cooking release tests were conducted in accordance with the protocols below for cookie dough, pizza dough, chicken leg, and egg. The results were graded from 1-5 (1-cannot remove, 5-excellent release with no residue and no staining).

Cookie dough. Small round piece (approximately 5 cm diameter) of dough placed centrally on coated substrate and cooked for 12 nuns at 160° C., allowed to cool for 5 mins. Release evaluated including ease of release, residue and staining.

Pizza Dough. Small round piece (approximately 5 cm diameter) of dough placed centrally on coated substrate and cooked for 12 mins at 160° C., allowed to cool for 5 mins. Release evaluated including ease of release, residue and staining.

Chicken Leg. One chicken leg placed centrally on coated substrate and cooked for 30 mins at 225° C., allowed to cool for 5 mins. Release evaluated including ease of release, residue and staining.

The results are set forth in Table 17 below:

TABLE 17

Cooking Release Tests

| Formula | Release Cookie | Release Pizza | Release Chicken |
|---|---|---|---|
| F(Control A) | 3 | 3 | 2 |
| F(Control B) | 3 | 3 | 2 |
| F(Control C) | 3 | 3 | 3 |
| F(Control D) | 3 | 3 | 3 |
| F(1) | 4 | 4 | 3 |
| F(2) | 3 | 3 | 3 |
| F(3) | 3 | 3 | 3 |
| F(4) | 5 | 5 | 4 |
| F(5) | 4 | 5 | 4 |
| F(6) | 5 | 5 | 5 |
| F(7) | 5 | 5 | 5 |
| F(8) | 4 | 5 | 4 |
| F(9) | 4 | 4 | 4 |
| F(10) | 4 | 5 | 4 |
| F(11) | 5 | 5 | 5 |
| F(12) | 4 | 5 | 4 |
| F(13) | 5 | 5 | 5 |
| F(14) | 5 | 5 | 5 |
| F(15) | 4 | 4 | 3 |
| F(16) | 4 | 4 | 4 |
| F(17) | 5 | 5 | 4 |
| F(18) | 4 | 5 | 4 |
| F(19) | 4 | 5 | 4 |
| F(20) | 3 | 3 | 3 |
| F(21) | 4 | 4 | 3 |
| F(22) | 3 | 4 | 3 |
| F(23) | 3 | 4 | 3 |
| F(24) | 3 | 4 | 3 |
| F(25) | 3 | 3 | 2 |
| F(26) | 4 | 5 | 5 |
| F(27) | 3 | 4 | 4 |
| F(28) | 4 | 5 | 4 |
| F(29) | 5 | 5 | 5 |
| F(30) | 5 | 5 | 5 |
| F(31) | 3 | 3 | 2 |
| F(32) | 4 | 4 | 4 |
| F(33) | 3 | 4 | 3 |
| F(34) | 3 | 3 | 3 |
| F(35) | 4 | 5 | 5 |
| F(36) | 3 | 4 | 4 |
| F(37) | 3 | 3 | 3 |
| F(38) | 4 | 4 | 4 |
| F(39) | 4 | 4 | 3 |
| F(40) | 4 | 4 | 4 |
| F(41) | 3 | 4 | 3 |
| F(42) | 4 | 4 | 4 |
| F(43) | 4 | 3 | 3 |
| F(44) | 4 | 4 | 4 |

The results in the table above show that there is an improvement in the release, reduction in staining, and ease of cleaning characteristics for all types of food tested over the control topcoats with the topcoats made in accordance with the first and second embodiments of the present invention when applied to flexible glass substrates.

Example 3E

Light Transmission Test

A light transmission test was conducted using a TES 1334 light meter, available from TES Electronic Corp. of Taipei, Taiwan. Units of measurement are lux (lx).

Samples were secured on a frame 2 inches in front of a light box and the peak reading was measured. Light transmission is expressed as a percent (%) obtained by dividing the measured lx value for a coated sample by the measured lx value for an uncoated sample.

The results are set forth in Table 18 below:

TABLE 18

Light Transmission Test

| Formula | Reading - LUX |
|---|---|
| F(Control A) | 1.47 |
| F(Control B) | 0.31 |
| F(Control C) | 1.41 |
| F(Control D) | 1.97 |
| F(1) | 1.85 |
| F(2) | 1.88 |
| F(3) | 2.03 |
| F(4) | 1.98 |
| F(5) | 2.44 |
| F(6) | 1.64 |
| F(7) | 1.94 |
| F(8) | 1.85 |
| F(9) | 1.92 |
| F(10) | 1.78 |
| F(11) | 2.04 |
| F(12) | 1.97 |
| F(13) | 2.07 |
| F(14) | 2.12 |
| F(15) | 2.64 |
| F(16) | 1.78 |
| F(17) | 2.03 |
| F(18) | 2.74 |
| F(19) | 2.28 |
| F(20) | 1.99 |
| F(21) | 2.08 |
| F(22) | 1.92 |
| F(23) | 1.78 |
| F(24) | 1.97 |
| F(25) | 2.05 |
| F(26) | 1.99 |
| F(27) | 2.15 |
| F(28) | 2.14 |
| F(29) | 1.91 |
| F(30) | 2.12 |
| F(31) | 1.84 |
| F(32) | 2.09 |
| F(33) | 1.84 |
| F(34) | 2.21 |
| F(35) | 2.04 |
| F(36) | 2.51 |
| F(37) | 2.13 |
| F(38) | 2.24 |
| F(39) | 1.92 |
| F(40) | 1.89 |
| F(41) | 2.01 |
| F(42) | 2.16 |
| F(43) | 1.88 |
| F(44) | 2.32 |

Table 18 shows that there is an increase in light transmission versus the control topcoats with the topcoats made in accordance with the first and second embodiments of the present invention when applied to flexible glass substrates.

Example 3F

Adhesion Test

Adhesion tests were conducted under the following conditions: (1) the test was completed on a Lloyd LRX Tensometer; (2) Samples 25 mm wide, 200 mm in length are prepared by sealing 2 strips of fabric with PFA film (temperature 375° C., 25 seconds).

The test is conducted at a speed of 100 mm/min for a distance of 25 mm. An average reading of 3 measurements are quoted, and the units of measurement are lbs/f.

The results are set forth in Table 19 below:

TABLE 19

| Formula | Adhesion test | |
|---|---|---|
| | Instantaneous Force (lbf) | Kinetic Force (lbf) |
| F(Control A) | 4.32 | 2.29 |
| F(Control B) | 5.93 | 4.77 |
| F(Control C) | 5.09 | 4.23 |
| F(Control D) | 4.48 | 4.32 |
| F(1) | — | — |
| F(2) | — | — |
| F(3) | 6.05 | 2.81 |
| F(4) | 5.07 | 2.26 |
| F(5) | 5.34 | 4.75 |
| F(6) | 5.17 | 3.72 |
| F(7) | 5.21 | 3.68 |
| F(8) | 4.61 | 4.63 |
| F(9) | 5.49 | 2.38 |
| F(10) | 5.17 | 2.78 |
| F(11) | 5.57 | 4.87 |
| F(12) | 3.51 | 3.53 |
| F(13) | 4.85 | 4.69 |
| F(14) | 5.15 | 4.96 |
| F(15) | 5.25 | 4.44 |

TABLE 19-continued

| Formula | Adhesion test | |
|---|---|---|
| | Instantaneous Force (lbf) | Kinetic Force (lbf) |
| F(16) | 3.53 | 3.96 |
| F(17) | 2.96 | 3.32 |
| F(18) | 3.03 | 5.64 |
| F(19) | 5.03 | 3.91 |
| F(20) | 2.44 | 4.11 |
| F(21) | 3.21 | 1.69 |
| F(22) | 5.21 | 3.2 |
| F(23) | 4.47 | 4.6 |
| F(24) | 6.02 | 4.13 |
| F(25) | 5.57 | 3.07 |
| F(26) | 4.79 | 4.19 |
| F(27) | 3.51 | 3.64 |
| F(28) | 3.42 | 3.74 |
| F(29) | 3.33 | 2.74 |
| F(30) | 2.65 | 4.03 |
| F(31) | 5.23 | 2.96 |
| F(32) | 4.91 | 5.2 |
| F(33) | 5.51 | 1.68 |
| F(34) | 4.74 | 4.12 |

TABLE 19-continued

| Formula | Adhesion test | |
|---|---|---|
| | Instantaneous Force (lbf) | Kinetic Force (lbf) |
| F(35) | 2.32 | 2.45 |
| F(36) | 3.31 | 4.02 |
| F(37) | 5.43 | 3.23 |
| F(38) | 5.79 | 5.48 |
| F(39) | 5.46 | 3.1 |
| F(40) | 3.03 | 3.14 |
| F(41) | 4.38 | 5.13 |
| F(42) | 4.5 | 4.19 |
| F(43) | 4.06 | 3.61 |
| F(44) | 4.03 | 2.65 |

The results in Table 19 show that the adhesion properties of the control topcoats are either maintained or show a slight improvement in the present coating compositions when applied to flexible glass substrates, indicating that the addition of the coating compositions does not interfere with the adhesion of the coating to the substrate.

Finally Table 20 summarizes the 10 compositions which yielded desirable overall properties as glasscloth topcoats they are ordered from best to worst, the four controls are also listed; they have significantly worse overall properties.

TABLE 20

Selected 4-Component Glasscloth Coating Topcoat Formulations with Desirable Properties

| Run # | HPTFE | PFA | FEP | LPTFE | Norm abrasion | norm release | norm surface properties | Reading-LUX | norm adhesion | norm all |
|---|---|---|---|---|---|---|---|---|---|---|
| F(11) | 0.6 | 0.04 | 0.13 | 0.23 | 0.74 | 1 | 0.74 | 2.04 | 0.84 | 0.83 |
| F(13) | 0.64 | 0.04 | 0.02 | 0.3 | 0.64 | 1 | 0.66 | 2.07 | 0.72 | 0.76 |
| F(14) | 0.666 | 0.04 | 0.07 | 0.224 | 0.55 | 1 | 0.68 | 2.12 | 0.79 | 0.75 |
| F(4) | 0.6 | 0.12 | 0.12 | 0.16 | 0.62 | 1 | 0.89 | 1.98 | 0.44 | 0.74 |
| F(8) | 0.84 | 0.1 | 0.02 | 0.04 | 0.82 | 0.75 | 0.68 | 1.85 | 0.68 | 0.73 |
| F(5) | 0.74 | 0.04 | 0.18 | 0.04 | 0.45 | 0.75 | 0.9 | 2.44 | 0.79 | 0.72 |
| F(28) | 0.84 | 0.04 | 0.08 | 0.04 | 0.71 | 0.75 | 1 | 2.14 | 0.41 | 0.72 |
| F(30) | 0.774 | 0.113 | 0.073 | 0.04 | 0.58 | 1 | 0.94 | 2.12 | 0.34 | 0.71 |
| F(38) | 0.64 | 0.04 | 0.02 | 0.3 | 0.52 | 0.5 | 0.82 | 2.24 | 0.94 | 0.7 |
| F(1) | 0.6 | 0.08 | 0.08 | 0.24 | 0.75 | 0.5 | 0.82 | 1.85 | | 0.69 |
| F(Control C) | 0 | 0 | 0 | 1 | 0.63 | 0.17 | 0.55 | 1.97 | 0.62 | 0.49 |
| F(Control B) | 1 | 0 | 0 | 0 | 0.61 | 0 | 0.39 | 0.31 | 0.87 | 0.47 |
| F(Control D) | 0 | 1 | 0 | 0 | 0.78 | 0.17 | 0 | 1.41 | 0.69 | 0.41 |
| F(Control A) | 1 | 0 | 0 | 0 | 0.51 | 0 | 0.22 | 1.47 | 0.35 | 0.27 |

From Table 20 it is apparent that these selected 4-Component Fluoropolymer blends for glasscloth coating contain 60-84% HPTFE, 4-12% PFA, 2-18% FEP and 4-30% LPFFE yield the most desirable properties.

Example 4

Multiple Component Blends with Engineering Resins

In this example, coil topcoats were made and applied over conventional coil base coatings ("basecoats") to rigid substrates in the form of ECCS (Hi-Top Steel) panels. Topcoats formulated in accordance with the present invention were evaluated against control topcoats.

A. Description of the Basecoat.

It is well known in the art that the solvent based systems of polyether sulphone can be prepared by the dissolution of a granular PES polymer, such as RADEL A-704P, available from Advanced Polymers LLC in an NMP/solvent blend. The PES solution can then be formulated into a basecoat by the addition of various compositions.

The topcoat formulations were coated onto one of four basecoats (Basecoat A, Basecoat B, Basecoat C or Basecoat D), which were prepared as described above and formulated as set further in Table 21 below.

TABLE 21

Basecoat formulations

| COMPONENT | BASECOAT A % | BASECOAT B % | BASECOAT C % | BASECOAT D % |
|---|---|---|---|---|
| RESIN | 15 | 15 | 14 | 1.8 |
| SOLVENT | 66 | 67 | 74 | 98.2 |
| ADDITIVES | 16 | 14 | 4 | 0 |
| PTFE | 3 | 4 | 8 | 0 |

Test samples were prepared by drawing down Basecoat A, Basecoat B and Basecoat C onto pre-cleaned ECCS (Hi-Top Steel) panels, followed by heating in an oven at 400° C. for 30 seconds. Basecoat D was applied onto a cleaned rubber substrate through a spray application and left to air dry for 1 minute.

Topcoats E(control)1 through E(control)11, E1-E17, E19, E21-E51, E62, E64, E66-E75, E101 and E133 were applied over Basecoat A, Topcoats E18, E20, E76-E100, E102-E116, E131-E132 were applied over Basecoat B, Topcoats E52-E61, E63, E65, E117-E130, E134 and E135 over basecoat C, and Topcoats E136 and E137 were applied over Basecoat D.

B. Application of Topcoats.

Topcoats formulated as described below were applied to the test samples by drawing down with relevant K Bar (draw down bar). Typically, the coated panels were then cured for 90 seconds in an oven at 420° C. As applied, the dry film thickness (DFT) of the basecoat was approximately 6 microns, and that of the topcoats were approximately 6 microns, Example topcoats were made using combinations of fluoropolymer dispersions and a topcoat base. The fluoropolymer components of the topcoats included one or more of the following: one or more high molecular weight PTFE (HPTFE) dispersions, one or more melt processable fluoropolymer dispersions (MPF), and one or more low molecular weight PTFE (LPTFE) dispersions.

As defined in this Example, a "4-component" blend contains all of the following components as described above: at least one HPTFE, at least one LPTFE, and at least two chemically different MPFs. In this Example, the two MPFs employed are FEP and PEA. The blends in this Example were made by mixing aqueous dispersions of the components, and adding to a formulated "topcoat base" containing the engineering resin. The resulting "formulations" were then drawn down or sprayed as films, as indicated in Table 24 below, over a basecoat and tested for gloss, surface roughness, steak release, chicken release and stain resistance.

The formula for the topcoat base, used in each topcoat formulations of the present Example, is set forth below in Table 22:

TABLE 22

| Topcoat Base | |
|---|---|
| Component | Weight % |
| Engineering resin | 38.00 |
| Deionized water | 30.00 |
| Monoetheylene glycol | 30.00 |
| TX-100 | 1.4 |
| Foam Blast | 0.6 |

Per Table 23 below, a first set of topcoats, designated Topcoats "E Control 1" through "E Control 11", were formulated as controls using a Topcoat base and each fluoropolymer in dispersion form, as produced by dispersion polymerization or emulsion polymerization and which was not thereafter not agglomerated, irradiated, or thermally degraded. Additionally, both LPTFE dispersions and LPTFE micropowders have been evaluated. A second set of topcoats, designated Topcoats E1 through E137 below, were formulated as above using the Topcoat base described above and fluoropolymer dispersion blends formulated as set forth in Table 23 below.

TABLE 23

Topcoat Blends

| ID | EN. POLYMER | POLYMER SOLID % | HPTFE SOLIDS | PFA SOLIDS | FEP SOLIDS | LPTFE SOLIDS | SFN-D SOLIDS | 9205 Dyneon PTFE |
|---|---|---|---|---|---|---|---|---|
| EControl1 | PES | 32.90 | 7.63 | 0.00 | 0.00 | 0.00 | 0.00 | 0.00 |
| EControl2 | PES | 32.90 | 0.00 | 7.63 | 0.00 | 0.00 | 0.00 | 0.00 |
| EControl3 | PES | 32.90 | 0.00 | 0.00 | 7.63 | 0.00 | 0.00 | 0.00 |
| EControl4 | PES | 32.90 | 0.00 | 0.00 | 0.00 | 7.63 | 0.00 | 0.00 |
| EControl5 | PES | 32.90 | 0.00 | 0.00 | 0.00 | 0.00 | 0.00 | 7.63 |
| EControl6 | PES | 32.90 | 0.00 | 0.00 | 0.00 | 0.00 | 7.63 | 0.00 |
| EControl7 | PES | 32.90 | 0.00 | 0.00 | 0.00 | 0.00 | 7.63 | 0.00 |
| EControl8 | PES | 35.62 | 0.00 | 0.00 | 0.00 | 0.00 | 0.00 | 0.00 |
| EControl9 | PES | 32.90 | 4.62 | 0.92 | 0.84 | 0.00 | 0.00 | 1.22 |
| EControl10 | PEEK | 36.81 | 0.00 | 0.00 | 0.00 | 0.00 | 0.00 | 0.00 |
| EControl11 | PAI | 34.72 | 0.00 | 0.00 | 0.00 | 0.00 | 0.00 | 0.00 |
| E1 | PPS | 26.59 | 3.59 | 0.20 | 0.00 | 0.20 | 0.00 | 0.00 |
| E2 | PPS | 26.59 | 3.59 | 0.20 | 0.00 | 0.20 | 0.00 | 0.00 |
| E3 | PPS | 27.21 | 2.45 | 0.14 | 0.00 | 0.14 | 0.00 | 0.00 |
| E4 | PPS | 27.21 | 2.45 | 0.14 | 0.00 | 0.14 | 0.00 | 0.00 |
| E5 | PPS | 27.21 | 2.18 | 0.27 | 0.00 | 0.27 | 0.00 | 0.00 |
| E6 | PPS | 27.21 | 2.18 | 0.27 | 0.00 | 0.27 | 0.00 | 0.00 |
| E7 | PPS | 26.54 | 3.59 | 0.20 | 0.00 | 0.20 | 0.00 | 0.00 |
| E8 | PPS | 26.59 | 3.59 | 0.20 | 0.00 | 0.20 | 0.00 | 0.00 |
| E9 | PPS | 26.59 | 3.20 | 0.40 | 0.00 | 0.40 | 0.00 | 0.00 |

TABLE 23-continued

Topcoat Blends

| ID | EN. POLYMER | POLYMER SOLID % | HPTFE SOLIDS | PFA SOLIDS | FEP SOLIDS | LPTFE SOLIDS | SFN-D SOLIDS | 9205 Dyneon PTFE |
|---|---|---|---|---|---|---|---|---|
| E10 | PPS | 28.99 | 3.45 | 0.43 | 0.00 | 0.43 | 0.00 | 0.00 |
| E11 | PPS | 28.99 | 3.45 | 0.43 | 0.00 | 0.43 | 0.00 | 0.00 |
| E12 | PPS | 28.99 | 3.45 | 0.43 | 0.00 | 0.43 | 0.00 | 0.00 |
| E13 | PPS | 28.99 | 3.45 | 0.43 | 0.00 | 0.43 | 0.00 | 0.00 |
| E14 | PPS | 28.99 | 3.45 | 0.43 | 0.00 | 0.43 | 0.00 | 0.00 |
| E15 | PPS | 29.98 | 3.56 | 0.44 | 0.00 | 0.44 | 0.00 | 0.00 |
| E16 | PPS | 27.63 | 3.29 | 0.41 | 0.00 | 0.41 | 0.00 | 0.00 |
| E17 | PPS | 27.63 | 3.29 | 0.41 | 0.00 | 0.41 | 0.00 | 0.00 |
| E18 | PPS | 27.63 | 3.29 | 0.41 | 0.00 | 0.41 | 0.00 | 0.00 |
| E19 | PPS | 27.63 | 3.29 | 0.41 | 0.00 | 0.41 | 0.00 | 0.00 |
| E20 | PPS | 27.63 | 3.29 | 0.41 | 0.00 | 0.41 | 0.00 | 0.00 |
| E21 | PPS | 29.19 | 3.47 | 0.43 | 0.00 | 0.43 | 0.00 | 0.00 |
| E22 | PPS | 28.99 | 3.45 | 0.43 | 0.00 | 0.43 | 0.00 | 0.00 |
| E23 | PPS | 28.99 | 3.45 | 0.43 | 0.00 | 0.43 | 0.00 | 0.00 |
| E24 | PPS | 28.99 | 3.45 | 0.43 | 0.00 | 0.43 | 0.00 | 0.00 |
| E25 | PPS | 28.99 | 3.45 | 0.43 | 0.00 | 0.43 | 0.00 | 0.00 |
| E26 | PPS | 28.99 | 3.45 | 0.43 | 0.00 | 0.43 | 0.00 | 0.00 |
| E27 | PPS | 28.99 | 3.45 | 0.43 | 0.00 | 0.43 | 0.00 | 0.00 |
| E28 | PPS | 28.99 | 3.45 | 0.43 | 0.00 | 0.43 | 0.00 | 0.00 |
| E29 | PPS | 28.99 | 3.45 | 0.43 | 0.00 | 0.43 | 0.00 | 0.00 |
| E30 | PPS | 29.98 | 3.57 | 0.45 | 0.00 | 0.45 | 0.00 | 0.00 |
| E31 | PPS | 29.98 | 3.57 | 0.45 | 0.00 | 0.45 | 0.00 | 0.00 |
| E32 | PPS | 29.98 | 3.57 | 0.45 | 0.00 | 0.45 | 0.00 | 0.00 |
| E33 | PPS | 29.98 | 3.57 | 0.45 | 0.00 | 0.45 | 0.00 | 0.00 |
| E34 | PPS | 29.98 | 3.57 | 0.45 | 0.00 | 0.45 | 0.00 | 0.00 |
| E35 | PPS | 29.98 | 3.57 | 0.45 | 0.00 | 0.45 | 0.00 | 0.00 |
| E36 | PPS | 29.98 | 3.57 | 0.45 | 0.00 | 0.45 | 0.00 | 0.00 |
| E37 | PPS | 29.98 | 3.57 | 0.45 | 0.00 | 0.45 | 0.00 | 0.00 |
| E38 | PPS | 29.98 | 3.57 | 0.45 | 0.00 | 0.45 | 0.00 | 0.00 |
| E39 | PPS | 29.98 | 3.57 | 0.45 | 0.00 | 0.45 | 0.00 | 0.00 |
| E40 | PPS | 29.98 | 3.57 | 0.45 | 0.00 | 0.45 | 0.00 | 0.00 |
| E41 | PPS | 29.98 | 3.57 | 0.45 | 0.00 | 0.45 | 0.00 | 0.00 |
| E42 | PPS | 29.98 | 3.57 | 0.45 | 0.00 | 0.45 | 0.00 | 0.00 |
| E43 | PPS | 28.99 | 3.45 | 0.43 | 0.00 | 0.43 | 0.00 | 0.00 |
| E44 | PPS | 28.99 | 3.45 | 0.43 | 0.00 | 0.43 | 0.00 | 0.00 |
| E45 | PPS | 28.99 | 3.45 | 0.43 | 0.00 | 0.43 | 0.00 | 0.00 |
| E46 | PPS | 28.99 | 3.45 | 0.43 | 0.00 | 0.43 | 0.00 | 0.00 |
| E47 | PPS | 28.99 | 3.45 | 0.43 | 0.00 | 0.43 | 0.00 | 0.00 |
| E48 | PPS | 28.99 | 3.45 | 0.43 | 0.00 | 0.43 | 0.00 | 0.00 |
| E49 | PPS | 28.99 | 3.45 | 0.43 | 0.00 | 0.43 | 0.00 | 0.00 |
| E50 | PPS | 28.99 | 3.45 | 0.43 | 0.00 | 0.43 | 0.00 | 0.00 |
| E51 | PPS | 28.99 | 3.45 | 0.43 | 0.00 | 0.43 | 0.00 | 0.00 |
| E52 | PPS | 28.99 | 3.45 | 0.43 | 0.00 | 0.43 | 0.00 | 0.00 |
| E53 | PPS | 28.99 | 3.45 | 0.43 | 0.00 | 0.43 | 0.00 | 0.00 |
| E54 | PPS | 28.99 | 3.45 | 0.43 | 0.00 | 0.43 | 0.00 | 0.00 |
| E55 | PPS | 28.99 | 3.45 | 0.43 | 0.00 | 0.43 | 0.00 | 0.00 |
| E56 | PPS | 28.99 | 3.45 | 0.43 | 0.00 | 0.43 | 0.00 | 0.00 |
| E57 | PPS | 28.99 | 3.45 | 0.43 | 0.00 | 0.43 | 0.00 | 0.00 |
| E58 | PPS | 28.99 | 3.45 | 0.43 | 0.00 | 0.43 | 0.00 | 0.00 |
| E59 | PPS | 28.99 | 3.45 | 0.43 | 0.00 | 0.43 | 0.00 | 0.00 |
| E60 | PPS | 28.99 | 3.45 | 0.43 | 0.00 | 0.43 | 0.00 | 0.00 |
| E61 | PPS | 28.99 | 3.45 | 0.43 | 0.00 | 0.43 | 0.00 | 0.00 |
| E62 | PPS | 28.99 | 3.45 | 0.43 | 0.00 | 0.43 | 0.00 | 0.00 |
| E63 | PPS | 28.99 | 3.45 | 0.43 | 0.00 | 0.43 | 0.00 | 0.00 |
| E64 | PPS | 28.99 | 3.45 | 0.43 | 0.00 | 0.43 | 0.00 | 0.00 |
| E65 | PPS | 28.99 | 3.45 | 0.43 | 0.00 | 0.43 | 0.00 | 0.00 |
| E66 | PPS | 28.99 | 3.45 | 0.43 | 0.00 | 0.43 | 0.00 | 0.00 |
| E67 | PPS | 28.24 | 3.45 | 0.43 | 0.00 | 0.43 | 0.00 | 0.00 |
| E68 | PPS | 26.35 | 6.44 | 0.81 | 0.00 | 0.81 | 0.00 | 0.00 |
| E69 | PPS | 28.10 | 3.43 | 0.43 | 0.00 | 0.43 | 0.00 | 0.00 |
| E70 | PPS | 28.10 | 3.43 | 0.43 | 0.00 | 0.43 | 0.00 | 0.00 |
| E71 | PPS | 28.10 | 3.43 | 0.43 | 0.00 | 0.43 | 0.00 | 0.00 |
| E72 | PPS | 28.10 | 3.43 | 0.43 | 0.00 | 0.43 | 0.00 | 0.00 |
| E73 | PPS | 28.85 | 1.37 | 0.17 | 0.00 | 0.17 | 0.00 | 4.29 |
| E74 | PPS | 30.26 | 3.70 | 0.46 | 0.00 | 0.46 | 0.00 | 0.00 |
| E75 | PPS | 29.97 | 1.85 | 0.23 | 0.00 | 0.23 | 0.00 | 0.00 |
| E76 | PES | 32.90 | 3.66 | 0.46 | 0.00 | 0.46 | 0.00 | 0.00 |
| E77 | PES | 32.71 | 3.64 | 0.45 | 0.00 | 0.45 | 0.00 | 0.00 |
| E78 | PES | 32.39 | 3.61 | 0.45 | 0.00 | 0.45 | 0.00 | 0.00 |
| E79 | PES | 32.74 | 3.64 | 0.45 | 0.00 | 0.45 | 0.00 | 0.00 |
| E80 | PES | 34.09 | 3.79 | 0.47 | 0.00 | 0.47 | 0.00 | 0.00 |
| E81 | PES | 33.88 | 3.77 | 0.47 | 0.00 | 0.47 | 0.00 | 0.00 |
| E82 | PES | 33.55 | 3.73 | 0.46 | 0.00 | 0.46 | 0.00 | 0.00 |
| E83 | PES | 33.92 | 3.78 | 0.47 | 0.00 | 0.47 | 0.00 | 0.00 |

TABLE 23-continued

Topcoat Blends

| ID | EN. POLYMER | POLYMER SOLID % | HPTFE SOLIDS | PFA SOLIDS | FEP SOLIDS | LPTFE SOLIDS | SFN-D SOLIDS | 9205 Dyneon PTFE |
|---|---|---|---|---|---|---|---|---|
| E84 | PES | 32.90 | 3.66 | 0.46 | 0.00 | 0.46 | 0.00 | 0.00 |
| E85 | PES | 33.52 | 3.73 | 0.46 | 0.00 | 0.46 | 0.00 | 0.00 |
| E86 | PES | 33.52 | 3.73 | 0.46 | 0.00 | 0.46 | 0.00 | 0.00 |
| E87 | PES | 32.09 | 5.62 | 0.70 | 0.00 | 0.70 | 0.00 | 0.00 |
| E88 | PES | 32.09 | 5.62 | 0.70 | 0.00 | 0.70 | 0.00 | 0.00 |
| E89 | PES | 28.97 | 5.07 | 0.63 | 0.00 | 0.63 | 0.00 | 0.00 |
| E90 | PES | 29.36 | 5.14 | 0.64 | 0.00 | 0.64 | 0.00 | 0.00 |
| E91 | PES | 29.36 | 3.86 | 0.51 | 0.46 | 1.54 | 0.00 | 0.00 |
| E92 | PES | 29.36 | 2.57 | 1.16 | 1.04 | 1.54 | 0.00 | 0.00 |
| E93 | PES | 29.36 | 2.57 | 0.77 | 0.69 | 2.31 | 0.00 | 0.00 |
| E94 | PES | 31.59 | 1.75 | 0.52 | 0.47 | 1.57 | 0.00 | 0.00 |
| E95 | PES | 33.61 | 1.87 | 0.56 | 0.51 | 1.69 | 0.00 | 0.00 |
| E96 | PES | 33.61 | 2.80 | 0.56 | 0.50 | 0.75 | 0.00 | 0.00 |
| E97 | PES | 33.30 | 1.85 | 0.56 | 0.50 | 1.67 | 0.00 | 0.00 |
| E98 | PES | 33.30 | 2.78 | 0.55 | 0.50 | 0.74 | 0.00 | 0.00 |
| E99 | PES | 33.38 | 2.79 | 0.56 | 0.50 | 0.74 | 0.00 | 0.00 |
| E100 | PES | 33.71 | 2.81 | 0.56 | 0.51 | 0.75 | 0.00 | 0.00 |
| E101 | PES | 33.71 | 2.81 | 0.56 | 0.51 | 0.75 | 0.00 | 0.00 |
| E102 | PEEK | 33.92 | 2.83 | 0.56 | 0.51 | 0.76 | 0.00 | 0.00 |
| E103 | PEEK | 33.92 | 2.83 | 0.56 | 0.51 | 0.76 | 0.00 | 0.00 |
| E104 | PPS | 28.99 | 2.59 | 0.52 | 0.46 | 0.69 | 0.00 | 0.00 |
| E105 | PPS | 28.99 | 2.59 | 0.52 | 0.46 | 0.69 | 0.00 | 0.00 |
| E106 | PPS | 30.77 | 2.75 | 0.55 | 0.50 | 0.73 | 0.00 | 0.00 |
| E107 | PPS | 30.77 | 2.75 | 0.55 | 0.50 | 0.73 | 0.00 | 0.00 |
| E108 | PPS | 32.90 | 2.75 | 0.55 | 0.50 | 0.73 | 0.00 | 0.00 |
| E109 | PPS | 32.90 | 1.83 | 0.55 | 0.50 | 1.65 | 0.00 | 0.00 |
| E110 | PPS | 28.99 | 1.73 | 0.52 | 0.46 | 1.55 | 0.00 | 0.00 |
| E111 | PPS | 28.99 | 1.73 | 0.52 | 0.46 | 1.55 | 0.00 | 0.00 |
| E112 | PPS | 30.77 | 1.83 | 0.55 | 0.50 | 1.65 | 0.00 | 0.00 |
| E113 | PPS | 30.77 | 1.83 | 0.55 | 0.50 | 1.65 | 0.00 | 0.00 |
| E114 | PEEK | 33.92 | 1.89 | 0.57 | 0.51 | 1.70 | 0.00 | 0.00 |
| E115 | PAI | 57.60 | 1.89 | 0.57 | 0.51 | 1.70 | 0.00 | 0.00 |
| E116 | PAI | 57.60 | 2.83 | 0.56 | 0.51 | 0.76 | 0.00 | 0.00 |
| E117 | PAI | 62.52 | 0.00 | 0.00 | 0.00 | 0.00 | 0.00 | 0.00 |
| E118 | PES | 33.37 | 2.78 | 0.55 | 0.50 | 0.74 | 0.00 | 0.00 |
| E119 | PES | 31.43 | 2.62 | 0.52 | 0.47 | 0.70 | 0.00 | 0.00 |
| E120 | PES | 32.37 | 2.70 | 0.54 | 0.48 | 0.72 | 0.00 | 0.00 |
| E121 | PES | 32.37 | 2.70 | 0.54 | 0.48 | 0.72 | 0.00 | 0.00 |
| E122 | PES | 34.02 | 3.40 | 0.62 | 0.56 | 0.57 | 0.00 | 0.00 |
| E123 | PES | 32.72 | 2.73 | 0.54 | 0.49 | 0.73 | 0.00 | 0.00 |
| E124 | PES | 32.03 | 2.78 | 0.55 | 0.50 | 0.74 | 0.00 | 0.00 |
| E125 | PES | 32.03 | 3.11 | 0.62 | 0.56 | 0.82 | 0.00 | 0.00 |
| E126 | PES | 32.30 | 2.83 | 0.56 | 0.51 | 0.76 | 0.00 | 0.00 |
| E127 | PES | 32.07 | 3.09 | 0.61 | 0.55 | 0.82 | 0.00 | 0.00 |
| E128 | PES | 31.75 | 3.06 | 0.61 | 0.55 | 0.81 | 0.00 | 0.00 |
| E129 | PES | 32.07 | 3.09 | 0.61 | 0.55 | 0.82 | 0.00 | 0.00 |
| E130 | PES | 31.92 | 3.07 | 0.61 | 0.55 | 0.81 | 0.00 | 0.00 |
| E131 | PAI | 32.03 | 2.78 | 0.55 | 0.50 | 0.00 | 0.00 | 0.00 |
| E132 | PAI | 33.37 | 2.78 | 0.55 | 0.50 | 0.00 | 0.00 | 0.00 |
| E133 | PES | 31.36 | 2.72 | 0.54 | 0.49 | 0.00 | 0.00 | 0.00 |
| E134 | PES | 30.70 | 2.66 | 0.53 | 0.48 | 0.00 | 0.00 | 0.00 |
| E135 | PES | 30.31 | 2.32 | 0.46 | 0.41 | 0.00 | 0.00 | 0.00 |
| E136 | FKM | 0.00 | 4.93 | 0.62 | 0.00 | 0.62 | 0.00 | 0.00 |
| E137 | FKM | 0.00 | 3.70 | 0.74 | 0.66 | 0.98 | 0.00 | 0.00 |

The fluoropolymer components of the Topcoats were as follows:

PTFE (HPTFE)—Daikin D310 (solids=60%).

PFA—du Pont PFA TE7224 (Lot #0804330005, solids=58.6%).

FEP—du Pont FEP TE9568 (solids=54.0%).

LPTFE—DuPont TE3887N (solids=55%, except that topcoats E(control)6 and E(control)7 were made with SFN-D, Chenguang (solids=25%) and topcoat E(control)5, E(control)9 and F73 was made with Dyneon 9205 PTFE micropowder).

Although not set forth in Table 23 above, Topcoat E75 additionally included 3.57 wt. % TF-1750, a granular HPTFE available from Dyneon LLC.

Test samples were prepared using the engineering polymer ratios and fluoropolymer dispersion blends as set forth above in Table 23, and were coated over the respective basecoat using the given cure schedules as given in Table 24 below. The topcoats E(control)1 through E(control)11 and E1-E135 were then "quenched" by passing the panel under a flowing tap of cold water until the panel is fully cooled to room temperature. The topcoats using E136 and E137 were spray applied, cured as per the coating schedule given in Table 24 below and allowed to cool to room temperature without any water quench.

TABLE 24

Preparation of test samples

| ID | BASE COAT | K Bar B/C | K Bar T/C | Cure temp (° C.) | T/C cure time (s) |
|---|---|---|---|---|---|
| EControl1 | A | K4 | K4 | 420 | 90 |
| EControl2 | A | K4 | K4 | 420 | 90 |
| EControl3 | A | K4 | K4 | 420 | 90 |
| EControl4 | A | K4 | K4 | 420 | 90 |
| EControl5 | A | K4 | K4 | 420 | 90 |
| EControl6 | A | K4 | K4 | 420 | 90 |
| EControl7 | A | K4 | K4 | 420 | 90 |
| EControl8 | A | K4 | K4 | 420 | 90 |
| EControl9 | A | K4 | K4 | 420 | 90 |
| EControl10 | A | K4 | K4 | 420 | 90 |
| EControl11 | A | K4 | K4 | 420 | 90 |
| E1 | A | K4 | K4 | 420 | 90 |
| E2 | A | K4 | K4 | 400 | 90 |
| E3 | A | K4 | K4 | 400 | 90 |
| E4 | A | K4 | K4 | 420 | 90 |
| E5 | A | K4 | K4 | 400 | 90 |
| E6 | A | K4 | K4 | 400 | 90 |
| E7 | A | K4 | K4 | 400 | 90 |
| E8 | A | K4 | K4 | 420 | 90 |
| E9 | A | K4 | K4 | 420 | 90 |
| E10 | A | K4 | K5? | 420 | 90 |
| E11 | A | K4 | K4 | 420 | 90 |
| E12 | A | K4 | K4 | 420 | 120 |
| E13 | A | K4 | K5 | 420 | 90 |
| E14 | A | K4 | K5 | 420 | 120 |
| E15 | A | K4 | K5? | 420 | 90 |
| E16 | A | K4 | K4 | 420 | 90 |
| E17 | A | K4 | K4 | 420 | 90 |
| E18 | B | K4 | K4 | 420 | 90 |
| E19 | A | K4 | K4 | 420 | 90 |
| E20 | B | K4 | K4 | 420 | 90 |
| E21 | A | K4 | K4 | 420 | 90 |
| E22 | A | K4 | K4 | 420 | 90 |
| E23 | A | K4 | K4 | 420 | 120 |
| E24 | A | K4 | K4 | 420 | 90 |
| E25 | A | K4 | K4 | 420 | 120 |
| E26 | A | K4 | K4 | 420 | 90 |
| E27 | A | K4 | K4 | 420 | 120 |
| E28 | A | K4 | K5 | 420 | 90 |
| E29 | A | K4 | K5 | 420 | 120 |
| E30 | A | K4 | K2 | 420 | 90 |
| E31 | A | K4 | K2 | 420 | 120 |
| E32 | A | K4 | K2 | 420 | 180 |
| E33 | A | K4 | K3 | 420 | 90 |
| E34 | A | K4 | K3 | 420 | 120 |
| E35 | A | K4 | K3 | 420 | 180 |
| E36 | A | K4 | K4 | 420 | 90 |
| E37 | A | K4 | K4 | 420 | 120 |
| E38 | A | K4 | K4 | 420 | 180 |
| E39 | A | K4 | K5 | 420 | 90 |
| E40 | A | K4 | K5 | 420 | 120 |
| E41 | A | K4 | K5 | 420 | 180 |
| E42 | A | K4 | K4 | 420 | 90 |
| E43 | A | K4 | K2 | 420 | 90 |
| E44 | A | K4 | K2 | 420 | 120 |
| E45 | A | K4 | K2 | 420 | 180 |
| E46 | A | K4 | K3 | 420 | 90 |
| E47 | A | K4 | K3 | 420 | 120 |
| E48 | A | K4 | K3 | 420 | 180 |
| E49 | A | K4 | K4 | 420 | 90 |
| E50 | A | K4 | K4 | 420 | 120 |
| E51 | A | K4 | K4 | 420 | 180 |
| E52 | C | K4 | K2 | 420 | 90 |
| E53 | C | K4 | K2 | 420 | 120 |
| E54 | C | K4 | K2 | 420 | 180 |
| E55 | C | K4 | K3 | 420 | 90 |
| E56 | C | K4 | K3 | 420 | 120 |
| E57 | C | K4 | K3 | 420 | 180 |
| E58 | C | K4 | K4 | 420 | 90 |
| E59 | C | K4 | K4 | 420 | 120 |
| E60 | C | K4 | K4 | 420 | 180 |
| E61 | C | K4 | K4 | 420 | 90 |
| E62 | A | K4 | K4 | 420 | 90 |
| E63 | C | K4 | K4 | 420 | 90 |
| E64 | A | K4 | K4 | 420 | 90 |
| E65 | C | K4 | K4 | 420 | 90 |
| E66 | A | K4 | K4 | 420 | 90 |
| E67 | A | K4 | K4 | 420 | 90 |
| E68 | A | K4 | K4 | 420 | 90 |
| E69 | A | K4 | K4 | 420 | 90 |
| E70 | A | K4 | K4 | 420 | 90 |
| E71 | A | K4 | K4 | 420 | 90 |
| E72 | A | K4 | K4 | 420 | 90 |
| E73 | A | K4 | K4 | 420 | 90 |
| E74 | A | K4 | K4 | 420 | 90 |
| E75 | A | K4 | K4 | 420 | 90 |
| E76 | B | K4 | K4 | 420 | 90 |
| E77 | B | K4 | K4 | 420 | 90 |
| E78 | B | K4 | K4 | 420 | 90 |
| E79 | B | K4 | K4 | 420 | 90 |
| E80 | B | K4 | K4 | 420 | 90 |
| E81 | B | K4 | K4 | 420 | 90 |
| E82 | B | K4 | K4 | 420 | 90 |
| E83 | B | K4 | K4 | 420 | 90 |
| E84 | B | K4 | K4 | 420 | 90 |
| E85 | B | K4 | K4 | 420 | 90 |
| E86 | B | K4 | K4 | 420 | 90 |
| E87 | B | K4 | K4 | 420 | 90 |
| E88 | B | K4 | K4 | 420 | 90 |
| E89 | B | K4 | K4 | 420 | 90 |
| E90 | B | K4 | K4 | 420 | 90 |
| E91 | B | K4 | K4 | 420 | 90 |
| E92 | B | K4 | K4 | 420 | 90 |
| E93 | B | K4 | K4 | 420 | 90 |
| E94 | B | K4 | K4 | 420 | 90 |
| E95 | B | K4 | K4 | 420 | 90 |
| E96 | B | K4 | K4 | 420 | 90 |
| E97 | B | K4 | K4 | 420 | 90 |
| E98 | B | K4 | K4 | 420 | 90 |
| E99 | B | K4 | K4 | 420 | 90 |
| E100 | B | K4 | K4 | 420 | 90 |
| E101 | A | K4 | K4 | 420 | 90 |
| E102 | B | K4 | K4 | 420 | 90 |
| E103 | B | K4 | K4 | 420 | 90 |
| E104 | B | K4 | K4 | 420 | 90 |
| E105 | B | K4 | K4 | 420 | 90 |
| E106 | B | K4 | K4 | 420 | 90 |
| E107 | B | K4 | K4 | 420 | 90 |
| E108 | B | K4 | K4 | 420 | 90 |
| E109 | B | K4 | K4 | 420 | 90 |
| E110 | B | K4 | K4 | 420 | 90 |
| E111 | B | K4 | K4 | 420 | 90 |
| E112 | B | K4 | K4 | 420 | 90 |
| E113 | B | K4 | K4 | 420 | 90 |
| E114 | B | K4 | K4 | 420 | 90 |
| E115 | B | K4 | K4 | 420 | 90 |
| E116 | B | K4 | K4 | 420 | 90 |
| E117 | A | K4 | K4 | 420 | 90 |
| E118 | A | K4 | K4 | 420 | 90 |
| E119 | A | K4 | K4 | 420 | 90 |
| E120 | A | K4 | K4 | 420 | 90 |
| E121 | A | K4 | K4 | 420 | 90 |
| E122 | A | K4 | K4 | 420 | 90 |
| E123 | A | K4 | K4 | 420 | 90 |
| E124 | A | K4 | K4 | 420 | 90 |
| E125 | A | K4 | K4 | 420 | 90 |
| E126 | A | K4 | K4 | 420 | 90 |
| E127 | A | K4 | K4 | 420 | 90 |
| E128 | A | K4 | K4 | 420 | 90 |
| E129 | A | K4 | K4 | 420 | 90 |
| E130 | A | K4 | K4 | 420 | 90 |
| E131 | B | K4 | K4 | 420 | 90 |
| E132 | B | K4 | K4 | 420 | 90 |
| E133 | A | K4 | KA | 420 | 90 |
| E134 | B | K4 | K4 | 420 | 90 |
| E135 | B | K4 | K4 | 420 | 90 |
| E136 | D | spray | spray | 165 | 180 |
| E137 | D | spray | spray | 165 | 180 |

Example 4A

Roughness and Gloss

In this Example, roughness and gloss of the coatings were determined. The test protocols are as follows.

Roughness. A stylus type surface roughness detector equipped with an analyzer that provides a tracing of the surface was used according to EN ISO 13565, such as the following: Mitutoyo Surftest 402 surface roughness detector and analyzer, available from Mitutoyo Canada, 2121 Meadowvale Blvd, Mississauga, Toronto, Ontario, ON L5N 5N1, and Perthometer M2P/M3P/M4P surface roughness detector and analyzer (Mahr GmbH—Carl-Mahr-Str.1, D-37073 Göttingen, Germany). These instruments measure Ra (arithmetic mean deviation of the roughness profile, measured in microns) and Pc (peak count). The procedure is as follows. First, prepare the sample to be measured. Due to the configuration of most detectors this may require cutting the sample to obtain a flat surface accessible to the detector. Set the detector roughness range to the level just higher than the expected roughness to be measured. Set the length of trace, scale magnification and measurement units (English or metric). Calibrate the detector according to the manufacturer's instructions using a known reference standard. In the same manner, measure the roughness of the sample surface. Make at least 6 measurements.

Gloss. Gloss measurements were attained using a Mini-glossmeter 110V 20°-60°, available from Sheen Instruments, at an angle of 60°. The gloss meter conformed to the following standards: BS3900/D5, DIN EN ISO 2813, DIN 67530, EN ISO 7668, ASTM D523, ASTM D1455, ASTM C346, ASTM C584, ASTM D2457, JIS Z 8741, MFT 30064, TAPPI T 480. Units of measurement are expressed as % reflectance.

The results are set forth in Table 25 below:

TABLE 25

Roughness and Gloss

| ID | ENGINEERING POLYMER | Gloss (60°) | Smoothness ($R_a$ mean) |
|---|---|---|---|
| EControl1 | PES | 2.2 | 1.25 |
| EControl2 | PES | 8.2 | 1 |
| EControl3 | PES | 12 | 0.66 |
| EControl4 | PES | 16.5 | 0.9 |
| EControl5 | PES | 8.2 | 2.6 |
| EControl6 | PES | 23 | 1.5 |
| EControl7 | PES | 5.6 | 1.84 |
| EControl8 | PES | 19.7 | 1.42 |
| EControl9 | PES | 4.7 | 1.3 |
| EControl10 | PEEK | 19.1 | 2.32 |
| EControl11 | PAI | 1.6 | 2.9 |
| E1 | PPS | 14 | 2.76 |
| E2 | PPS | 18 | 2.53 |
| E3 | PPS | 42 | 2.88 |
| E4 | PPS | 19 | 2.8 |
| E5 | PPS | 23 | 3.12 |
| E6 | PPS | 22 | 2.16 |
| E7 | PPS | 16 | 2.4 |
| E8 | PPS | 20 | — |
| E9 | PPS | 15 | 3.637 |
| E10 | PPS | 10 | 2.1 |
| E11 | PPS | 13.8 | 1.16 |
| E12 | PPS | 12 | 1.01 |
| E13 | PPS | 14.1 | 0.9 |
| E14 | PPS | 9.8 | 1.37 |
| E15 | PPS | 5 | 2.55 |
| E16 | PPS | 10.2 | 2.51 |
| E17 | PPS | 13.3 | 2 |
| E18 | PPS | 12 | 2.46 |
| E19 | PPS | 12.2 | 2.3 |
| E20 | PPS | 3.7 | 1.9 |
| E21 | PPS | 18 | 4 |
| E22 | PPS | 11.8 | 1.16 |
| E23 | PPS | 13 | 0.88 |
| E24 | PPS | 12 | 1.27 |
| E25 | PPS | 10.2 | 1.48 |
| E26 | PPS | 21 | 0.74 |
| E27 | PPS | 19 | 0.71 |
| E28 | PPS | 21 | 0.96 |
| E29 | PPS | 17 | 0.9 |
| E30 | PPS | 7 | 1.04 |
| E31 | PPS | 7.7 | 1.15 |
| E32 | PPS | 3.3 | 1.57 |
| E33 | PPS | 8.9 | 1.28 |
| E34 | PPS | 10.9 | 1.06 |
| E35 | PPS | 10.3 | 1.2 |
| E36 | PPS | 10.8 | 1.22 |
| E37 | PPS | 15 | 1.01 |
| E38 | PPS | 11.5 | 1.15 |
| E39 | PPS | 11.1 | 1.09 |
| E40 | PPS | 12.6 | 1.07 |
| E41 | PPS | 12 | 1.1 |
| E42 | PPS | 8.2 | 1.04 |
| E43 | PPS | 1.7 | 1.2 |
| E44 | PPS | 1.9 | 1.23 |
| E45 | PPS | 1.8 | 1.3 |
| E46 | PPS | 3.2 | 1.36 |
| E47 | PPS | 3.2 | 1.25 |
| E48 | PPS | 2.9 | 1.27 |
| E49 | PPS | 2.8 | 1.18 |
| E50 | PPS | 3.8 | 1.07 |
| E51 | PPS | 3.7 | 1.24 |
| E52 | PPS | 1.9 | 1.3 |
| E53 | PPS | 1.7 | 1.27 |
| E54 | PPS | 2.2 | 1.15 |
| E55 | PPS | 2.4 | 1.35 |
| E56 | PPS | 2.9 | 1.27 |
| E57 | PPS | 4 | 1.372 |
| E58 | PPS | 4 | 1.45 |
| E59 | PPS | 4 | 1.3 |
| E60 | PPS | 4.2 | 1.18 |
| E61 | PPS | 4.0 | 1.45 |
| E62 | PPS | 2.8 | 1.18 |
| E63 | PPS | 5.1 | 2.51 |
| E64 | PPS | 3.2 | 2.72 |
| E65 | PPS | 5.1 | 2.51 |
| E66 | PPS | 3.2 | 2.72 |
| E67 | PPS | 4 | 2.65 |
| E68 | PPS | 1.7 | 2.82 |
| E69 | PPS | 4.6 | 1.04 |
| E70 | PPS | 5 | 0.98 |
| E71 | PPS | 4.2 | 0.99 |
| E72 | PPS | 7.5 | 1.71 |
| E73 | PPS | 9.3 | 2.06 |
| E74 | PPS | 33 | 1.15 |
| E75 | PPS | — | — |
| E76 | PES | 3.5 | 2.37 |
| E77 | PES | 1.9 | 2.47 |
| E78 | PES | 2.6 | 2.81 |
| E79 | PES | 2.5 | 3.62 |
| E80 | PES | 2 | 2.23 |
| E81 | PES | 2.7 | 2.47 |
| E82 | PES | 2.7 | 2.33 |
| E83 | PES | 2.4 | 2.76 |
| E84 | PES | 0.8 | 1.97 |
| E85 | PES | 4.3 | 1.89 |
| E86 | PES | 3.9 | 1.68 |
| E87 | PES | 2.5 | 2.4 |
| E88 | PES | 2.4 | 1.59 |
| E89 | PES | 0.5 | 1.81 |
| E90 | PES | 1.7 | 1.69 |
| E91 | PES | 2.5 | 1.86 |
| E92 | PES | 3 | 1.9 |
| E93 | PES | 2.7 | 2.11 |
| E94 | PES | 3.8 | 3.16 |

TABLE 25-continued

Roughness and Gloss

| ID | ENGINEERING POLYMER | Gloss (60°) | Smoothness ($R_a$ mean) |
|---|---|---|---|
| E95 | PES | 4.6 | 3.178 |
| E96 | PES | 3.4 | 3.1 |
| E97 | PES | 4.2 | 4.01 |
| E98 | PES | 6 | 5.7 |
| E99 | PES | 3.2 | 3.76 |
| E100 | PES | 3.1 | 2.48 |
| E101 | PES | 7.8 | 1.27 |
| E102 | PEEK | 3 | 0.67 |
| E103 | PEEK | 6 | overflow |
| E104 | PPS | 5.8 | 0.89 |
| E105 | PPS | 5.2 | 1.14 |
| E106 | PPS | 5 | 3.09 |
| E107 | PPS | 7 | 1.03 |
| E108 | PPS | 9.8 | 0.82 |
| E109 | PPS | 8.9 | 1.07 |
| E110 | PPS | 4.6 | 1.28 |
| E111 | PPS | 5.5 | 1.05 |
| E112 | PPS | 6 | 0.78 |
| E113 | PPS | 6 | 1.108 |
| E114 | PEEK | 4.1 | 0.64 |
| E115 | PAI | 6.6 | 4.76 |
| E116 | PAI | 5.5 | 4.25 |
| E117 | PAI | 23 | overflow |
| E118 | PES | 6 | 4.09 |
| E119 | PES | 6 | 1.22 |
| E120 | PES | 5.9 | 1.54 |
| E121 | PES | 5.7 | 1.37 |
| E122 | PES | 9.5 | 2.76 |
| E123 | PES | 6.6 | 2.39 |
| E124 | PES | 5.1 | 1.89 |
| E125 | PES | 4.8 | 1.1 |
| E126 | PES | 6.3 | 1.93 |
| E127 | PES | 6 | 1.62 |
| E128 | PES | 5.2 | 1.74 |
| E129 | PES | 5.5 | 1.5 |
| E130 | PES | 6.4 | 1.35 |
| E131 | PAI | 0.3 | 4.78 |
| E132 | PAI | 0.5 | 2.54 |
| E133 | PES | 6.8 | 0.87 |
| E134 | PES | 5.2 | 0.77 |
| E135 | PES | 4.2 | 1.6 |
| E136 | FKM | | |
| E137 | FKM | | |

Example 4B

Reciprocating Abrasion Test

A reciprocating abrasion test (RAT) was conducted on certain of the coatings under the test protocol set forth in Example 3B. The results are set forth in Table 26 below:

TABLE 26

Reciprocating abrasion test (RAT)

| ID | EN. POLYMER | BASE COAT | Abrasion/RAT Cycles |
|---|---|---|---|
| EControl1 | PES | A | 900 |
| EControl2 | PES | A | 367 |
| EControl3 | PES | A | 440 |
| EControl4 | PES | A | 230 |
| EControl5 | PES | A | 450 |
| EControl6 | PES | A | 275 |
| EControl7 | PES | A | 80 |
| EControl8 | PES | A | 400 |
| EControl9 | PES | A | 165 |
| EControl10 | PEEK | A | 200 |
| EControl11 | PAI | A | 160 |
| E1 | PPS | A | 60 |
| E2 | PPS | A | 110 |
| E3 | PPS | A | 220 |
| E4 | PPS | A | 125 |
| E5 | PPS | A | 220 |
| E6 | PPS | A | 200 |
| E7 | PPS | A | 90 |
| E8 | PPS | A | 60 |
| E9 | PPS | A | 60 |
| E10 | PPS | A | 220 |
| E11 | PPS | A | 180 |
| E12 | PPS | A | 150 |
| E13 | PPS | A | 220 |
| E14 | PPS | A | 200 |
| E15 | PPS | A | 220 |
| E16 | PPS | A | 180 |
| E17 | PPS | A | 180 |
| E18 | PPS | B | 290 |
| E19 | PPS | A | 180 |
| E20 | PPS | B | 3000 |
| E21 | PPS | A | 330 |
| E22 | PPS | A | 298 |
| E23 | PPS | A | 105 |
| E24 | PPS | A | 298 |
| E25 | PPS | A | 105 |
| E26 | PPS | A | 298 |
| E27 | PPS | A | 105 |
| E28 | PPS | A | 275 |
| E29 | PPS | A | 140 |
| E30 | PPS | A | 165 |
| E31 | PPS | A | 100 |
| E32 | PPS | A | 54 |
| E33 | PPS | A | 194 |
| E34 | PPS | A | 300 |
| E35 | PPS | A | 180 |
| E36 | PPS | A | 335 |
| E37 | PPS | A | 170 |
| E38 | PPS | A | 300 |
| E39 | PPS | A | 356 |
| E40 | PPS | A | 212 |
| E41 | PPS | A | 335 |
| E42 | PPS | A | 180 |
| E43 | PPS | A | 50 |
| E44 | PPS | A | 64 |
| E45 | PPS | A | 61 |
| E46 | PPS | A | 150 |
| E47 | PPS | A | 200 |
| E48 | PPS | A | 100 |
| E49 | PPS | A | 200 |
| E50 | PPS | A | 200 |
| E51 | PPS | A | 150 |
| E52 | PPS | C | 40000 |
| E53 | PPS | C | 71000 |
| E54 | PPS | C | 60000 |
| E55 | PPS | C | 42000 |
| E56 | PPS | C | 100000 |
| E57 | PPS | C | 85000 |
| E58 | PPS | C | 93000 |
| E59 | PPS | C | 91000 |
| E60 | PPS | C | 80000 |
| E61 | PPS | C | 93000 |
| E62 | PPS | A | 200 |
| E63 | PPS | C | 38000 |
| E64 | PPS | A | 394 |
| E65 | PPS | C | 38000 |
| E66 | PPS | A | 394 |
| E67 | PPS | A | 445 |
| E68 | PPS | A | 330 |
| E69 | PPS | A | 620 |
| E70 | PPS | A | 220 |
| E71 | PPS | A | 190 |
| E72 | PPS | A | 90 |
| E73 | PPS | A | 390 |
| E74 | PPS | A | 475 |
| E75 | PPS | A | — |
| E76 | PES | B | 21000 |

TABLE 26-continued

Reciprocating abrasion test (RAT)

| ID | EN. POLYMER | BASE COAT | Abrasion/ RAT Cycles |
|---|---|---|---|
| E77 | PES | B | 7000 |
| E78 | PES | B | 7000 |
| E79 | PES | B | 7000 |
| E80 | PES | B | 7000 |
| E81 | PES | B | 22000 |
| E82 | PES | B | 100000 |
| E83 | PES | B | 33000 |
| E84 | PES | B | 100000 |
| E85 | PES | B | 42000 |
| E86 | PES | B | 33000 |
| E87 | PES | B | 26000 |
| E88 | PES | B | 26000 |
| E89 | PES | B | 17000 |
| E90 | PES | B | 18000 |
| E91 | PES | B | 33000 |
| E92 | PES | B | 28000 |
| E93 | PES | B | 27000 |
| E94 | PES | B | 8000 |
| E95 | PES | B | 36000 |
| E96 | PES | B | 31000 |
| E97 | PES | B | 20000 |
| E98 | PES | B | 20000 |
| E99 | PES | B | 65000 |
| E100 | PES | B | 19000 |
| E101 | PES | A | 570 |
| E102 | PEEK | B | 19000 |
| E103 | PEEK | B | — |
| E104 | PPS | B | 14000 |
| E105 | PPS | B | 25000 |
| E106 | PPS | B | 25000 |
| E107 | PPS | B | 26000 |
| E108 | PPS | B | 19000 |
| E109 | PPS | B | 25000 |
| E110 | PPS | B | 25000 |
| E111 | PPS | B | 38000 |
| E112 | PPS | B | 3000 |
| E113 | PPS | B | 40000 |
| E114 | PEEK | B | 35000 |
| E115 | PAI | B | 85000 |
| E116 | PAI | B | 18000 |
| E117 | PAI | A | 620 |
| E118 | PES | A | 403 |
| E119 | PES | A | 370 |
| E120 | PES | A | 440 |
| E121 | PES | A | 400 |
| E122 | PES | A | 350 |
| E123 | PES | A | 403 |
| E124 | PES | A | 700 |
| E125 | PES | A | 370 |
| E126 | PES | A | 400 |
| E127 | PES | A | 800 |
| E128 | PES | A | 320 |
| E129 | PES | A | 320 |
| E130 | PES | A | 330 |
| E131 | PAI | B | 32000 |
| E132 | PAI | B | 23000 |
| E133 | PES | A | 450 |
| E134 | PES | B | 31000 |
| E135 | PES | B | 27000 |
| E136 | FKM | D | — |
| E137 | FKM | D | — |

The results in the table above show that there is improvement in linear abrasion resistance over the control topcoats with the topcoats made in accordance with the first and second embodiments of the present invention.

Example 4C

Cooking Release Tests

Cooking release tests were conducted in accordance with the protocols below for chicken leg, and steak. For the chicken kg and steak testing, the results were determined by whether or not the surface of the coating appeared to be clean after washing without containing meat still stuck to the surface. This would then determine the end point of the testing and the number of cycles completed to achieve the end point then recorded.

Chicken Leg. One chicken leg placed centrally on coated substrate and cooked for 40 mins at 230° C. Clean coated substrate in a warm solution of water and washing up liquid. Dry and evaluate coated surface for signs of meat residues. Signs of meat residues indicate the endpoint of the testing. The number of cycles of chicken leg cooked to reach endpoint is then recorded, however, 5 cycles of testing are required for a test "pass".

Steak. Place a piece of raw rump steak visibly free from the fat around the outside of the meat into the sample to be tested (marble does not need removing). Surface area is important and the size of steak being used is approx. 22.5 cm$^2$ by 12.5 cm$^2$ to give a surface area of 200 cm$^2$±25 cm$^2$. The weight of the pieces should be ~0.6 kg. Cook for 1 hour at 180° C. Soak coated substrate in 60° C. solution of water and washing up liquid for 15 mins. Dry and evaluate coated surface for signs of meat residues. Signs of meat residues and any staining whatsoever indicated the endpoint of the testing. The number of cycles of steak cooked to reach endpoint is then recorded, however, 5 cycles of testing are required for a test "pass".

The results are set forth in Table 7 below:

TABLE 27

Cooking release tests

| ID | ENGINEERING POLYMER | Steak clean up (Fail = 0, Pass = 1) | Number of Steak Cycles (5 CYCLES IS STANDARD PASS) | Chicken |
|---|---|---|---|---|
| EControl1 | PES | 0 | 2 | 3 |
| EControl2 | PES | 0 | 2 | 5 |
| EControl3 | PES | 0 | 2 | 4 |
| EControl4 | PES | 0 | 4 | 5 |
| EControl5 | PES | 1 | 4 | 4 |
| EControl6 | PES | 1 | 4 | 5 |
| EControl7 | PES | 1 | 4 | 3 |
| EControl8 | PES | 0 | 3 | 1 |
| EControl9 | PES | 0 | 3 | 3 |
| EControl10 | PEEK | 0 | 1 | 1 |
| EControl11 | PAI | 0 | 0 | 1 |
| E1 | PPS | 1 | 2 | 3 |
| E2 | PPS | 1 | 2 | 2 |
| E3 | PPS | 0 | 1 | 5 |
| E4 | PPS | 1 | 2 | 1 |
| E5 | PPS | 1 | 2 | 2 |
| E6 | PPS | 0 | 1 | 2 |
| E7 | PPS | 0 | 1 | 1 |
| E8 | PPS | 0 | 1 | 3 |
| E9 | PPS | 0 | 1 | 5 |
| E10 | PPS | 1 | 20 | 1 |
| E11 | PPS | 0 | 1 | 1 |
| E12 | PPS | 1 | 3 | 1 |
| E13 | PPS | 0 | 1 | 0 |
| E14 | PPS | 0 | 3 | 1 |
| E15 | PPS | 1 | 2 | 1 |
| E16 | PPS | 0 | 1 | 1 |
| E17 | PPS | 1 | 1 | 1 |
| E18 | PPS | 1 | 1 | 1 |
| E19 | PPS | 1 | 1 | 1 |
| E20 | PPS | 0 | 1 | 1 |
| E21 | PPS | 0 | 1 | 5 |
| E22 | PPS | 0 | 3 | 5 |
| E23 | PPS | 0 | 3 | 5 |
| E24 | PPS | 0 | 3 | 5 |
| E25 | PPS | 0 | 3 | 5 |

TABLE 27-continued

Cooking release tests

| ID | ENGINEERING POLYMER | Steak clean up (Fail = 0, Pass = 1) | Number of Steak Cycles (5 CYCLES IS STANDARD PASS) | Chicken |
|---|---|---|---|---|
| E26 | PPS | 0 | 3 | 5 |
| E27 | PPS | 0 | 3 | 5 |
| E28 | PPS | 0 | 3 | 3 |
| E29 | PPS | 0 | 3 | 3 |
| E30 | PPS | 0 | 1 | 1 |
| E31 | PPS | 0 | 1 | 1 |
| E32 | PPS | 0 | 1 | 4 |
| E33 | PPS | 0 | 1 | 1 |
| E34 | PPS | 0 | 1 | 1 |
| E35 | PPS | 0 | 1 | 1 |
| E36 | PPS | 0 | 1 | 1 |
| E37 | PPS | 0 | 1 | 1 |
| E38 | PPS | 0 | 1 | 1 |
| E39 | PPS | 0 | 1 | 1 |
| E40 | PPS | 0 | 1 | 1 |
| E41 | PPS | 0 | 1 | 1 |
| E42 | PPS | 0 | 5 | 5 |
| E43 | PPS | 0 | 2 | 5 |
| E44 | PPS | 0 | 1 | 2 |
| E45 | PPS | 1 | 5 | 5 |
| E46 | PPS | 0 | 1 | 5 |
| E47 | PPS | 0 | 1 | 5 |
| E48 | PPS | 0 | 1 | 4 |
| E49 | PPS | 0 | 1 | 5 |
| E50 | PPS | 0 | 1 | 2 |
| E51 | PPS | 1 | 5 | 5 |
| E52 | PPS | 0 | 1 | 5 |
| E53 | PPS | 0 | 1 | 5 |
| E54 | PPS | 1 | 5 | 5 |
| E55 | PPS | 0 | 1 | 5 |
| E56 | PPS | 1 | 5 | 5 |
| E57 | PPS | 0 | 1 | 5 |
| E58 | PPS | 0 | 1 | 5 |
| E59 | PPS | 0 | 1 | 5 |
| E60 | PPS | 0 | 1 | 5 |
| E61 | PPS | 0 | 1 | 5 |
| E62 | PPS | 0 | 1 | 5 |
| E63 | PPS | 0 | 1 | 1 |
| E64 | PPS | 0 | 1 | 4 |
| E65 | PPS | 0 | 1 | 1 |
| E66 | PPS | 0 | 1 | 4 |
| E67 | PPS | 0 | 5 | 1 |
| E68 | PPS | 0 | 5 | 5 |
| E69 | PPS | 0 | 5 | 5 |
| E70 | PPS | 0 | 5 | 0 |
| E71 | PPS | 0 | 5 | 5 |
| E72 | PPS | 0 | 5 | 5 |
| E73 | PPS | 1 | 5 | 5 |
| E74 | PPS | 0 | 1 | 0 |
| E75 | PPS | — | — | — |
| E76 | PES | 0 | 1 | 1 |
| E77 | PES | 0 | 1 | 5 |
| E78 | PES | 0 | 5 | 5 |
| E79 | PES | 0 | 3 | 1 |
| E80 | PES | 0 | 1 | 2 |
| E81 | PES | 0 | 4 | 5 |
| E82 | PES | 1 | 5 | 5 |
| E83 | PES | 0 | 2 | 2 |
| E84 | PES | 0 | 1 | 5 |
| E85 | PES | 1 | 5 | 5 |
| E86 | PES | 0 | 1 | 2 |
| E87 | PES | 0 | 5 | 5 |
| E88 | PES | 0 | 1 | 2 |
| E89 | PES | 0 | 1 | 1 |
| E90 | PES | 0 | 1 | 5 |
| E91 | PES | 0 | 1 | 5 |
| E92 | PES | 0 | 1 | 3 |
| E93 | PES | 1 | 5 | 5 |
| E94 | PES | 1 | 5 | 3 |
| E95 | PES | 1 | 5 | 2 |
| E96 | PES | 1 | 2 | 5 |
| E97 | PES | 1 | 5 | 5 |
| E98 | PES | 1 | 5 | 0 |
| E99 | PES | 1 | 5 | 5 |
| E100 | PES | 1 | 30 | 2 |
| E101 | PES | 1 | 30 | 5 |
| E102 | PEEK | 0 | 5 | 5 |
| E103 | PEEK | — | — | — |
| E104 | PPS | 0 | 5 | 5 |
| E105 | PPS | 0 | 1 | 1 |
| E106 | PPS | 0 | 1 | 1 |
| E107 | PPS | 0 | 1 | 1 |
| E108 | PPS | 0 | 1 | 1 |
| E109 | PPS | 0 | 1 | 1 |
| E110 | PPS | 0 | 5 | 5 |
| E111 | PPS | 0 | 1 | 1 |
| E112 | PPS | 0 | 1 | 1 |
| E113 | PPS | 0 | 1 | 3 |
| E114 | PEEK | 0 | 5 | 5 |
| E115 | PAI | 0 | 1 | 1 |
| E116 | PAI | 0 | 1 | 0 |
| E117 | PAI | 0 | 1 | 1 |
| E118 | PES | 1 | 5 | 3 |
| E119 | PES | 1 | 1 | 5 |
| E120 | PES | 1 | 1 | 5 |
| E121 | PES | 1 | 1 | 5 |
| E122 | PES | 1 | 1 | 5 |
| E123 | PES | 1 | 1 | 4 |
| E124 | PES | 1 | 1 | 5 |
| E125 | PES | 1 | 1 | 5 |
| E126 | PES | 1 | 1 | 5 |
| E127 | PES | 1 | 1 | 5 |
| E128 | PES | 1 | 1 | 5 |
| E129 | PES | 1 | 1 | 5 |
| E130 | PES | 1 | 1 | 5 |
| E131 | PAI | 0 | 1 | 1 |
| E132 | PAI | 0 | 1 | 1 |
| E133 | PES | 1 | 1 | 5 |
| E134 | PES | 0 | 5 | 5 |
| E135 | PES | 0 | 5 | 5 |
| E136 | FKM | | | |
| E137 | FKM | | | |

The results in the table above show that there is an improvement in the release and ease of cleaning characteristics for all types of food tested over the control topcoats with the topcoats made in accordance with the first and second embodiments of the present invention.

Example 4D

Adhesion and 0T Bend Tests for Formable Coatings

In this Example, an adhesion test was conducted in accordance with the procedures described below to determine the adhesion strength of a coating to its substrate by trying to remove the coating with adhesive tape. A 0T bend test was also conducted, The procedure for the adhesion test, referred to as "Test 2" below, is as follows, with initial reference to "Test 1" below. For ECCS substrate BOTH Test 2 and 0T must pass.

Test 1

1. Scope.

This procedure is to be used to determine the adhesion of a coating to its substrate by trying to remove the coating with adhesive tape.

2. Equipment and Materials.

2.1. Metal ruler divided in millimeters or special template with appropriate spacing of cuts.

2.2. Single edge razor blade, scalpel, knife or other cutting instrument with a fine, sharp edge.

2.3. As an alternative to 2.1 and 2.2, a multi-bladed cutting tool with the proper blade spacing may be used.

2.4. Adhesive tape, such as 3M Scotch Brand No. 897 Strapping Tape or No. 898 Filament tape or its equivalent.

2.5. Low power (3-5×) magnifying glass.

3. Procedure.

3.1. Lay the test piece on a flat firm surface.

32. With the metal rule, mark off eleven (11) spaces separated by the required distance. This may be 1, 1.5 or 2 mm. Markings may be made by nicking the coating with the cutting tool.

3.3. Hold the ruler or other metal straight edge firmly on the test piece at the first marking. Scribe a line 2 to 4 cm long with the cutting tool. Continue making cuts for the remaining marks. The cuts should be evenly spaced and parallel to one another. The cuts should penetrate the coating completely through to the substrate, but should not gouge the substrate.

3.4. Rotate the test piece 90°, and repeat steps 3.2 and 3.3, making a second set of cuts perpendicular to and superimposed on the first set of cuts. The completed cuts will form a grid of 100 squares with sides of the required dimension. Brush away any flakes or ribbons of the coating from the grid.

3.5. If a multi-bladed cutting tool is used, steps 3.2, 3.3 and 3.4 can be eliminated. Use the multi-bladed cutting tool to produce the grid as required. Make sure that the cuts are clean and completely through to the substrate.

3.6. Cut a 15 cm length of adhesive tape. Apply the tape over the grid. Press down firmly. A rubber eraser may be used to rub the tape to remove air pockets and ensure a Good bond.

3.7. Within 90±30 seconds of application, remove the tape by grasping one end and pulling rapidly at a peeling angle of 180°. Pull rapidly but do not jerk.

3.8. Repeat steps 3.6 and 3.7 over the same grid for the required number of times. Usually 5 pulls are used.

4. Evaluation.

4.1. Inspect the grid with the magnifying glass for removal of the coating from the substrate. In the case of a multicoat system or in the case of a recoatability test, inspect the grid for removal of one coat from another.

4.2. Report the amount of coating remaining on the grid, e.g., 100% means no coating removed. Typically this is reported as number of squares remaining compared to number of squares produced. For perfect adhesion over 100 squares, the rating would be 100/100. Note any adhesion failures to the substrate or between coats.

5. Precautions.

5.1. Inspect the cutting tool before each test. Dress the tool with fine abrasive paper or a sharpening stone, if needed. Replace multibladed tools or single edged tools when they become too badly damaged to use.

6. References.

6.1. ASTM D-3359 Method B, Measuring Adhesion by Tape Test 6.2. DIN 53 151

6.3. JIS K 5400—Section 6.15 Cross Cut Adhesion 6.4. BS EN 24624:1992

Test 2

1. Scope.

1.1. This procedure measures the adhesion of coatings to a substrate by the cross hatch and indent adhesion method after exposure to boiling water. This method is an extension of Test 1 above. It is applicable to formable coatings.

2. Equipment and Materials.

2.1. Container large enough to hold test items, normally coated sheet metal, with a lid to cover the container after inserting the items.

2.2. Electric hot plate or gas burner stove.

2.3. Timer.

2.4. Water (deionised water is preferred, but not required).

2.5. Cloth or paper towels.

2.6. Falling weight/Impact tester or Erikson tester (a press which produces a hemispherical protrusion in the panel).

2.7. Other equipment and materials required as per Test 1.

3. Procedure.

3.1. Fill container with sufficient water to cover most of the article to he tested. Place container on stove or hot plate and bring to the boil. Reduce heat to maintain a constant simmer. Keep covered.

3.2. Immerse article in the boiling water. Set timer for required time. The usual time is fifteen (15) minutes unless otherwise specified.

3.3. Remove article after the required time. Dry immediately with paper towel.

3.4. Scribe a crosshatch pattern on the article to he tested according to the procedure outlined in Test 1.

3.5. Apply reverse impact or Erikson to rear of article directly behind crosshatch.

3.6. Apply tape to crosshatch area and check adhesion as described in Test 1.

4. Evaluation.

4.1. Evaluate and report as describe in Test 1.

5. Precautions/Comments.

5.1. Conduct initial tape test by Test 1 within 5 minutes of removal from water.

5.2. If a series of tests are being conducted, maintain a constant water level. Also, replace water periodically to avoid a build up of salts or other debris, especially if using tap water.

6. References.

6.1. BS 7069:1988

6.2. BS 3900 Part E3

0T Bend Test

The procedure for the 0T bent test is as follows.

1. Scope.

1.1 This procedure is used to determine the adhesion and flexibility of coatings when subjected to a 180° bend.

2. Equipment and Materials.

2.1 A five inch bench vise permanently mounted to work table or metal brake form machine.

2.2 Scotch #160 Transparent tape ¾" wide, or equivalent.

3. Procedure.

3.1 Prepare test panels using agreed upon substrate and following the application recommendations for the coating. Alternately, cut panels from production coated metal. Panels should be 2" to 3" wide by length necessary to make the test.

3.2 Insert one end of the panel ½ inch into the vise. Bend the panel to 90° with coating on outside of bend. Remove from vise and bend to greater than 90° by hand. Reinsert into vise and compress until flat. This is a zero "T" bend. Use the same procedure for each successive "T" bend. One thickness to be 1 "T", two thicknesses to be 2 "T", etc. Apply the tape firmly over the entire length of the bend.

3.3 Remove the tape with a single rapid pull. Repeat with fresh tape for the number of pulls specified.

4. Evaluation.

4.1 Examine each "T" bend visually before applying tape. Report lowest "T" bend at which no cracking of the coating is visible.

4.2 Examine each "T" bend visually after taping. Report lowest "T" bend at which no coating is removed.

5. Comments/Precautions.

5.1 Avoid scratching of the coating when crimping panel in the vise. If necessary, protect the coating with paper while bending.

5.2 Results may vary depending upon the direction of the bend in relation to the grain of the metal (across grain or with grain).

5.3 Coatings become more flexible with increasing temperature. Specify temperature at which bend is to be made.

5.4 Hard, high temper metals will fracture when bent 180°. The "T" bend test cannot be run on these metals.

6. References.

6.1 ASTM D3794-79 Section 9.5.5

The results are set forth in Table 28 below:

TABLE 28

Adhesion and 0T bend tests

| ID | ENGINEERING POLYMER | 0T Bend Test (PASS = 1, FAIL = 0) | Adhesion Test 2 (crosshatch tape peel) (PASS = 1, FAIL = 0) | % Fluoropolymer solids |
|---|---|---|---|---|
| EControl1 | PES | 0 | 0 | 7.63 |
| EControl2 | PES | 1 | 1 | 7.63 |
| EControl3 | PES | 1 | 1 | 7.63 |
| EControl4 | PES | 1 | 1 | 7.63 |
| EControl5 | PES | 1 | 1 | 7.63 |
| EControl6 | PES | 1 | 1 | 7.63 |
| EControl7 | PES | 1 | 1 | 7.63 |
| EControl8 | PES | 1 | 1 | 0 |
| EControl9 | PES | 1 | 1 | 7.63 |
| EControl10 | PEEK | 1 | 1 | 0 |
| EControl11 | PAI | 1 | 1 | 0 |
| E1 | PPS | 1 | 1 | 3.99 |
| E2 | PPS | 1 | 1 | 3.99 |
| E3 | PPS | 1 | 1 | 2.73 |
| E4 | PPS | 1 | 1 | 2.73 |
| E5 | PPS | 1 | 1 | 2.73 |
| E6 | PPS | 1 | 1 | 2.73 |
| E7 | PPS | 1 | 1 | 3.98 |
| E8 | PPS | 1 | 1 | 3.99 |
| E9 | PPS | 1 | 1 | 4 |
| E10 | PPS | 1 | 1 | 4.31 |
| E11 | PPS | 1 | 1 | 4.31 |
| E12 | PPS | 1 | 1 | 4.31 |
| E13 | PPS | 1 | 1 | 4.31 |
| E14 | PPS | 1 | 1 | 4.31 |
| E15 | PPS | 1 | 1 | 4.45 |
| E16 | PPS | 1 | 1 | 4.12 |
| E17 | PPS | 1 | 1 | 4.12 |
| E18 | PPS | 1 | 1 | 4.12 |
| E19 | PPS | 1 | 1 | 4.12 |
| E20 | PPS | 1 | 1 | 4.12 |
| E21 | PPS | 1 | 1 | 4.34 |
| E22 | PPS | 1 | 1 | 4.31 |
| E23 | PPS | 1 | 1 | 4.31 |
| E24 | PPS | 1 | 1 | 4.31 |
| E25 | PPS | 1 | 1 | 4.31 |
| E26 | PPS | 1 | 1 | 4.31 |
| E27 | PPS | 1 | 1 | 4.31 |
| E28 | PPS | 1 | 1 | 4.31 |
| E29 | PPS | 1 | 1 | 4.31 |
| E30 | PPS | 0 | 0 | 4.46 |
| E31 | PPS | 0 | 0 | 4.46 |
| E32 | PPS | 0 | 0 | 4.46 |
| E33 | PPS | 1 | 1 | 4.46 |
| E34 | PPS | 0 | 0 | 4.46 |
| E35 | PPS | 0 | 0 | 4.46 |
| E36 | PPS | 0 | 1 | 4.46 |
| E37 | PPS | 1 | 1 | 4.46 |
| E38 | PPS | 0 | 0 | 4.46 |
| E39 | PPS | 0 | 0 | 4.46 |
| E40 | PPS | 0 | 1 | 4.46 |
| E41 | PPS | 0 | 0 | 4.46 |
| E42 | PPS | 1 | 1 | 4.46 |
| E43 | PPS | 0 | 0 | 4.31 |
| E44 | PPS | 0 | 0 | 4.31 |
| E45 | PPS | 0 | 0 | 4.31 |
| E46 | PPS | 0 | 1 | 4.31 |
| E47 | PPS | 0 | 0 | 4.31 |
| E48 | PPS | 0 | 0 | 4.31 |
| E49 | PPS | 0 | 0 | 4.31 |
| E50 | PPS | 0 | 0 | 4.31 |
| E51 | PPS | 0 | 0 | 4.31 |
| E52 | PPS | 1 | 1 | 4.31 |
| E53 | PPS | 1 | 1 | 4.31 |
| E54 | PPS |   |   | 4.31 |
| E55 | PPS | 1 | 1 | 4.31 |
| E56 | PPS | 1 | 1 | 4.31 |
| E57 | PPS | 0 | 1 | 4.31 |
| E58 | PPS | 1 | 1 | 4.31 |
| E59 | PPS | 0 | 1 | 4.31 |
| E60 | PPS | 0 | 1 | 4.31 |
| E61 | PPS | 1 | 1 | 4.31 |
| E62 | PPS | 0 | 0 | 4.31 |
| E63 | PPS | 1 | 1 | 4.31 |
| E64 | PPS | 1 | 1 | 4.31 |
| E65 | PPS | 1 | 1 | 4.31 |
| E66 | PPS | 1 | 1 | 4.31 |
| E67 | PPS | 0 | 0 | 4.31 |
| E68 | PPS | 1 | 0 | 8.05 |
| E69 | PPS | 1 | 1 | 4.29 |
| E70 | PPS | 1 | 1 | 4.29 |
| E71 | PPS | 0 | 0 | 4.29 |
| E72 | PPS | 0 | 1 | 4.29 |
| E73 | PPS | 0 | 1 | 6.01 |
| E74 | PPS | 0 | 1 | 4.62 |
| E75 | PPS |   |   | 5.88 |
| E76 | PES | 0 | 1 | 4.57 |
| E77 | PES | 1 | 1 | 4.55 |
| E78 | PES | 1 | 1 | 4.5 |
| E79 | PES | 1 | 1 | 4.55 |
| E80 | PES | 1 | 1 | 4.74 |
| E81 | PES | 1 | 1 | 4.71 |
| E82 | PES | 1 | 1 | 4.66 |
| E83 | PES | 1 | 1 | 4.72 |
| E84 | PES | 1 | 1 | 4.57 |
| E85 | PES | 1 | 1 | 4.66 |
| E86 | PES | 1 | 1 | 4.66 |
| E87 | PES | 1 | 1 | 7.02 |
| E88 | PES | 1 | 1 | 7.02 |
| E89 | PES | 1 | 1 | 6.34 |
| E90 | PES | 1 | 1 | 6.43 |
| E91 | PES | 1 | 1 | 6.37 |
| E92 | PES | 1 | 1 | 6.31 |
| E93 | PES | 1 | 1 | 6.35 |
| E94 | PES | 1 | 1 | 4.31 |
| E95 | PES | 1 | 1 | 4.63 |
| E96 | PES | 1 | 1 | 4.61 |
| E97 | PES | 1 | 1 | 4.59 |
| E98 | PES | 1 | 1 | 4.57 |
| E99 | PES | 1 | 1 | 4.59 |
| E100 | PES | 1 | 1 | 4.64 |
| E101 | PES | 1 | 1 | 4.64 |
| E102 | PEEK | 1 | 1 | 4.65 |
| E103 | PEEK |   |   | 4.65 |

TABLE 28-continued

Adhesion and 0T bend tests

| ID | ENGI-NEERING POLYMER | 0T Bend Test (PASS = 1, FAIL = 0) | Adhesion Test 2 (crosshatch tape peel) (PASS = 1, FAIL = 0) | % Fluoropolymer solids |
|---|---|---|---|---|
| E104 | PPS | 0 | 0 | 4.26 |
| E105 | PPS | 0 | 1 | 4.26 |
| E106 | PPS | 1 | 0 | 4.53 |
| E107 | PPS | 0 | 0 | 4.53 |
| E108 | PPS | 1 | 1 | 4.53 |
| E109 | PPS | 1 | 1 | 4.53 |
| E110 | PPS | 1 | 0 | 4.26 |
| E111 | PPS | 1 | 1 | 4.26 |
| E112 | PPS | 0 | 1 | 4.53 |
| E113 | PPS | 1 | 1 | 4.53 |
| E114 | PEEK | 1 | 1 | 4.67 |
| E115 | PAI | 1 | 1 | 4.67 |
| E116 | PAI | 1 | 1 | 4.65 |
| E117 | PAI | 0 | 0 | 0 |
| E118 | PES | 1 | 1 | 4.58 |
| E119 | PES | 1 | 1 | 4.31 |
| E120 | PES | 1 | 1 | 4.44 |
| E121 | PES | 1 | 1 | 4.44 |
| E122 | PES | 1 | 1 | 5.16 |
| E123 | PES | 1 | 1 | 4.49 |
| E124 | PES | 1 | 1 | 4.58 |
| E125 | PES | 1 | 1 | 5.11 |
| E126 | PES | 1 | 1 | 4.66 |
| E127 | PES | 1 | 1 | 5.07 |
| E128 | PES | 1 | 1 | 5.02 |
| E129 | PES | 1 | 1 | 5.07 |
| E130 | PES | 1 | 1 | 5.04 |
| E131 | PAI | 1 | 1 | 3.83 |
| E132 | PAI | 1 | 1 | 3.83 |
| E133 | PES | 1 | 1 | 3.75 |
| E134 | PES | 1 | 1 | 3.67 |
| E135 | PES | 1 | 1 | 3.2 |
| E136 | FKM | | | 6.16 |
| E137 | FKM | | | 6.08 |

The results in Table 28 show that the adhesion properties of the control topcoats are either maintained or show a slight improvement in the present coating compositions, indicating that the addition of the coating compositions at the tested percentage solids of fluoropolymers does not interfere with the adhesion of the coating to the substrate when the topcoats have been made in accordance with the first and second embodiments of the present invention.

Normalized properties are used to combine the results of several tests and determine selected formulations which are set out in Table 29. Normalized data are calculated as follows:

NORM SURFACE=Mean((Col Maximum(:Ra)−:Ra)/(Col Maximum(:Ra)−Col Minimum(:Ra)), ((("Gloss(60o)")−Col Minimum(("Gloss(60o)")))/(Col Maximum(("Gloss(60o)"))−Col Minimum(("Gloss(60o)")))

NORM(RAT, CHICK, STEAK)=Mean(((("Number of Steak Cycles(5 CYCLES IS STANDARD PASS)")−Col Minimum(("Number of Steak Cycles(5 CYCLES IS STANDARD PASS)")))/(Col Maximum(("Number of Steak Cycles(5 CYCLES IS STANDARD PASS)"))−Col Minimum(("Number of Steak Cycles(5 CYCLES IS STANDARD PASS)"))),(:Chicken−Col Minimum(:Chicken))/(Col Maximum(:Chicken)−Col Minimum(:Chicken)),(:RAT−Col Minimum(:RAT))/(Col Maximum(:RAT)−Col Minimum(:RAT)))

NORM ENG ALL=Mean(((("Number of Steak Cycles(5 CYCLES IS STANDARD PASS)")−Col Minimum(("Number of Steak Cycles(5 CYCLES IS STANDARD PASS)")))/(Col Maximum(("Number of Steak Cycles(5 CYCLES IS STANDARD PASS)"))−Col Minimum(("Number of Steak Cycles(5 CYCLES IS STANDARD PASS)"))),(:Chicken−Col Minimum(:Chicken))/(Col Maximum(:Chicken)−Col Minimum(:Chicken)),(:RAT−Col Minimum(:RAT))/(Col Maximum(:RAT)−Col Minimum(:RAT)), ((Col Maximum(:Ra):Ra)/(Col Maximum(:Ra)−Col Minimum(:Ra)),(("Gloss(60o)")−Col Minimum(("Gloss(60o)")))/(Col Maximum(("Gloss(60o)"))−Col Minimum(("Gloss(60o)"))))

TABLE 29

Selected Coating Formulations for Topcoats on Rigid Substrates

| ID | POLYMER SOLID % | % HPTFE | % PFA | % FEP | % LPTFE | norm Surface | norm all eng | norm RAT Chick Steak |
|---|---|---|---|---|---|---|---|---|
| E56 | 28.99 | 0.8 | 0.1 | 0 | 0.1 | 0.47 | 0.62 | 0.71 |
| E101 | 33.71 | 0.61 | 0.12 | 0.11 | 0.16 | 0.53 | 0.61 | 0.67 |
| E59 | 28.99 | 0.8 | 0.1 | 0 | 0.1 | 0.48 | 0.57 | 0.64 |
| E82 | 33.55 | 0.8 | 0.1 | 0 | 0.1 | 0.36 | 0.57 | 0.71 |
| E58 | 28.99 | 0.8 | 0.1 | 0 | 0.1 | 0.46 | 0.57 | 0.64 |
| E57 | 28.99 | 0.8 | 0.1 | 0 | 0.1 | 0.47 | 0.56 | 0.62 |
| E60 | 28.99 | 0.8 | 0.1 | 0 | 0.1 | 0.49 | 0.56 | 0.6 |
| E84 | 32.9 | 0.8 | 0.1 | 0 | 0.1 | 0.37 | 0.55 | 0.67 |
| E53 | 28.99 | 0.8 | 0.1 | 0 | 0.1 | 0.45 | 0.52 | 0.57 |
| E114 | 33.92 | 0.4 | 0.12 | 0.11 | 0.36 | 0.55 | 0.52 | 0.5 |
| EControl6 | 32.9 | 0 | 0 | 0 | 1 | 0.69 | 0.5 | 0.37 |
| EControl4 | 32.9 | 0 | 0 | 0 | 1 | 0.67 | 0.49 | 0.37 |
| EControl2 | 32.9 | 0 | 1 | 0 | 0 | 0.56 | 0.43 | 0.35 |
| EControl5 | 32.9 | 0 | 0 | 0 | 1 | 0.4 | 0.43 | 0.45 |
| EControl3 | 32.9 | 0 | 0 | 1 | 0 | 0.64 | 0.42 | 0.28 |
| EControl9 | 32.9 | 0.52 | 0.1 | 0.1 | 0.28 | 0.49 | 0.33 | 0.22 |
| EControl7 | 32.9 | 0 | 0 | 0 | 1 | 0.44 | 0.32 | 0.23 |
| EControl1 | 32.9 | 1 | 0 | 0 | 0 | 0.46 | 0.31 | 0.21 |

As can be seen from Table 29, the 3-Component formula 80% HPTFE, 10% PFA and 10% LPTFE yields desirable properties. In addition the 4-Component formula with 10-61% HPTFE, 12% PFA 11% FEP and 16-36% LPTFE also delivers desirable properties.

Even ignoring RAT performance, the best performing formulations are as listed above.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A fluoropolymer composition, comprising:
   at least one low molecular weight polytetrafluoroethylene (LPTFE) having a number average molecular weight ($M_n$) of 500,000 or less, said LPTFE obtained from a dispersion including less than 1.0 wt. % surfactant; and
   at least two melt processible fluoropolymers in addition to said LPTFE, comprising:
      a first melt-processible fluoropolymer (MPF) in the form of perfluoroalkoxy; and
      a second melt-processible fluoropolymer (MPF) in the form of fluorinated ethylene propylene (FEP), said second melt-processible fluoropolymer (MPF) chemically different from said first melt-processible fluoropolymer (MPF), at least one of said first and second MPFs having a melt flow rate of at least 2 g/10 min;
   said at least one LPTFE present in an amount of between 40 wt. % and 60 wt. %, said perflouroalkoxy present in an amount of between 24 wt. % and 48 wt. %, and said FEP present in an amount of between 12 wt. % and 16 wt. %, based on the total solids weight of said at least one LPTFE, said perflouroalkoxy, and said FEP; and
   wherein said composition lacks fillers.

2. The fluoropolymer composition of claim 1, wherein said composition lacks high molecular weight polytetrafluoroethylene (HLPTFE) having a number average molecular weight ($M_n$) of at least 500,000.

3. The fluoropolymer composition of claim 1, wherein said composition further comprises at least one high molecular weight polytetrafluoroethylene (HPTFE) having a number average molecular weight ($M_n$) of at least 500,000.

4. The fluoropolymer composition of claim 3, wherein said at least one HPTFE is present in an amount of between 1 wt. % and 89 wt. %, based on the total solids weight of said at least one HPTFE, said at least one LPTFE, and said at least two MPFs.

5. The fluoropolymer composition of claim 3, wherein said at least one LPTFE is present in an amount of between 16 wt. % and 60 wt. %, said HPTFE is present in an amount of between 1 wt. % and 60 wt. %, and said at least two MPFs are together present in an amount of between 11 wt. % and 60 wt. %, based on the total solids weight of said at least one HPTFE, said at least one LPTFE, and said at least two MPFs.

6. The fluoropolymer composition of claim 1, wherein said at least one LPTFE is obtained via emulsion polymerization without being subjected to agglomeration, thermal degradation, or irradiation.

7. The fluoropolymer composition of claim 1, wherein said composition is in the form of an aqueous dispersion.

8. The fluoropolymer composition of claim 1, wherein said at least one LPTFE is obtained from a dispersion including less than 0.5 wt. % surfactant.

9. The fluoropolymer composition of claim 1, wherein said at least one LPTFE has a number average molecular weight ($M_n$) of 200,000 or less.

10. The fluoropolymer composition of claim 3, wherein said at least one high molecular weight polytetrafluoroethylene (HPTFE) includes a modifying co-monomer present in an amount of less than 1% by weight, based on the weight of said HPTFE.

11. The fluoropolymer composition of claim 10, wherein said modifying co-monomer is perfluoropropylvinylether (PPVE).

12. A coating applied to a substrate, said coating comprising said fluoropolymer composition of claim 1.

13. A method of coating a substrate, said method comprising the steps of:
   providing a substrate;
   applying a coating composition to the substrate, the coating composition comprising:
      at least one low molecular weight polytetrafluoroethylene (LPTFE) having a number average molecular weight ($M_n$) of 500,000 or less, the LPTFE obtained from a dispersion including less than 1.0 wt. % surfactant; and
      at least two melt processible fluoropolymers in addition to the LPTFE, comprising:
         a first melt-processible fluoropolymer (MPF) in the form of perfluoroalkoxy; and
         a second melt-processible fluoropolymer (MPF) in the form of fluorinated ethylene propylene (FEP), the second melt-processible fluoropolymer (MPF) chemically different from the first melt-processible fluoropolymer (MPF), at least one of the first and second MPFs having a melt flow rate of at least 2 g/10 min, the at least one LPTFE present in an amount of between 40 wt. % and 60 wt. %, the perfluoroalkoxy present in an amount of between 24 wt. % and 48 wt. %, and the FEP present in an amount of between 12 wt. % and 16 wt. %, based on the total solids weight of the at least one LPTFE, the perfluoroalkoxy, and the FEP, and wherein said composition lacks fillers; and
   curing the composition o form a coating.

14. The method of claim 13, further comprising additional steps, prior to said applying a coating composition step, of:
   applying a primer to the substrate, the primer including at least one fluoropolymer; and
   optionally, at least partially curing the primer.

15. The method of claim 14, further comprising additional steps, following said applying a primer step and prior to said applying a coating composition step, of:
   applying a midcoat to the substrate, the midcoat including at least one fluoropolymer; and
   optionally, at least partially curing the midcoat.

16. The method of claim 13, wherein the coating composition lacks high molecular weight polytetrafluoroethylene (HLPTFE) having a number average molecular weight ($M_n$) of at least 500,000.

17. The method of claim 13, wherein the coating composition further comprises at least one high molecular weight polytetrafluoroethylene (HPTFE) having a number average molecular weight ($M_n$) of at least 500,000.

18. The method of claim 17, wherein the at least one HPTFE is present in an amount of between 1 wt. % and 89 wt.%, based on the total solids weight of the at least one HPTFE, the at least one LPTFE, and the at least two MPFs in the coating composition.

19. The method of claim 13, wherein the substrate is selected from the group consisting of:
   a rigid substrate; and
   a flexible substrate.

20. The method of claim 13, wherein the at least one LPTFE is obtained from a dispersion including less than 0.5 wt. % surfactant.

21. The method of claim 13, wherein the at least one LPTFE has a number average molecular weight ($M_n$) of 200,000 or less.

22. The method of claim 17, wherein the at least one high molecular weight polytetrafluoroethylene (HPTFE) includes a modifying co-monomer present in an amount of less than 1% by weight, based on the weight of the HPTFE.

23. The method of claim 22, wherein the modifying co-monomer is perfluoropropylyinylether (PPVE).

* * * * *

UNITED STATES PATENT AND TRADEMARK OFFICE
CERTIFICATE OF CORRECTION

PATENT NO.       : 9,051,461 B2
APPLICATION NO.  : 12/962790
DATED            : June 9, 2015
INVENTOR(S)      : Leonard W. Harvey et al.

It is certified that error appears in the above-identified patent and that said Letters Patent is hereby corrected as shown below:

In the Claims:

Claim 1, Column 89, lines 36 and 40, replace "perflouroalkoxy" to "perfluoroalkoxy"

Claim 13, Column 90, line 46, replace "composition o form" to "composition to form"

Signed and Sealed this
Twentieth Day of October, 2015

Michelle K. Lee
*Director of the United States Patent and Trademark Office*